United States Patent
Leonard et al.

(10) Patent No.: US 9,700,912 B2
(45) Date of Patent: Jul. 11, 2017

(54) FLUID TRANSPORT MEDIA

(71) Applicants: William K. Leonard, River Falls, WI (US); John W. Louks, Hudson, WI (US)

(72) Inventors: William K. Leonard, River Falls, WI (US); John W. Louks, Hudson, WI (US)

( * ) Notice: Subject to any disclaimer, the term of this patent is extended or adjusted under 35 U.S.C. 154(b) by 797 days.

(21) Appl. No.: 13/929,443

(22) Filed: Jun. 27, 2013

(65) Prior Publication Data
US 2014/0000513 A1 Jan. 2, 2014

Related U.S. Application Data

(60) Provisional application No. 61/690,447, filed on Jun. 27, 2012.

(51) Int. Cl.
 *B05C 5/02* (2006.01)
 *B05B 15/00* (2006.01)
 *B33Y 80/00* (2015.01)

(52) U.S. Cl.
 CPC ............ *B05C 5/027* (2013.01); *B05B 15/008* (2013.01); *B05C 5/0245* (2013.01); *B05C 5/0254* (2013.01); *B33Y 80/00* (2014.12)

(58) Field of Classification Search
 CPC ..... B05C 5/0245; B05C 5/0254; B05C 5/027; B05B 15/008
 See application file for complete search history.

(56) References Cited

U.S. PATENT DOCUMENTS

| | | |
|---|---|---|
| 402,188 A | 4/1889 | Peregrine |
| 3,149,949 A | 9/1964 | Dockerty |
| 3,365,325 A | 1/1968 | Fraenkel |
| 3,570,059 A | 3/1971 | Mott |
| 3,746,642 A | 7/1973 | Bergstrom |
| 3,788,486 A | 1/1974 | Bergstrom |
| 3,828,725 A | 8/1974 | Lewicki, Jr. |
| 4,371,571 A | 2/1983 | McIntyre et al. |
| 4,386,998 A | 6/1983 | McIntyre et al. |
| 4,489,671 A * | 12/1984 | Choinski ............... B05C 5/007 118/266 |
| 4,774,109 A | 9/1988 | Hadzimihalis et al. |
| 4,806,391 A | 2/1989 | Shorin |
| 4,945,855 A | 8/1990 | Eklund et al. |
| 5,045,358 A | 9/1991 | Watanabe et al. |
| 5,067,432 A | 11/1991 | Lippert |

(Continued)

OTHER PUBLICATIONS

"Inertial and Gravitational Effects in Extrusion Dies for Non-Newtonian Fluids", William K Leonard, Polymer Engineering and Science, Jun. 1985.vol. 25,No. 9, pp. 570-576.

(Continued)

*Primary Examiner* — Darren W Gorman
(74) *Attorney, Agent, or Firm* — Skinner and Associates; Joel Skinner

(57) ABSTRACT

Improved apparatus and methods for filtering and applying coating fluids onto substrates. The apparatus and methods are useful for casting embossed sheeting, and in fluid application dies. Improved fluid filtration methods, apparatus, elements and media are also disclosed. An apparatus and method for collection of mist generated in high speed liquid film splitting processes are also disclosed.

20 Claims, 133 Drawing Sheets

(56) References Cited

U.S. PATENT DOCUMENTS

| | | |
|---|---|---|
| 5,069,403 A | 12/1991 | Marentic et al. |
| 5,133,516 A | 7/1992 | Marentic et al. |
| 5,262,194 A | 11/1993 | Bischer, Jr. et al. |
| 5,409,732 A | 4/1995 | Leonard et al. |
| 5,691,846 A | 11/1997 | Benson, Jr. et al. |
| 5,698,655 A | 12/1997 | Chung et al. |
| 5,702,527 A | 12/1997 | Seaver et al. |
| 5,993,672 A | 11/1999 | Manz |
| 6,027,768 A * | 2/2000 | Koskinen .............. B05C 5/0254 118/302 |
| 6,057,033 A | 5/2000 | Bilodeau |
| 6,290,685 B1 | 9/2001 | Insley et al. |
| 6,511,714 B2 | 1/2003 | Branlard et al. |
| 6,524,488 B1 | 2/2003 | Insley et al. |
| 6,579,574 B2 | 6/2003 | Seaver et al. |
| 6,737,113 B2 | 5/2004 | Leonard et al. |
| 6,855,374 B2 | 2/2005 | Leonard |
| 6,884,371 B2 | 4/2005 | Smith |
| 6,899,922 B2 | 5/2005 | Leonard et al. |
| 7,125,490 B2 | 10/2006 | Clendenning et al. |
| 7,311,780 B2 | 12/2007 | Leonard et al. |
| 7,361,300 B2 | 4/2008 | Kelly et al. |
| 7,591,903 B2 | 9/2009 | Maier et al. |
| D618,761 S | 6/2010 | Reid et al. |
| 7,985,343 B2 | 7/2011 | Haldopoulos et al. |
| 8,312,997 B2 | 11/2012 | Hahn et al. |
| 8,444,752 B2 | 5/2013 | Beall et al. |
| 9,168,479 B2 | 10/2015 | Aoki |
| 9,359,929 B2 | 6/2016 | Mase et al. |
| 2014/0329019 A1 | 11/2014 | Tanley et al. |

OTHER PUBLICATIONS

"Chapter 10 by Robert B. Secor", Liquid Film Coating. edited by S. F. Kistler and P. M. Schweizer, Chapman & Hall, 1997, ISBN 0412064812.

\* cited by examiner

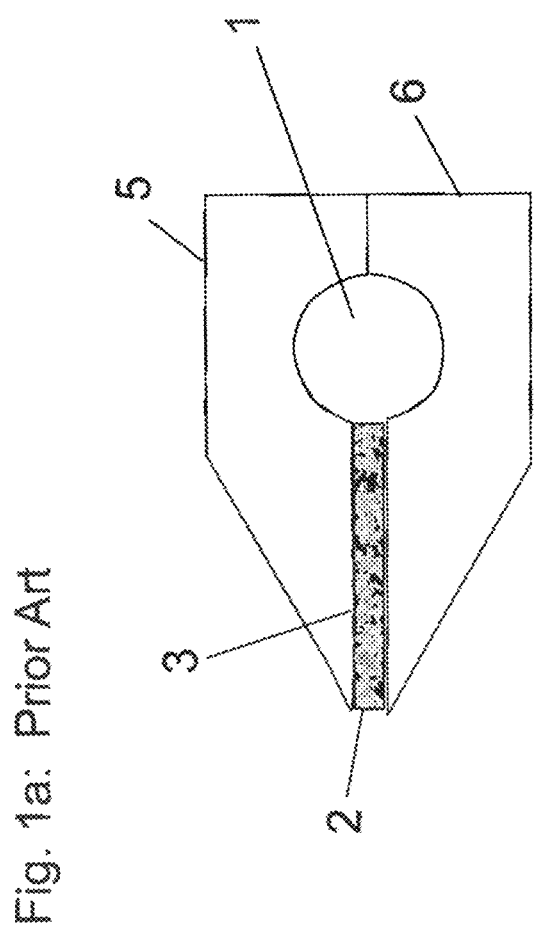

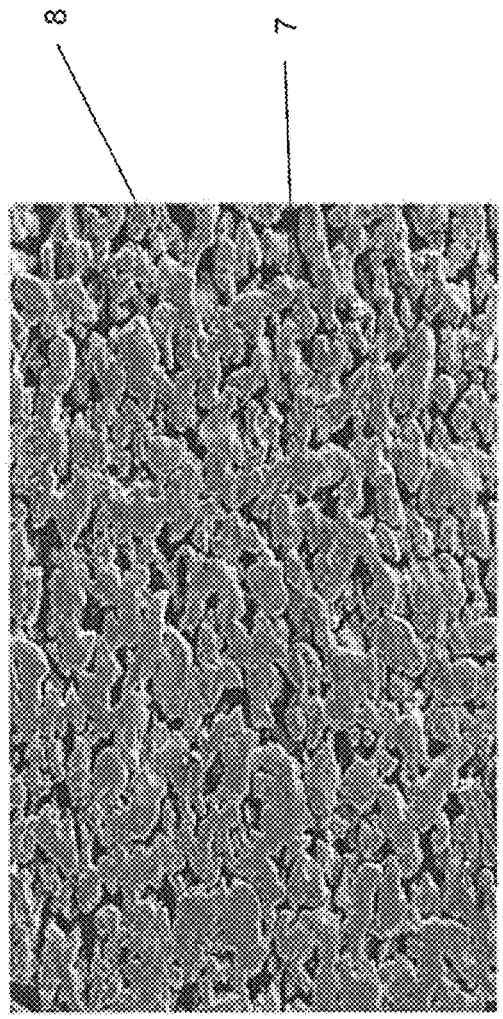
Fig. 1b: Prior Art

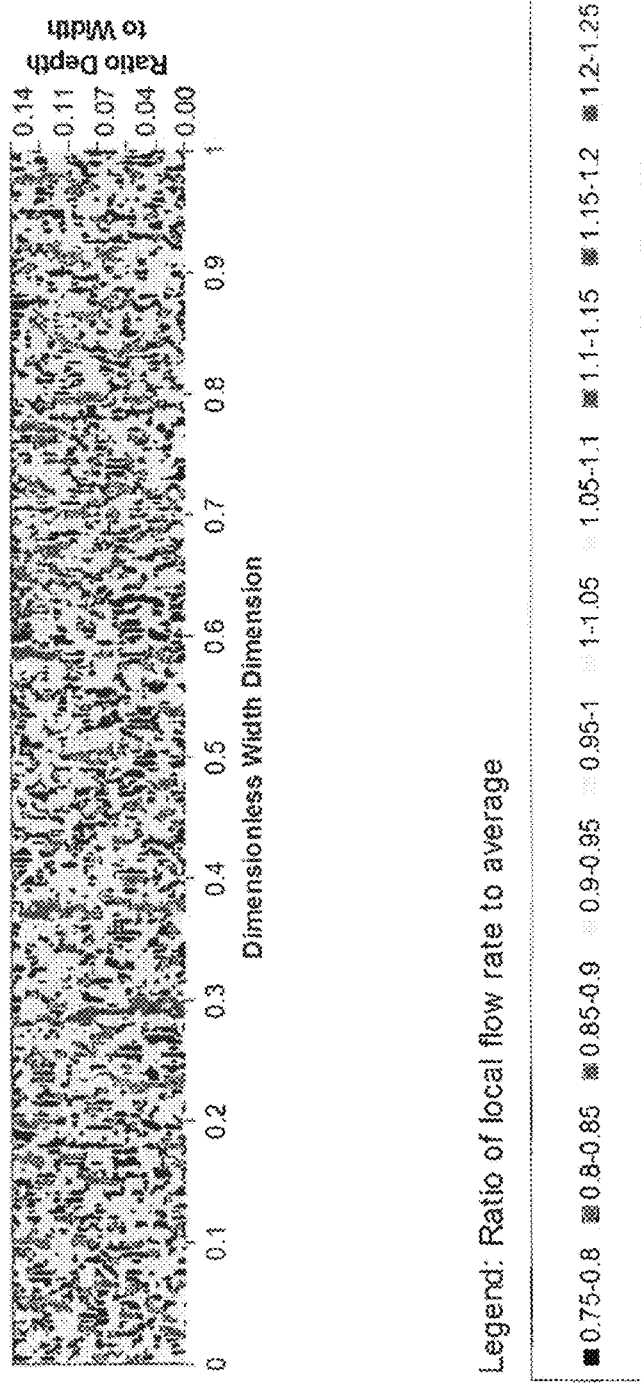

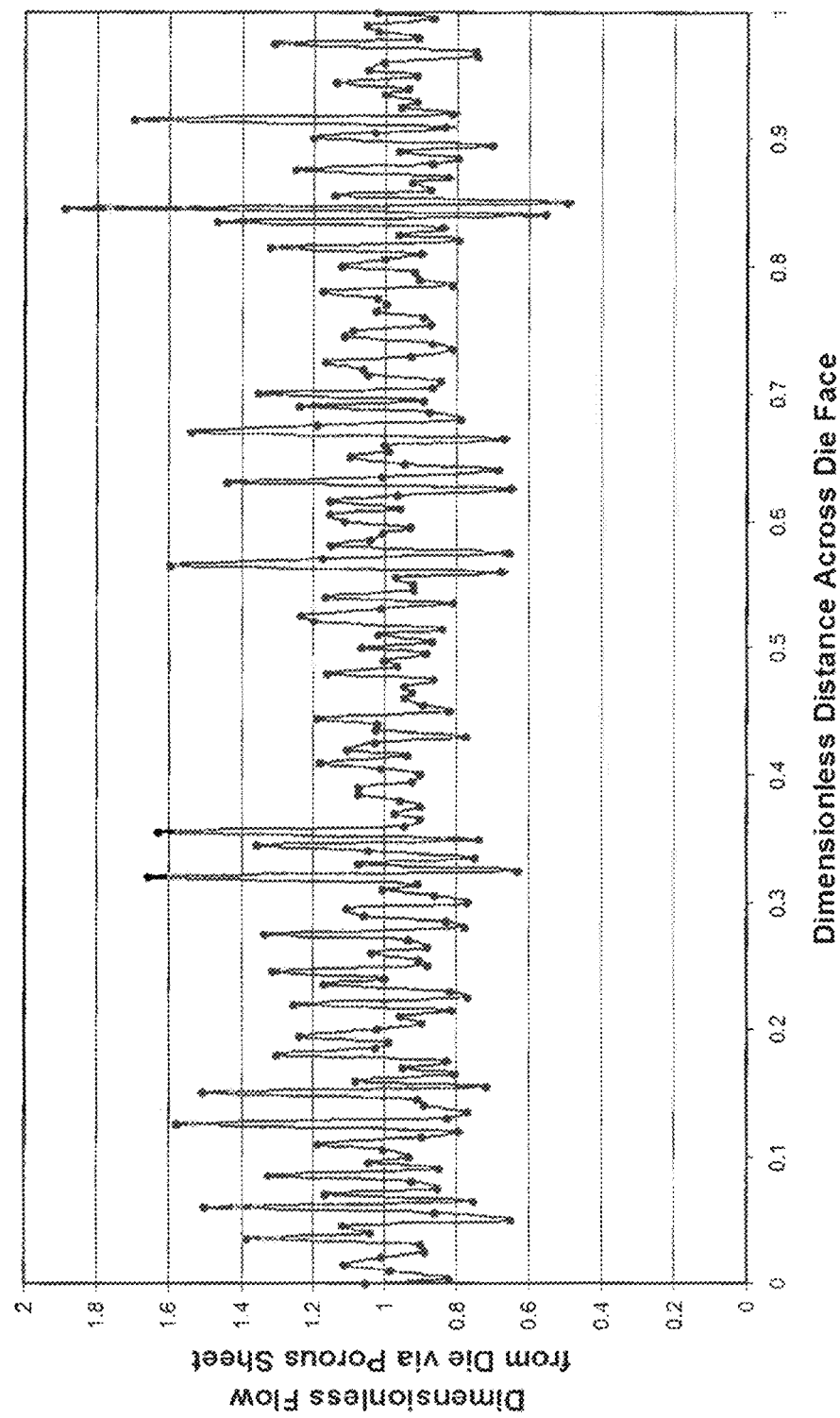

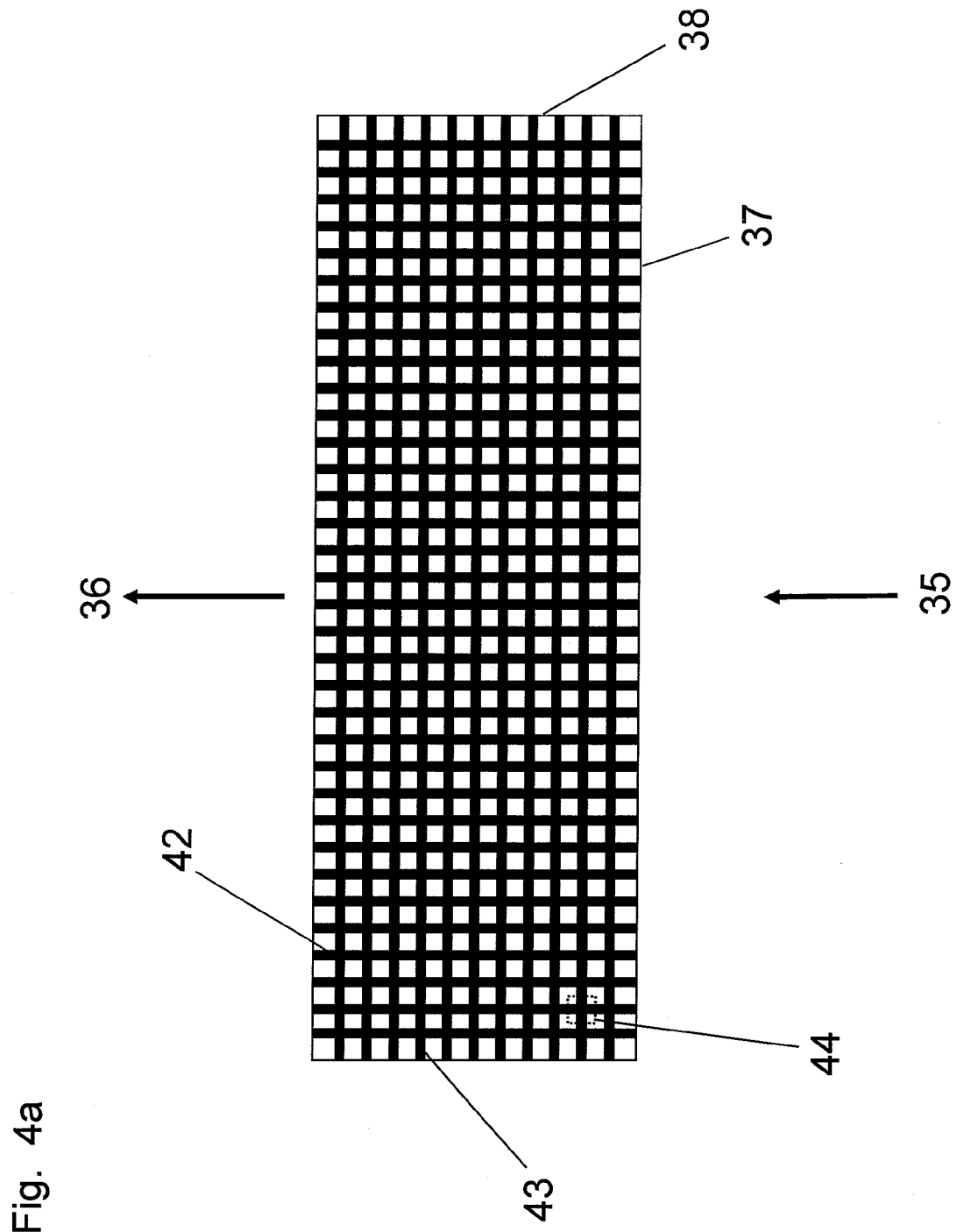

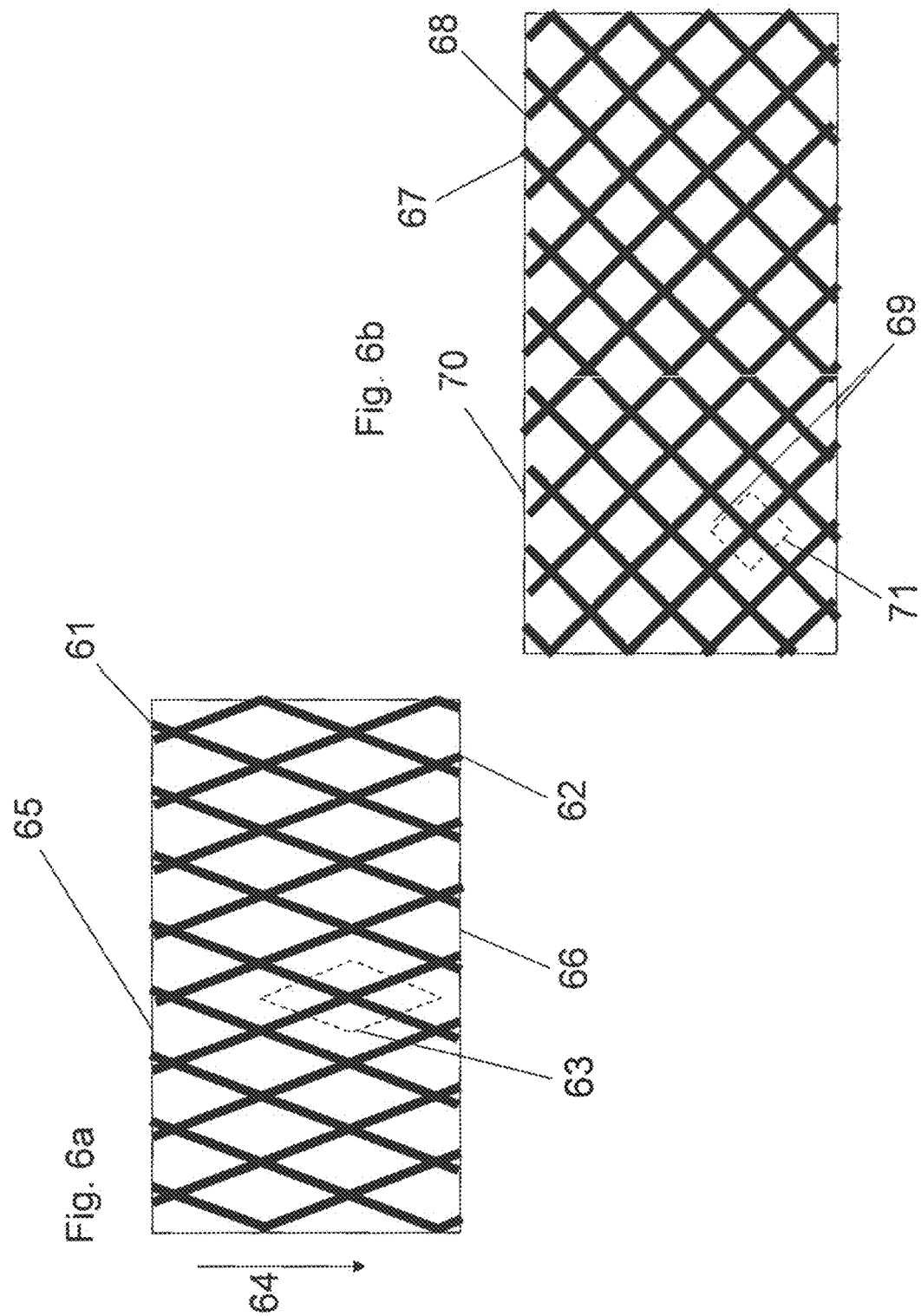

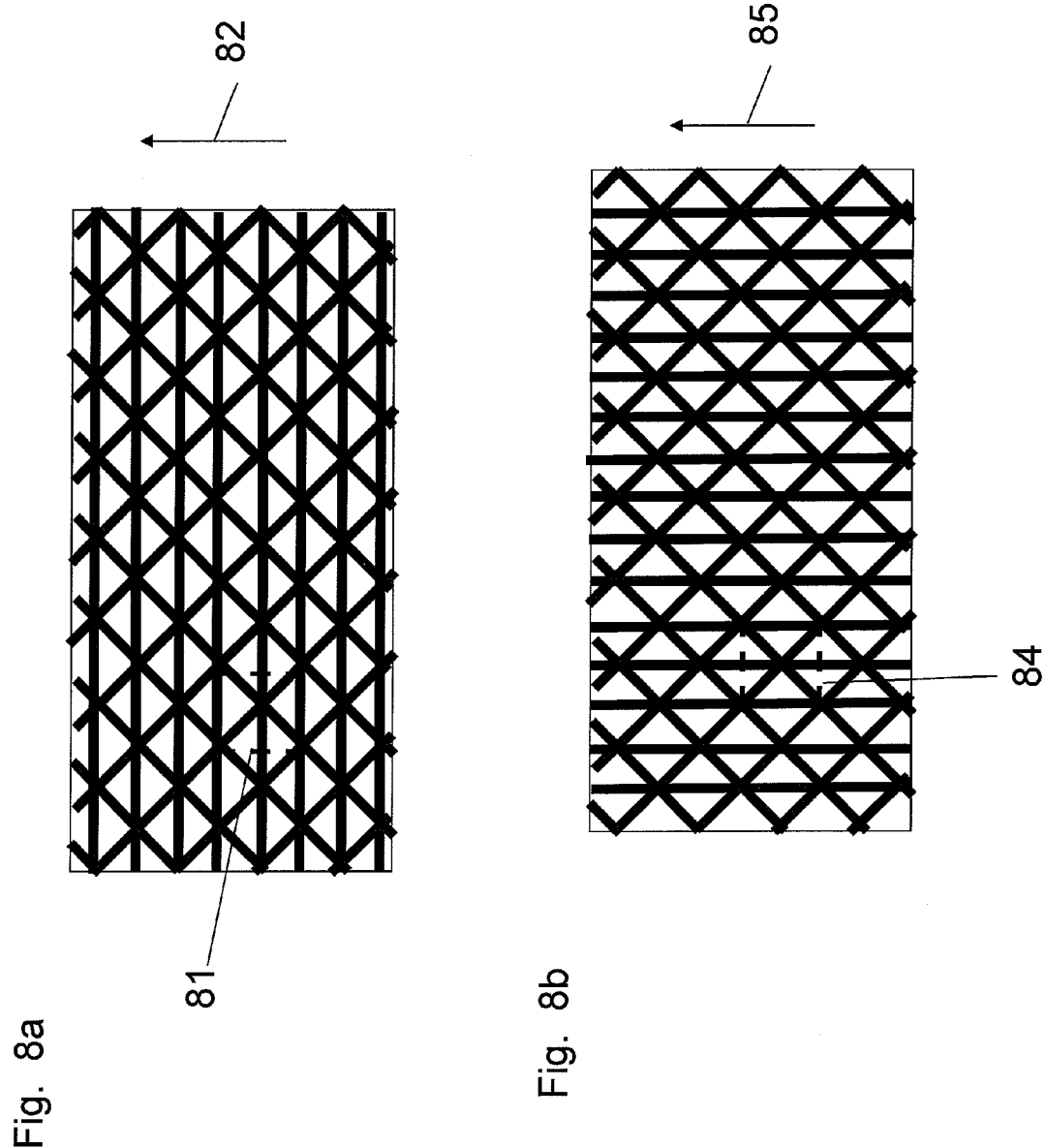

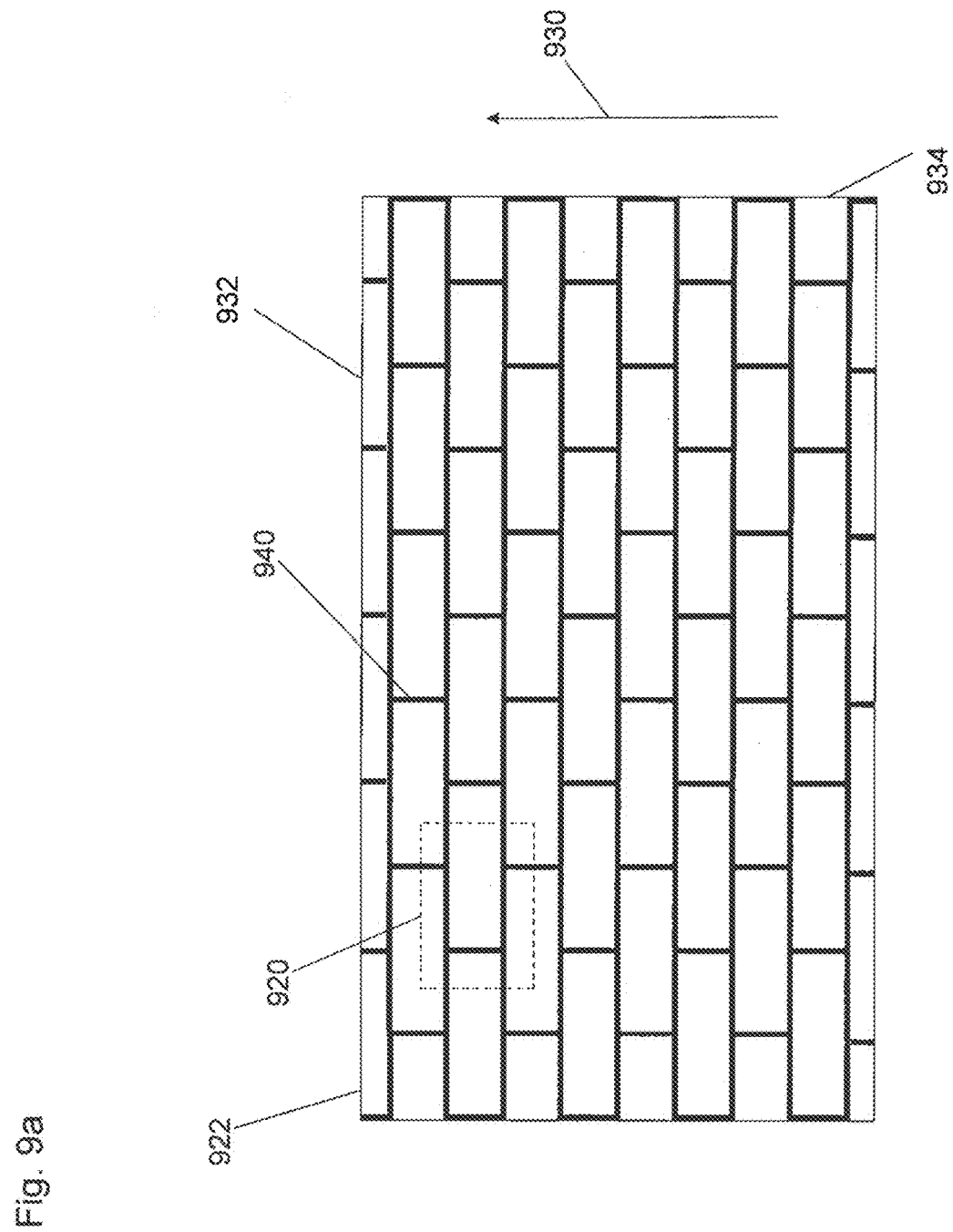

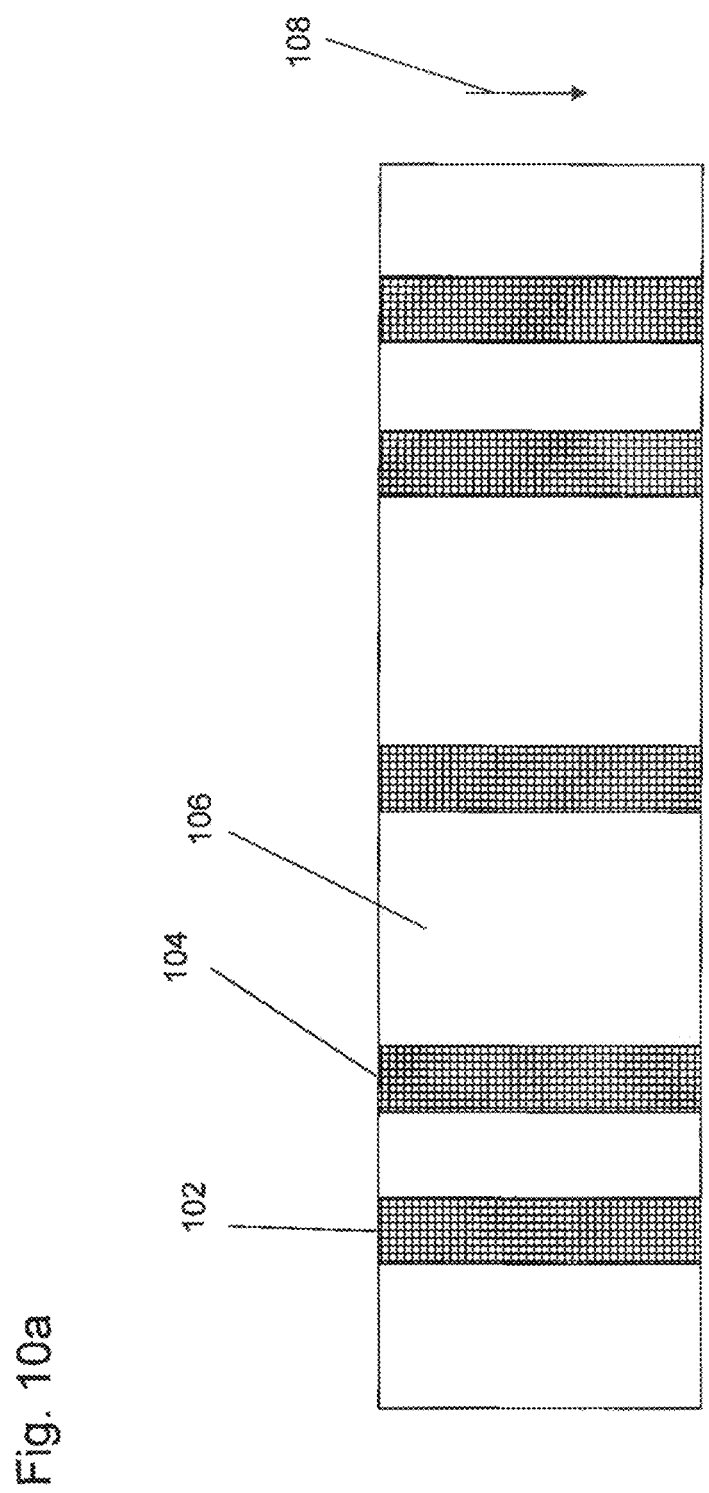

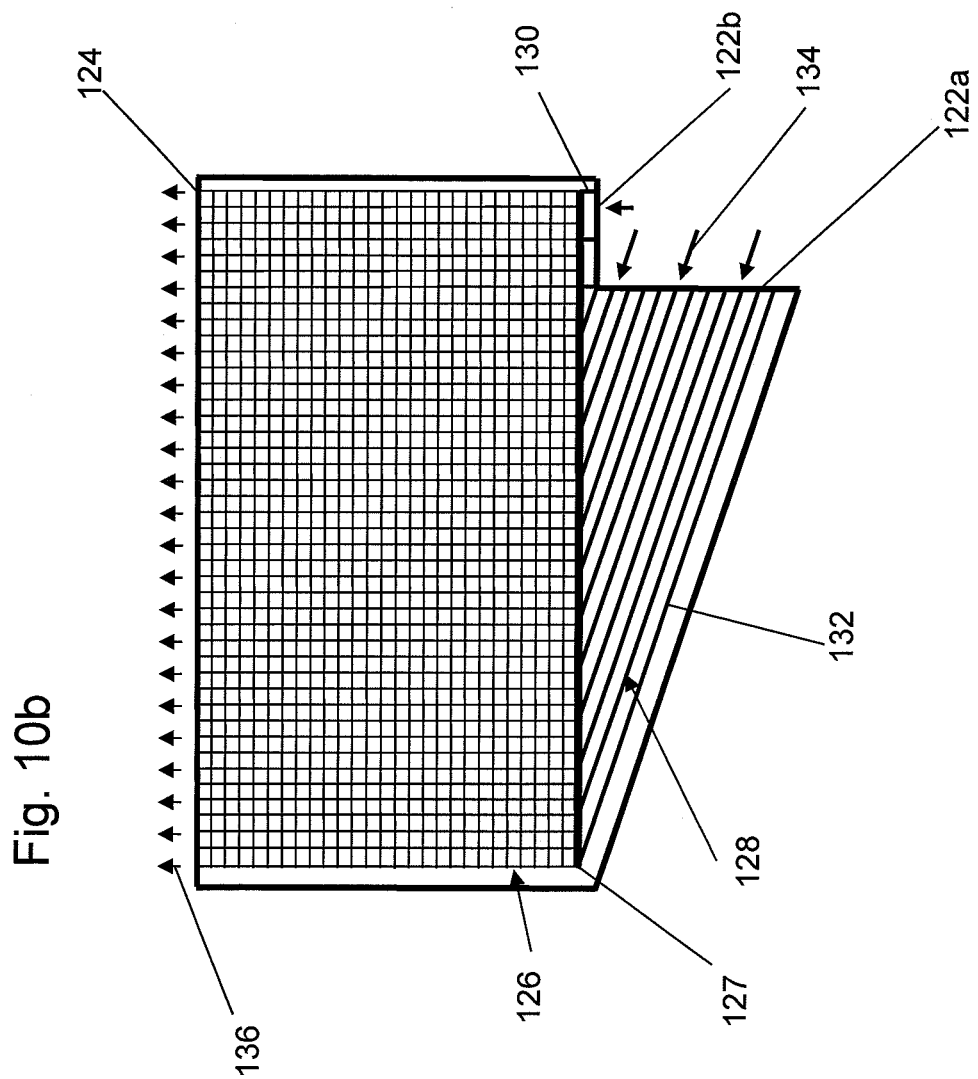

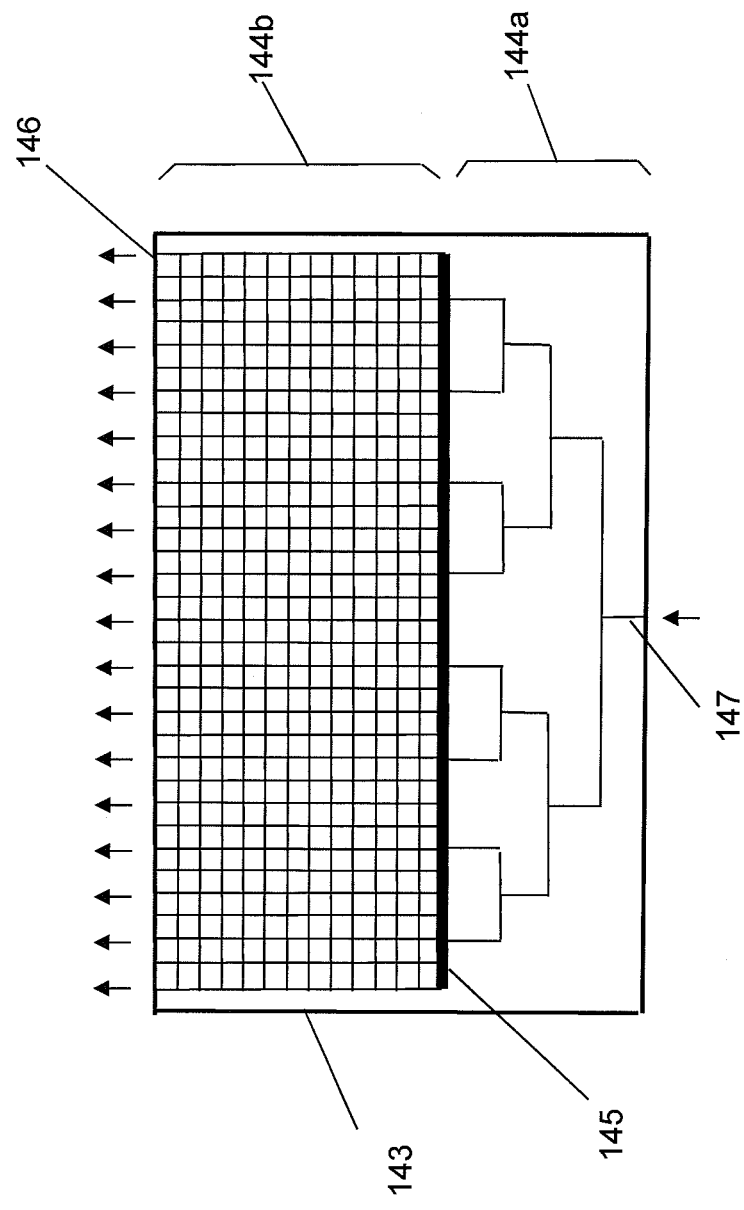

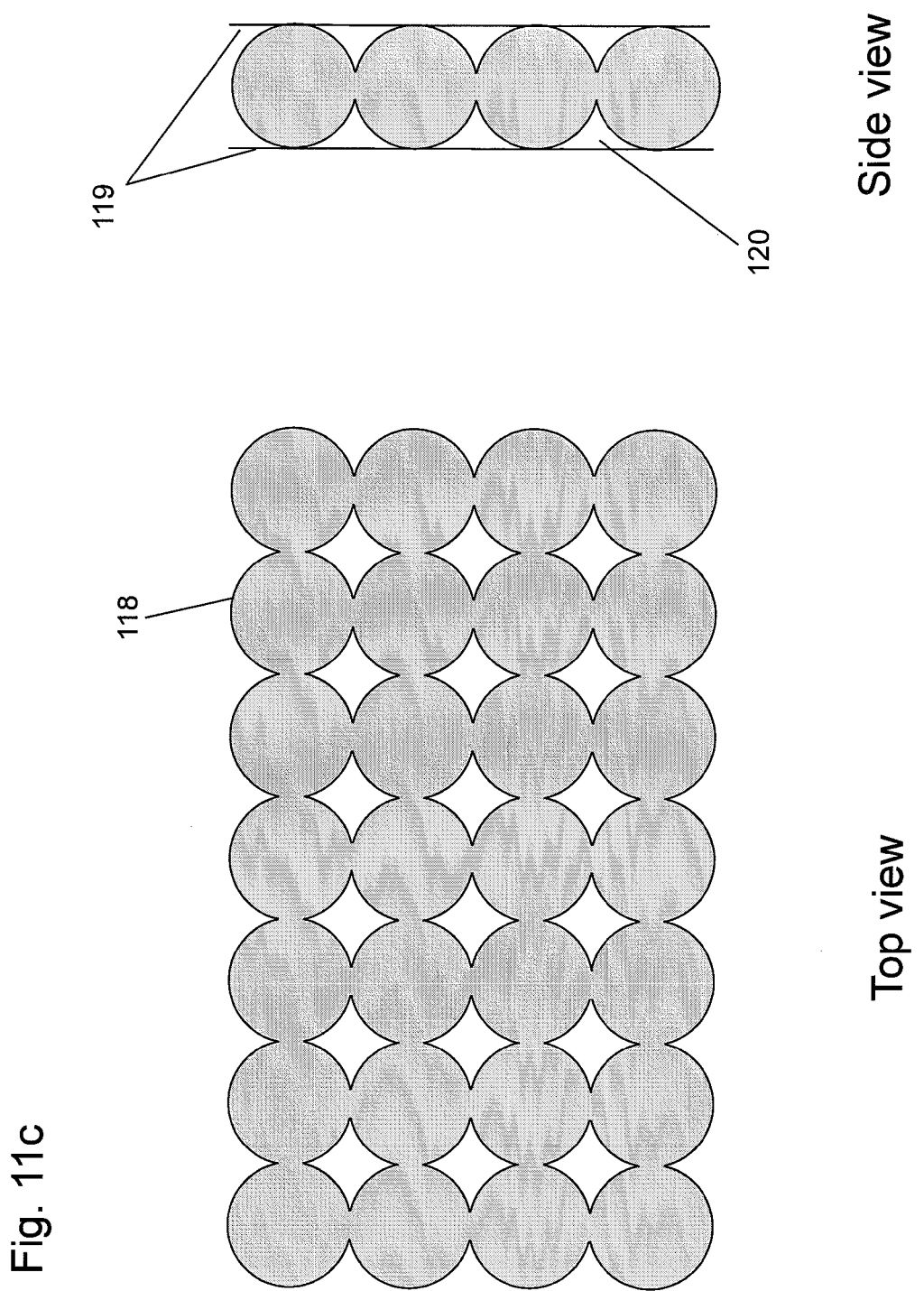

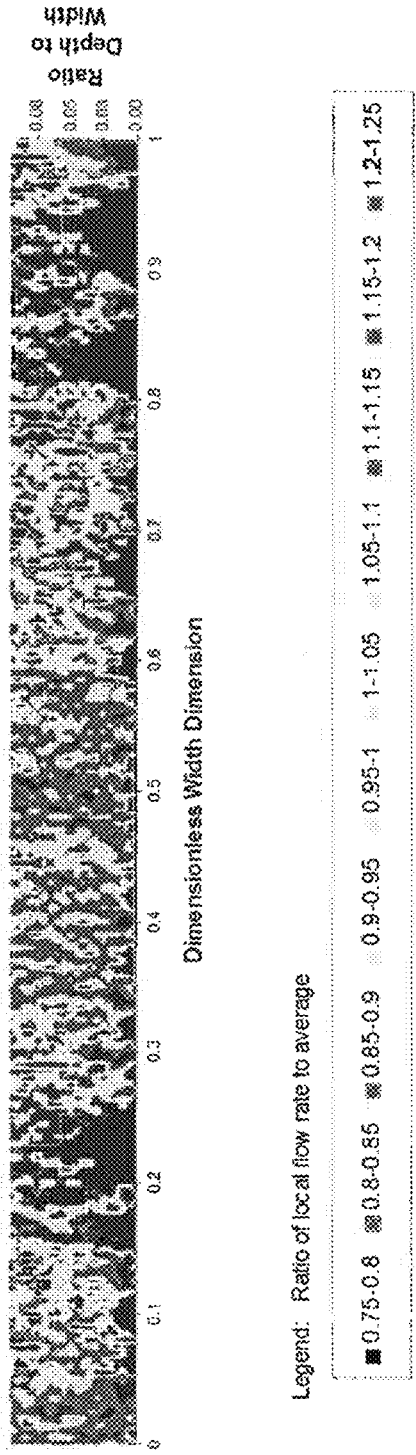

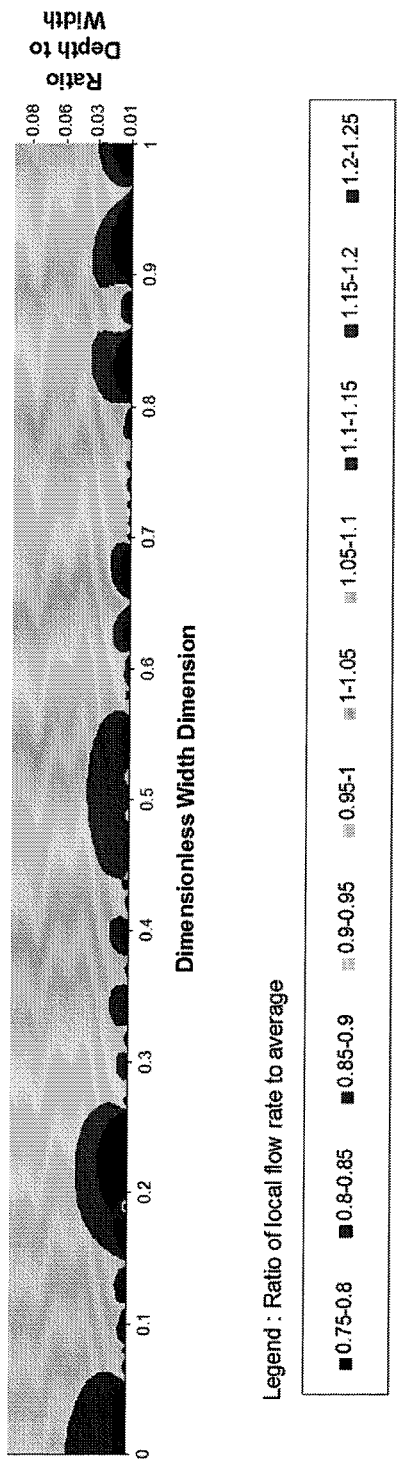
Fig. 13: Flow in Improved Metering Sheet

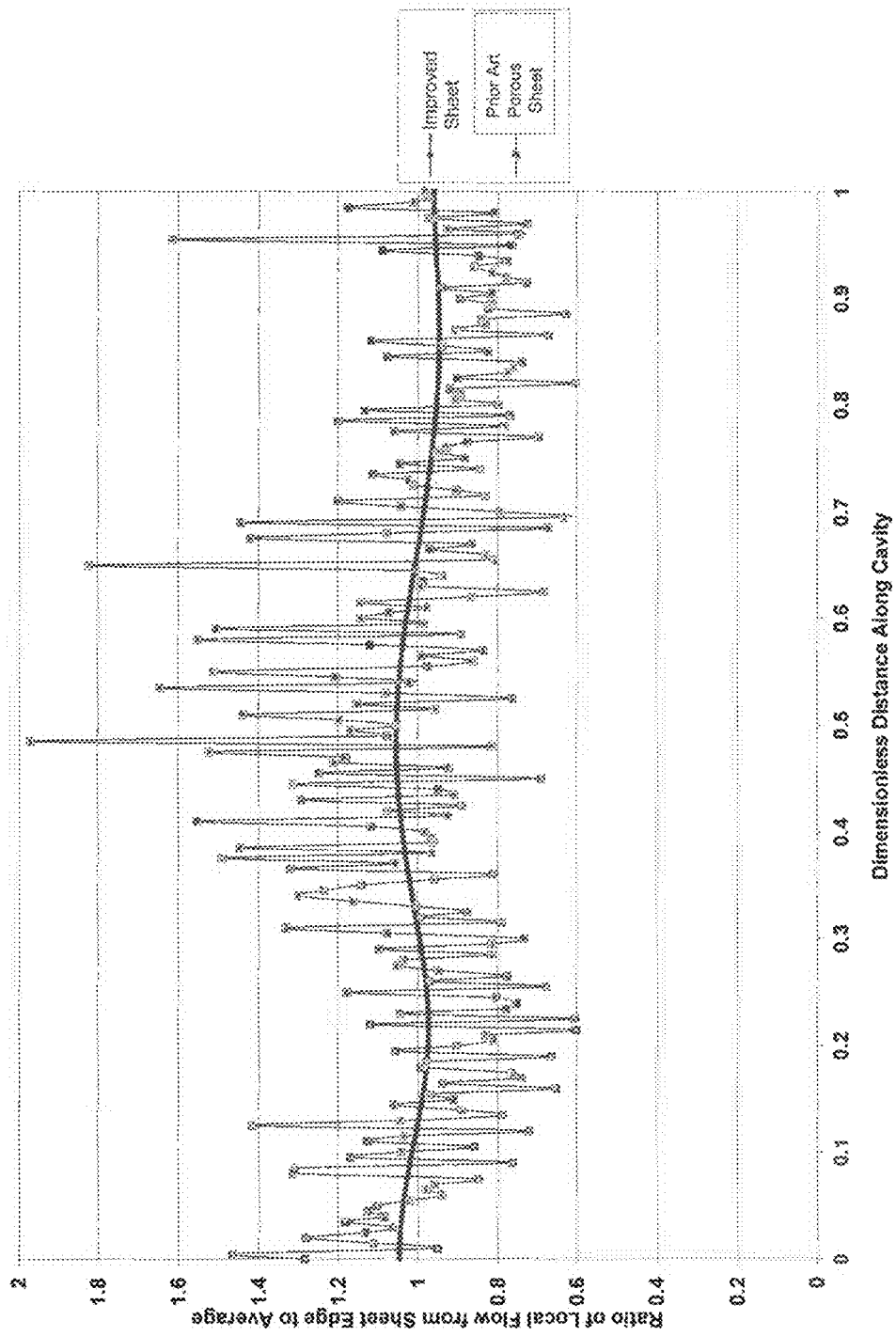

Fig. 25: Improved Multimodal Capture Probability Gradient for 5x26x2 Grid

Fig. 26: Improved Multimodal Capture Probability Gradient for 5x48x2 Grid

Particles Trapped vs. Auxiliary Channel Flow Resistance

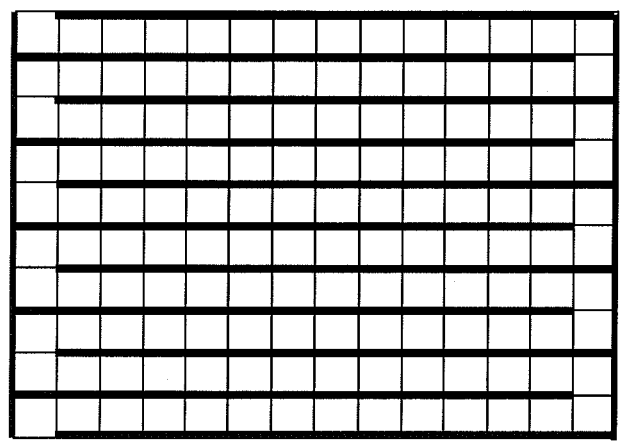
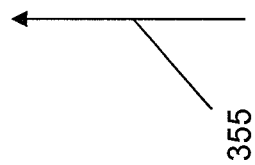
Fig. 35b

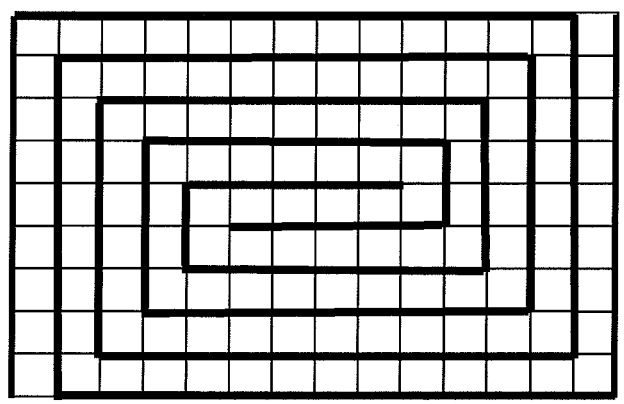
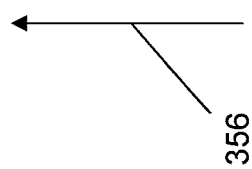
Fig. 35c

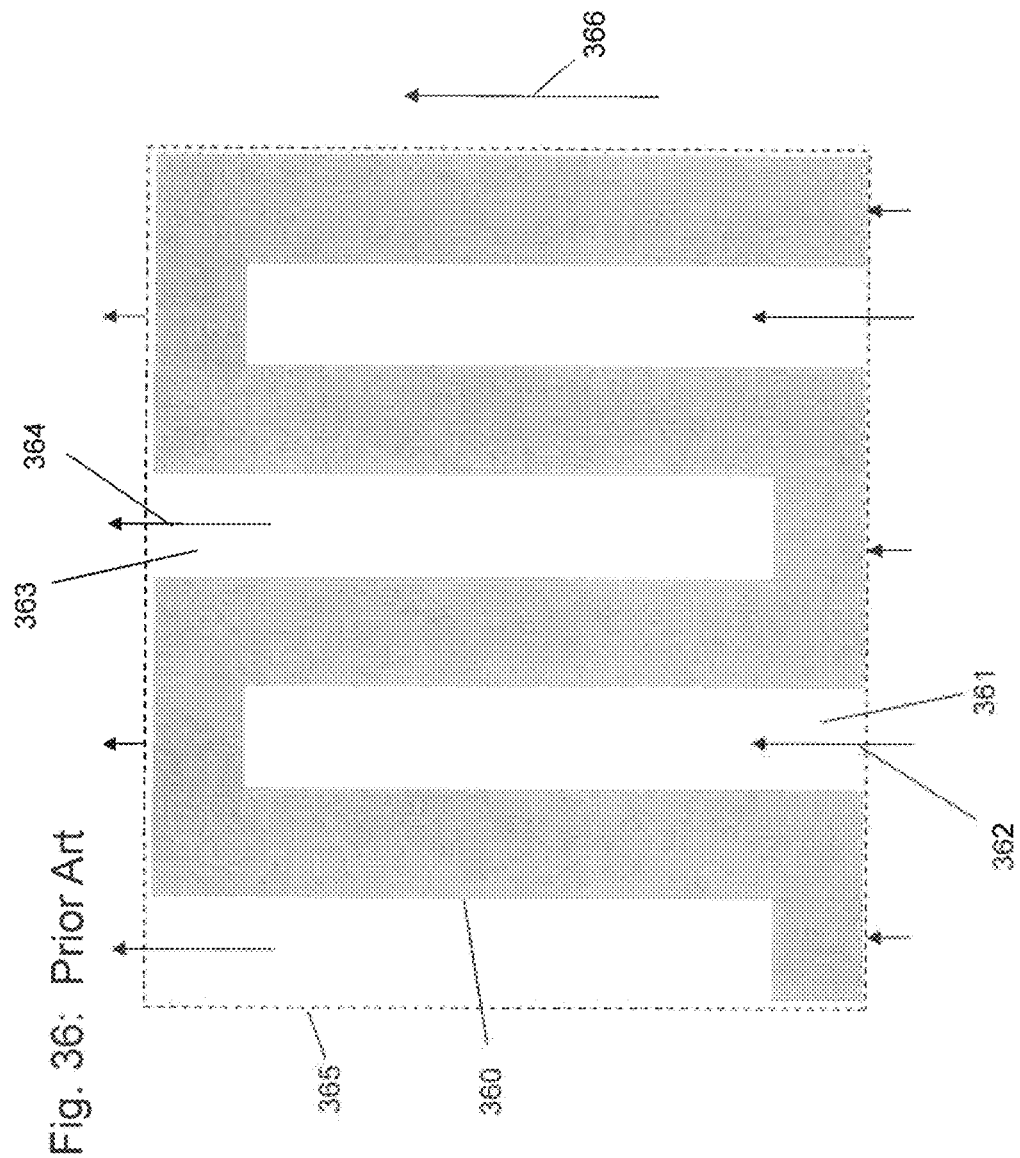
Fig. 36: Prior Art

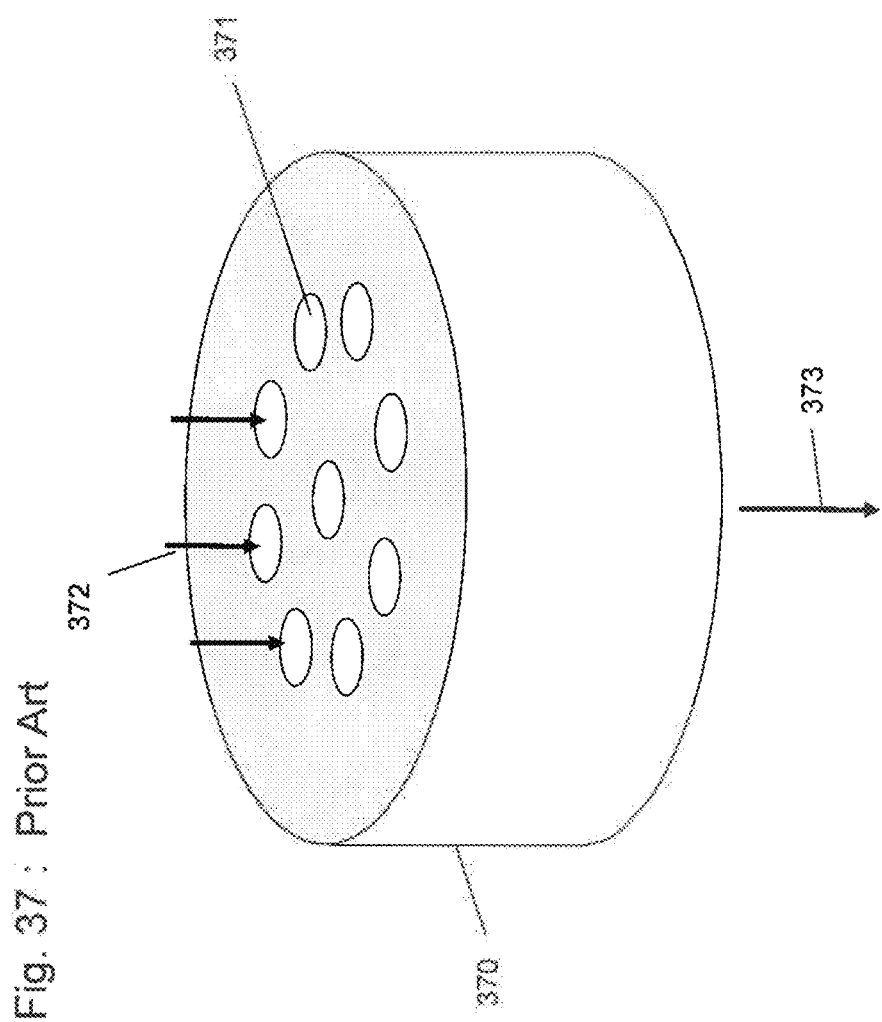
Fig. 37: Prior Art

Fig. 44

Table 1.: Total particles captured at the filtration end point of a 50% reduction in flow rate

|  | Particle Capture Probability | | |
|---|---|---|---|
|  | 0.3 | 0.5 | 0.7 |
| Z-fold | 3,171 | 1,822 | 1,443 |
| Micro-auxiliary1: equal mass | 5,954 | 6,190 | 5,001 |
| Micro-auxiliary1: equal volume | 11,908 | 12,380 | 10,002 |

Fig. 45

Table 2.: Ratio of particle capture performance for the improved media versus the Z-fold media at the filtration end point of a 50% reduction in flow rate

| | Particle Capture Probability | | |
|---|---|---|---|
| | 0.3 | 0.5 | 0.7 |
| Z-fold | 1.0 | 1.0 | 1.0 |
| Micro-auxiliary1: equal mass | 1.9 | 3.4 | 3.5 |
| Micro-auxiliary1: equal volume | 3.8 | 6.8 | 6.9 |
| Micro-auxiliary2: equal mass | - | 1.9 | - |
| Micro-auxiliary2: equal volume | - | 3.8 | - |
| Micro-auxiliary3: equal mass | - | 2.3 | - |
| Micro-auxiliary3: equal volume | - | 4.6 | - |

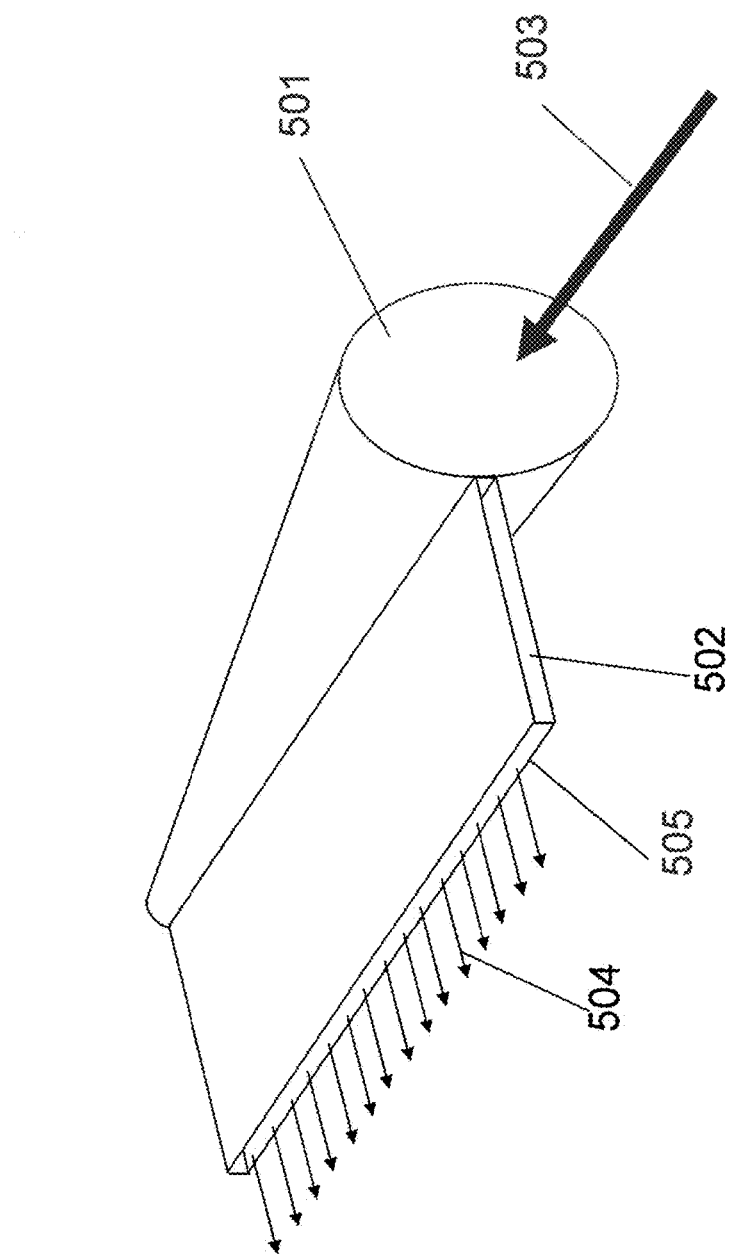
FIG. 46: Prior Art

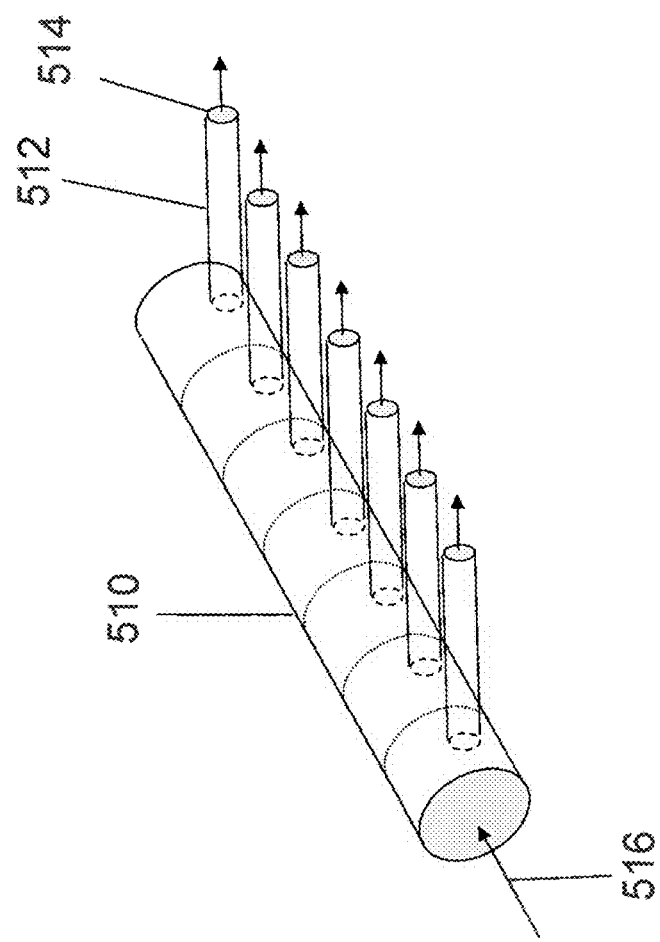
FIG. 47 : Prior Art

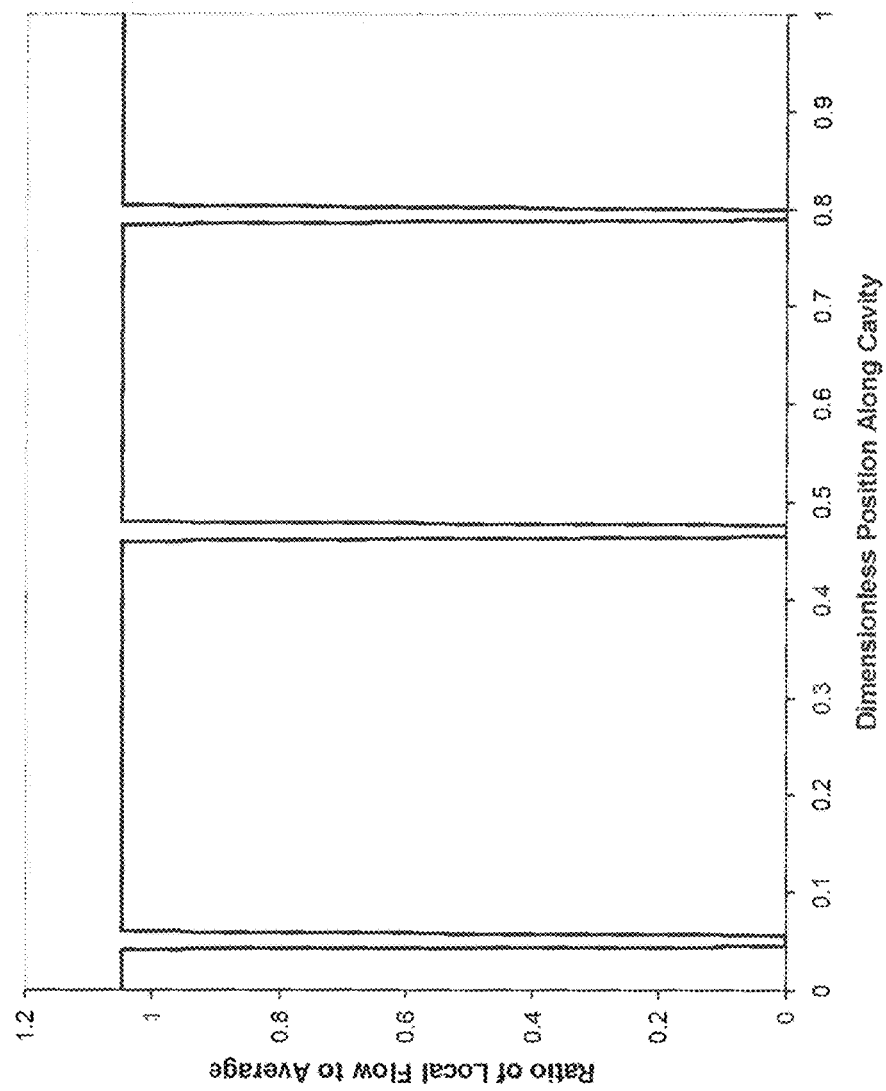

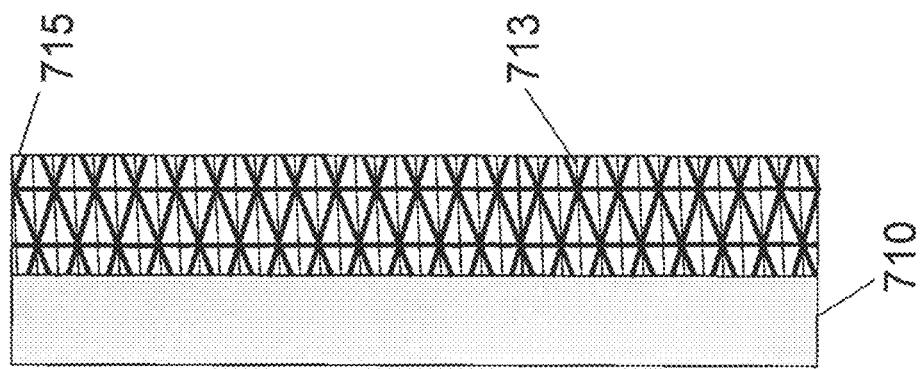
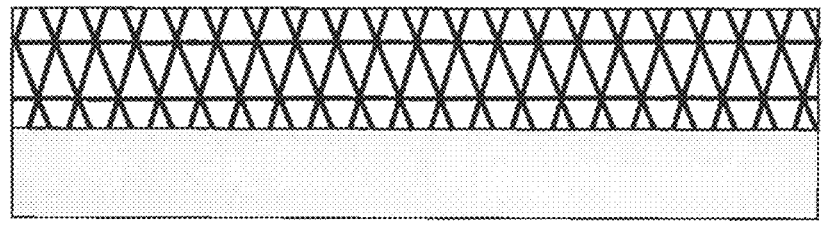
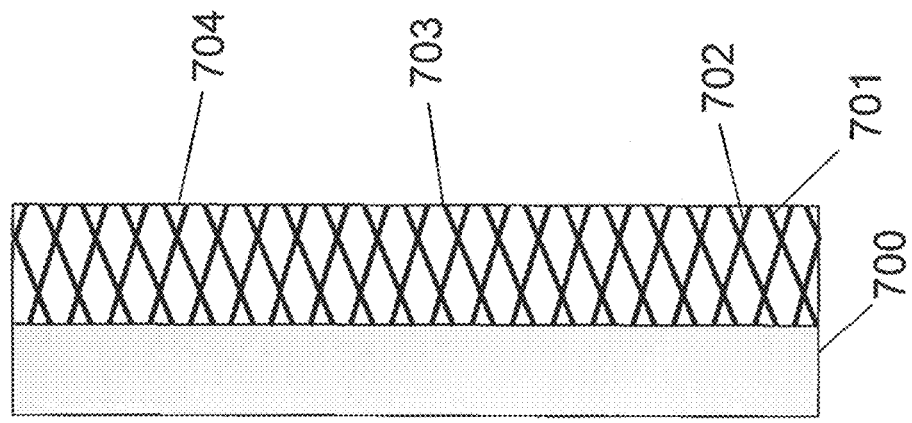

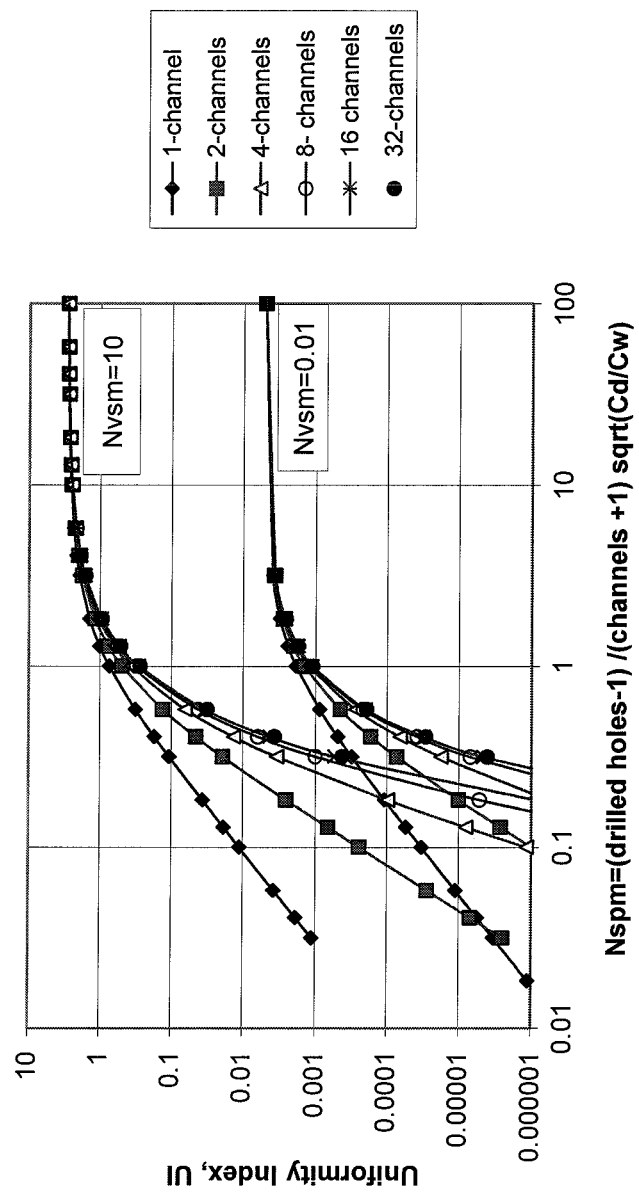
Fig. 51a: Drill Hole Dies with Auxiliary Channels
Number of drilled holes >100

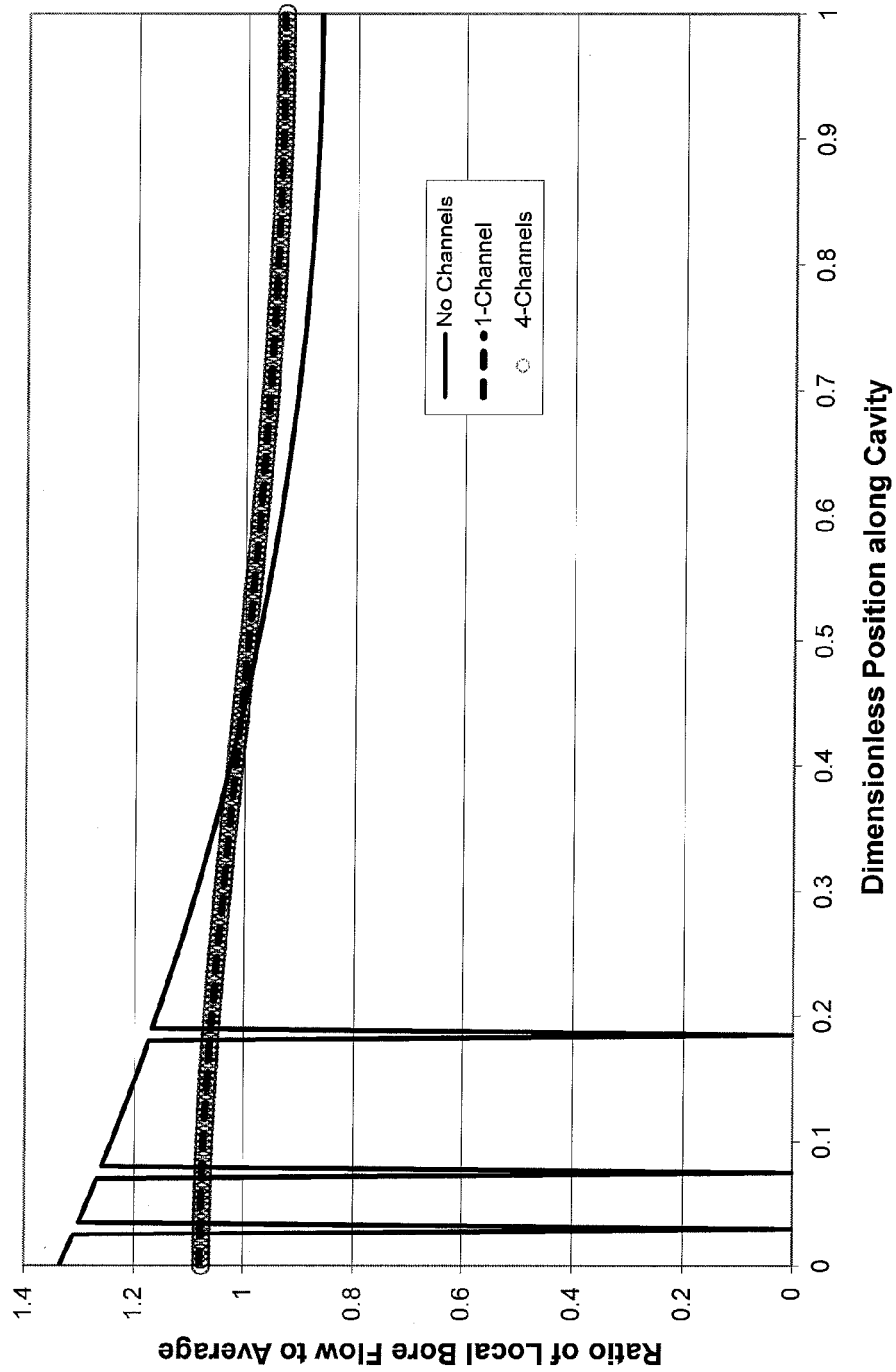

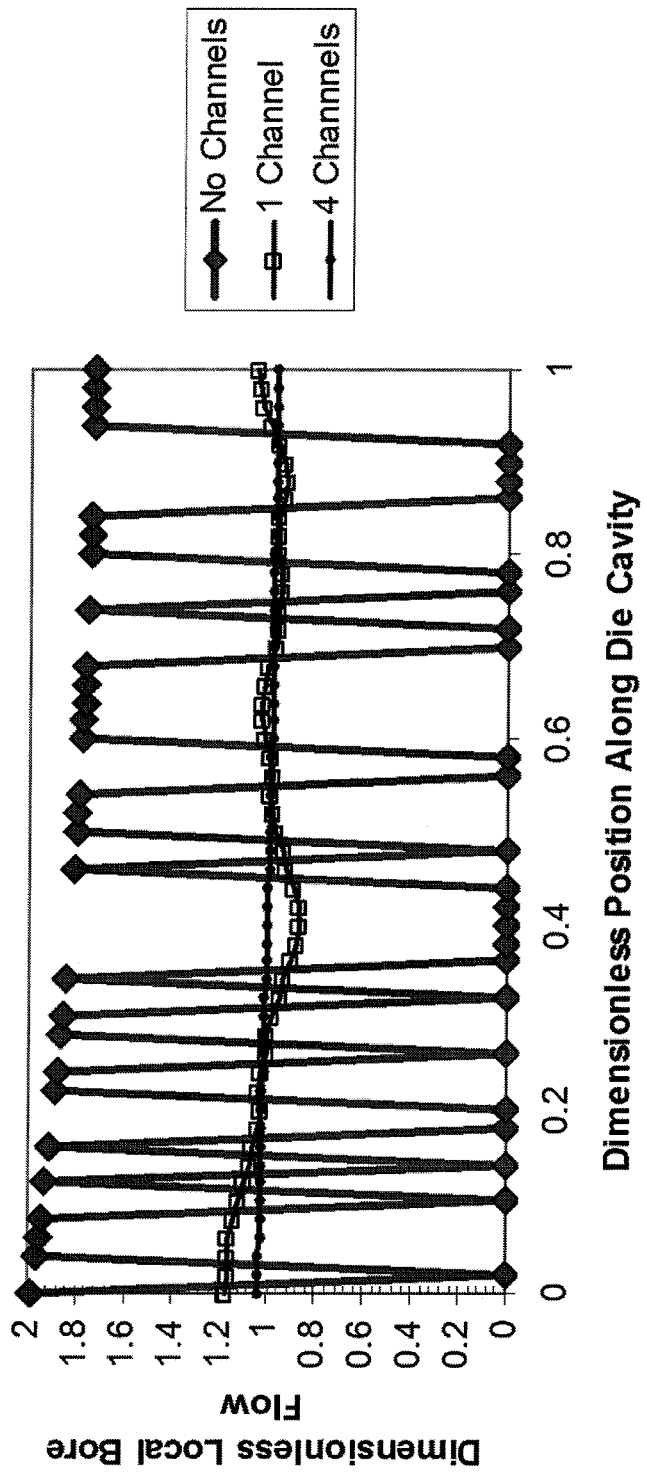

Fig. 58: Influence of Auxiliary Channel Position for Nvm=.0001

Fig. 59: Influence of Auxiliary Channel Position for Nvm=.0001 with blockage

Fig. 60: Influence of Auxiliary Channel Position for Nvm=1 with blockage

Fig. 61: Influence of Auxiliary Channel Position for Nv=1 with no blockage

Bore Outflow with Clogging
- Geometry of Fig 50a
- Various # of Intersections

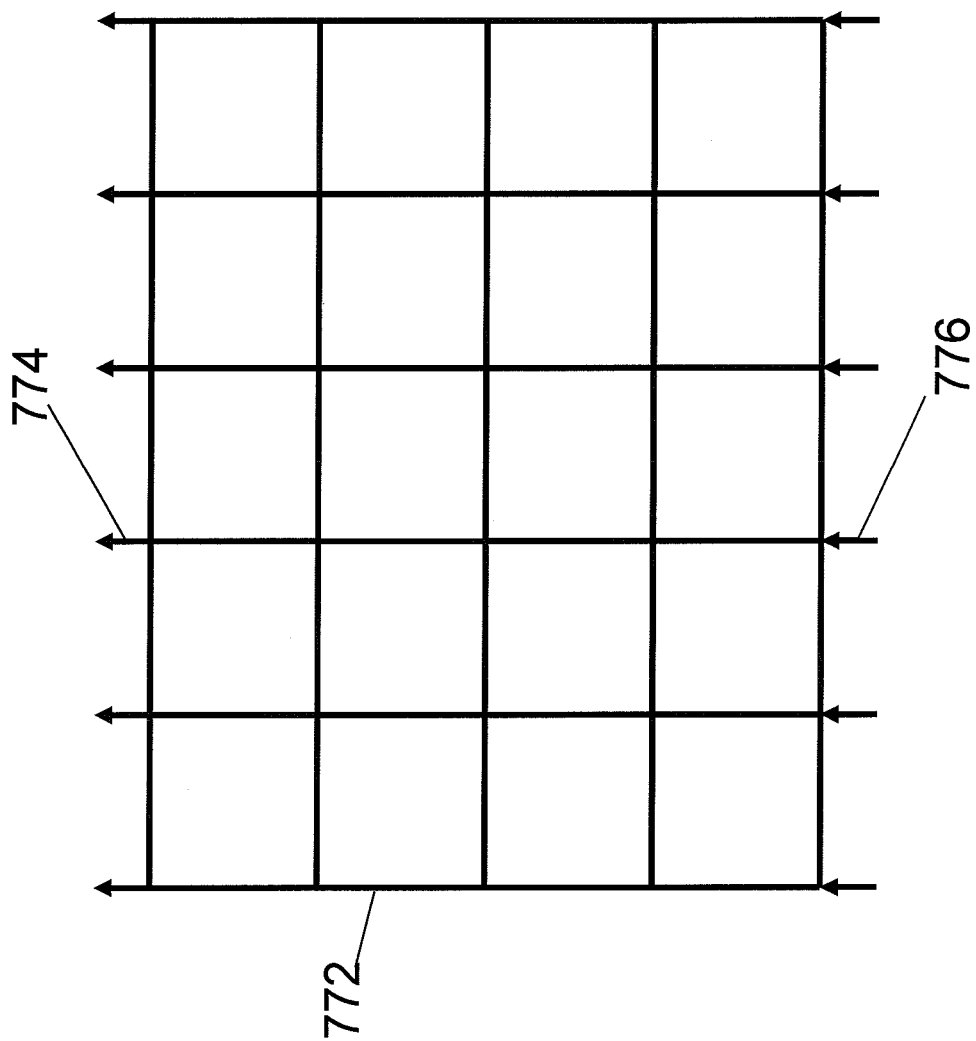
Fig. 66a: 2D-Square grid of passageways

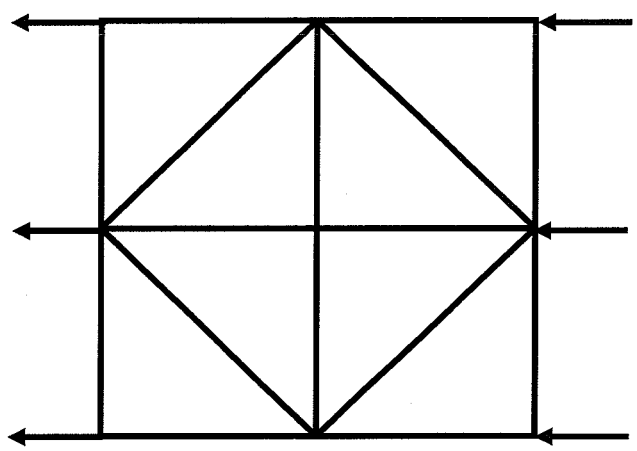
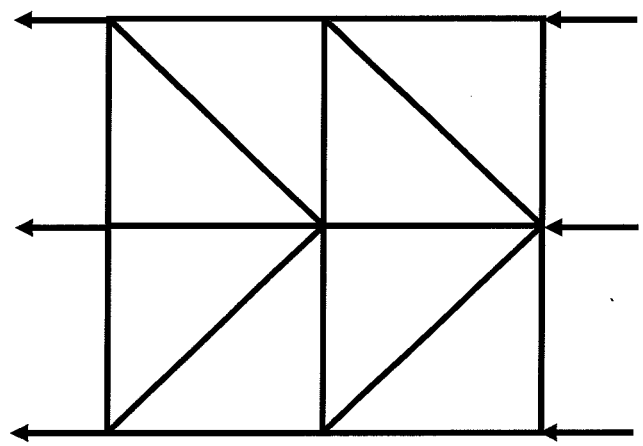
Fig. 66b

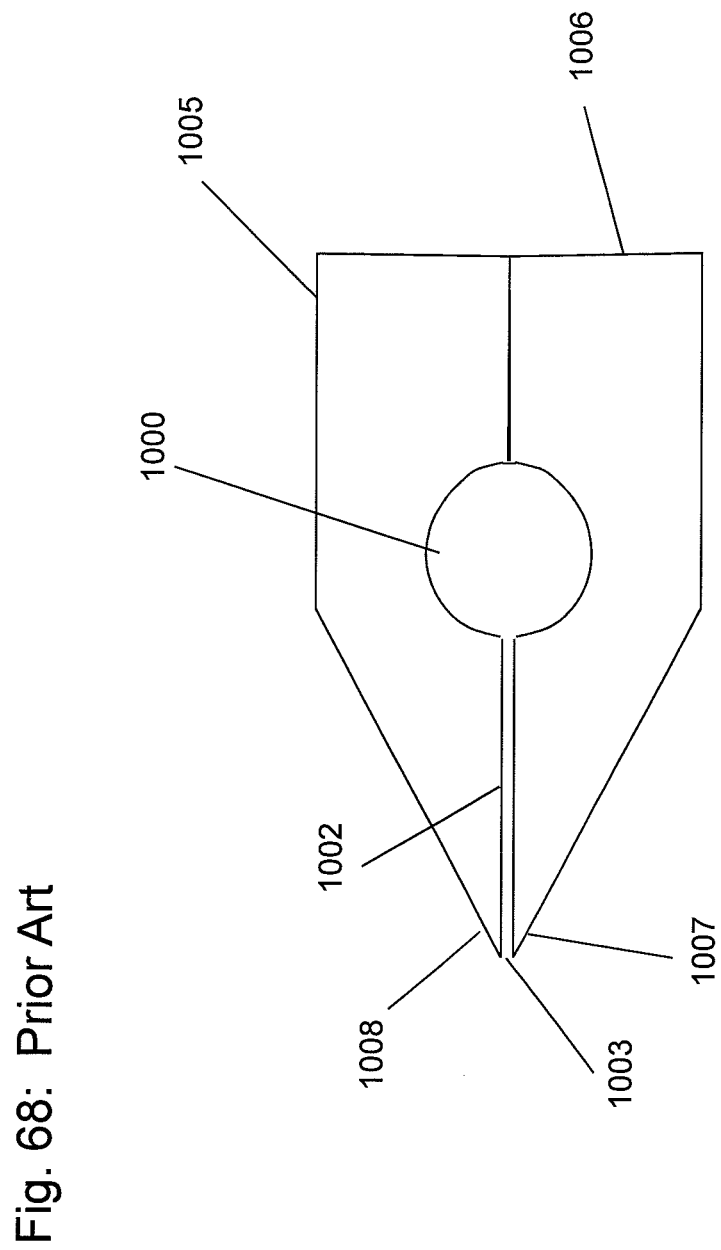
Fig. 68: Prior Art

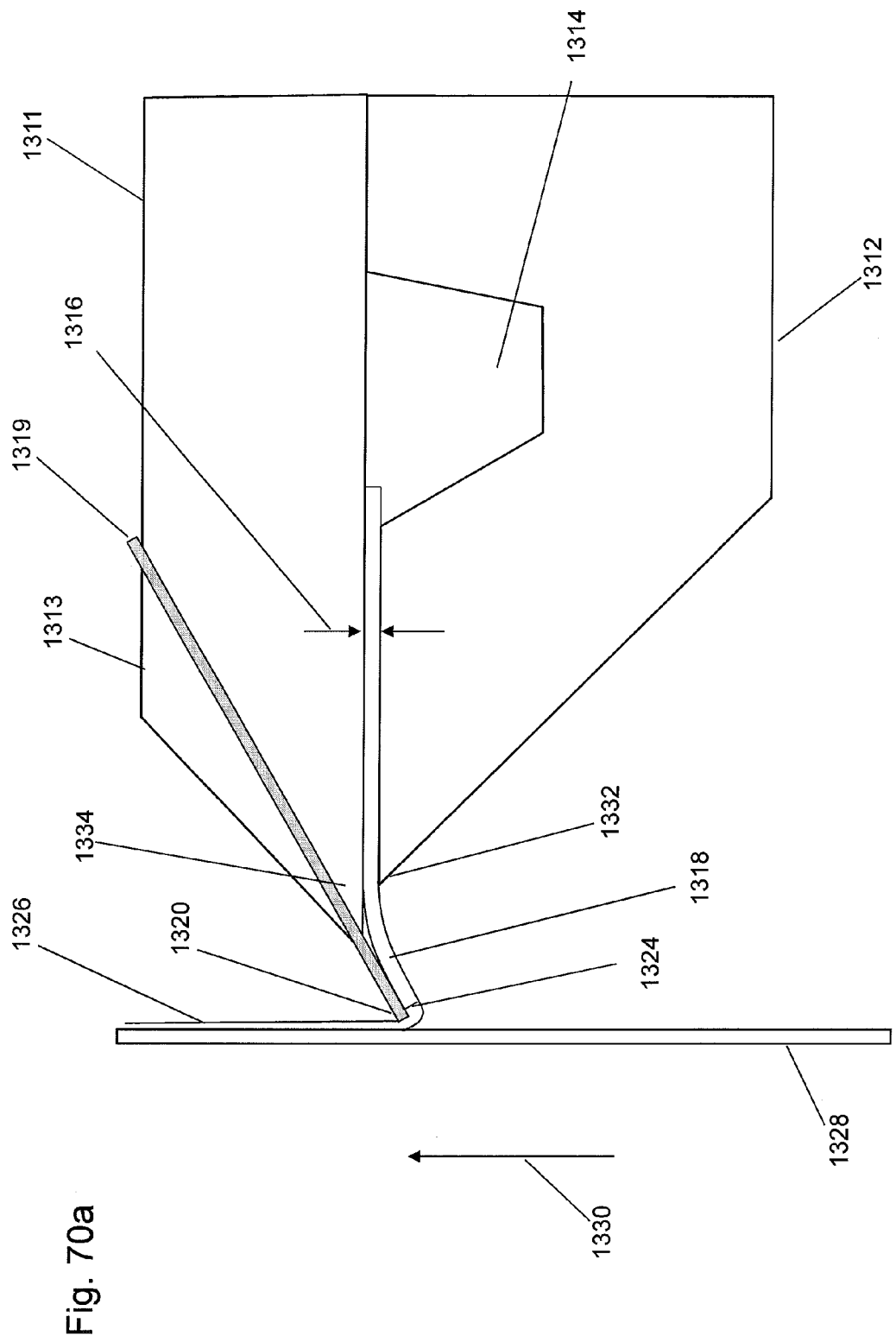

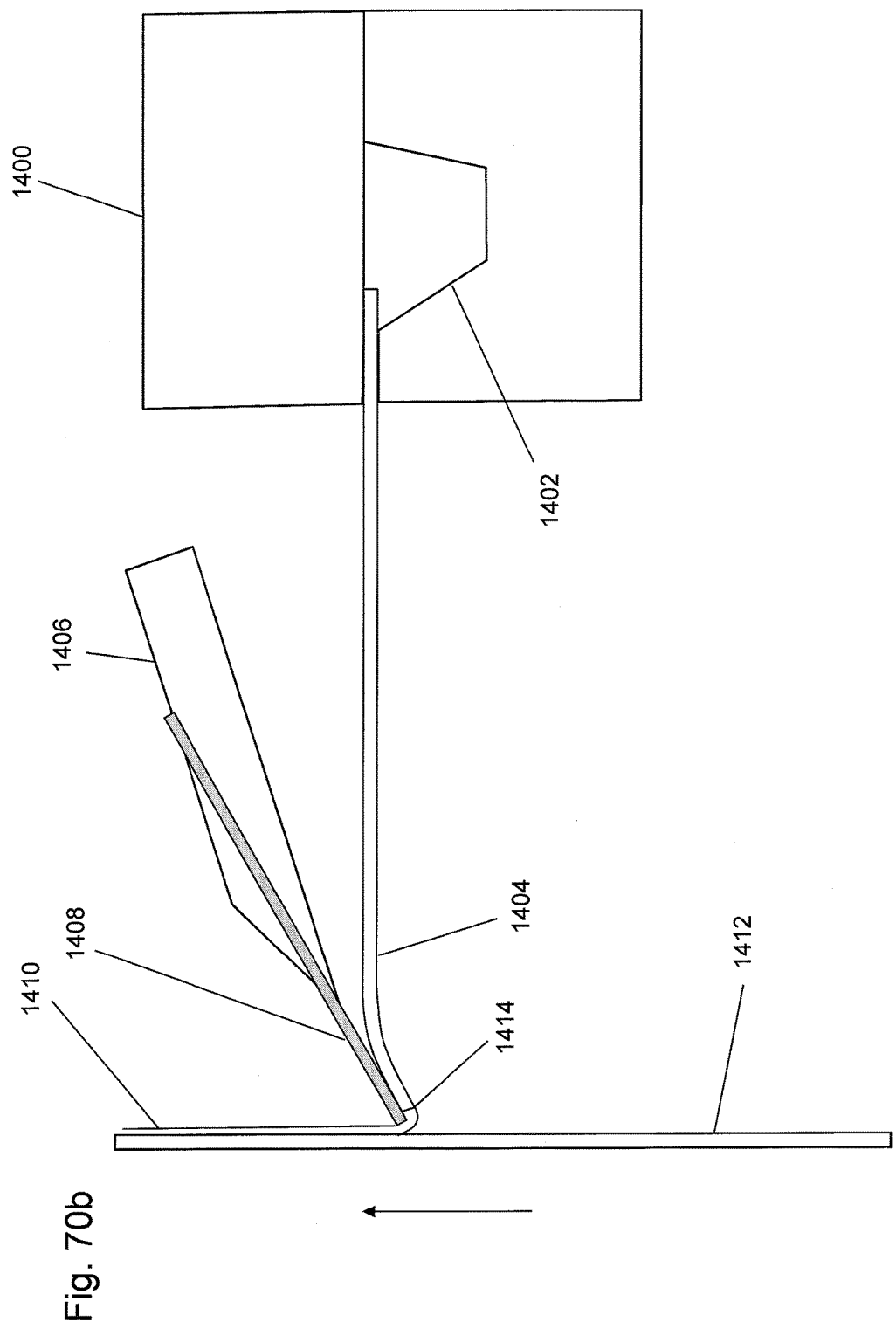

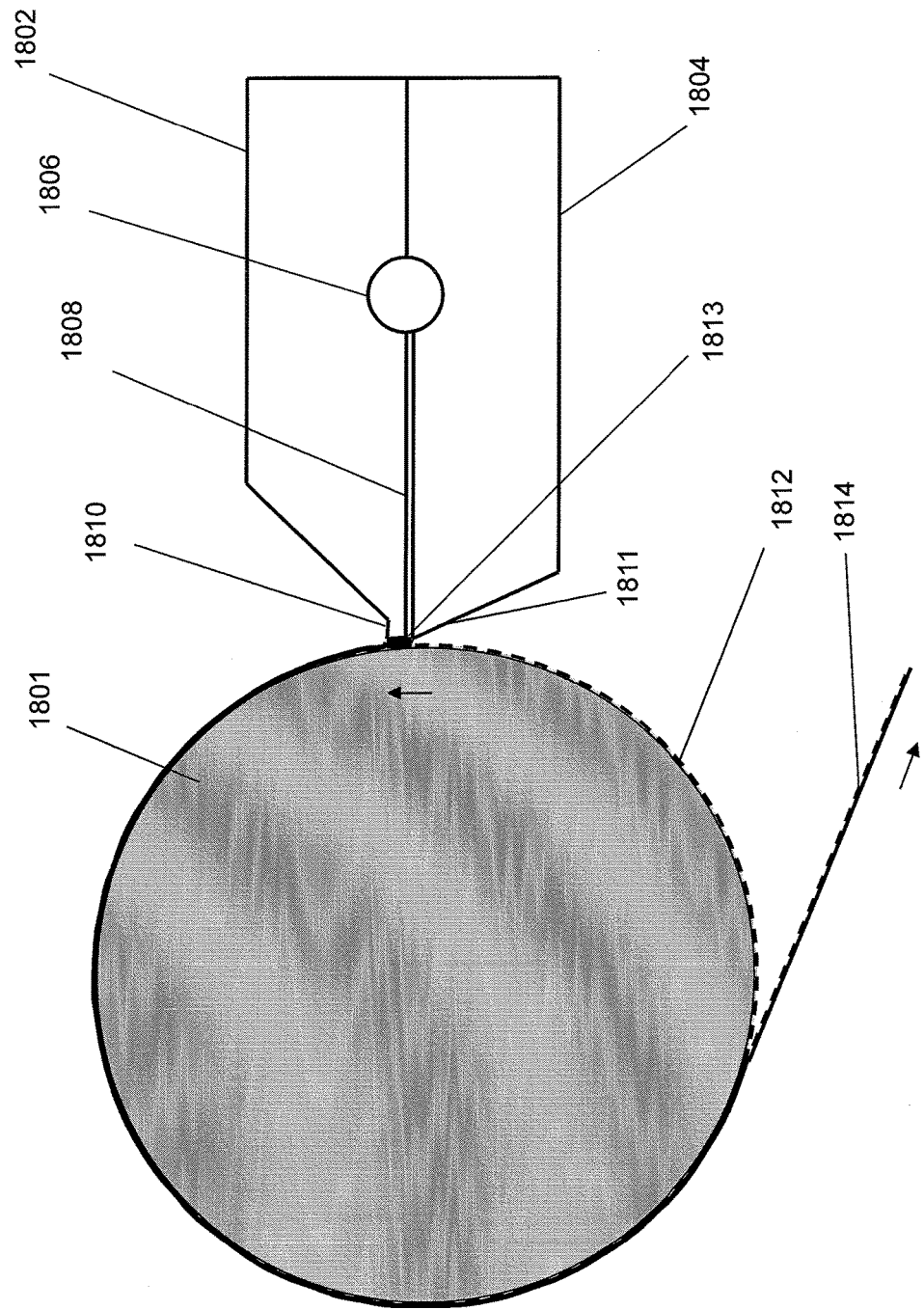
Fig. 71: Casting Embossed Webs - Prior Art

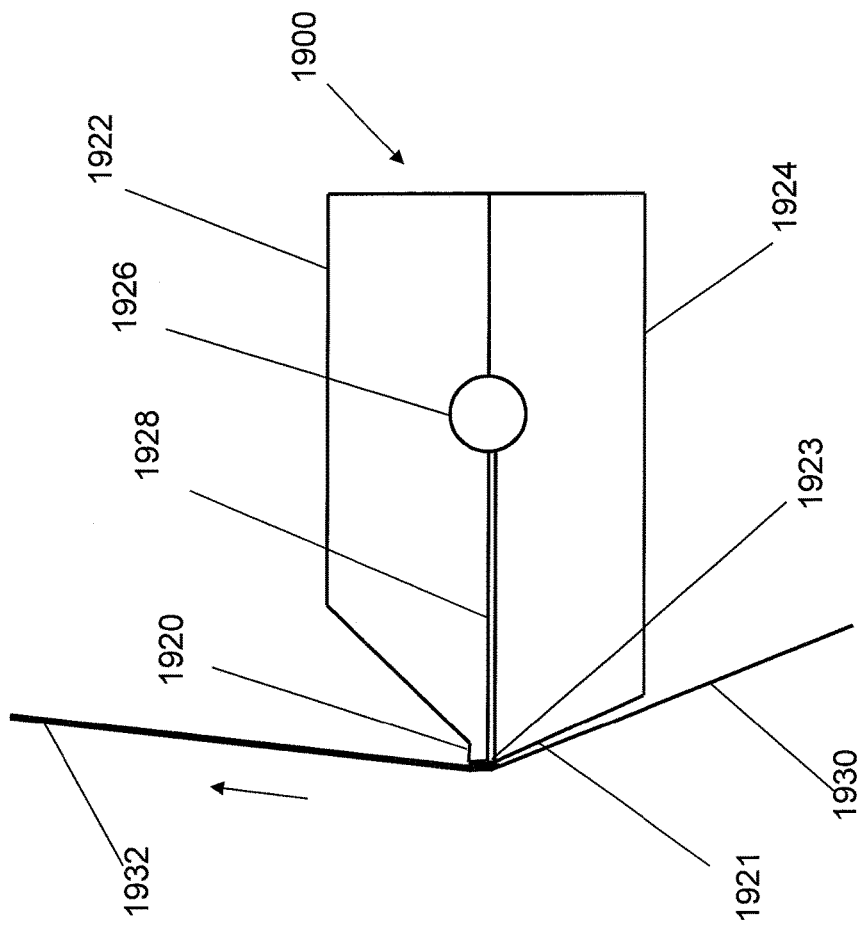
Fig. 72: Prior Art – Free Span Coating

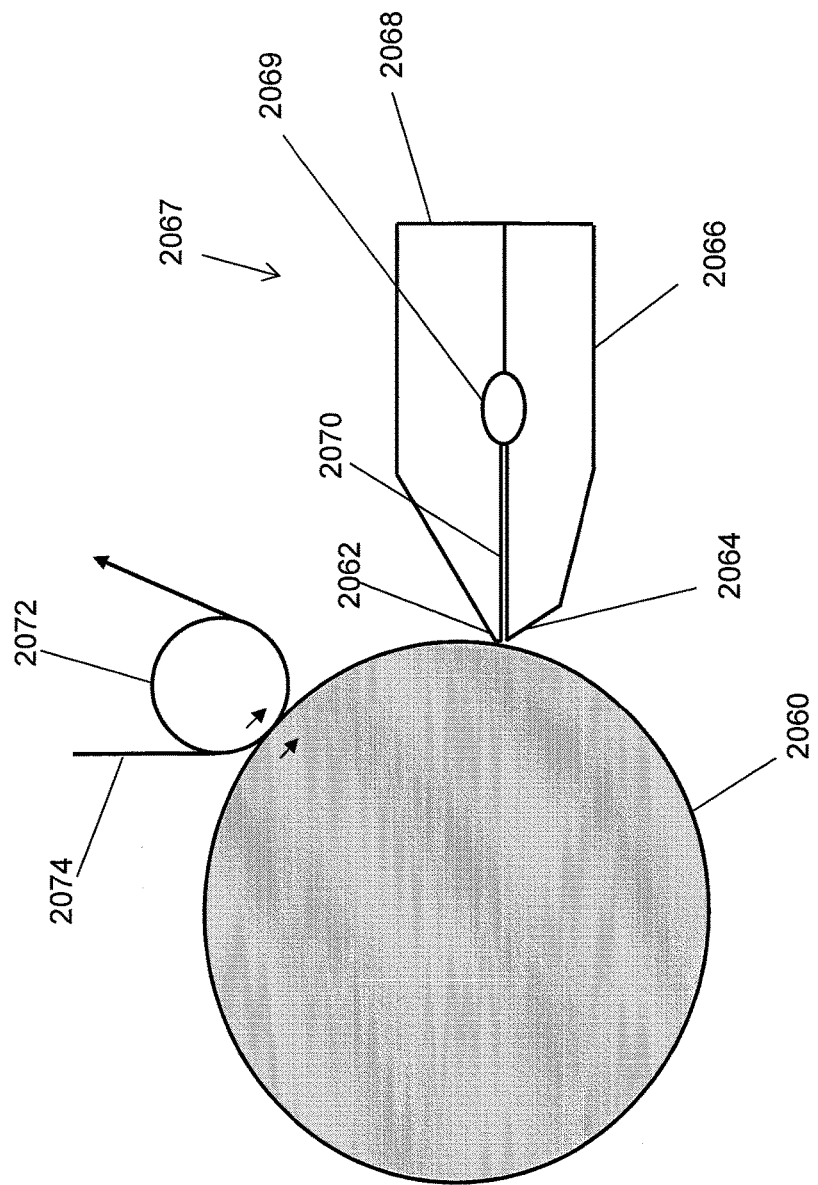
Fig 73: Prior Art – Transfer Coating

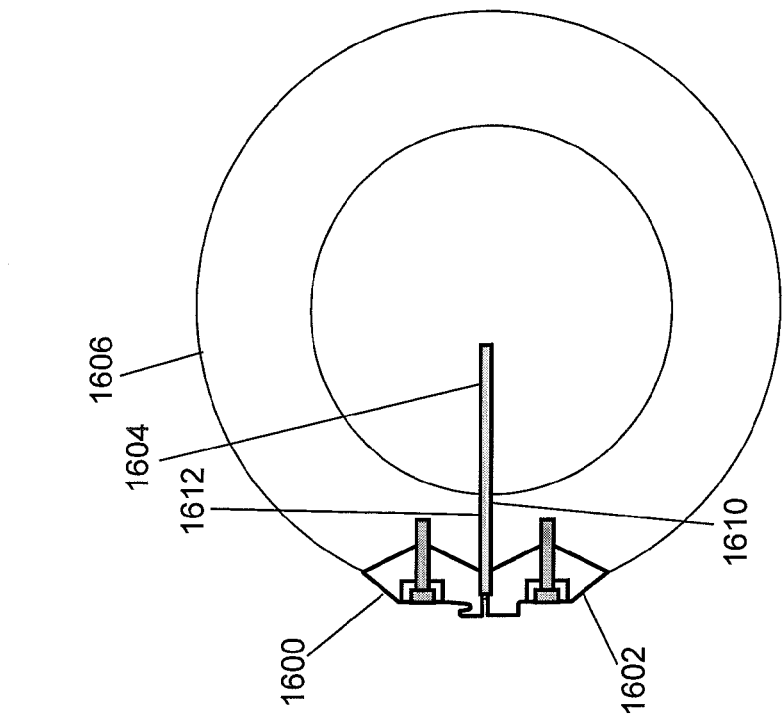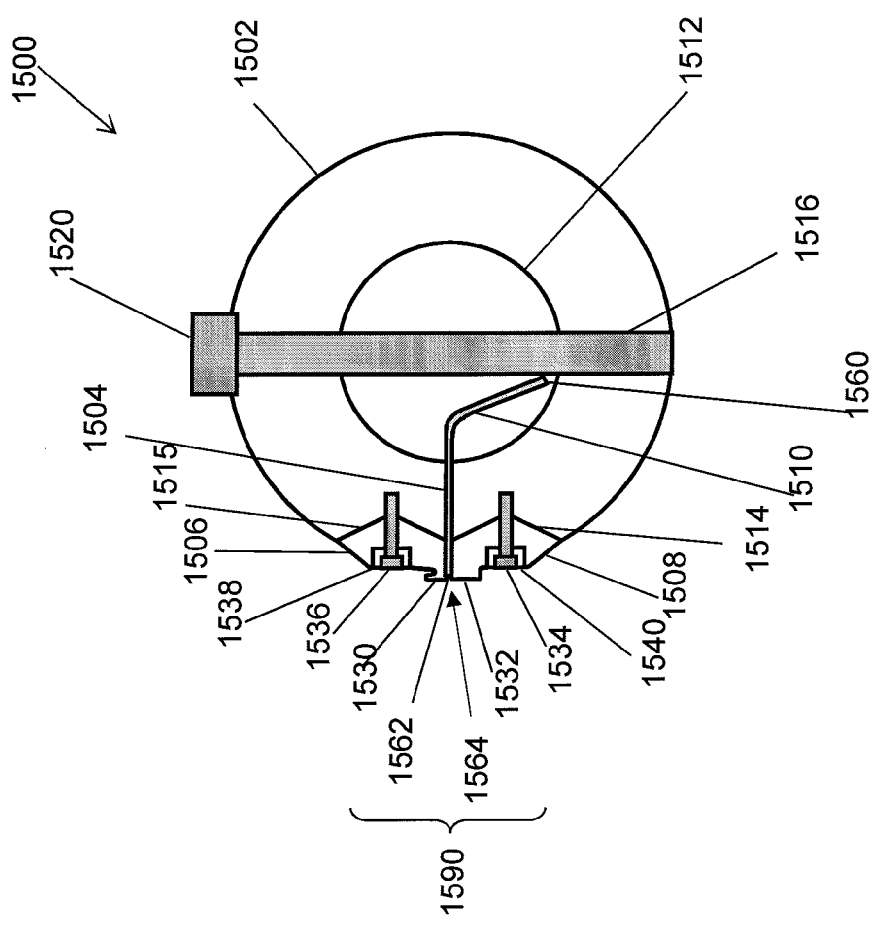
Fig. 79b
Fig. 79a

Fig. 82: Prior Art – Out Running Side of a Two Roll Nip

Fig 84: End View of Die

Fig. 85: Bottom Die Plate

Fig. 86: Flow from Dies Using a Cavity and Improved Porous Media

Fig. 87: Multi-orifice Die with an Auxiliary Channel

Fig. 88: Uniformity Index where 0.0001<Rw/Rd<10 and where 1<W/d<1000

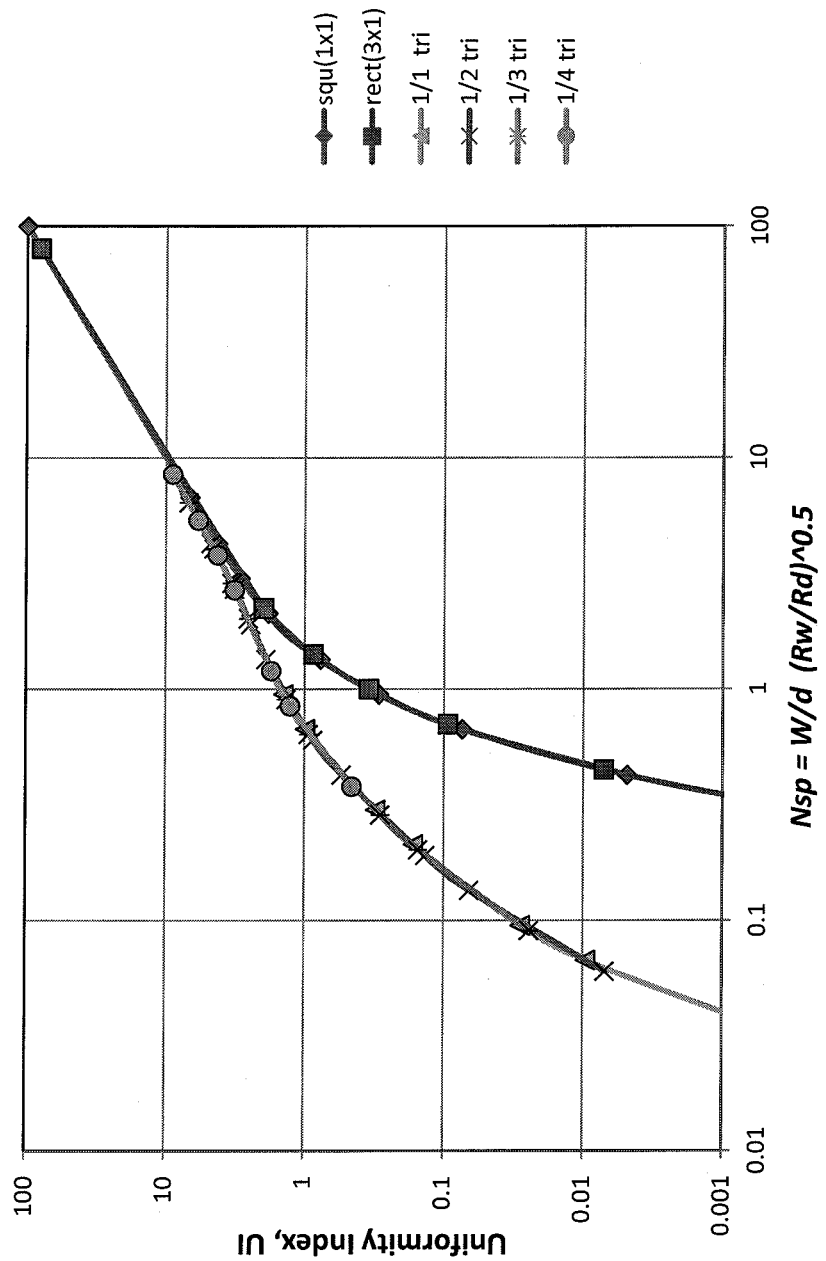

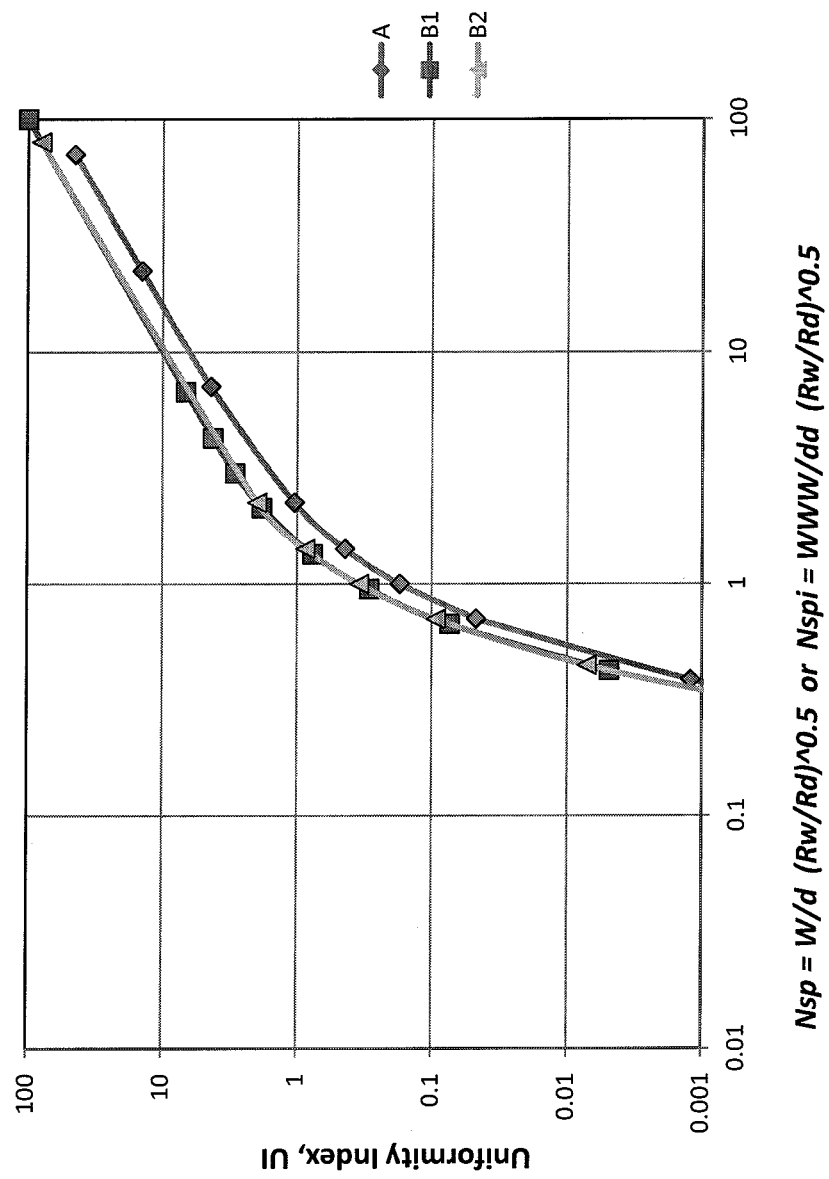
Fig. 90b: Flow from Point Fed Slot

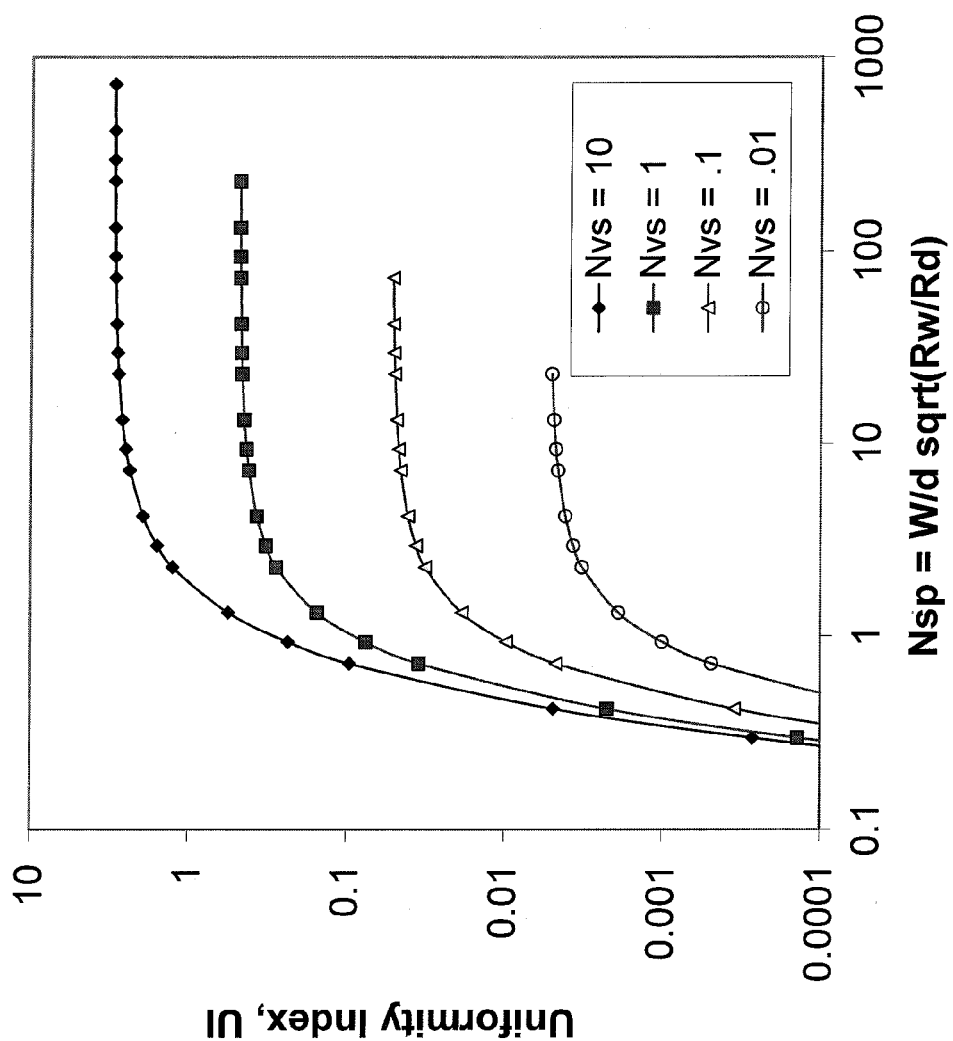
Fig. 93: Flow Uniformity from a Cavity and Slot System

FLUID TRANSPORT MEDIA

CROSS REFERENCE TO RELATED APPLICATIONS, IF ANY

This application claims the benefit under 35 U.S.C. §119 (e) of U.S. Provisional Patent Application Ser. No. 61/690,447, filed Jun. 27, 2012, which is hereby incorporated by reference.

BACKGROUND OF THE INVENTION

Field of the Invention

This invention pertains to metering, collecting, filtering and distributing fluids. More specifically, the present invention relates to improved apparatus and improved methods for filtering and applying coating fluids onto substrates. The invention is useful for casting embossed sheeting, and in fluid application dies. Still further, the invention pertains to improved fluid filtration methods, apparatus, elements and media, and to the collection of mist generated in high speed liquid film splitting processes.

Background Information

A. Coating Technology—Fluid Metering

In processing fluids in general, it is often required to precisely control the flow rate or the distribution of local flow rates along a length. Coating is an example. Coating is the process of replacing gas contacting a substrate, usually a solid substrate such as a web, by a layer of fluid. In coating science there is the need to produce a controlled and commonly uniform distribution of local flow rates along a line. Generally, this is produced by forced flow through a slot and having it exit from a slot orifice of a coating die.

Most fluid flow devices are made of metal. They are precisely machined to very exacting dimensions, and they are expensive to fabricate. This is especially true of die coating devices. Inexpensive fabrication techniques and environmentally friendly disposable parts are needed. Coating processes using inexpensive and disposable coating apparatus would create competitive advantages. However, such devices are not available. Even disposable replacement parts for die coating devices are not known.

In manufacturing economic disposal of process waste is essential for low cost production. Incineration of waste is useful for this. However, contaminated metal parts damage incinerators. Polymeric and organic parts are ideal for disposal by incineration.

In coating dies the purpose of internal flow passages is to distribute the fluid so as to produce a film of fluid exiting from the die through the slot orifice along a length. Usually, it is desired that the rate flow be of uniform along the length. When fluid is transferred from the die to a moving web, the down web uniformity is dominated by the consistency of the web speed and the fluid supply rate. The cross web uniformity is a function of the uniformity of fluid flow from point to point across the web width.

Existing coating dies have internally a cavity and a metering slot connected in series. The slot and cavity serve to distribute flow along a length. The solid structure of the die defines the width of fluid applied onto a substrate during coating. When the cavity is large, the slot height small, and the slot dimensions uniform, a uniform flow exiting from the slot may be achieved. Over the years much art and science has been devoted to improving the design and understanding of the internal flow distribution of coating dies. This is described by Robert B. Secor in chapter 10 of *Liquid Film Coating*; Kistler, S. F. and Schweizer, P. M., Editors; Chapman & Hall: London, 1997.

Slots have limited ability to distribute flow from a cavity uniformly along a discharge edge length. Additionally, it is even more difficult to feed fluid to a slot at a single point and discharge it uniformly along a discharge edge length. Generally, very small slot gaps are required. Improvements are needed.

Unfortunately, the uniformity of flow from a die slot even when it is fed uniformly at an inlet edge is dominated by the precision of the slot height. If the fluid flow is laminar and the fluid is Newtonian, a 10 percent variation in the height will result in a 30 percent variation in flow rate. If the fluid is shear thinning the deviation will be higher. Therefore, the metering slot must be very precisely machined at great expense. The consequence is that coating dies are very costly to build, and very labor intensive to clean and maintain. It is not economical to dispose of them after a single use. An improvement over this die slot technology is needed.

In the processing of fluids to produce coated products the fluids must be filtered to remove particles with sizes ranging from about the dry coating caliper to about the wet coating caliper. These will cause visible or functional defects. Most particularly, particles with sizes near or larger than the hydraulic diameter of the flow passages must be removed to avoid severe disruption of the uniformity of the coating distribution. Conventionally, this is done as a step separate from the application of the fluid to a substrate, Since there are many sources of fluid contamination within the die, it is desirable to filter the fluid as it enters the die slot. However this is not generally possible. Simplified apparatus and methods are needed for the simultaneous final filtration and coating of fluids.

B. Arrays of Holes

Another aspect of this invention relates to fluid distribution using arrays of the fluid flow bores. Distribution dies using such are referred to as multi-orifice dies. Bores have been used in some instances to overcome some short comings of slots.

Flow distribution dies with continuous slots are expensive to manufacture and operate. The machining and setup costs for the slot fluid distribution dies are large. Maintaining a precisely uniform discharge slot is costly. In order to maintain uniformity of the discharge slot in the cross-web direction, dies have to be massive and require elaborate mountings to provide adequate structural support around the slot. Replacing the slot with drilled holes simplifies and reduces cost.

When dies are used for coating the "cross-web" direction is defined as the dimension across the width of a substrate translating with respect to the die. The web is typically a web of paper or polymer film. The "cross-web" direction is perpendicular to the direction of travel of the web with respect to the die. "Cross web" direction may be used to identify the orientation in the die, and the orientation of a plane intersecting the coating on a web or an extrudate or the web itself.

Dies with multiple orifices provided a less expensive alternative to continuous slot dies. Multiple orifice dies have a number of orifices that allow fluid to exit the die at a discharge face. Examples of multiple orifice dies are illustrated and described in U.S. Pat. Nos. 3,149,949, 4,774,109, 5,045,358 and 4,371,571, all of which are incorporated by reference in their entirety, herein.

Multiplicities of parallel drilled holes or bores, and porous media have been used in place of slots. All have deficiencies. McIntyre in U.S. Pat. No. 4,386,998 discloses a drilled hole coating die where the fluid is discharged along the length of a coating die through a line of cylindrical bores and exit orifices. The holes have a diameter on the order hundreds of microns. The drilled die is a useful design due to its simplicity.

While the multiple orifice die has utility, it also has substantial problems. First when a hole becomes plugged, an uncoated down web line occurs in the coating on the web. Once a hole is locally plugged there is no way to direct flow to the exit orifice of the plugged bore. Second, the small holes are difficult to clean. Thirdly, individual flow streams exiting from the orifices must be merged to form a continuous uninterrupted coating on the target substrate. There is a need to counter the drilled die plugging tendencies and improve the performance.

U.S. Pat. No. 7,591,903 by Maier et al. discloses multi-orifice dies used in coating. It discusses the use of a die with a face plate with a plurality of orifices and bores extending back into the die body. These bores are convey fluid from the die cavity to the die face, are independent of each other. They have no means of exchanging fluid between bores. When a bore is clogged at its entrance, no fluid flow exits from its discharge orifice at the die face.

C. Porous Media

Passing a fluid through a porous media to distribute it is known. U.S. Pat. No. 402,188 discloses a painting apparatus in which the paint flows through a porous piece of felt or sponge and is applied as a coating. The porous material serves to distribute across a width of substrate. U.S. Pat. No. 3,828,725 describes a curtain coater in which a bed of beads is placed in the supply cavity before the slot to increase the flow resistance into the slot and achieve lower flow rates. U.S. Pat. No. 3,365,325 discloses curtain coating using flow through one or more porous members to distribute flow into a free falling curtain for coating.

Seaver et al. in U.S. Pat. No. 5,702,527 disclose the use of a porous material of material compressed between two die plates to create a large pressure drop to produce uniform flow at low flow rates along the die width. The flow is within the sheet from one edge to another because of the confinement by the die plates.

The uniformity of flow from a distribution die with a cavity is limited by the uniformity of the media. The uniformity of flow from a discharge edge is quite limited when the media is fed from a point source or very small cavity in the die. Improvements are needed.

The uniformity of conventional commercially available porous materials is also deficient. They are not adequately uniform from point to point, and the individual pores are not uniformly positioned and sized. Improvements are needed.

Pores are small in materials used in porous media. Pore sizes generally range from submicrons to a hundred microns. Porous media material is a mixture of a solid framework and pores. A porous sheet is considered to have a length and width much larger than the pore size and a thickness many times greater than the pore size. The pores are distributed throughout the material.

Usually both the solid matrix and the pore network (the void volume) are assumed to be continuous. However in reality in known commercial materials, the pores are not all continuous and the void volumes in all areas of the material are not uniform. Some pores are dead ended, and some are totally isolated from the other pores. This is a failing of known porous media. Examples of deficient sheets are sheets formed from metal, ceramic, and plastic granular material.

Conventional porous materials have some portion of their void volume that is non-functional with respect to fluid flow. This results in restricted transport of fluid. In addition to these problems, the porous sheets described in the Seaver et al. patent and other porous materials are deficient in another way for precisely distributing fluids along a line of discharge. When examined closely, it is found that known porous sheets do not have uniform flow properties from point to point. In contrast, precision coating die slots have uniform flow resistances per unit length except at edges.

Known porous materials are fabricated from collections of fibers or particles placed together to form solid structures. Other porous materials are formed by mixing two or more different materials together. An example is the mixing of a gas with a liquid resin followed by the solidification of the resin. The individual fibers or particles always have a distribution of sizes, and therefore the sheet forming processes are not consistent. Bubbles in porous foams are not uniform in size and their locations relative to their neighbors are variable. The consequence is that the resulting porosity of these materials is not uniform. The resulting flow resistance of these sheets is not uniform along any line. Improvements are needed.

Sheets of porous media do not confine fluid flow to be solely within the plane of the sheet. The media allows flow in all directions including unfortunately perpendicularly out from and through their top and bottom sheet surfaces.

Sheets of known porous media have deficiencies in distributing flow and they do not perform well as filters. When flow is from and inlet edge to an outlet edge the inlet edge traps contaminants and disrupts flow uniformity. This adds to the non-uniformity cause by their base structure. Improvements in both functions individually and the simultaneous distribution and filtering are needed.

D. Filtering with Porous Media

One type of fluid filter is a cartridge-type filter with a replaceable filter element typically mounted on a core and placed into a filtration system. Other devices and filter media employing granular material structures and sheets are commercially available. Replaceable porous filters have pores sized to prevent contaminants and/or particles (hereinafter "contaminants" for the sake of convenience and without intent to limit) from passing through the filter, while allowing fluid passage. Contaminants typically become trapped on filter surfaces requiring the filters to be replaced on a regular basis. Example granular material structures include the use of metals, ceramics, plastics, sand and other like materials assembled so that the collections of grains form the porous media. Usually the grains are molded into a functional shape and sintered to form a block of filter media. Metal grains are commonly used in high pressure filter applications.

Cartridge-type pleated filters are cylindrical elements having an open longitudinal center bore with radially-outwardly extending, longitudinally folded portions or pleats. A plurality of pleats is commonly arranged around a tubular core defining a cylinder element. When viewed in a transverse cross-section, the pleats typically extend radially outward from the core toward the outer periphery of the filter. A drawback of standard pleated designs is that, because of standardization, it is difficult to increase the size of the usable filter area beyond that allowed by the conventional dimensions of the filter container. The filter capacity and effectiveness are limited by the surface area of the pleated cartridge design approach. Additionally the mechanical strength of the pleats is limited. Above a limiting pressure gradient across the filter the cartridge will fracture or collapse.

Attempts have been made to modify the pleat design in order to increase the surface area. For example, attempts have been made to modify the length at which a pleat extends from the center core toward the periphery of the cartridge. Clendenning et al. in U.S. Pat. No. 7,125,490 disclose forming pleats that are radially curved rather than having pleats that extend linearly from the core of the cartridge. The increase in the length of each radially curved pleat is intended to result in an increased surface area of the filter.

Plain, thick walled porous cylinders of sintered grains are known and used as substitutes for the pleated geometry to gain strength. However, the surface area for filtration is restricted to the circumference times the cylinder length. While this geometry is physically strong, the filtration area is limited. Attempts to improve these filters include molding of surface areas or removing material to obtain complex surface shapes to increase the exposed surface area. Omitting or removing material however diminishes the strength.

Previously, to reduce the pressure drop across the filter and improve filtration life, sintered metal, porous plastic and ceramic filters having extended filter surface areas have been designed. Such extended area filters include cylindrical or conical cavities in the filter's surface. Examples include Mott's U.S. Pat. No. 3,570,059 and Bergstrom's, U.S. Pat. Nos. 3,746,642 and 3,788,486. Such filters offer extended filter inlet side surface area. Often a method of providing extended surface area involves deforming the inlet surface by molding deep large pits in it. The scale of such inlet surface modification is on the order of 5 millimeters to many centimeters.

U.S. Pat. No. D618,761 illustrates a geometry where the structure of the block of filter media is highly modified to achieve increased surface area.

Haldopoulos et al. in U.S. Patent Application Publication 20080296238 disclose the use of molded, highly intricate, sintered porous plate structures in assemblages as replacements for pleated cartridges. To overcome the mechanical strength limitation of the long pleated cartridge filters they have replaced the conventional long pleated single element with a multitude of very short stacked plate elements. Each plate element, filter plate is comprised of a planar base portion having an outer peripheral edge, a top surface, and a bottom surface. A convoluted ridge wall extends from the top surface of the base portion and has a ridge outer side surface, a ridge inner side surface, and a top ridge surface. This ridge is in essence a short pleated subassembly which is attached to and strengthened by the base portion. In this manner they describe using the surface area advantage of pleating while providing means reinforcing the mechanical strength of the pleat.

In all cases the increase in surface area is obtained by omitting or removing large volumes of the base sintered porous media. This reduces the overall strength of the element lowering its fracture resistance or collapse strength. The total volume occupied by a pleated element is much larger than the actual volume occupied by the porous material itself. The lack of material completely filling the total volume very significantly diminishes the mechanical strength.

In general, if a sintered filtration media element is limited to the confines of a fixed volume, the strength of this element is maximized when the media totally fills the volume. Any removal or omission of the media from parts of the volume to increase surface area or enhance flow diminishes the strength. This is a basic problem with past designs of filter elements.

What is lacking are internal pore structures and designs to allow better filtration, allow more complete utilization of pores, and to allow reduced flow resistance.

The nature of the granular make-up of the sintered a metal filter and its counterparts in other materials is a severe limitation. There is no way to modify and control the individual flow and particle capture properties of the individual pores within the media. The assemblage of grains creates a random collection of pore locations, sizes and interconnections. A method is needed to create porous structure where a multiplicity of the pore locations, sizes, interconnections and properties maybe individually designed and manipulated to produce improve flows and filtering.

E. Disposable Fluid Distribution Components

Most fluid flow devices and in particular coating devices are made of metal. Although they may be precisely machined to very exacting dimensions, they are expensive to fabricate. This is especially true of slot die coating devices. Inexpensive fabrication techniques and environmentally friendly disposable parts are needed. Coating processes using inexpensive and disposable coating apparatus would create a competitive advantage. However, such devices are not available. Even economically disposable replacement parts for die coating devices are not known.

Fluid transport may be characterized based on the mechanism that causes flow within the device. When fluid transport is the result of a controllable force or gravity acting on the fluid, the fluid movement is considered "forced". An example is the flow resulting from an applied pressure force. Such a pressure may be generated as a result of the active forces created by displacement of a fluid using a pump.

In processing, precise control the flow rate or the distribution of local flow rates along a length is required. Coating is such a process. Coating consists of replacing gas contacting a substrate, usually a solid substrate such as a web, by a layer of fluid. Generally, a uniform distribution of local flow rates along a discharge slot orifice is desired. This is produced by forced flow through a slot of a die coater device.

1. Fluid Metering by Coating Slots

In coating dies the purpose of internal flow passages is to distribute the fluid so as to produce a film of fluid exiting through a slot orifice along a length. Commonly, it is desired that the rate flow be of uniform along the length. When fluid is transferred from the die to a moving web, the down web uniformity is dominantly controlled by the consistency of the web speed and the fluid supply rate. The cross web uniformity is a function of the uniformity of fluid flow from point to point across the web width.

Prior coating techniques are illustrated in FIGS. 68 and 46. FIG. 68 is a cross sectional schematic showing the internal flow passages in a coating die. Coating dies have internally a cavity 1000 and a metering slot 1002 connected in series. These are confined by a top die plate 1005 and a bottom die plate 1006. The slot and cavity serve to distribute flow along a length. The slot extends along the length of the die to positions near its ends. The flow exits from a slot orifice 1003 which is bounded by two die lips 1007 and 1008 at the distal ends for plates 1005 and 1006. Solid structure of the die at its ends defines the width of fluid applied onto a substrate. FIG. 46 is an isometric view of the internal flow passages. The cavity 501 takes the fluid inflow from a feed point illustrated by the arrow 503 and distributes it along the internal entrance of the slot 502. When the cavity is large, the slot height small, and the slot dimensions uniform, constant flow exiting from the slot may be achieved along the length of the die slot. This is illustrated by the arrows 504. Over the years much art and science has been devoted to improving the design and understanding of the internal flow distribution of coating dies. This is described by Robert B. Secor in *Liquid Film Coating*; Kistler, S. F. and Schweizer, P. M., Editors; Chapman & Hall: London, 1997; chapter 10.

Unfortunately, the uniformity of flow from a die slot is dominated by the precision (the uniformity) of the slot height. If the fluid flow is laminar and the fluid is Newtonian, a 10 percent variation in the height will result in a 30 percent variation in flow rate. If the fluid is shear thinning the deviation will be higher. Therefore, the metering slot must be very precisely machined at great expense. The consequence is that coating dies are very costly, and they are labor intensive to clean and maintain. It is not economical to dispose of them after a single use. An improvement is needed.

2. Arrays of Holes

As described, the function of a metering slot is usually to provide prescribed flow along a line where it exits the die. Other methods of achieving this include the use of a multiplicity of parallel drilled holes and the use of porous media. Both have deficiencies.

McIntyre in U.S. Pat. No. 4,386,998 discloses a coating die where the fluid is discharged across the width of a coating die through a line of cylindrical drilled holes. The holes have a diameter on the order hundreds of microns. While this has some utility, it also has substantial problems. First when a hole becomes plugged, an uncoated down web line occurs in the coating on the web. Once a hole is locally plugged there is no way to divert flow to the exiting orifice of the plugged hole. Second, the small holes are difficult to clean. This contrasts with the ease of cleaning a die slot. Metering slots are positioned at the junction of two die plates which may be disassembled for intense cleaning of the slot surfaces. Thorough cleaning a great many small holes is labor intensive.

Insley et al. in U.S. Pat. No. 6,290,685 describes the use of micro-replicated parallel flow channels to create a fluid distribution sheet, but these suffer from the same problems as the holes of the McIntyre patent.

3. Porous Media

Although porous media are widely available and often consider disposable, it is deficient. The problems and deficiencies of commercial porous media are discussed above.

4. Blade Coating

Blade coating is a method of coating in the paper industry. Blade coating is a method by which coating is applied to base paper. The coater consists of a large back-up roll around which the paper passes and a steel blade which bears against the paper. Excess coating fluid is applied to the paper and the excess is scraped off by the blade. Eklund et al. in U.S. Pat. No. 4,945,855 describes a blade coater where fresh, excess fluid is deposited onto the paper directly behind the blade. A problem with this method is that no means exists that allows the coating weight applied to be directly controlled by metering the flow rate and where no excess is used.

5. Coating Die Precision Lips

Coatings of many types are applied with slot orifice dies. The die is a means of spreading a premetered amount of fluid onto the width of a substrate. The fluid is provided from a hose or pipe and is distributed across the substrate by the die. The fluid exits through a slot orifice at die lips positioned very close to the substrate. Fluid is transferred from the slot to the substrate to produce a coating on the substrate.

The die plate areas around the slot orifice opening are referred to as lips. The edges of the slot orifice on the lips are a critical region for defect free coatings. Any nick or protrusion at the orifice generates defects in the coating even if the average flow through the slot is uniform—even if the rest of the slot is perfect. Unfortunately, the orifice edges and the lips are easily damaged. Incidental contact with objects frequently occurs necessitating replacing these expensive lips and the die plates which contain them. Improvements in the durability of die lips are needed. Inexpensive lips are needed.

Unfortunately, the orifice edges in the lips are easily damaged. Incidental contact with objects frequently occurs necessitating replacing this expensive lips and the die plates which contain them. Additionally, the metal die parts when damaged are contaminated by the coating materials which are often hazardous materials. Incineration of the parts may be required to destroy the hazardous materials. However, the metal parts still remain and increase the cost of the disposal. Improvements in the durability of die lips are needed as well as improvements in the die lip materials to facilitate disposal.

Coating dies are made of tool steel. This is used because the steel may be machined and ground with very high precision. Precision die slots are thought necessary for generating uniform flow from the slot orifice. Precision ground die lips are required for accurate positioning of the die lips very close to the substrate during coating. Flatness, straightness and positioning precisions of plus or minus 2 micrometers are often required with these tool steels pieces. Therefore, dies are currently are very expensive to manufacture.

In summary, an apparatus that eliminates the need for precisely machined metal die lips and slots is desired.

a. Cast Coating Die Lips

During cast coating, the dies are bought into very close proximity to the substrate and/or coating rolls. Unfortunately, positioning of the dies is subject to human error and mechanical breakdowns, and the result is often clashing of the die lips with the substrate or coating rolls. Touching the lips to the substrate being coated will damage it. If the substrate is a web, cutting or breaking the web may occur. If the substrate is a metal embossing belt, the embossing pattern will be destroyed. If the die is used in combination with a roll, clashing the lips and the roll will damage the surfaces. If the roll has a precisely patterned surface it must be replaced. Clashing causes expensive upsets to the manufacturing process for coated products.

A means to minimize the costs of clashing die lips is desired. This is particularly useful in the production of embossed sheeting and pressure sensitive adhesive coated products.

Die lips may be integral to the plates making up the die, or they may be separate items attached to the die plates. In any case, they must be precisely machined and ground so that they may be positioned very accurately to create uniform gaps between the lip and the substrate during coating. The uniformity of these gaps across the width of the substrate determines the uniformity of the coating applied. A one percent variation of the gap results in a one percent or greater variation in the cross web coating uniformity. The expense of manufacturing steel die lips with the accuracy necessary for precision coating is large.

b. Casting Manufacture of Embossed Sheeting

Embossed or patterned sheeting is generally characterized as having a smooth side and a textured side. It is widely used for many purposes. Optically functional sheeting is one class that highly important commercially. Examples include cube corner retro-reflective sheeting as exemplified in U.S. Pat. No. 6,884,371 to Smith. Cube corner retroreflective sheeting typically comprises a thin transparent layer having a substantially planar front surface and a rear structured surface comprising a plurality of geometric structures. The process of making cube corner sheets is complex and expensive.

Cube corner retroreflective sheeting is only one example of many useful types of functional embossed sheeting. Other examples include the production of surface 3-dimensional structures (textures) of both large and small dimensions. Macro and micro-structures on a surface serve many purposes ranging from modification of optical properties, frictional properties, fluid flow interactions, and interaction with electromagnetic energy.

A significant portion of the manufacturing expense is associated with the creation of masters, molds and tooling used for creation of the embossed sheeting. Sheeting is manufactured by casting a thin layer of fluid polymeric resin onto a roll, belt, web or flat mold. The mold contains on its surface the negative of the desired sheeting surface texture. The casting process uses precision coating dies to apply the liquid onto these textured surfaces. After solidification of the resin, an embossed sheet is striped from the casting surface. The mold is reused as many times as possible to reduce the mold investment cost per unit of product. To achieve precision and durability the textured mold surface is commonly constructed from metal.

It is common to cast this liquid layer of resin onto the mold surface using a slot orifice coating die. Slot die heads are known as a means of achieving a precise and smooth liquid film on a web, belt, mold or master. These dies have a slot orifice from which flows id directed onto the target surface. The slot exit is defined by a pair of lips. One of the lips may be adjustable in directions substantially perpendicular to the slot axis. This provides adjustment of the slot opening for tuning the uniformity of the fluid flow from the slot.

The die lips extend from the slot upstream and downstream relative to the direction of mold or web movement. The downstream lip serves as a smoothing lip for transferring and forcing fluid coating onto the mold. In order to achieve proper transfer and surface filling, the smoothing lip must be positioned extremely close to the mold surface. To achieve a useful smooth continuous coating on the mold, the die lip must be positioned with a clearance equal to one to two times desired sheet thickness. If the sheet has a wet caliper of 50 micrometers before solidification, the lip will need to be within 50 to 100 micrometers from the mold surface.

The operational positioning of the slot die very close to the mold surface is difficult and demands constant attention. Unfortunately, problems often occur, and the die may contact the mold. Any contact or clashing with the metal die lip damages the mold. This requires replacement of the expense mold. The metal die lip is also damaged by clashing, and it also requires replacement.

c. Casting Manufacture of PSA Coatings

The casting of unsupported pressure sensitive adhesive (PSA) onto rolls or belts using slot coating dies has problems similar to casting sheeting.

Problems in PSA casting are exemplified by the need for a method to coat a hotmelt adhesive onto an open polypropylene non-woven web without penetrating into it. The challenge is that the molten hotmelt adhesive has a low viscosity at its application temperature. Coating it with a slot die forces the adhesive into and through the non-woven. A method to avoid this problem is to cast the adhesive onto a cooled transfer drum or belt and then laminate solidified adhesive to the non-woven web.

Coating onto a steel transfer drum or belt is fraught with problems. It generates scrap and roll surface maintenance down time. To coat a thin layer of PSA onto a chilled roll requires the surface must be coated with a silicone release coating to allow removal afterward solidification.

The slot die steel lip must be brought very precisely into close proximity to the roll surface. When a coating is produced, it is non-uniform and of poor quality. This is a result of the limitations on dimensional tolerances when machining the die and the roll. Tolerances are further upset by variations in the release coating on the roll. There is great risk of mechanical contact between the roll and the metal lip. This destroys the roll release coatings and metal surfaces. The thin coatings required for PSA tapes are difficult to produce at low scrap rates using transfer drums.

d. Cast Coating Improvements

Both the production of embossed sheeting, and the casting of free PSA films have the common problem of damage to critical surfaces when using a slot die. Improvements in coating onto reusable surfaces using casting dies is a need of industry.

Lippert in U.S. Pat. No. 5,067,432 describes an improved slot die useful for casting a coating onto a web or mold surface. The improvement comprises a means of removably attaching the lips to the coating die. While this allows easy replacement of die lips damaged by clashing, it does not prevent the damage. Improvements are desired in the casting process to minimize die cost, to minimize die maintenance, to minimize mold maintenance, and to maximize component life.

e. Waste Management with Dies

As previously noted, precision coating with a die requires uniform flow across the width of the substrate. Uniform flow requires a uniform slot height along its length and across the width. Currently, this uniformity requires precision metal dies. Great skill and art is employed to machine grind and polish the die plates to the needed exacting tolerances. This makes die plates expensive to make and maintain. Disposal after a single use is not economical. Cleaning and reuse of the die is time consuming and labor intensive.

Labor saving improvements in the die maintenance are desired. Inexpensive coating dies which allow environmentally friendly disposal are needed. Methods of coating using inexpensive disposable coating apparatus are needed. Disposal by incineration is desired. Disposable devices or even disposable replacement parts are not known. These will have the greatest economic impact if they are manufactured by high volume processes.

f. Mist Collection

Multi-roll coaters are common for the production of solventless silicone coatings in the converting industry. These are described in chapter 2 of the *Evolution of Coating*, by George L. Booth published by Gorham International Inc., of Gorham, Me. in 1995. As process speeds increase, the generation of mists in the roll nips has become a problem. A mist is defined as a concentration of particles in a gas where the particles are generally liquid or solid. There is a special need for the elimination of mists from the process of silicone coating. Mist abatement offers the potential of lower operational costs, lower health hazards, reduced contamination of the process area, and elimination of unwanted redeposits on the coated product. Silicone contamination of surfaces modifies their surface properties and changes their functionality in many negative ways.

The fundamentals of the misting problem have been studied by Michael Sean Owens in his PhD studies at the University of Minnesota and are summarized in his Power-Point™ Doctoral Defense presentation on Oct. 27, 2004. Potential solutions are suggested by his work. He shows that manipulation of process variables, formulation rheology, and formulation chemistry can produce process operating windows where misting is diminished. Unfortunately, increasing web line speed will at some point always create a misting problem. A limitation of Owens' work is that he did not study the ultra-low coating range common in silicone coating.

Anti-misting additives and formulations have been developed by the chemical suppliers. Examples of this approach include U.S. Pat. Nos. 5,698,655, 4,806,391, 6,057,033 and 6,511,714. It should be recognized that no additive or special formulation technology will likely have the flexibility to solve all silicone misting problems. These disclosures are helpful, but they do not give product developers the unrestrained freedom to optimize their formulations for other properties.

Misting is also common in the paper industry and in the high speed use of the coating improvement rolls described by Leonard et al. in U.S. Pat. Nos. 6,737,113, 7,311,780, 6,899,922, 6,855,374 and 6,579,574.

When mists are created on a coating process line, the traditional HVAC engineers have attempted to collect and dispose of them with air handling systems. In order to guard against the consequences of this mist, air ducts for mist capture are positioned around the coating station. The resulting ducting and baffles are objectionable. They obstruct access to the coater. They obstruct observation and monitoring of the process. They hinder cleaning of the coater. Additionally, large volumes of contaminated air are generated which are costly to process.

One of the disclosures of Owens is to use large diameter coater rolls. This is helpful because it decreases the rate of divergence of the roll surfaces emerging from the nip. A practical method of cutting the divergence in half at the transfer nip is suggested by this inventor. Using a lead-off idler roll to direct the web path on the outrunning side of the transfer nip can create the effect of an infinite backup roll diameter. This is accomplished by removing the web from the backup roll surface at the nip. The web moves forward in contact with the transfer roll. It then is removed tangentially from the transfer roll and passes on to the idler roll. Note that this approach may still fail at a sufficiently high speed. Additionally, the approach generally changes the dynamics of web handling especially with regard to elements of tension control, speed control, wrinkling abatement, and coating quality. Success is dependent on the silicone formulation, web type and web quality. Expert web handling advice is available from various consultants. Again this approach, like so many others, fails at a high speed.

All US patents and patent applications, and all other published documents mentioned anywhere in this application are incorporated by reference in their entirety.

BRIEF SUMMARY OF THE INVENTION

It is the objective of this invention to enhance the economics and improve the processes of transport, distributing, coating, collecting and filtering fluids.

Primary teachings of this invention are articles and methods for distributing fluid along a line. They comprise a fluid conveying means where the means consists of an inlet edge, an outlet edge at the line, a volume with first and second major surfaces in close proximity that define the volume. Flow passes between the surfaces. A subunit of the volume has a flow resistance to the fluid in a first direction that differs from the subunit's flow resistance in a second direction. These distributing means include but are not limited to enclosed slots, porous media, drilled passageways, machined pathways, micro-channeled sheets, and multiple layers of such means. The multiple layers may be interconnected.

It is also a teaching to simultaneously filter and distribution fluid through the volume.

In various implementations, the invention employs engineered flow passageway structures, internal micro-channels, internal auxiliary channels, and improved porous media. The flow passageways have hydraulic diameters ranging from tens to thousands of micrometers, and length to diameter ratios of 0.1 to 10,000 or larger. Disclosed are novel flow distributing sheets, novel filtering sheets, improved filtering media, improved coating apparatus and methods, simultaneous filtering and distribution methods and apparatus, improved multi-orifice coating apparatus, improved casting apparatus and methods, and disposable coating apparatus. Also disclosed are inventive improvements in slots and in known porous media used for fluid distribution. Additional disclosures are methods and apparatus for mist collection employing the novel flow distribution media and systems.

Many of the devices and media of this invention are generally inexpensive, and economically disposable.

A. Fluid Distribution

1. Metering Sheets

One device of the present invention is a micro-replicated fluid distribution sheet with flow passageways and grids of passageways through which fluid is transported. It provides prescribed flow resistances from a first boundary edge to a sheet edge of the sheet for accurate flow metering and distribution. The device in one form is a sheet that provides uniform flow discharge along a discharge edge. The device may also have flow resistances that are varied to produce a desired flow variation along a sheet discharge edge.

In one embodiment, a rectangular metering sheet may be fed from a single point at a corner on the first boundary edge, or at a point between the first boundary edge and a position approaching the outlet. In this case roughly uniform outflow is achieved along the opposing discharge edge if the dimensionless parameter Nsp is less than 1.1. Approximately uniform flow is achieved if Nsp is less than 0.72 or more preferably less than 0.46.

For uniform flow distribution along large outlet lengths, the width of the sheet may be subdivided into a limited number of abutting sections. Each is fed at an inlet point where the dimensionless parameter Nsp is less than 1.1, or preferably less than 0.72, or most preferably less than 0.46 for the section.

Other useful metering sheet forms include right trapezoids, trapezoids, right triangles, triangles, and various polygons and other shapes. When fed from an apex or a point between the apex and a position approaching the outlet edge, good flow distribution may be achieved from a discharge edge when the parameter Nsp is sufficiently small Values less than 1 are preferred. Values less than 0.2 are more preferred.

The present invention also includes a distribution die apparatus where the sheet conducts fluid from a cavity to an exit face. The use of flow distribution sheets to improve coating devices is also disclosed.

In the cases where the sheet is fed along an edge from a cavity, it is taught that uniform outflow from the sheet is achieved when the dimensionless number, Nvs, is kept below 1, preferably below 0.1, and most preferably below 0.04.

Further teachings of this invention are an improved fluid distribution and filtration sheet constructed with two and three dimensional flow channel grids. For 2D grids device outflow uniformity is obtained when the dimensionless parameter Nvsw is greater than 0.00000001 and the parameter Nvs is less than 1.0 or preferably less than 0.1.

It is also a finding that improved fluid distribution is achieved if the device is designed so that the parameter Nsp is less than 1.

The distribution die apparatus of the invention is improved by providing the ability to overcome passageway clogging. This is accomplished with the presence rows of widthwise passages when the ratio Rw/Rd is less than 10 and preferably less than 1.

The sheets of the invention are highly tolerant of contaminants that clog passageways, and useful as devices to both distribute and filter fluids. It is a teaching to use the sheets in coating devices to meter, distribute and filter fluids just prior to their application to a substrate.

2. Slots

Unique profiled slots are disclosed which promote improved fluid distribution. Preferred geometries are those chosen so that the parameter Nsp is less than 2. More preferred geometries are those chosen so that the parameter Nsp is less than 1. Still more preferred geometries are those chosen so that the parameter Nsp is less than 0.5.

In dies and coating devices where a slot is fed by a cavity, it is taught that improved outflow uniformity is achieved when the dimensionless number, Nvs, is kept below 1. Preferably it is below 0.1, and most preferably below 0.04. Additionally, the profiled slot has a dimensionless parameter value Nsp of less than 1.

3. Porous Media

Unique profiled porous media sheets are disclosed which promote improved fluid distribution from an edge. Preferred geometries are those chosen so that the parameter Nsp is less than 1. More preferred geometries are those chosen so that the parameter Nsp is less than 1. Still more preferred geometries are those chosen so that the parameter Nsp is less than 0.5.

In dies and coating devices where the media sheet is fed by a cavity, it is taught that improved outflow uniformity is achieved when the dimensionless number, Nvs, is kept below 1, preferably below 0.1, and most preferably below 0.04. Additionally when the profiled porous media has a dimensionless parameter value Nsp of less than 1, improved outflow uniformity is achieved.

B. Fluid Filtering

The present invention relates in part to elements, devices and media that allow the filtration of fluids, including liquids and gases, which contain contaminants. What is lacking in conventional porous filter media is the ability to effectively and efficiently use all the mass and volume of the filter. Also lacking is the ability to simultaneously meter and filter flow. Methods, articles and apparatus are disclosed for more effective use of the filter internal pore structure. The invention improves properties per unit volume and per unit mass. One aspect of the invention teaches the use of flow distribution sheets for filtration. Further, the media may be readily designed to fit any size and shape requirement.

One embodiment of the invention is a distribution sheet where the grid of passages is modified so that the probability of capture of a target particle by the composite of all the entrance edge passages, the "entrance composite probability", is less than one. Preferred is to have the entrance composite probability substantially less than 1.0 while simultaneously having the probability of capture of a plurality remaining passages equal to one. More preferred is to additionally modify successive regions of passages so that their entrance composite probability is also substantially less than 1.0 while simultaneously having the probability of capture of the target particle for a combined plurality of the region's be near or equal to 1.

In the case when the passageways of a grid all have the same target particle capture probability and a uniform flow conductance in the three primary directions, and when there are more than five and less than 52 rows of nodes in the flow direction, improved filtration is obtained if the capture probability of the passageways is less than 1. Preferably it is less than 0.5 and most preferably less than 0.2.

When the filter media has a first region of flow passages followed by a second region, improved filtration is obtained if the capture probability of the first is uniform and substantially less than one and that of the second is one. An improvement is obtained if the first region has a gradient in capture probability that increases in the nominal direction of flow.

In still another teaching, the present invention provides improved filter media comprised of a known porous media in which are placed auxiliary fluid micro-channels that have substantially zero particle capture probability, where the dimensionless auxiliary channel flow resistance ratio is in the range of 0.001 to 0.1, and where these micro-channels act to connect the functional faces with the internal volume of the media. More preferred is a ratio between 0.01 and 0.1. The inventive filter media provides increased contaminate capture rates per unit volume and mass. It is a teaching to improve filtering of the media by employing a plurality of micro-channel auxiliary flow passageways to enhance contaminant capture.

The 3D grids of FIGS. 38 to 43 define preferred auxiliary passageways extending from inlet and outlet faces of porous media or grid media useful for improving filtration.

The filter elements and media of this teaching provide improved strength and resistance to undesirable deformations that typically result with conventional elements from an increase in pressure drop across the filter during the service life of a filter. Because of this, the elements of this teaching can prolong the useful service life over known filter technology.

C. Improved Multiple Orifice Dies

The invention includes an improved multiple orifice die apparatus and methods for dispensing flowable materials. This improved die design is the simplest form of our general teaching for improving flow distribution and filtering.

In one form the apparatus is a die comprised of a die body. In this body a cavity distributes fluid along a length. Additionally, multiple bores direct the fluid from the cavity to exit orifices arranged along a line on a discharge face. Auxiliary flow channels which intercept the bores are positioned between the cavity and the orifices. The addition of auxiliary flow channels helps to overcome the problems of die clogging and poor flow distribution. The channels enable filtering of the fluid. Multiple layers of bores and exit orifices further improve flow distribution and filtering.

It is preferred that the dimensionless viscous number, Nvm, for the die and fluid be less than one. It is preferred that the value of the parameter Nspm is less than one. It is preferred that the value of the parameter Nvi is greater than 0.0001. It is preferred that the majority of the auxiliary channels be placed so that the ratio flow resistance through a bore from the channel to the exit orifice to the flow resistance from the cavity to the channel is greater than one.

D. Disposable Dies and Lips

It is an objective of this invention to minimize the cost of coating processes and the maintenance of coating devices through the use of disposable components. In one form the invention pertains to a novel blade coating device employing a fluid metering sheet.

Another aspect of the invention is the use of resilient and disposable die lips to lower maintenance and allow a new mode of fluid application. Additionally, combinations of the numerous inventive aspects allow the avoidance of expensive precisely machined and polished metal dies and die parts.

E. Method and Apparatus for Mist Collection

High speed coating employing transfer rolls generates mists of coating fluid at roll nip regions. It is an objective of this invention to collect and control the migration of these mists from the roll nip regions. Apparatus and methods are disclosed for trapping and removal of the mists.

The system of the present invention is an improved method of removing mists from the space between coating rolls. It involves two steps. The first is confining the mist deep within the roll nip. The second is using a compact mist extractor to flush and remove the mist from the small confinement zone. The extractor's unique design using fluid distribution sheets allows it to fit extremely far into the mist generating nip, and it creates a barrier to mist escape. The extractor removes mist from the zone and collects it in a vacuum system before it has a chance to enter the surrounding room.

F. Significant Features

1. Fluid Distribution Sheet

A fluid distribution device comprising a sheet of material having a first major surface and a second major surface, and at least one edge is disclosed. In it a matrix of fluid flow passageways where a portion of them allow a multiplicity of flow paths in the plane of the sheet from an inlet region to an outlet region, where a portion of the passageways allow flow at an angle to other flow paths, and where the flow is generally within the sheet. In the device no passageways extend through a major surface preventing flow through the surface. Preferably, no passages extend through both major surfaces creating a fluid confining distribution sheet.

A fluid distribution device comprising at least one layer of a sheet of material having a first major surface and a second major surface, having at least one edge, and having a grid of fluid flow passageways within where every passageway has a designed and specified direction, connectivity, shape and flow resistance. Additionally, a portion of the flow passageways allow/provide a multiplicity of first flow paths substantially parallel to the surfaces from an inlet region to an outlet region, and where a another portion of the passageways allow flow at an angle to the first flow paths. An improved sheet of this invention contains a grid of passageways that confine the flow within the sheet and does not allow flow through the major surfaces. The preferred sheet is a fluid confining distribution sheet that conducts flow from an inlet edge region to an outlet edge region.

In one embodiment, this sheet is constructed from an array of repeating base unit cells abutting side by side formed of solid material and fluid flow passageways within the cells. the unit cells allow fluid flow to proceed in at least two directions in the plane of the sheet. The unit cells have similar flow passageways (a repeating passageway design and geometry), where each individual flow passageway of the unit cell interconnects with one of an adjacent cell (except at the first and second major surfaces and at edges of the sheet). Every passageway of the unit cell is fluidically connected to substantially all other cell passageways. Every passageway has a specified direction, connectivity, shape and flow resistance. A fluid may be transported edgewise through the sheet from a one edge region or edge position to another edge position.

A teaching is a sheet wherein the inlet region edge length is equal to the outlet region edge length.

A teaching is a sheet wherein the inlet region edge length is less than the outlet region edge length.

A teaching is a sheet wherein the inlet region edge length is more than ten times less than the outlet region edge length.

A teaching is a sheet wherein the inlet region edge length is a point or very short with respect to the outlet edge.

2. A Fluid Distribution Apparatus using a Distribution Sheet

A further teaching of this invention is an apparatus for distributing fluid comprising a separate discharge applicator device which discharges fluid along a line, a fluid confining distribution sheet, a separate die body, and an internal flow distribution cavity in the die body; and wherein the fluid confining distribution sheet fluidically connects the separate die body distribution cavity of the separate die body to the separate discharge application device.

3. A Coating Device using a Distribution Sheet

A further teaching of this invention is a compound apparatus for coating comprising a die body, an external discharge application location on the die body where the fluid is applied across a substrate, an internal flow distribution cavity in the die body, and a fluid distribution sheet which fluidically connects the cavity and the external application location.

Still another teaching of the invention is a compound apparatus for coating where in the application device is a blade applicator, a knife applicator, a slot orifice applicator, a slide applicator, or a curtain applicator.

An additional teaching of this invention is a compound apparatus for coating comprising an application device where the fluid is applied across a substrate, a fluid confining distribution sheet, a die body device, an external face disposed on the application device, and an internal flow distribution cavity in the die body device; and wherein the fluid confining distribution sheet fluidically connects the cavity and the application device.

4. A Method of Coating using a Distribution Sheet

A further teaching of this disclosure is a method of coating using the fluid confining distribution sheet. This method uses a coating station employing a die block with an internal flow distribution cavity, a means of supplying the fluid to the cavity, and a means of translating a substrate through the station. Further it includes the steps flowing fluid through the cavity, flowing the fluid through a fluid confining distribution sheet, flowing fluid from the cavity into the fluid distribution sheet, flowing fluid to a substrate, and the application of the fluid to the substrate.

5. A Fluid Filtering and Distribution Sheet

Another aspect of the invention is a fluid filtering media comprising at least one layer of a sheet of material having a first major surface and a second major surface and at least one edge, and a grid fluid flow passageways within the sheet. Every passageway has a designed and specified direction, connectivity, shape, flow resistance, size, and a capture probability for a target contaminant. The fluid flow passageways allow flow along paths substantially parallel to the sheet surfaces from an inlet edge region to an outlet edge region. A portion of the flow passageways allow flow at an angle to a second portion of the passageways.

Another aspect of the invention is a fluid filtering and distribution media for discharging fluid along a line comprising at least one layer of a sheet of material having a first major surface and a second major surface and at least one edge, and a grid of fluid flow passageways within the sheet. Every passageway has a designed and specified direction, connectivity, shape, size, flow resistance, and a capture probability for a target contaminant. The fluid flow passageways allow flow along paths substantially parallel to the surfaces from an inlet edge region to an outlet edge region. a portion of the flow passageways allow flow at an angle to a second portion of the passageways. Additionally, some of the flow passages are designed to capture the target contaminant.

6. A Method of Coating using a Filtering and Distribution Sheet

A further teaching of this disclosure is a method of filtering and coating using the fluid distribution and filtering sheet. This method uses a coating station employing a die block with an internal flow distribution cavity, a means of supplying the fluid to the cavity, a means of translating a substrate through the station, flowing fluid through the cavity, flowing the fluid through a fluid distribution and filtering sheet, flowing fluid from the cavity into the fluid distribution sheet, a fluid to substrate transfer means, flowing the fluid from the fluid distribution sheet to the fluid to substrate transfer means, filtering a target contaminant from the fluid within the fluid distribution and filtering sheet and the application of the fluid to the substrate.

A further teaching of this disclosure is a method of coating using a fluid confining distribution and filtering sheet and filtering target contaminants from the fluid with the sheet. This method additionally uses a coating station employing a die block with an internal flow distribution cavity, a means of supplying the fluid to the cavity, and a means of translating a substrate through the station. Further it includes the steps flowing fluid through the cavity, flowing the fluid through the fluid confining distribution and filtering sheet, flowing fluid from the cavity into the fluid distribution sheet, flowing fluid to a substrate, capturing the target contaminants and the application of the fluid to the substrate.

7. An Improved Coating Die Using a Filtering and Distribution Sheet

A further teaching of this invention is a device for coating comprising an external application (discharge) location where the fluid is applied across a substrate, a fluid filtering and distribution sheet, a die body, an external face disposed on the die, and an internal flow distribution cavity wherein the fluid distribution sheet fluidically connects the cavity and the external application location.

An additional teaching of this invention is a compound device for coating comprising an application device where the fluid is applied across a substrate, a fluid filtering and distribution sheet, a die body device, an external face disposed on the application device, and an internal flow distribution cavity in the die body device wherein fluid filtering and distribution sheet fluidically connects the cavity and the application device.

A further teaching is an improved device for coating wherein the dimensionless ratio Nvs is less than 1.0, 0.5, 0.1, or 0.04.

8. A Designed Filtration Media

Another aspect of this invention is a primary filtration media element comprising an entrance face, an outlet face, a volume, and a grid of passageways within the volume where every passage has a designed and specified direction, connectivity, shape, size, flow resistance, and a capture probability for a target contaminant.

a. Feature 1

A further teaching of this disclosure is a first improved filtration media element comprising the primary filtration media element and additionally comprising a grid of first auxiliary channels having a capture probability for the target contaminant substantially lower than the grid passageways, where the auxiliary first channels distribute fluid to a multiplicity of points or regions within the volume, and where the auxiliary first channels connect to the inlet face but not the outlet face.

b. Feature 2

Another teaching is a second improve filtration media element comprising the first improved filtration media element wherein the capture probability for a target contaminant of the grid of passageways is between 0.05 and 1.0, and the ratio of the flow resistance of the grid of passageways to the auxiliary first channels per unit length is between 0.005 and 0.2.

c. Feature 3

A third improved filtration media element comprises the first improved filtration media element, a grid of auxiliary second channels having a capture probability for the target contaminant substantially lower than the grid passageways, where the auxiliary second channels distribute fluid from a multiplicity of points or regions within the volume to the outlet face but not the inlet face.

d. Feature 4

A fourth improved filtration media element comprises the first improved filtration media, sub volumes surrounded or outlined by a portion of the auxiliary channels or by a portion of the auxiliary channels and media edges wherein the capture probability for the target contaminant for grid of passageways within the sub volumes increases in the direction of fluid flow.

e. Feature 5

A fifth improve filtration media element comprises the primary filtration media element wherein the prescribed capture probability for the contaminant increases in the general direction of flow.

f. Feature 6

A sixth improved filtration media element comprises the primary filtration media, sub volumes surrounded or outlined by a portion of the auxiliary channels or by a portion of the auxiliary channels and media edges wherein the cumulative average capture probability for the target contaminant for the passageways of the grid of flow paths through the sub volumes increases in the direction of fluid flow.

g. Feature 7

A seventh improved filtration media element comprises the first improved filtration media, sub volumes surrounded or outlined by a portion of the auxiliary channels or by a portion of the auxiliary channels and media edges wherein the cumulative average capture probability for the target contaminant for grid of passageway of flow paths through the sub volumes in the direction of fluid flow is near one.

h. Feature 8

A eight improved filtration media element comprises the first improved filtration media, sub volumes surrounded or outlined by a portion of the auxiliary channels or by a portion of the auxiliary channels and media edges wherein the dimensionless auxiliary channel flow resistance ratio ranges between 0.002 to 0.2, 0.01 to 0.1, and 0.02 to 0.06.

9. General Filter Media

Another aspect of this invention is a porous filtration media comprising an entrance face, an outlet face, a volume, an assembly of porous material within the volume where the material has an average capture probability for a target contaminant, a first grid of auxiliary channels having a substantially low capture probability for the target contaminant, where the first grid of auxiliary channels distribute fluid to a multiplicity of points or regions within the volume, and where the first grid of auxiliary channels connect to the inlet face but not the outlet face.

a. Feature 1

A first improved filtration media comprising the porous filtration media, a second grid of auxiliary channels having a substantially low capture probability for the target contaminant, where the second grid of auxiliary channels distribute fluid from a multiplicity of points or regions within the volume, and where the second grid of auxiliary channels connect to the outlet face but not the inlet face.

b. Feature 2

A second improve filtration media comprising the first filtration media wherein the prescribed capture probability for a contaminant increases in the direction of flow.

c. Feature 3

A third improved filtration media comprising of at least one sub volume of the primary filtration media, surrounded, contiguous, outlined, rimmed, ringed, fringed, flanked, enclosed, or defined by a portion of the auxiliary channels or by a portion of the auxiliary channels and media edges wherein the cumulative average capture probability for the assembly of porous material of the sub volume increases in the direction of fluid flow.

d. Feature 4

A fourth improved filtration media comprising of at least one sub volume of the primary filtration media, surrounded, contiguous, outlined, rimmed, ringed, fringed, flanked, enclosed, or defined by a portion of the auxiliary channels or by a portion of the auxiliary channels and media edges wherein the cumulative average capture probability for the assembly of porous material of the sub volume in the direction of fluid flow is near one.

10. A Method of Filtering Using Improved General Filter Media

A method for filtering comprising using the general improved filter media, a means of containing the media, a directing contaminated fluid flow to at least one inlet face of the general improved filter media, and collecting the flow from at least one outlet face of the general improved filter media.

11. A Device for Filtering Using Improved General Filter Media

A device for filtering a fluid comprising using the general improved filter media, a means of containing the media, a means of directing flow to at least one inlet face of the general improved filter media, and a means of collecting flow from at least one outlet face of the general improved filter media.

12. An Improved Multi-Orifice Die Coating Method

A method of coating a fluid comprising employing a die, a means of supplying the fluid to the die, a substrate translating past the die, and the application of the fluid to the substrate wherein the die consists of a die block which includes an external face disposed on the die block, an internal flow distribution cavity, a multiplicity of orifices on the external face, a multiplicity of bores (in fluid communication with) flowably connected to the cavity and to the orifices wherein the bores have lengths, providing at least one auxiliary channel intersecting at least two of the bores, flowing the fluid material through the at least two of the orifices, and transferring the fluid from the orifices to a translating substrate.

A method of coating a fluid comprising employing a die, a means of supplying the fluid to the die, a substrate translating past the die, and the application of the fluid to the substrate wherein the die consists of a die block which includes an external face disposed on the die block, an internal flow distribution cavity, a multiplicity of orifices on the external face, a multiplicity bores (in fluid communication with) flowably connected to the cavity and to the orifices wherein the bores have lengths and at least two of the bores intersect, flowing the fluid material through the at least two of the orifices, and transferring the fluid from the orifices to a translating substrate.

A method of filtering and coating a fluid that contains a target contaminant comprising a die; a means of supplying the fluid to the die, a substrate translating past the die; the application of the fluid to the substrate wherein the die consists of a die block which includes an external face disposed on the die block, an internal flow distribution cavity, a multiplicity of orifices on the external face, a multiplicity of bores (in fluid communication with) flowably connected to the cavity and to the orifices wherein the bores have lengths and a probability of capturing a target contaminant, wherein the bores consists of grid of intersecting bores, flowing the fluid material through the at least two of the orifices, capturing the target contaminant within the grid of bores and transferring the fluid from the orifices to a translating substrate.

13. An Improved Multi-Orifice Die Coating Device

A first die for dispensing flowable material comprising a die block where the die block comprises:
  an external face disposed on the die block,
  an internal flow distribution cavity,
  a multiplicity of orifices on the external face,
  a multiplicity bores (in fluid communication with) each flowably connected to the cavity and to at least one of the orifices wherein the bores have lengths, and at least one auxiliary channel intersecting at least two of the bores.

Another aspect of the invention is an improvement of the first die wherein the at least one of the bores intersect at least one of the remaining bores.

Another aspect of this invention is an improvement of the first die further comprising providing at least the auxiliary channels.

Another aspect of this invention is an improvement of the first die further comprising a means of filtering the flowable material by the action of the bores.

Another aspect of this invention is an improvement of the first die further comprising a means of filtering the flowable material by the action of the auxiliary channels.

14. An Improved Multi-Orifice Die Filtering and Coating Device

A first die for dispensing flowable material comprising a die block where the die block comprises:
  an external face disposed on the die block,
  an internal flow distribution cavity,
  a multiplicity of orifices on the external face,
  a multiplicity bores (in fluid communication with) each flowably connected to the cavity and to at least one of the orifices wherein the bores have lengths, at least one auxiliary channel intersecting at least two of the bores, and where some portion of the bores and auxiliary channels have a probability of capturing a target contaminant.

15. An Improved Slot Orifice Casting Die

A first apparatus for applying a coating fluid to a substrate including a die body having precision die slot and upstream and downstream lips relative to the direction of movement of the substrate, wherein the downstream lip is constructed from resilient organic or polymeric material with a Young's modulus between 0.01 to 1 giga-pascals, wherein the lips cooperate to define a slot orifice from which coating fluid may be emitted onto a surface of the substrate, and wherein the lip is removably attached.

Another aspect of this invention is an improved first apparatus wherein the lips define a length of the distal end of the die slot.

Another aspect of this invention is an improved first apparatus wherein the organic lip has a resilience as measured by ASTM™ Shore A hardness ranging between 10 and 90 durometer, or Shore O or Shore OO durometers less than 100.

Other aspects of this invention are improved out running lip designs modifying the physical properties at the distal end and adjustably modifying the resilience of the lip.

In still other aspects of the invention the metering distribution function of the precision die slot is accomplished by replacing it with a metering sheet. Further improvement is accomplished by using a filtering and metering sheet.

16. An Improved Method of Coating with a Slot Orifice Casting Die

A method of coating a fluid comprising employing a die, a means of supplying the fluid to the die, a substrate translating past the die, and the application of the fluid to the substrate wherein the die consists of a die block which includes
an external face disposed on the die block,
an internal flow distribution cavity,
a die slot extending between in running and out running die lips,
an out running die lip comprised of a material with a Young's modulus between 0.01 to 1 giga-pascals and a resilience as measured by ASTM™ Shore A hardness ranging between 10 and 90 durometer, or Shore O or Shore OO durometers less than 100,
flowing fluid through the die slot,
transferring the fluid to the translating substrate,
and placing the out running die lip in clashing contact position with respect to the substrate.

Other aspects of this invention are improved out running lip designs modifying the physical properties at the distal end and adjustably modifying the resilience of the lip.

17. A Disposable Slot Orifice Casting Die

An improved first slot orifice coating die apparatus comprising a tubular die body, a metering sheet, a discharge face on the body, at least one organic lip forming the discharge face, and a fluid metering sheet which fluidically connects the interior of the tubular body the exterior at the lip.

An improved slot orifice coating die apparatus comprising the first slot orifice coating die apparatus comprising wherein the all the base components delineated are made from organic materials.

An improved slot orifice coating die apparatus comprising the first slot orifice coating die apparatus comprising wherein the all the base components delineated are made from materials disposed of by incineration.

18. A Method of Mist Collection

A first method of removing a fluid from a roll nip, having a roll longitudinal axis, a nip volume and a nip contact point, comprising the steps of confining a fraction of the nip volume where the fraction is contiguous to the nip contact point for a length along the roll axis, extracting a fluid from the volume, flowing the fluid through a collection device, and positioning at least some portion of the device within the nip volume.

Another aspect of this invention is an improved first method where the fluid is a mist.

19. An Apparatus for Removing Mist from a Roll Nip

Another teaching of this invention is a first apparatus for removing a fluid from a roll nip comprising a means of confining a volume within the nip, a means of extracting fluid form the nip, and a means to position a portion of the extraction means within the nip.

Another aspect of this invention is an improved first apparatus for removing a fluid from a roll nip wherein the extracting means contacts the volume, wherein the confining means is a die, wherein the die employs a fluid distribution sheet to conduct fluid from the nip into the die, and wherein the volume is less than ten percent of the nip volume.

The following is a non-limiting list of features of the invention.

Base Features

1. A sheet-like fluid distribution apparatus comprising:
a physical volume;
a bounding upper surface with a projected area having a predetermined shape and a predetermined area;
a bounding lower surface having a projected area which is substantially the same as the bounding upper surface projected area;
a bounding edge circumscribing the projected area of the bounding upper surface and the bounding lower surface;
at least one fluid flow passageway disposed within the physical volume;
a fluid distribution region disposed along a line on the bounding edge; and
at least one fluid access region on the physical volume;
wherein the at least one fluid flow passageway, the fluid distribution edge, and the at least one fluid access region are fluidically connected;
wherein the at least one fluid flow passageway allows bounding edgewise flow through the physical volume both toward and parallel to the fluid distribution region throughout the physical volume; and
wherein the physical volume contains a plurality of regions that have a first average flow resistance between the upper and lower surfaces through the regions and toward the fluid distribution edge, and a second average flow resistance between the upper and lower surfaces through the regions and parallel to the fluid distribution edge which is not equal to the first average flow resistance.

2. An apparatus of aspect 1 wherein the fluid flow passageways are not dead ended.

3. An apparatus of aspect 1 wherein the fluid flow passageways have a hydraulic diameter to a flow length ratio is greater than 0.1.

4. An apparatus of aspect 1 wherein the second average flow resistance is less than the first average flow resistance.

4A. An apparatus of aspect 1 wherein subdivisions of the area have a first average flow resistance edgewise through the volume and toward the fluid distribution edge, and a second average flow resistance edgewise through the volume and parallel to the fluid distribution edge which is not equal to the first resistance.

4B An apparatus of aspect 1 wherein subdivisions of the area have a first average flow resistance edgewise through the volume and toward the fluid distribution edge, and a second average flow resistance edgewise through the volume and parallel to the fluid distribution edge which is less than the first resistance.

4C: An apparatus of aspect 1 wherein each subdivisions of the area has a first average flow resistance edgewise through the volume and toward the fluid distribution edge, and a second average flow resistance edgewise through the volume and parallel to the fluid distribution edge which is less than the first resistance.

4D An apparatus of aspect 1 wherein each subdivisions of the area has a first average flow resistance edgewise through the volume and toward the fluid distribution edge, and a second average flow resistance edgewise through the volume and parallel to the fluid distribution edge which is less than the first resistance, and wherein the subdivisions have equal areas 4E. An apparatus of aspect 1 wherein the flow passageways of the flow resistances that are prescribed/defined by at least one of the following: a mathematical formula, algorithm or a table of predetermined values 4F. An apparatus of aspect 1 wherein some portion of the flow passageways are designed to provide a substantial probability of trapping a target contaminant.

4G. An apparatus of aspect 1 wherein some portion of the flow passageways are designed to provide a substantial probability of trapping a target contaminant and some portion of the flow passageways are designed to provide a low probability of trapping the target contaminant.

4H. An apparatus of aspect 1 wherein the flow passageways have target contaminant capture probabilities that are prescribed/defined by at least one of the following: a mathematical formula, algorithm or a table of predetermined values.

4G. An apparatus of aspect 1 and further comprising passageways are dimensioned to provide a means of absolute filtration of all particles larger than a specified size.

4I. An apparatus of aspect 1 with a tolerance to clogging wherein Rw/Rd<10.

5. An apparatus of aspect 1 further comprising:
an external fluid source,
a fluid transport means that is in fluid communication with the fluid access region, and
a means of creating a pressure differential between the access region and the distribution edge region.

6. An apparatus of aspect 1 wherein fluid distribution device is combination of at least two fluid distribution devices stacked upon each other.

7. An apparatus of aspect 6 wherein the two fluid distribution devices have a multiplicity of fluidic interconnections.

8. An apparatus of aspect 6 where in one of the fluid distribution devices has its second average flow resistance less than its first average flow resistance and another has its second average flow resistance equal to or larger than its first average flow resistance.

9. An apparatus of aspect 1 wherein the material of the fluid distribution device is combination at least two fluid distribution devices abutted edge to edge.

10. An apparatus of aspect 9 where in one of the fluid distribution devices has its second average flow resistance less than its first average flow resistance and another has its second average flow resistance equal to or larger than its first average flow resistance.

11. An apparatus of aspect 1 wherein the resistance to flow may be changed by applying forces or energy to at least on of the bounding surfaces.

12. An apparatus of aspect 1 wherein at least one of the bounding surfaces is a plane.

13. An apparatus of aspect 5 further comprising a fluid transport cavity extending along the access region and fluidically connected to and interposed between the fluid transport means and the fluid access region.

14. An apparatus of aspect 13 wherein the fluid access region extends along an line substantially paralleling the fluid distribution edge.

15. An apparatus of aspect 13 wherein the projected area is rectangular and passageways are periodically spaced.

16. An apparatus of aspect 15 wherein the combination of cavity and fluid distribution apparatus passageways has a dimensionless parameter Nsp value less than 1 for distributing the fluid uniformly.

17. An apparatus of aspect 1 wherein the access region is a small region at a point.

17A. An apparatus of aspect 1, with a rectangular area point fed at corner along opposite edge with good uniformity Nsp<1.1.

17B. An apparatus of aspect 1, with a rectangular area point fed along opposite edge with better uniformity with Nsp<0.72.

17E. An apparatus of aspect 1, with a rectangular area point fed along opposite edge with good uniformity Nsp<1.1

18. An apparatus of aspect 17 wherein the distribution edge follows a straight line,
the point is located at a depth perpendicular to the straight line, and wherein straight lines connecting the point to the first end of the distribution edge and the second end of the distribution edge fall within the projected area, and
the sheet has a dimensionless parameter equal the ratio of the fluid distribution edge length divided by the depth, times the square root of the ratio of the second average flow resistance divided by the first average flow resistance and the dimensionless parameter has a value less than 1 or better less than 0.20.

19. An apparatus of aspect 18 wherein the sheet area is rectangular,
wherein a distribution side of the rectangle includes the distribution edge, and
the dimensionless parameter has a value less than 1.2.

20. An apparatus of aspect 19 wherein the dimensionless parameter is less than 0.6.

21. An apparatus of aspect 1 further comprising intermittently spaced, additional flow channels paralleling the discharge edge.

Grooved Slot Features

22. An apparatus of aspect 1 wherein the physical volume is a slot created by/between confining solid first and second walls where at least one of the walls is contains a multiplicity of structures extending away from the nominal wall position.

23. An apparatus of aspect 22 wherein some portion of structures are periodically spaced.

24. An apparatus of aspect 22 wherein some portion of structures are non-uniformly spaced.

25. An apparatus of aspect 22 wherein some portion of structures are discontinuous.

26. An apparatus of aspect 22 wherein the structures are grooves extending from the nominal wall position.

Slot Protrusions Features

27. An apparatus of aspect 22 wherein the structures are protrusions extending from the nominal wall position to a protrusion limit dimension.

28. An apparatus of aspect 27 wherein the volume has a spacing between the surfaces and the protrusion limit dimension equals the spacing.

Drilled Holes Features

29. An apparatus of aspect 1 wherein the physical volume further comprises a solid material and a multiplicity of fluid flow bore holes and auxiliary flow channels extending in at least two directions through the solid material.

30. An apparatus of aspect 29 wherein some portion of the bores intercept distribution orifices on the fluid distribution edge.

31. An apparatus of aspect 29 wherein the bores extend in two directions and no auxiliary flow channels are present.

32. An apparatus of aspect 29 wherein some portion of the bores are periodically spaced.

33. An apparatus of aspect 29 wherein some portion of the auxiliary flow channels are non-periodically spaced.

34. An apparatus of aspect 29 wherein some portion of the bores and auxiliary flow channels are periodically spaced.

35. An apparatus of aspect 29 wherein the second resistance is equal to the first resistance.

36. An apparatus of aspect 29 and further comprising at least some portion of the bores providing flow paths toward the distribution line are dimensioned to provide a substantial probability of trapping a target contaminant.

37. An apparatus of aspect 36 and further comprising providing absolute filtration of all particles larger than a specified size.

38. An apparatus of aspect 29 wherein the bores are arrange in more than one layer.

39. An apparatus of aspect 29 wherein the hydraulic diameter of at least one of the bores changes along its length.

40. An apparatus of aspect 29 wherein a majority the auxiliary channels are located at a distance along the bores less than the distance from the access region and the distribution edge.

Porous Sheet Features

41. An apparatus of aspect 1 wherein the physical volume comprises at least one a sheet of porous media confined by walls.

42. An apparatus of aspect 41 wherein the porous media is positioned with in a slot.

43. An apparatus of aspect 41 wherein the porous media contains bores within it.

44. An apparatus of aspect 41 wherein the porous media contains grooves on at least one of its surfaces.

45. An apparatus of aspect 41 wherein the porous media contains protrusions on at least one of its surfaces.

46. An apparatus of aspect 41 wherein the porous media contains auxiliary channels within it.

Metering Sheet Feature—Designed Porous Sheet with Base Unit Cells

47. An apparatus of aspect 1 wherein the fluid distribution device further comprises an engineered porous material functionally divided into of a multiplicity of base unit cells containing the fluid flow passageways and having an upper and a lower surface areas and area shapes, and which individually occupying a small portion of the corresponding bounding upper and lower surface areas.

48. An apparatus of aspect 47 wherein the base unit cells include one or more area shapes.

49. An apparatus of aspect 47 wherein the base unit cell area shapes are geometric shapes that are polygons.

50. An apparatus of aspect 49 wherein the base unit cell area shapes are chosen from shapes including triangles, quadrilaterals, pentagons and hexagons.

51. An apparatus of aspect 47 wherein each fluid flow passageway in the base unit cell interconnects to at least one other in the base unit cell.

52. An apparatus of aspect 47 wherein the wherein each of the sides of the base unit cells that span between the sheet surfaces has a passageway through it connecting to an adjacent base unit cell passageway.

53. An apparatus of aspect 47 wherein each a base unit cells allows flow in at least two directions edgewise in the sheet.

54. An apparatus of aspect 47 wherein the base unit cells have identical area shapes.

55. An apparatus of aspect 47 wherein all passages in the base unit cells interconnect.

56. An apparatus of aspect 47 wherein the base unit cell has an average flow resistance that is different in at least two directions.

57. An apparatus of aspect 47 wherein the base unit cell has flow resistance that is identical in at least two directions.

58. An apparatus of aspect 47 wherein the base unit flow passageways are micro-replicated.

59. An apparatus of aspect 47 wherein the material of the sheet is confined by at least one confining solid surface.

60. An apparatus of aspect 47 wherein the material of the fluid distribution device is an organic material.

61. An apparatus of aspect 47 wherein the material of the fluid distribution device is an inorganic material.

62. An apparatus of aspect 47 wherein the material of the fluid distribution device is assembled by 3D printing.

63. An apparatus of aspect 47 wherein the material of the fluid distribution device is in the physical form of a sheet.

64. An apparatus of aspect 57 wherein the void volume of the base unit cells contains columns of material spanning some portion of the sheet thickness 65. An apparatus of aspect 47 wherein some portion of the flow passageways are designed to provide a substantial probability of trapping a target contaminant.

66. An apparatus of aspect 47 wherein some portion of the porous material contains at least one auxiliary channel within it traversing at an angle to the direction toward the distribution edge.

The present invention is believed to involve novel elements, combined in novel ways to yield more than predictable results. The problems solved by the invention were not fully recognized in the prior art.

The aspects, features, advantages, benefits and objects of the invention will become clear to those skilled in the art by reference to the following description, claims and drawings.

BRIEF DESCRIPTION OF THE SEVERAL VIEWS OF THE DRAWING

In this disclosure, multiple devices are illustrated along with graphical and tabular results of the investigations of their performance.

FIG. 1a is a schematic cross-sectional view of the internal flow passages of a existing flow distribution device using a slot filled with commercial porous media.

FIG. 1b is photograph of a cross section of commercially available sintered porous media.

FIG. 1c is a grey scale contour graph of the local flow rate at points over the porous sheet area spanning the width length along the cavity and the depth distance from the cavity to the fluid exit face and where the sheet is a known porous media sheet.

FIG. 1d is a graph of the fluid flow at the exit line of the sheet when a known porous media sheet is employed.

FIGS. 6a and b are schematic drawings illustrating possible flow passageway arrangements in an improved metering sheet.

FIG. 10a is a schematic illustration of an improved metering sheet useful for coating of stripes of fluid.

FIGS. 10b and 10c are schematic illustrations of improved metering sheets useful for distributing flow from a small inlet region to a large outlet region.

FIGS. 10d and 10e are schematic illustrations of improved metering sheets useful for distributing flow from a point inlet region to a large outlet region.

FIG. 12 is a grey scale contour graph of the local flow rate at points over the sheet area spanning the length along the cavity and the distance from the cavity to the fluid exit face. In this case, the sheet is a known commercial, porous media sheet where eighty percent of the flow pores of the sheet bordering the distribution cavity are blocked.

FIG. 13 is a grey scale contour graph of the local flow rate at points over the sheet area spanning the length along the cavity and the distance from the cavity to the fluid exit face. Here the flow is through an improved metering sheet where eighty percent of the flow pores of the sheet bordering the distribution cavity are blocked.

FIG. 14 is a graph of the fluid flow from a sheet along an exit line comparing the outflow from a commercial porous sheet with that of an improved metering sheet when there is identical blockage at the sheet entrance.

FIGS. 35a, 35b and 35c are schematic illustrations of filtering grids including both inlet and outlet auxiliary channels.

FIG. 36 is a schematic cross-sectional illustration of a conventional Z-fold filter element.

FIG. 37 is a schematic cross-sectional illustration of a known filter element.

FIGS. 44 and 45 contain tabulated results of filtration experiments comparing filter media of this invention with known Z-fold elements.

FIG. 46 is a perspective schematic view of the internal flow passages of a known flow distribution device using a slot.

FIG. 47 is a perspective schematic view of the internal flow passages of a known flow distribution device using multiple bores and orifices.

FIG. 48 is a graph of the output of a known multi-orifice die with three plugged bores.

FIG. 51a is a graph of the output of a multi-orifice, drilled hole die illustrating the utility of auxiliary channels.

FIG. 51b is a graph of the output of a multi-orifice, drilled hole die with three plugged bores with and without the use of the channels of the invention.

FIG. 52 is a graph of the output of a multi-orifice die with 45% of the bores plugged illustrating how channels improved filtration and uniform flow distribution.

FIG. 66a illustrates a 2D square grid of passageways that may be studied by the flow model of this teaching.

FIG. 66b illustrates grid geometries that may be modeled with the passageway flow model of this teaching.

FIG. 68 is a schematic cross-sectional view of a known coating distribution die using a slot.

FIGS. 69a, 69b and 70a are schematic cross-sectional views of a blade coating devices of this invention.

FIGS. 70b, 70c, 70d, 70e are compound coating devices where the die block containing the distribution cavity is physically separated from the applicator means.

FIG. 71 is a schematic cross-sectional view of a known casting die station for producing embossed webs.

FIG. 72 is a schematic cross-sectional view of a known free span die coating station.

FIG. 73 is a schematic cross-sectional view of a known transfer coating station.

FIGS. 79a and 79b are cross-sectional views of disposable coating dies employing non-metallic polymeric lips and improved fluid distribution sheets.

FIG. 90a is a graph of the uniformity index for a flow from corner fed polygon slots.

FIG. 90b is a graph of the uniformity index for a flow from a rectangular slots where the feed point is within the rectangular area.

FIG. 93 is a graph of the uniformity index for flow from a cavity and slot system.

Figure 2:
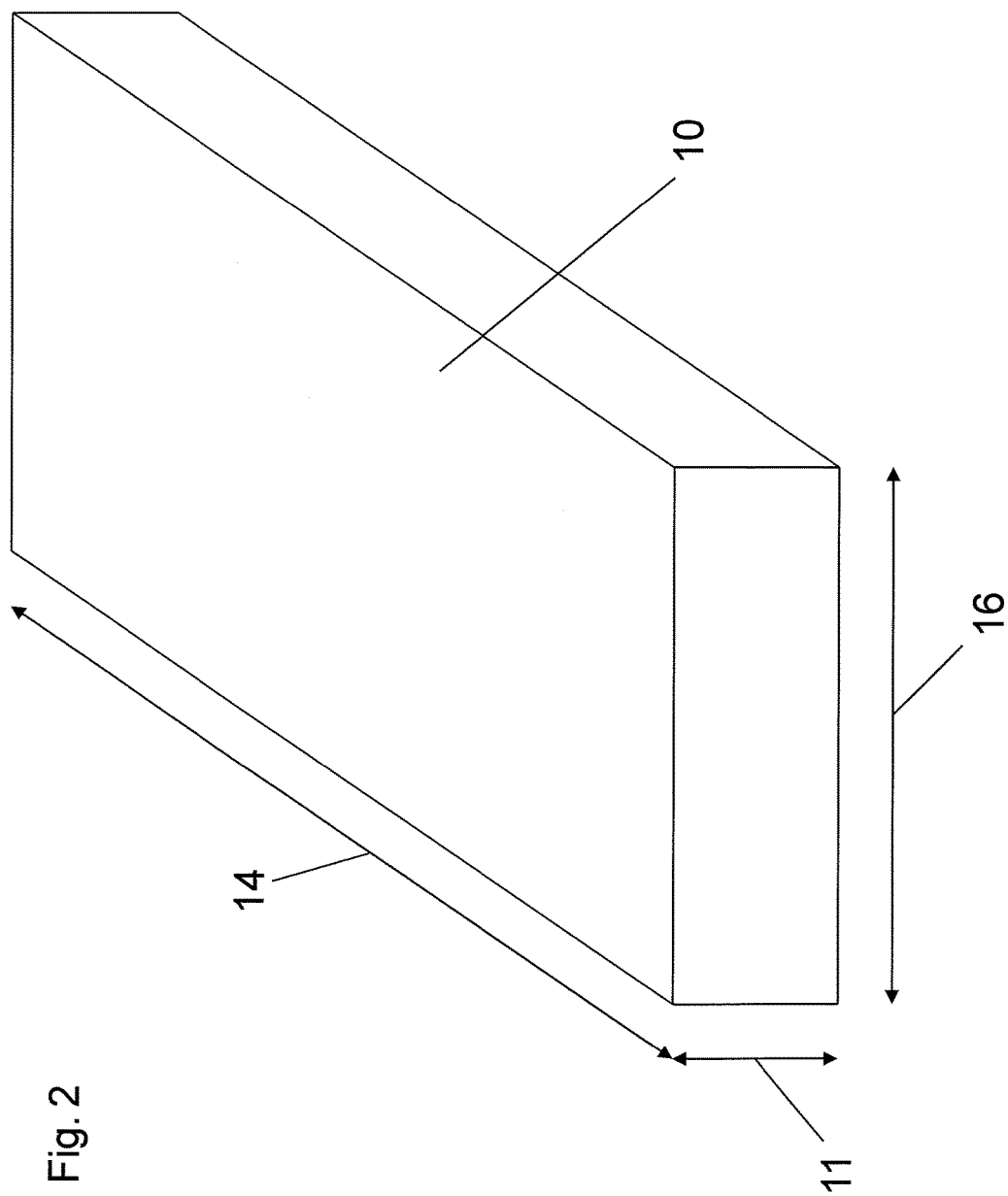
FIG. 2 is a perspective schematic view of an improved metering sheet.

While the above identified figures set forth several preferred embodiments of the invention, other embodiments are also contemplated, as noted in the discussion. In all cases, this disclosure presents the invention by way of representation and not limitation. It should be understood that numerous other modification and embodiments can be devised by those with ordinary skills in the art which fall within the scope and spirit of the principles of the invention.

DETAILED DESCRIPTION

The following description of the invention is provided as a teaching of the invention in its best, currently known embodiments. To this end, those ordinarily skilled in the relevant art will recognize and appreciate that many changes can be made to the various aspects of the invention described herein, while still obtaining the beneficial results of the present invention. They will also recognize that the invention covers such a broad range of uses that the best embodiments for specific application may not be the optimum for others. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used herein, the singular forms "a," "an" and "the" include plural referents unless the context clearly dictates otherwise. Thus, for example, reference to a "metering sheet" includes embodiments having two or more such sheets unless the context clearly indicates otherwise.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

As used herein, the term or phrase "fluid communication" is intended to include aspects where a fluid may be caused to flow from point or object to another.

As used herein, "flow resistance" of a passageway relates the flow through the passageway to the pressure drop through the passageway. The flow rate multiplied by the flow resistance equals the pressure drop from one end to the other end of the passageway.

References are made to size scales. As used herein, the term or phrase "nanometer scale size" or "on the scale of nanometers" is intended to include all sizes ranging from 1 to less than 1000 nanometers. The term or phrase "micron scale size" or "on the scale of microns" is intended to include all sizes ranging from 1 to less than 1000 microns. The term or phrase "millimeter scale size" or "on the scale of millimeters" is intended to include all sizes ranging from 1 to less than 10 millimeters.

As used herein, the prefix "micro-" is intended to refer to sizes of about 1 micron to about 1000 microns. "Microchannels" refers to channels with hydraulic diameters ranging from about 1 to 1000 microns.

A primary teaching of this invention is an apparatus for distributing fluid along a line comprising slot like volume that encompasses a fluid conveying means. Such means conveys fluid from an inlet edge, inlet point or inlet points to an outlet edge. The volume has first and second major surfaces in close proximity where flow passes between the surfaces, and it has various shapes. In some examples the apparatus is a sheet where flow passes edgewise through it. Within portions of the volume, the ratio of the flow resistance of the fluid in a first direction to the flow resistance perpendicular to the first direction when measured at the same flow rate does not equal one. These distributing means and articles include but are not limited to enclosed slots, porous media, drilled passageways, machined pathways, micro-channeled sheets, and multiple layers of such. The multiple layers maybe interconnected.

It has been found that when fluid is distributed from a point through the volume to a discharge line, generally uniform outflow may be achieved when special ranges of parameters are used. A slot like volume is characterized by two major surfaces. These are generally near parallel or near concentric surfaces in close proximity to each other. The distance between them is the thickness or gap. It may be constant, or varying, or slowly varying, or on the average constant, or periodically varying, or varying about a constant value, or varying about an average value or systemically varying. The major surfaces each have an area generally with the same area shapes with perimeters that fit within a rectangle. The rectangle has width and depth lengths.

The major surfaces may be flat planes or surfaces with elevation changes about some reference plane in Cartesian coordinates, or a diameter in cylindrical coordinates, or a diameter in spherical coordinates. This sheet like volume may be folded, twisted, bent, or deformed in many different ways. This slot like volume may also be thought of as a membrane that has and internal This sheet or membrane like functional volume may be formed of a void volume enclosed by bounding solid surfaces or fluid restraining planes. A slot is an example. Additionally, this volume may be filled or partially filled with material or porous material. The volume between the major surfaces again is bounded by an edge or multiple edge boundaries. The sheet like volume is used to direct fluid from an inlet to an outlet edge.

Figure 95:
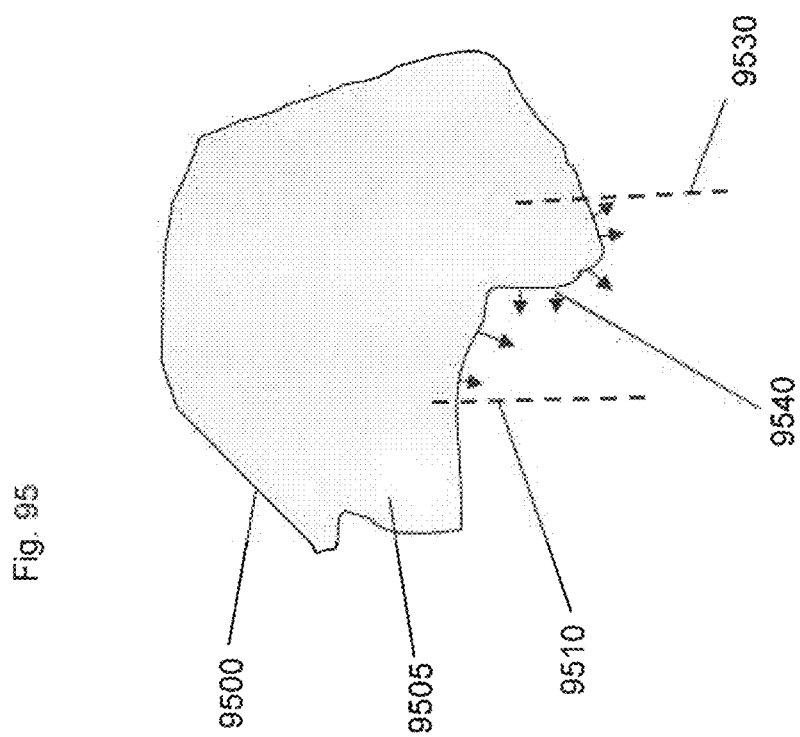
FIG. 95 is a schematic top view of an improved slot distribution system with an irregular major surface shape.

We teach improvements to existing technology to achieve a prescribed flow or a uniform flow from a sheet outlet edge region. FIG. 95 shows a top view generalized sheet like volume shape 9500. The top major surface area 9505 is flat to simplify the illustration, but this is not a requirement. Dashed lines 9510 and 9530 define an outlet edge flow region where fluid flows outward and normal indicated by arrows 9540 from the volume edge.

Figure 96:
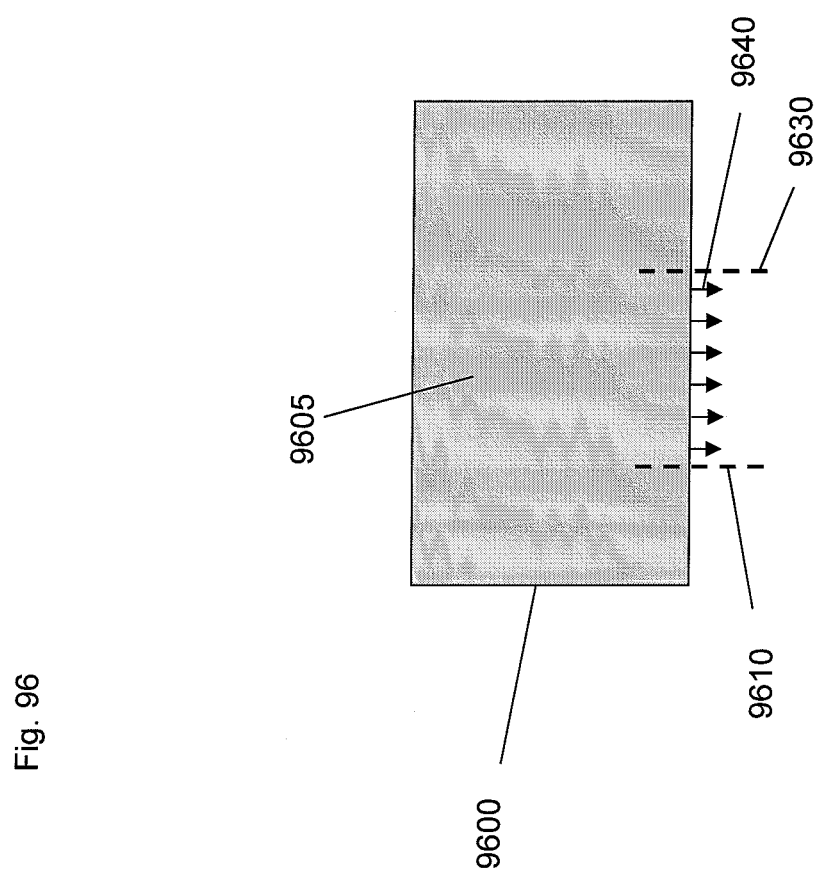
FIG. 96 is a schematic top view of an improved slot distribution system where the polygonal major surface shape of FIG. 95 has been mathematical transformationally mapped onto a rectangular plane.

The area 9505, and the defining perimeter edge of the volume as projected in the top view, and the outlet edge defining lines 9510 and 9530 may generally be mapped onto a straight sided polygon as shown in FIG. 96. Here the defining perimeter is now the rectangle edge of area 9605, and the discharge edge is confined between line 9610 and 9630. Any point on the surface will have a corresponding point on the rectangle. Flow from the outlet edge is shown by arrows 9640.

When the major surface of the volume can be mathematically transformed into a polygon, the findings and teachings for flow distribution in and from the polygon concerning the effect of flow resistances on flow distribution may be mathematically interpreted to obtain analogous effects in the original irregular shaped volume. If a prescribed flow an outlet edge for an irregular shape is desired, and if the shape may be transformed into a polygon such as the rectangle or triangle in the following descriptions, then the teachings for obtaining a flow distribution in the transformed space may be used to determine the local variability of flow resistances in the original irregular shape necessary to obtain an equivalent distribution.

An analogy is that if the polygon were a very elastic rubber sheet, it may be stretched and manipulated into the irregular shape of interest, then properties of the polygon may be transformed to obtain the equivalent flow results in the irregular shape.

Various implementations of the invention and systems that incorporate it are illustrated.

A. Existing Dies

FIG. 46 is a perspective schematic view of internal flow passages of a known flow distribution device using a slot. The flow passages consist of an internal cavity 501 into which a flow is introduced as illustrated by arrow 503. The fluid flows down the length of the cavity. Along its length flow enters a slot 502 which connects to the exterior of the die. The fluid exits as illustrated by the arrows 504 from the slot orifice 505. In coating and other flow distribution devices the cavity is also referred to as the manifold or distribution manifold.

FIG. 47 is a perspective schematic view of internal flow passages of known flow distribution devices using multiple bores and orifices. The passages consist of a cavity 510, and bores 512, and orifices 514. The orifices are located on a discharge face which is not shown. A flow is introduced as illustrated by arrow 516. It is distributed down the length of the cavity 510, and enters the bores 512. The bores connect the cavity with the exterior of the die where the flow exits through the orifices 514.

B. Existing Modeling

Flow models may be used to accurately describe the distribution of flow rates from the slot orifice of a slot die. We have found that in many cases Stokes flow and lubrication flow models work well. A model with a three dimensional grid of flow passages is briefly summarized in the following description.

In the past, a simple approach to modeling the flow in a porous media and media flow passageways was used. It considered the media as a continuum where flows versus pressure drop are related by a Darcy constant. Commercially important three dimensional porous structures have been modeled by the Darcy approach where flows in individual passageways are ignored and the multitude of channels in a region are averaged together.

C. New 3D Flow Grid Modeling

Three-dimensional modeling of flow through interconnected channels, tubes, bores and passageways has been developed. It has been inventively used to study, to optimize, and to define new and improve devices and methods for fluid distribution. Here the flows in each passageway are individually calculated and variations in flow between them are studied. In contrast to the Darcy approach, the mathematically more intensive task of calculating flows for every individual flow passageway is accomplished.

Figure 64:
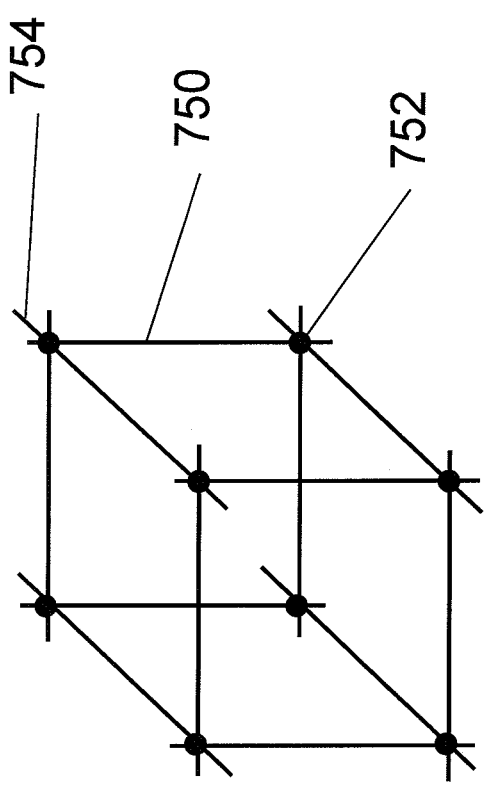
FIG. 64 is an isometric schematic of the basic cube element of the three dimensional flow grid of this teaching.

A general three dimensional model has been developed which may be used to describe the flow in any system of flow passageways or designed porous media. It is illustrated in FIG. 64. It is constructed of arrays of channels, assembled in grids of passageways. The grids are arranged so that they outline the edges of what is called in topology a convex quadrilateral. The grids extend in x, y and z directions. The base element of this model is a single array of passageways represented by the lines 750 connecting eight node points represented by the small circles 752, and where the passageways form the outlining edges of one convex quadrilateral. For simplicity, this quadrilateral may be thought of as a cube without limiting the general usefulness of the model. Twenty-four additional passageways 754 extend from the eight corners or node points. These additional passageways provide flow paths for fluid entering and exiting the base cube. With the cube aligned with orthogonal x, y and z axis, these additional passageways extend in x, y and z axis directions from each node.

The base cube element consists then of twelve passageways 750, and twenty-four additional connection passages 754. Each has an arbitrary resistance to fluid flow through it. When the flow is pressure driven through the grid of flow paths, at least one pair of the additional passageways serve as inflow and outflow paths to and from the cube.

Thirty-six equations must be generated to solve for the flow in each flow path. Eight mass balances may be written, one for each node where passages intersect. Multiple closed loops of passageways may be defined. Because the pressure drop around any closed loop of paths must sum to zero, flow loop equations may be written for the cube. Five independent equations may be written. Additionally, a pressure balance equation for any pair of inlet and outlet passageways and an arbitrary flow path between them is used when the pressure differential between the inlet and outlet is known. Still further for any passageway that is not used, the flow rate is set to zero. In this manner 36 equations may be written, and the flow in every passageway may be found by solving the equations.

For Newtonian fluids the equation set will comprise a linear system of equations which may be solved by various methods. When the fluid flow properties depend upon the rate of flow, the equation set will be non-linear.

An alternative method of solving for the flows in the 3D grid is as follows. If pressure boundary conditions are known, and the flows at any node must sum to zero. The pressures at the nodes may be calculated noting that the flow from one node to the next equals the path flow conductance times the pressure change. A system of equations is developed for solving for the pressures at each node. Once the pressures are known, the path flow rates are calculated using the flow conduction relationship.

By using an assemblage of the base cubes, an assembly of fluid flow passageways may be used to span a volume, a 3-dimensional space.

Figure 65:
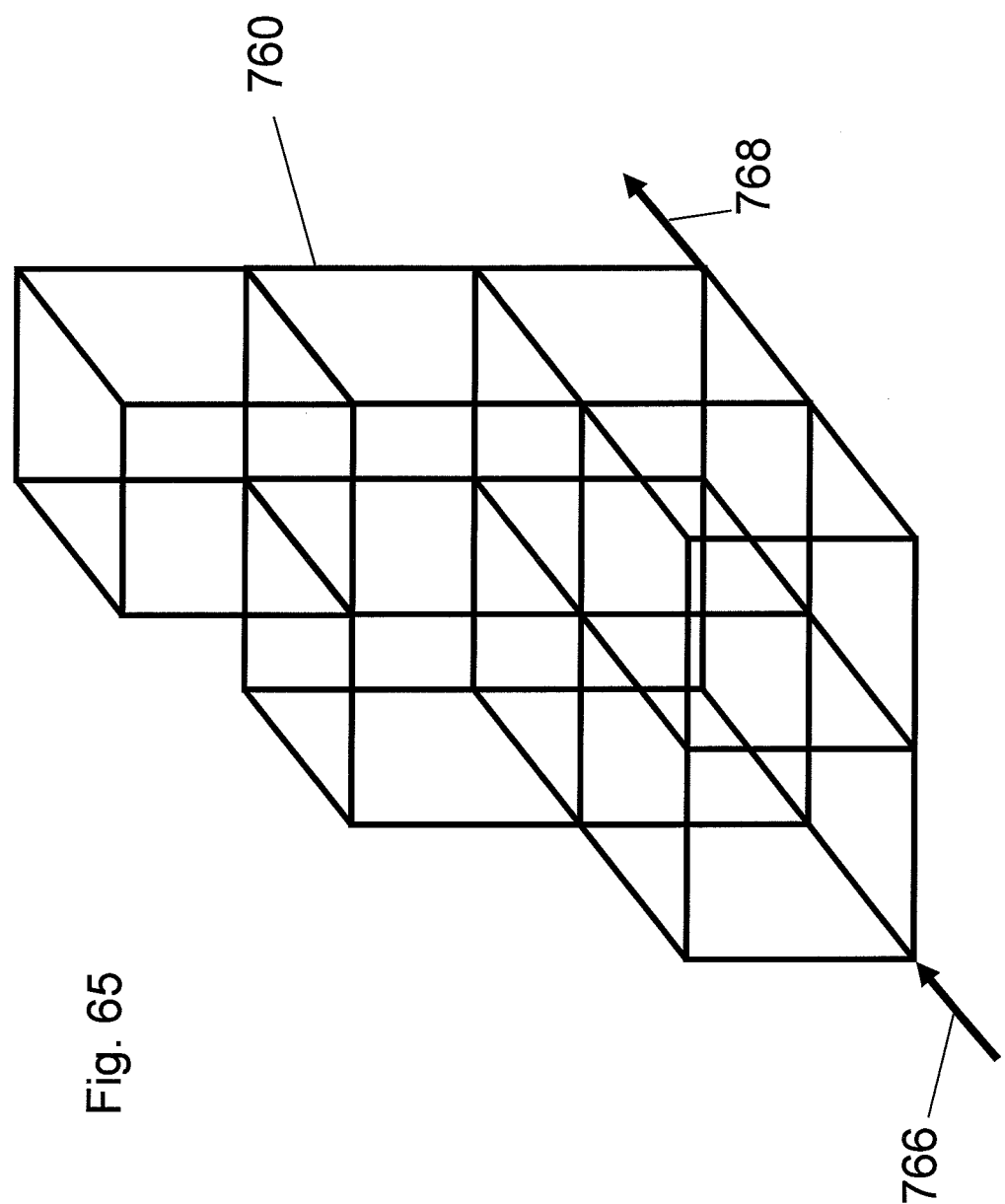
FIG. 65 is an isometric schematic of a volume filled with an array of basic cube elements of flow passages that may be used to model the flow within the volume.

One can think of a general of assemblages of cubes where each edge of the cube is a flow duct. Blocks of cubes may be stacked together to form a composite spanning the volume to be modeled. An example geometry is shown in FIG. 65 where each bold line represents a flow channel. Here an assemblage of cubes 760 fills a three dimensional volume. Fluid is flowed into the assemblage through an inlet tube indicated by arrow 766. Fluid exits through a tube indicated by arrow 768.

D. 2D Flow Model

A simplified form of the cube model may be used to model flow channels and passageways existing in a plane of two dimensions. FIG. 66a illustrates a simple two dimensional model of flow paths. Here an assemblage of passageways 772 fills a two dimensional (2D) plane. Fluid flows into the assemblage through an inlet tubes indicated by arrows 776. Fluid exits through a tubes indicated by arrows 774. The intersections of passageways are nodal points. The passageways are arranged in square grids connecting the nodes.

Figure 66C:
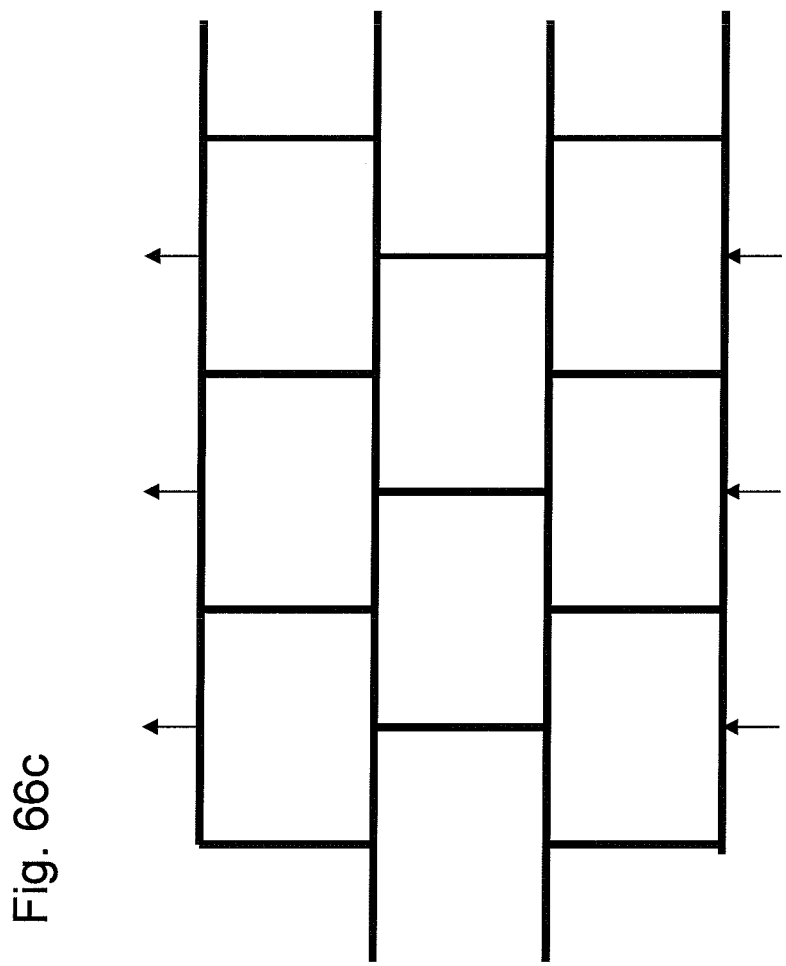
FIG. 66c illustrates an interlaced rectangular grid geometry that may be modeled with the passageway flow model of this teaching.
Figure 66D:
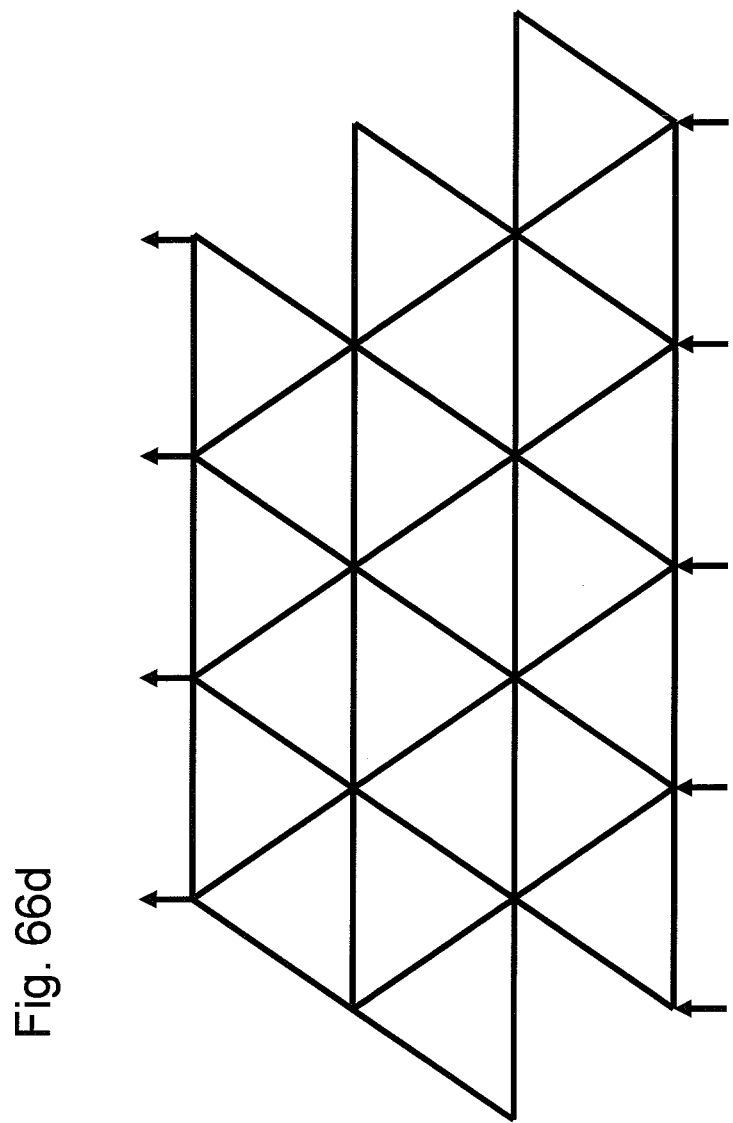
FIG. 66d illustrates a triangular grid geometry that may be modeled with the passageway flow model of this teaching.
Figure 66E:
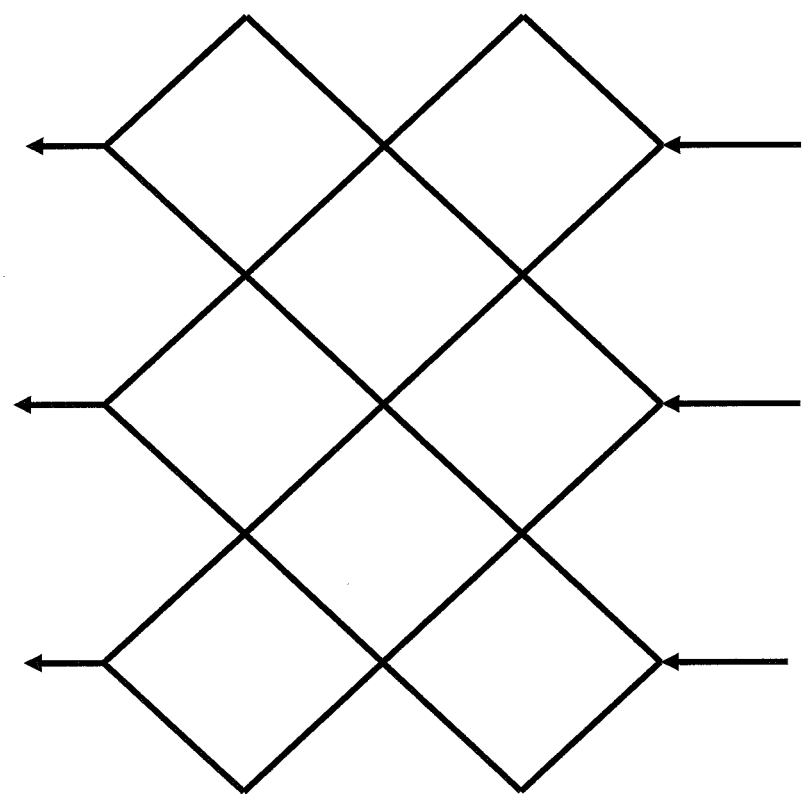
FIG. 66e illustrates a diamond grid geometry that may be modeled with the passageway flow model of this teaching.
Figure 66F:
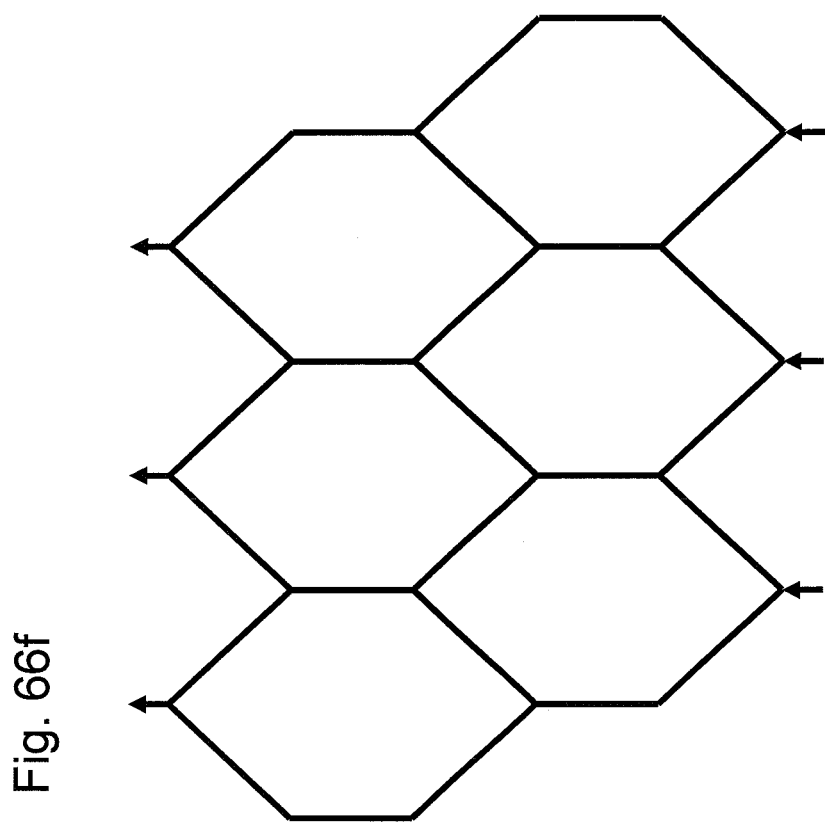
FIG. 66f illustrates a hexagonal grid geometry that may be modeled with the passageway flow model of this teaching.

FIG. 66b illustrates how more complex nodal connectivity may be simulated by setting the flow resistances of a repeating pattern of passageways to infinity in the square grid in FIG. 66a. FIGS. 66c through 66f illustrate other equivalent 2-dimensional path geometries that may be studied by manipulating the resistances of the model in FIG. 66a. All of these variations may be created by setting selected passageway flow resistances to zero and to infinity.

Using a large mesh of the squares or the triangles, nearly any assembly of interconnecting 2D flow paths may be approximated. In a like manner using a cubic grid assembled of multiple cube elements of FIG. 64, assemblies of interconnecting 3D flow paths may be approximated.

E. Improved Multiple Orifice Dies

The minimization of the cost of coating may be accomplished through the use of the improved multi-orifice dies. These dies have a generally lower fabrication cost. It is a teaching to fabricate these dies from polymeric materials.

In the following description of multi-orifice dies, the term "bore" refers to a passageway which conveys fluid between a supply cavity and an exit orifice on or in the proximity of a die face. The bore is a member of a multiplicity of bores arranged to connect a line or lines of multiple exit orifices. Drilled holes are an example. It is within the scope of this invention to have a slot orifice extend along the length of the die on the die face. The slot intercepts the bores before they reach the die face. Such a slot may perform the function of merging the separate streams of fluid exiting from the bores into a ribbon of fluid at or near the die face.

The terms "auxiliary channel in the die width" and "cross channel" refer to flow a passageway which is generally perpendicular to the bores. Alternatively, the passageway may be at an angle to the bores. The passageway intercepts at least two bores.

The term "uniformity index" is a dimensionless number that refers to the flow distribution from the bores and is abbreviated UI. It is defined here as the difference between the maximum and minimum bore flow rates at the exit face divided by the average bore flow rate. A perfect uniform flow distribution has a uniformity index equal to zero.

1. Modeling Multi-Orifice Dies

A model of the flows in multi-orifice fluid distribution devices was created. For devices with flow passages like those illustrated in FIG. 47, it is found that the flow distribution from the die orifices is primarily a function of the ratio of the viscous flow resistance down the cavity 510 to the total viscous flow resistance through the bores 512. This is referred to as the dimensionless viscous number, Nvm.

The models are valid when the assumption of Stokes flow is accurate. That is when conditions are such that inertia and gravity have insignificant influences, and when bore and channel entrance losses are small.

2. The Clogging Problem

When the viscous number approaches zero a perfect, uniform flow distribution is achieved, but this does not prevent clogging. When large particles contaminate the fluid, they may clog the entrances to bores. An example of the problem presented by clogging three bores of a FIG. 47 type die at dimensionless positions 0.05, 0.47, and 0.79 is illustrated in FIG. 48. Here the ratio of the local flow rate from a bore to the average flow rate from the bores is plotted versus the dimensionless position along the die discharge face. The result of clogging is a disrupted flow distribution from the respective orifices. For each clogged bore there is a corresponding lack of coating exiting at the die fade. Flow enters the cavity at position zero. If the die is being used to coat a substrate, defective product will result and force shutdown of production.

a. Auxiliary Cross Channels

Figure 49A:
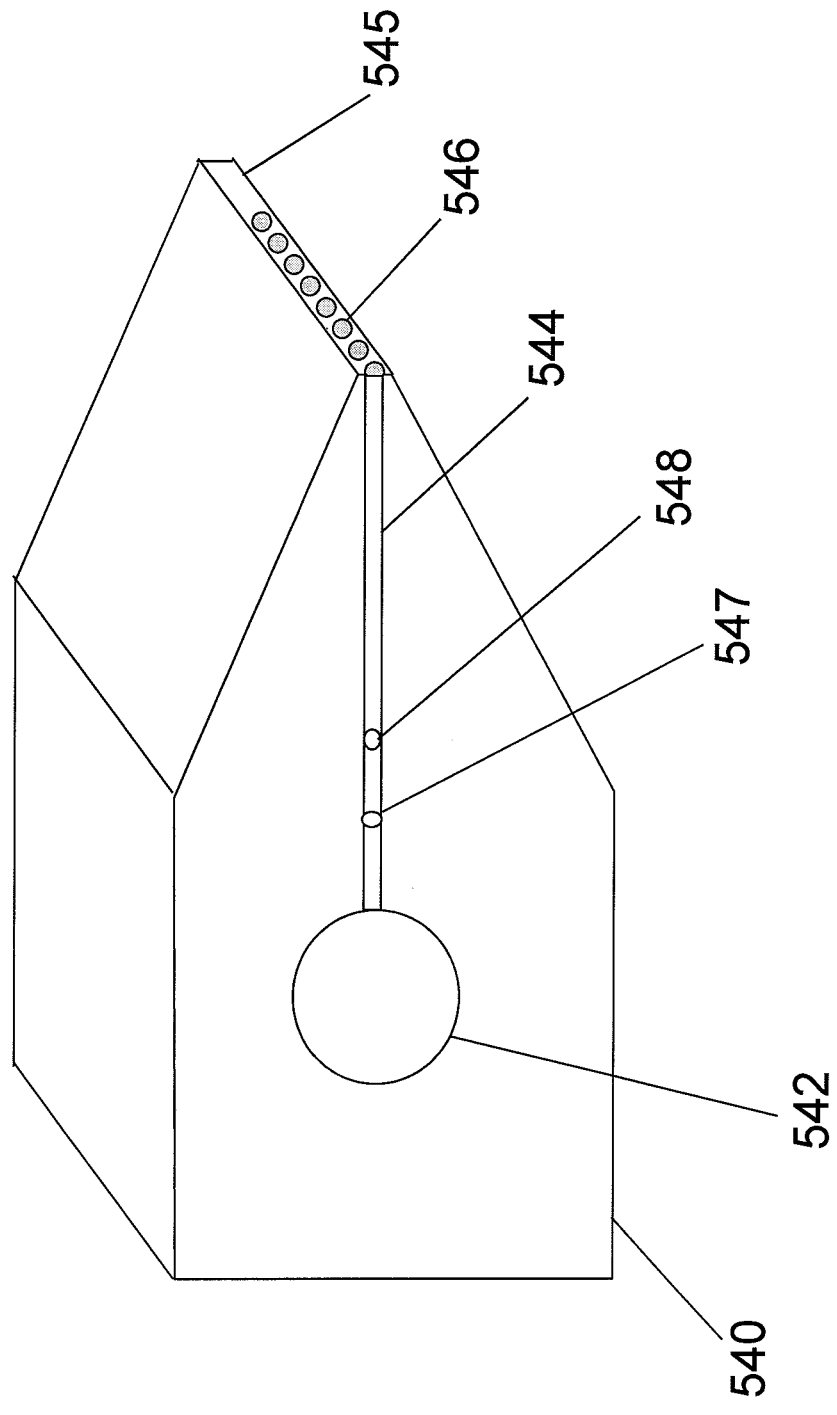
FIG. 49a is a perspective schematic view of a section of one embodiment of the inventive die using one row of bores.

Through extensive investigation, it has been discovered that the clogging problem of multi-orifice dies may be substantially diminished. An improved multiple orifice die is obtained by adding at least one cross die auxiliary channel. More than one is most preferred. The channels are illustrated in FIG. 49a. The multi-orifice die body 540 contains an internal cavity 542 which extends down the length of the body. Multiple bores 544 extend from the cavity to an exterior face of the die 545. Fluid is introduced to the cavity by a means not shown and then flows to the bores 544. The fluid flows through the bores and exits from orifices 546 on the die face 545.

Figure 49B:
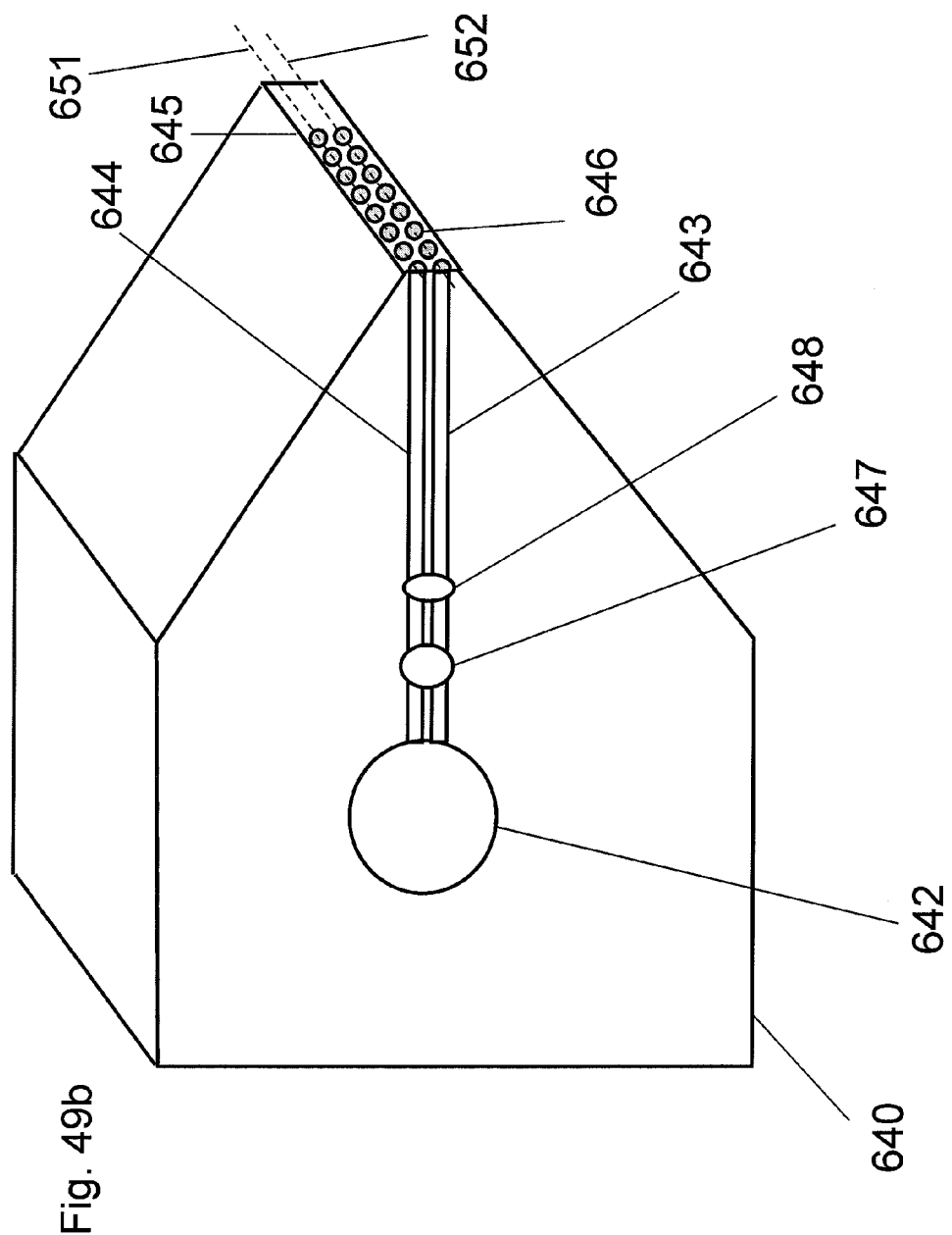
FIG. 49b is a perspective schematic view of a section of one embodiment of the inventive die using two rows of bores.

Auxiliary channels 547 and 548 are positioned to intercept the bores 544 and provide for the transfer of fluid from one bore to at least one other bore. It is preferred that at least one of the channels extends down the widthwise length of the die and engages with substantially all of the bores 544.

b. Layered Bores:

Through extensive investigation, it has additionally been found that the clogging problem of multi-orifice dies may be made insignificant using additional rows or layers of bores stacked upon each other. This improved multiple orifice die is illustrated in FIG. 49b. The die body 640 contains an internal cavity 642 which extends down the length of the body. Multiple bores extend from the cavity to an exterior face of the die 645. These bores are arranged in a first row of bores 643 arrange along a dashed line 652, and a second row 644 arrange along a dashed line 652. These lines need not be straight.

Fluid is introduced to the cavity 642 by a means not shown and then flows to the bores 643 and 644. The fluid flows through the bores and exits from orifices 646 on the die face 645.

Auxiliary cross channels 647 and 648 are positioned to intercept the bores 643 and 644 and provide for the transfer of fluid from one bore to at least one other bore hole. Although two channels are illustrated, improvement is achieved using only one. More than one channel is preferred. Improve performance is achieved when the channel provides for the transfer of fluid from one bore, a first bore, to at least a second bore or a number of additional bores. The first bore is a member of a first line of bores such as line 652 and the second bore may be a member of the same line of bores or a member of another line of bores. It is preferred that the channel connect both adjacent bores in the same line and adjacent bores in another line.

It is preferred that at least one of the channels extends down the length of the die and engages with substantially all of the bores 643 and 644 of lines 651 and 652.

i. Auxiliary Cross Channels

Figure 49C:
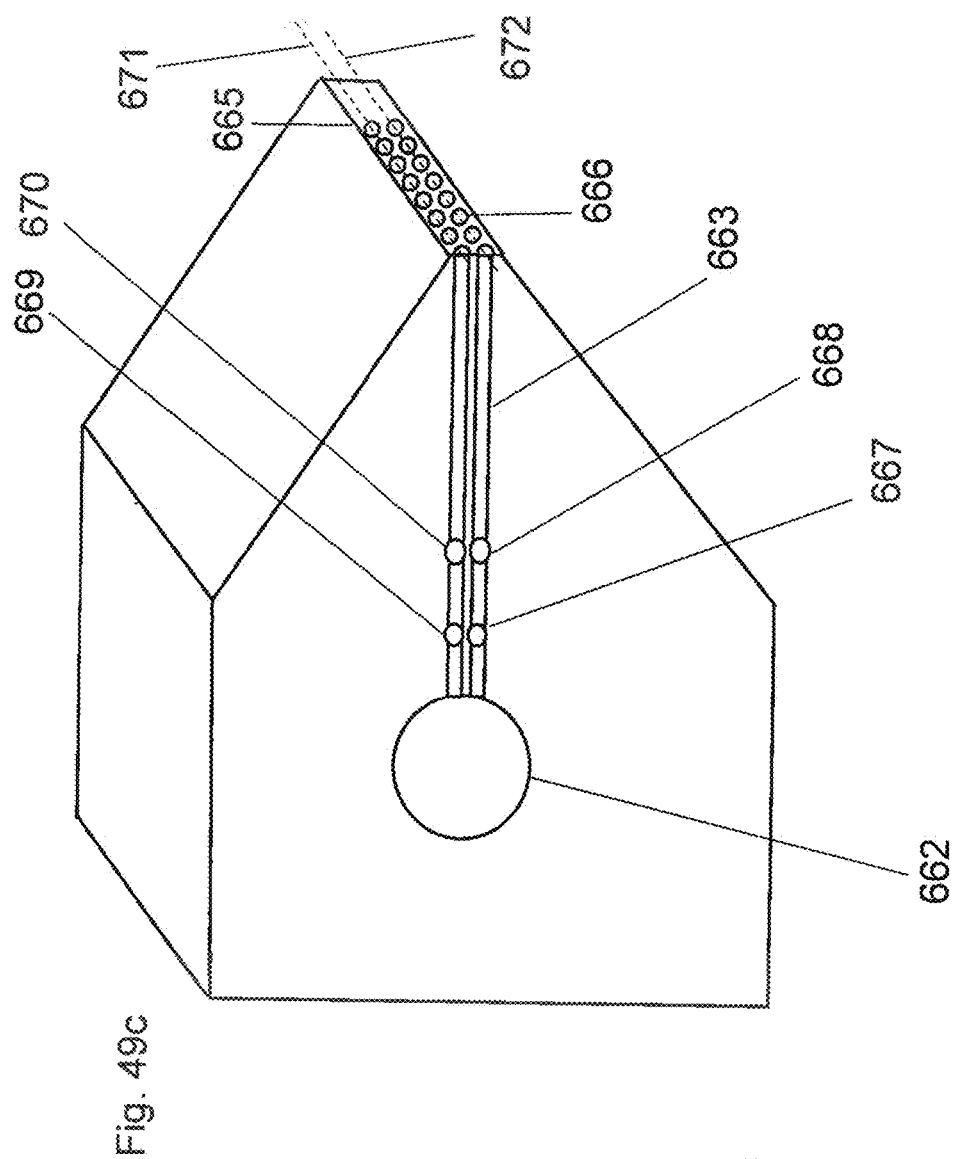
FIG. 49c is a perspective schematic view of a section of still another embodiment with a die using two rows of bores.

Another useful embodiment of our invention channel geometry is illustrated in FIG. 49c. In this embodiment, the top layer of bores 665 arranged along exit line 671 is interconnected by auxiliary channels 669 and 670. The bottom layer of bores 666 is arranged along line exit 672 and the bores are interconnected by auxiliary cross channels 667 and 668. There is no interconnection between the two layers except at the cavity 662.

The auxiliary channels 667 and 668 are positioned to intercept the bores 663 and provide for the transfer of fluid from one bore to at least one other bore hole. Although two channels are illustrated, improvement is achieved using only one. More than one channel is preferred. Improve performance is achieved when the channel provides for the transfer of fluid from one bore, a first bore, to at least a second bore or a number of additional bores. This first bore is a member of a first line of bores arranged along a line such as 672 and the second bore is a member of the same line of bores.

ii. Auxiliary Inter-layer Channels

Figure 49D:
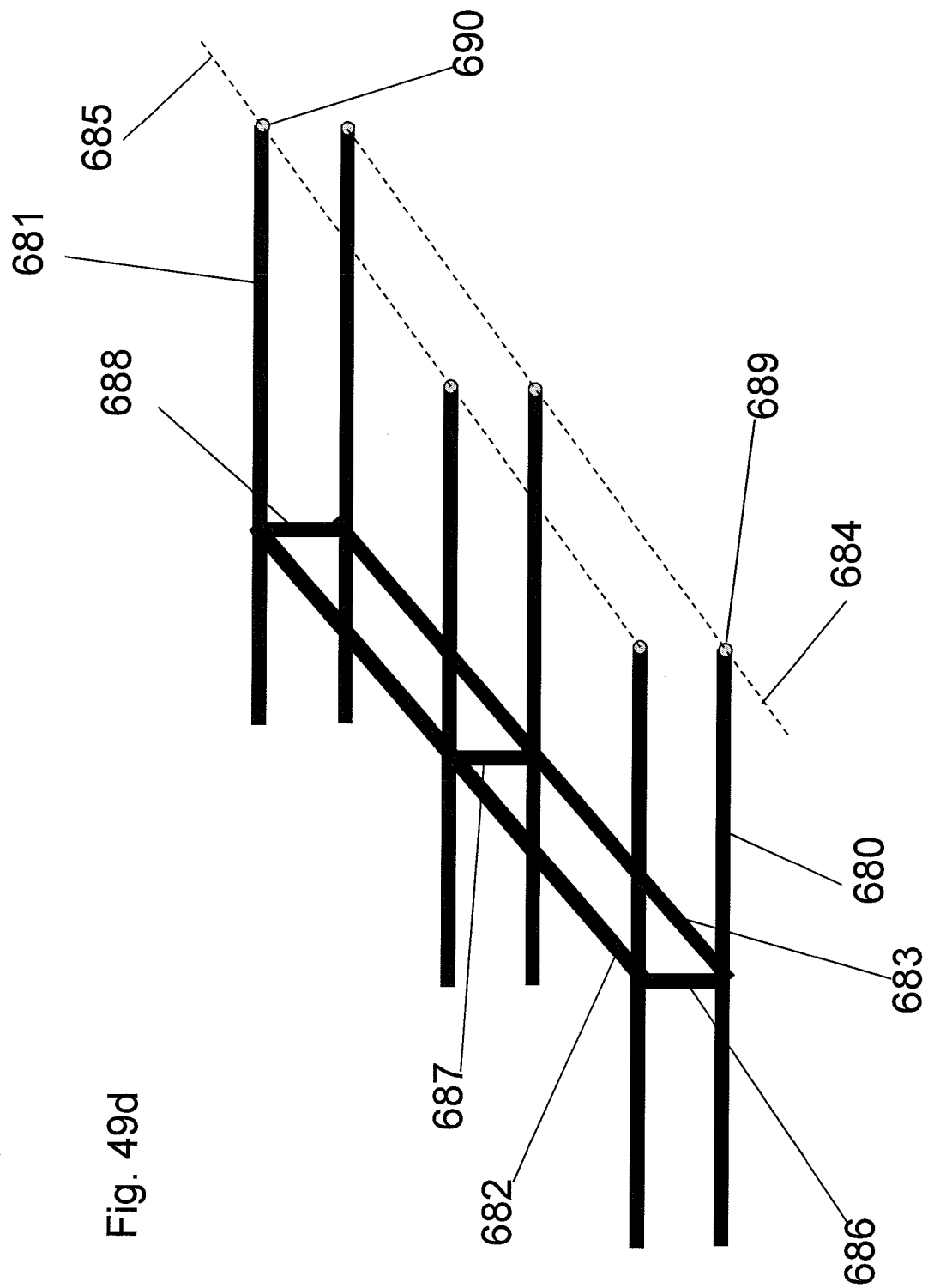
FIG. 49d is an isometric schematic view of the flow passageways of still another embodiment with a die concept using two rows of bores.

Still another useful embodiment of our inventive channel geometry is illustrated in FIG. 49d. An isometric view of a portion of bores, and auxiliary channels is shown. Bores 680 and 681 are arranged along lines 684 and 685 respectively into layers one above the other. These bores terminate at discharge orifices 689 and 690. The bores 681 along line 685 are connected in the top layer by auxiliary cross channel 682. The bores 680 along line 684 are connected in the bottom layer by auxiliary channel 683. Additionally, layer interconnect auxiliary channels 686, 687 and 688 provide passageways for flow between the layers. These inter-layer auxiliary channels further improve the distribution of flow from orifices 689 and 690. It is preferred that the auxiliary layer interconnect channels simultaneously intersect both the bores and the intra-layer auxiliary cross channels. However, improvement in flow distribution may also be obtained by other locations.

Improved flow distribution is obtained when contaminants are present with only interlayer auxiliary channels present. It has been found that an auxiliary passageway, such as channel 547 or 548 in FIG. 49a or channel 647 or 648 in FIG. 49b or channels 683 and 682 in FIG. 49d are useful in eliminating flow defects. Significantly when two or more layers of bores are employed, improved flow distribution along the die face may be obtained using layer interconnect auxiliary flow channels that connect two or more lines or layers of bores. Most preferred is the use of two or more lines or layers of bores with one or more intra-layer cross flow auxiliary channels and one or more arrays of interlayer auxiliary channels.

In the case of a single line of bores, auxiliary channels are helpful. When a cavity to bore entrance is plugged by any means, the total disruption in flow from the die does not result if at least one auxiliary channel is present. Referring to FIG. 49a, the presence of auxiliary channels like 547 or 548 enable flow from all the orifices 544 in the presence of clogging. The channels produce not only flow from all orifices negating plugging problems at the cavity, but they also improved orifice flow uniformity down the line of the die discharge orifices. This new technology allows acceptable die outflow uniformity when the prior art would not. If the die is being used to coat a fluid onto a web translating past it in proximity to the face 545, a continuous distribution of coating fluid is produced.

3. Model Parameters

Modeling has been used in designing liquid distribution devices using bores and channels that function well. Fluid dynamically, it is useful study the flow distributions in and from a die for the case of a constant cross-sectional area primary cavity distributing flow to bores. One prime parameter is the dimensionless viscous number, Nvsm. A second is the dimensionless cross channel viscous number, Nvcm. Nvsm is defined as the total viscous resistance to flow down the cavity (manifold) divided by the composite total flow resistance through the bores. For n bores of equal resistance carrying flow in parallel, the composite total flow resistance equals 1/n times the flow resistance through one bore. When the bores have un-equal resistances, the reciprocal of the total resistance equals the sum of the reciprocals of the resistances of the individual bores.

A preferred value is Nvsm less than 1.0 when no auxiliary channels are present.

Nvcm is defined as the total viscous resistance to flow down the cavity (manifold) divided by the composite total flow resistance through all the auxiliary cross channels. Preferred values of Nvcm are greater than 0.001.

Nvim is defined as the total viscous resistance to flow down the cavity divided by the composite total flow resistance through all the inter-layer channels. Preferred values of Nvim greater than 0.001

4. 2D Model Shows Cross Channels Improve Results

When the auxiliary cross channels are uniform in size and uniformly spaced, and when one layer of bores is present, a useful characterizing parameter is the ratio of the number of uniformly spaced bores along the die width minus one, to the number of auxiliary channels plus one. This ratio is symbolized as Kw/Kd. This is further multiplied by the square root of the bore flow resistance between the auxiliaries divided by the auxiliary channel flow resistance between the bores. A constant area, end fed cavity is assumed. Symbolically this parameter is Nspm=Kw/Kd sqrt(Rw/Rc). It has equivalent fluid dynamic relevance and meaning to the terms used in describing flow in slots and porous media.

Figure 87:
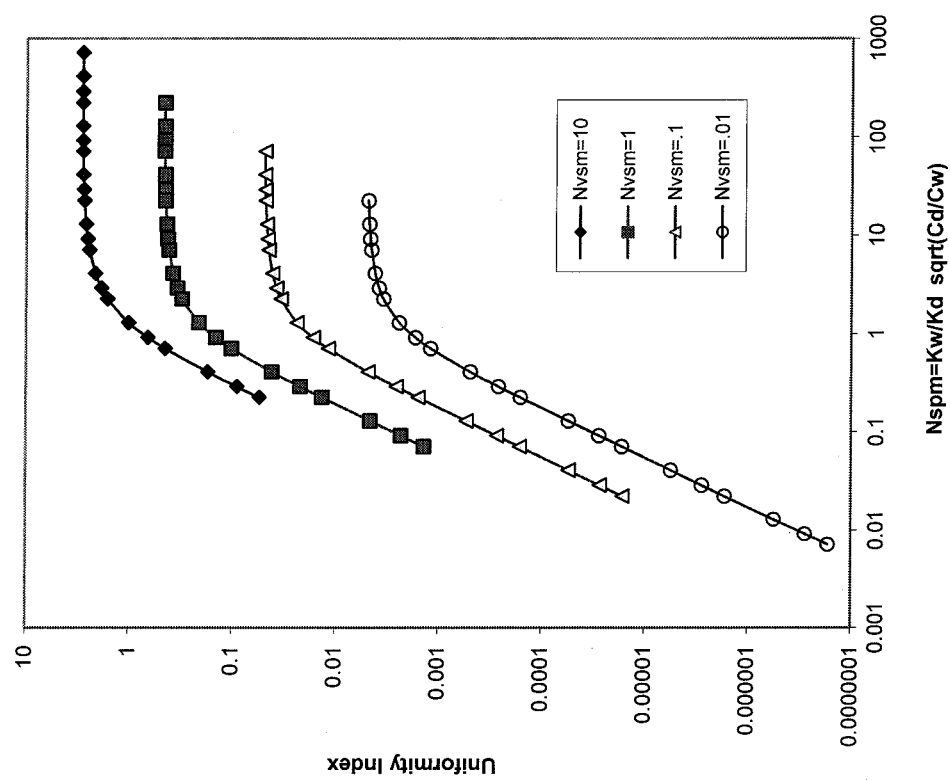
FIG. 87 is a graph of the uniformity index for a drilled hole die with one auxiliary channel.

FIG. 87 illustrates that decreasing the dimensionless number Nspm improves the uniformity independent of the value of the viscous parameter Nvsm.

FIG. 51a illustrates how dramatically the UI may be improved when channels are added. It also shows the importance of the dimensionless number Nspm which equals the number of drilled holes minus 1, divided by the number of channel plus one, times the square root of the ratio of hole conductivity between channels to channel conductivity between holes. The graph illustrates that a die design where the value of Nspm is less than 3 is preferred.

FIG. 51h illustrates that the presence of channels like 547 or 548 of FIG. 49a simultaneously eliminates clogging defects and improves the flow distribution from the die along its length. When a drilled hole die having no auxiliary cross channel is used and when three of the bores between positions 0 and 0.2 are clogged at their entrances, disrupted flow results at the discharge face. No flow exits from these clogged bores. The graph line labeled "No Cross Channels" in FIG. 51b illustrates the flow from the die when these blockages are present.

When one or four cross channels are added to the die and where the dimensionless cross channel viscous number is Nvcm=0.5, the defect from clogging is completely healed. This is illustrated by the curves labeled "1-Cross Channel" and "4-Cross Channels," which fall on top of each other. When the channels are employed flow exits from every orifice on the die face, and the distribution of flow from the bores along the die is substantially improved.

For the die design illustrated in FIG. 49a and the parameters noted for FIG. 51, the flow maldistribution from the die is large (UI is large) without the use of auxiliary channels even if there are no bore blockages. With no channels and no blockages, the ratio of local flow to average flow is at one end of the cavity 1.33 and 0.87 at the other. For perfectly uniform flow this ratio would be 1.0 all along the die. An observation of interest is that the introduction of auxiliary channels lowers the ratio to 1.09 and 0.93 at the ends. With no channels the uniformity index for the die is poor at 0.46, and with channels, the uniformity index is greatly improved to 0.16. This is a 65% improvement in the flow distribution uniformity. The uniformity index would be 0.0 for perfectly uniform flow from the orifices.

For the die design illustrated in FIG. 49a, and the parameters noted for FIG. 51b, and with clogging of three bores, and no auxiliary cross channels, the uniformity index is poor at 1.33. When this clogging exists but the auxiliary channels are present, the uniformity index is excellent at 0.16

It can be seen that clogging of bores by trapping particles has the negative effect of disrupting a die's outflow uniformity if not corrected by auxiliary channels. However, bore clogging also accomplishes the task of filtering material from the fluid. This can be a desirable result if those particles degrade a product being manufactured. The presence of auxiliary channels in the fluid distribution device allows the device to perform filtration of the fluid and simultaneously improve the distribution of fluid. Filtering is another useful function of the invention.

5. Designing for Filtering

A filtering action is useful because even pre-filtered fluids and the purest of fluids are easily contaminated. Incomplete cleaning and accidental contamination of process equipment is an ongoing and continuous problem in manufacturing. It is therefore highly useful that the invention may be used to remove contaminants from the fluid stream during distribution. The presence of auxiliary channels of this invention allows contaminate removal and simultaneous improvement of the uniformity of flow distribution from a distribution device. This is an advancement over prior art.

The filtration utility is illustrated in FIG. 52. The die design illustrated in FIG. 49a is used to filter a large number of particles from the fluid, and the die parameter has a value Nvcm=1. Here forty-five percent of the bores have been randomly clogged by trapping contaminants carried by the fluid. Examples of possible contaminants are fibers, solid particles, soft particles, viscoelastic particles and even gas bubbles. The contaminants are trapped at the junction of the bores and the cavity.

In FIG. 52 the line labeled "no channels" shows the flow distribution for a multi-orifice die with no auxiliary channels. While the die usefully traps particles and does not allow them to pass to the orifices, the flow is totally disrupted. Flow does not issue from 45% of the orifices. Additionally, from the other orifices where there is flow, the rates are on the order of twice the desired average. When one auxiliary channel is added, the performance totally changes. With only the single auxiliary channel the distribution is continuous with flow from every orifice. The flow distribution has uniformity on the order of plus or minus 18 percent. With four channels all having the same flow resistance and where Nvcm=1, the distribution is further smoothed and the variation is diminished to only 3 percent. With four channels and Nvcm=1, the flow distribution is very uniform and a large number of particles have been filtered from the fluid. A multiplicity of auxiliary channels generally produces improved results over a single channel.

While the graph illustrates the results of clogging of the bores at their junction with the cavity, contaminants may also be trapped at the junctions of bores and auxiliary channels prior to arriving at the fourth channel, and there still will be flow from all orifices. FIG. 52 illustrates results for only one of a multitude of possible mechanical designs. The number of channels, their positions, the channel viscous flow resistances, and the cavity flow resistance may be chosen in combination to achieve a wide variety of flow distributions while meeting filtering challenges.

Those with ordinary skills in the art will recognize that while uniform flow distribution is a common need, other types of prescribed flows may be achieved with the invention. If a predetermined distribution that varies as a function of position is desired, it may be achieved by many methods including variation of orifice size, of bore flow resistance, of bore hydraulic radius, of bore length, and of bore properties along their lengths. Such design results may easily be engineered using the flow modeling described here.

When the bores 544 of FIG. 49a all intercept the channels 547 and 548, clogging primarily occurs at the cavity to bore entrance. Additional clogging may occur at the entrances of the bores from the auxiliary channels. Clogging at these has a much lower probability of occurring and it is substantially lower for each successive channel. It is also found that when there are multiple channels the flow defects from clogging at a first channel may be eliminated by the presence of a second channel or a number of additional auxiliary channels.

Figure 53:
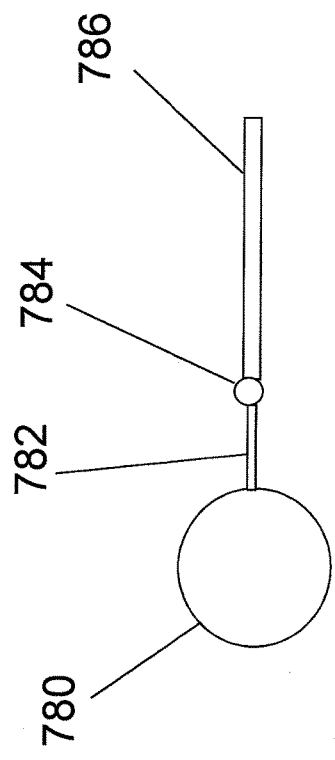
FIG. 53 is schematic cross sectional view of the internal flow passages of an embodiment of the invention.

The addition of at least one channel to a multi-orifice die produces fluid distribution performance benefits. It enables improved designs and operational advantages. FIG. 53 illustrates another useful internal channel flow passageway design. Cavity 780 supplies fluid to bores 782. Bores 782 feed into channel 784 which extends down the length of the die and parallel to the cavity 780. Channel 784 transfers fluid to bores 786 which transport it to the exterior of the die. The bores 782 and 786 do not need to have their centerlines aligned.

Here bores 786 are of larger diameter than bores 782. This dramatically increases the probability that any clogging will occur at the cavity 780 and bore 782 junction and not at the channel 784 and bore 786 junction. This is advantageous.

6. Incorporation of Filter Media

Figure 54:
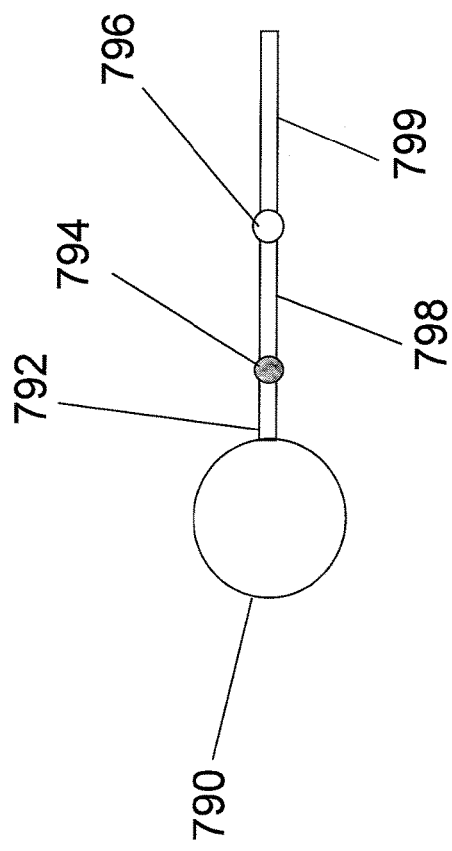
FIG. 54 is schematic cross sectional view of the internal flow passages of another embodiment of the invention.

FIG. 54 illustrates still another improved design. Here cavity 790 feeds a series of bores and channels. Bores 792, 798 and 799 are in series with channels 794 and 796. To facilitate the collection of contaminates that may clog bores, filter media is placed in channel 794. Another teaching is to introduce the media into the die at one end and remove it from the other. This may be done intermittently or continuously. The media in channel 794 may be a rope, a thread, or a rod of material that may be pulled or pushed through the die while it is being used. This concept of continuous or intermittent filter media replacement may also be used when all or some of the 792, 798 and 799 bores are replaced by die slots. By this means final filtering of the fluid may be accomplished just prior to distribution from the die or device.

Figure 55:
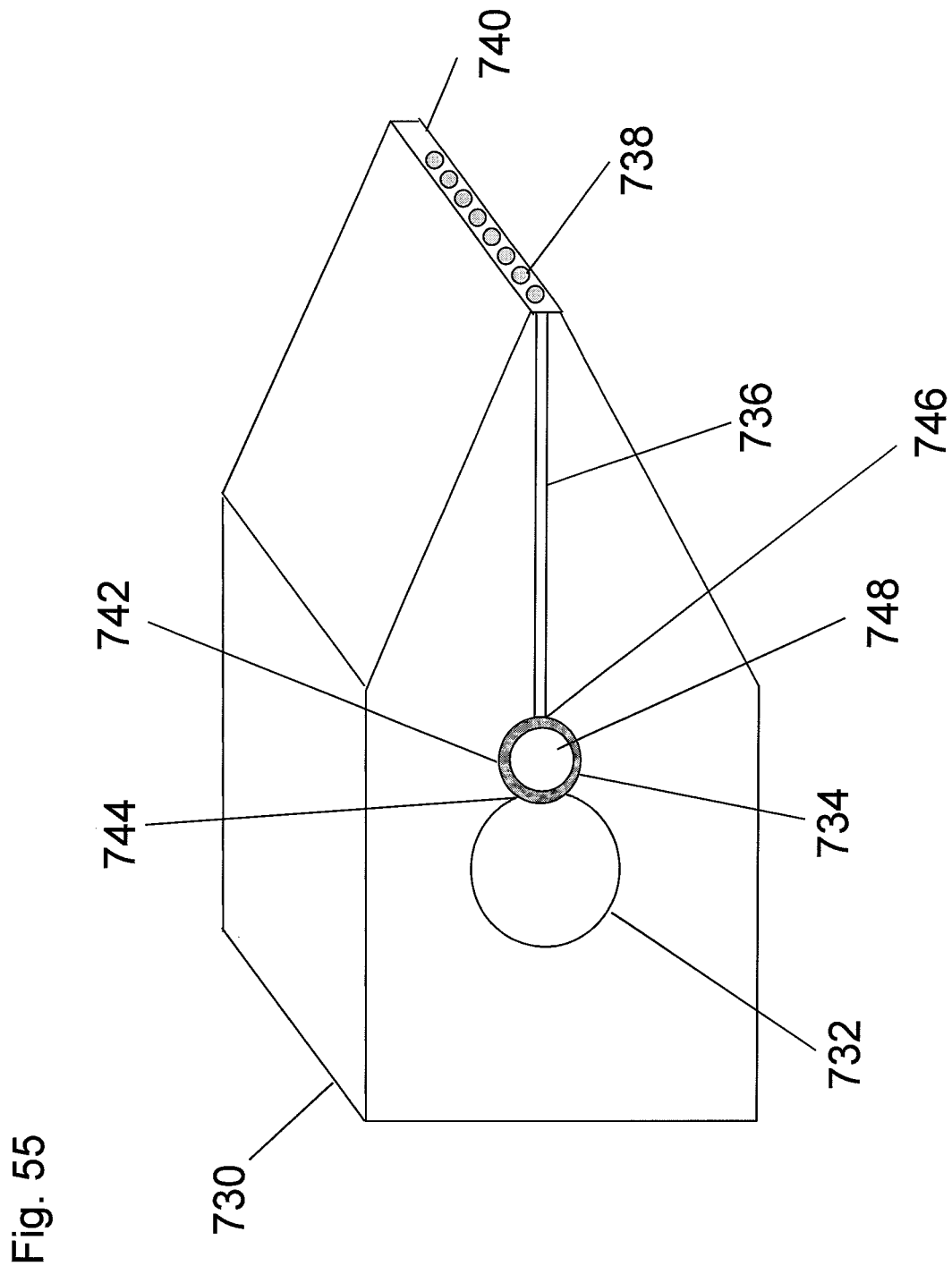
FIG. 55 is a partial perspective schematic view of another embodiment of the invention.

FIG. 55 illustrates still another improved design. Die body 730 contains cavity 732, channel 734 and bores 736. The bores terminate at discharge orifices 738 on the face 740 of the die. The channel 742 connects the bores 736 and the cavity 732. The opening 744 between the cavity and the channel provides for flow from the cavity to the channel. The opening 746 between the bores and the channel provides for flow from the channel 742 to the bores. A tubular filter element 746 is paced within the channel so as to provide filtering of the fluid flowing into and out of the channel. The open area of the filter tube leaves a portion of the area 748 of the channel free for unimpeded fluid flow parallel to the cavity.

7. Profile Control

Figure 56:
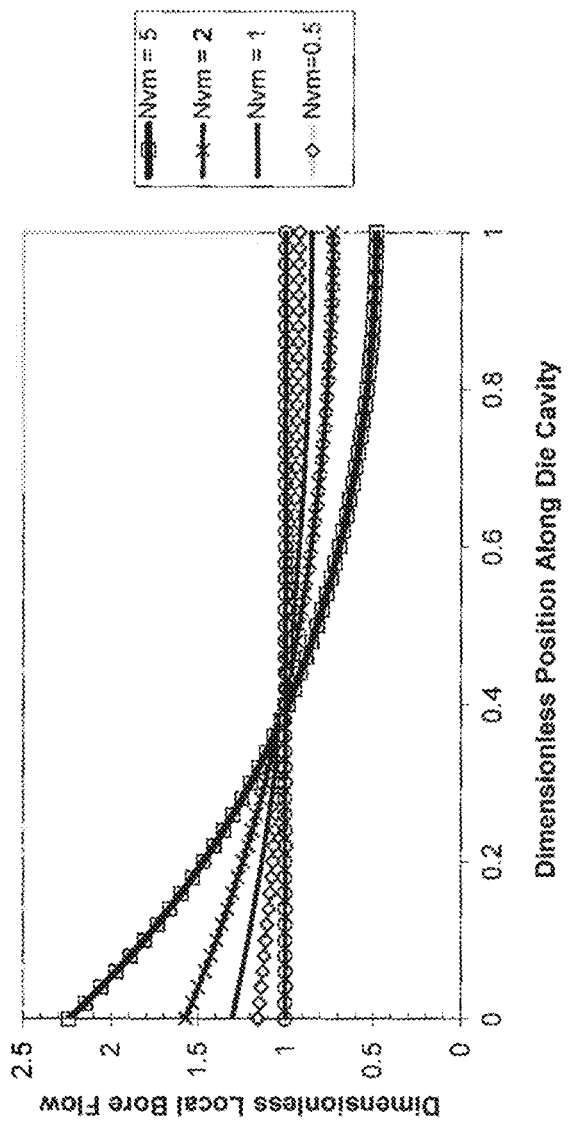
FIG. 56 is a graph of the lengthwise flow distribution of a known multi-orifice flow distribution device as a function of the dimensionless viscous number.

With prior art drilled multi-orifice dies, the flow distribution along the length of the die is a function of the dimensionless viscous number (Nvm). This is illustrated by the graph in FIG. 56. When the viscous number for a specific die and fluid is high, generally greater than 0.5, the flow distribution along the length will be poor. With a fixed design, there is no way to improve this without changing the die dimensionless viscous number or the fluid characteristics. Changing the die design to change the die's dimensionless viscous number requires remachining or a new die.

Figure 57:
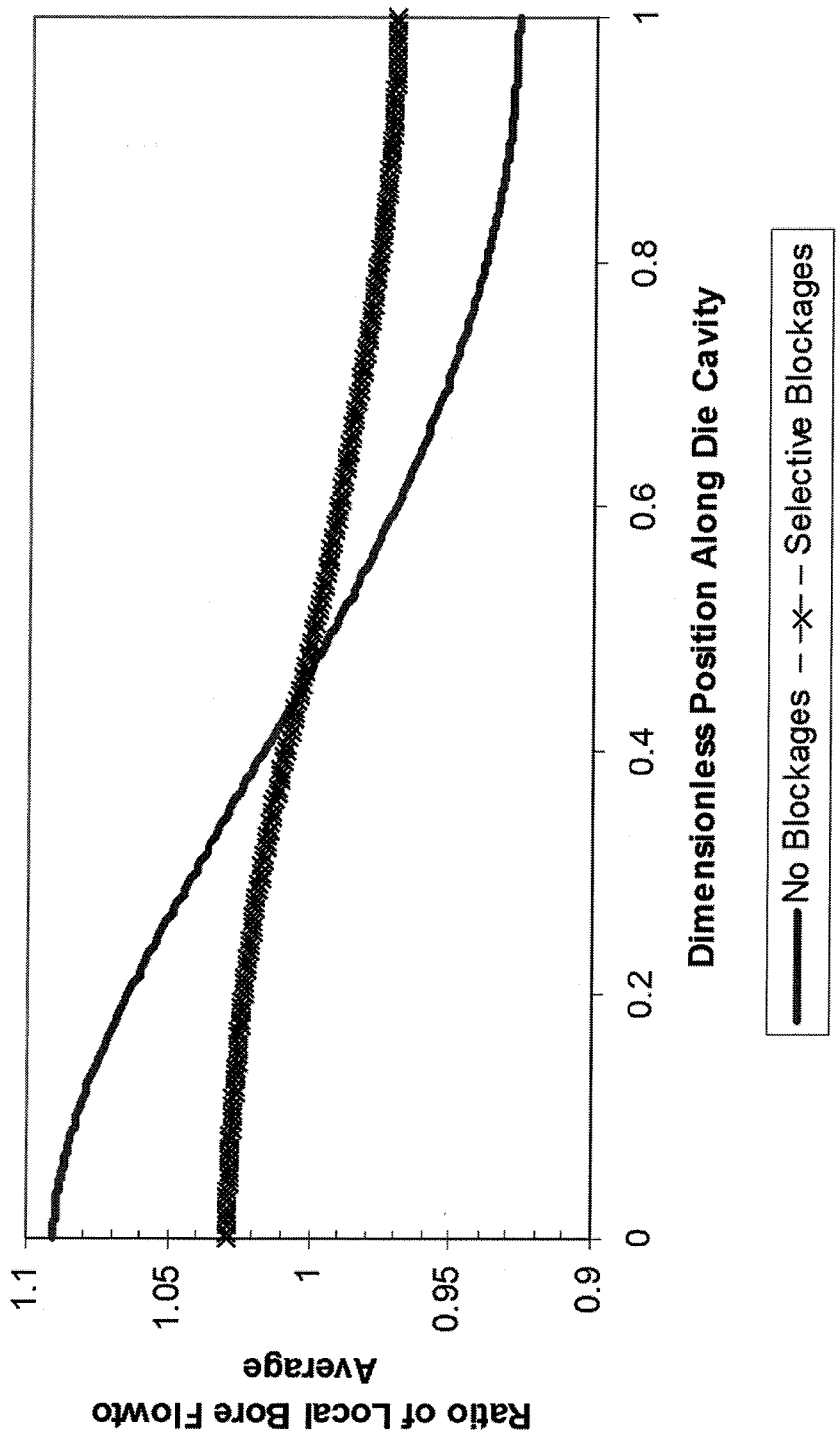
FIG. 57 is a graph illustrating the utility of the invention and demonstrating improving the flow distribution from a multi-orifice flow device by selective blocking of bore entrances.

The flow distribution from a multi-orifice die with at least one auxiliary channel may be drastically and easily modified. It is a teaching to adjust flow distribution by blocking the flow from a cavity into at least one bore or from a channel into at least one bore for the beneficial improvement of the flow distribution. This is illustrated by FIG. 57. Presented are results for a distribution die with one auxiliary channel with the dimensionless viscous number equal to 1.0 and the dimensionless channel viscous number equal to 0.5. Here the quantity, the local flow at a position divided by the average flow from the bores, is graphed as a function of the dimensionless position down the length of the die body.

The X's on the dashed line give the flow distribution from the 201 die bores with an auxiliary channel present and the selectively blocking a number of cavity to bore entrances. The solid line is the distribution from the die with no selective bore blockages. The flows are blocked to bore numbers 1, 3, 6, 9, 12, 15, 18, 21, 24, 27, 30, 33, 37, 41, 45, 50, 55, 61, 67, 75, 83, 91, 99, 108, and 118 where the first bore is at dimensionless position 0 and the last at position 1.0. The distribution from the die with no selective blockages has a uniformity index of 0.162. This is beneficially changed to 0.058 for a 64.4% improvement when selective blockages are employed.

For control here a simple on and off flow control is used. It may be accomplished manually or by using bore entrance blocking mechanisms that are activated by a control system.

Figure 58:
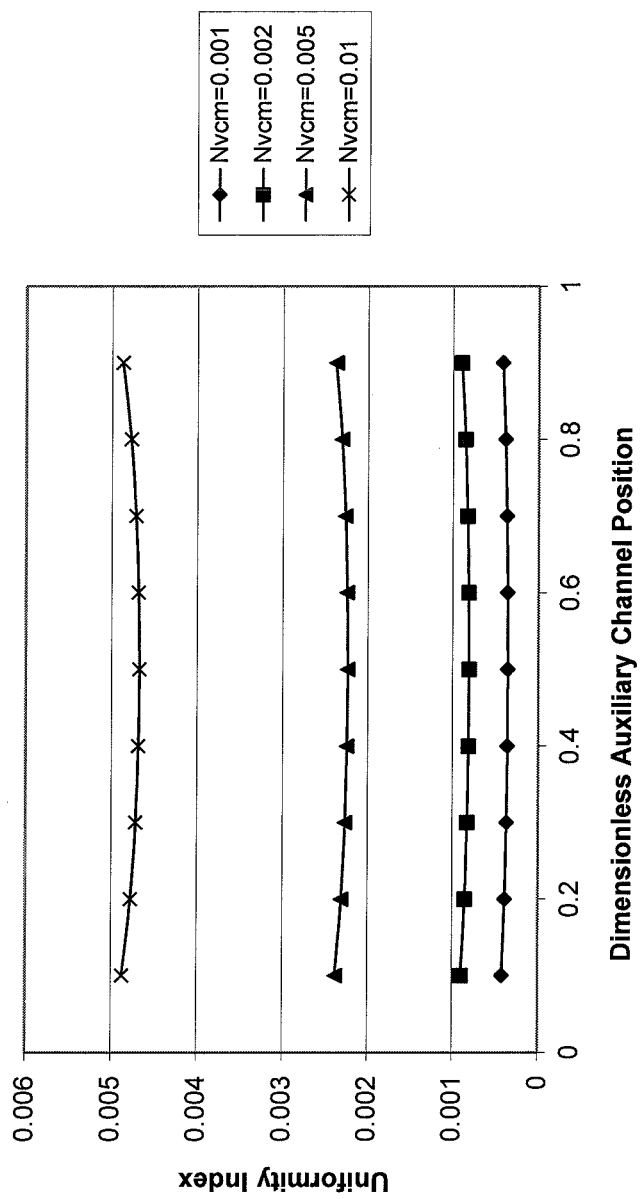
FIG. 58 is a graph of the uniformity index for a device of the invention as a function of an auxiliary channel position and dimensionless viscous number when the viscous number is Nvs=0.0001.
Figure 59:
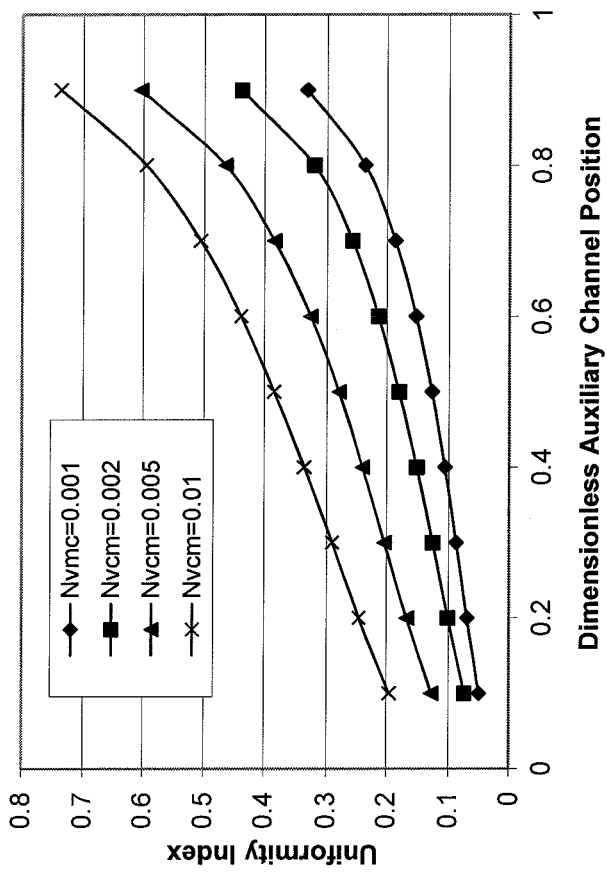
FIG. 59 is a graph of the uniformity index for a device of the invention as a function of the channel position and dimensionless viscous number when significant bore clogging occurs and when the viscous number is Nvs=0.0001.
Figure 60:
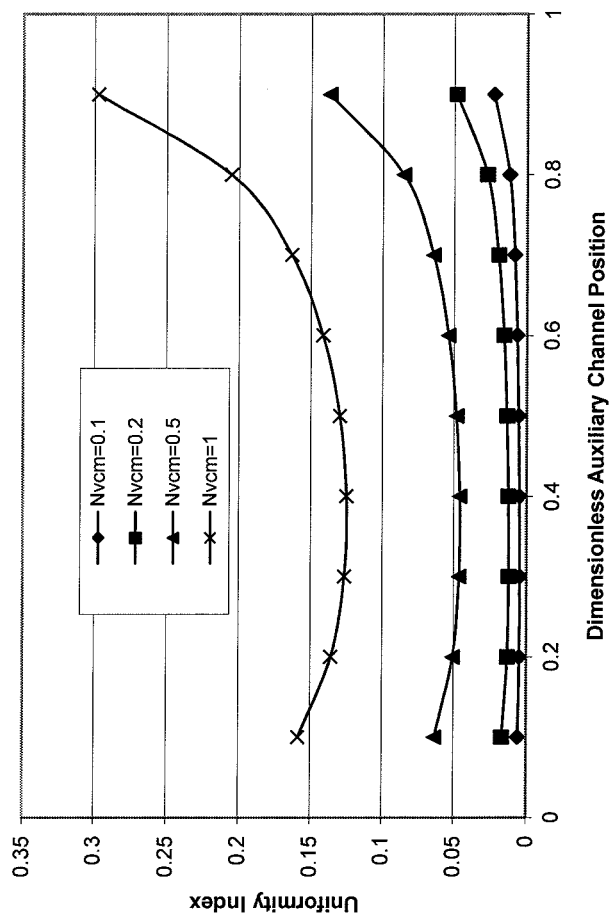
FIG. 60 is a graph of the uniformity index for a device of the invention as a function of the channel position and dimensionless viscous number when significant bore clogging occurs and when the viscous number is Nvs=1.
Figure 61:
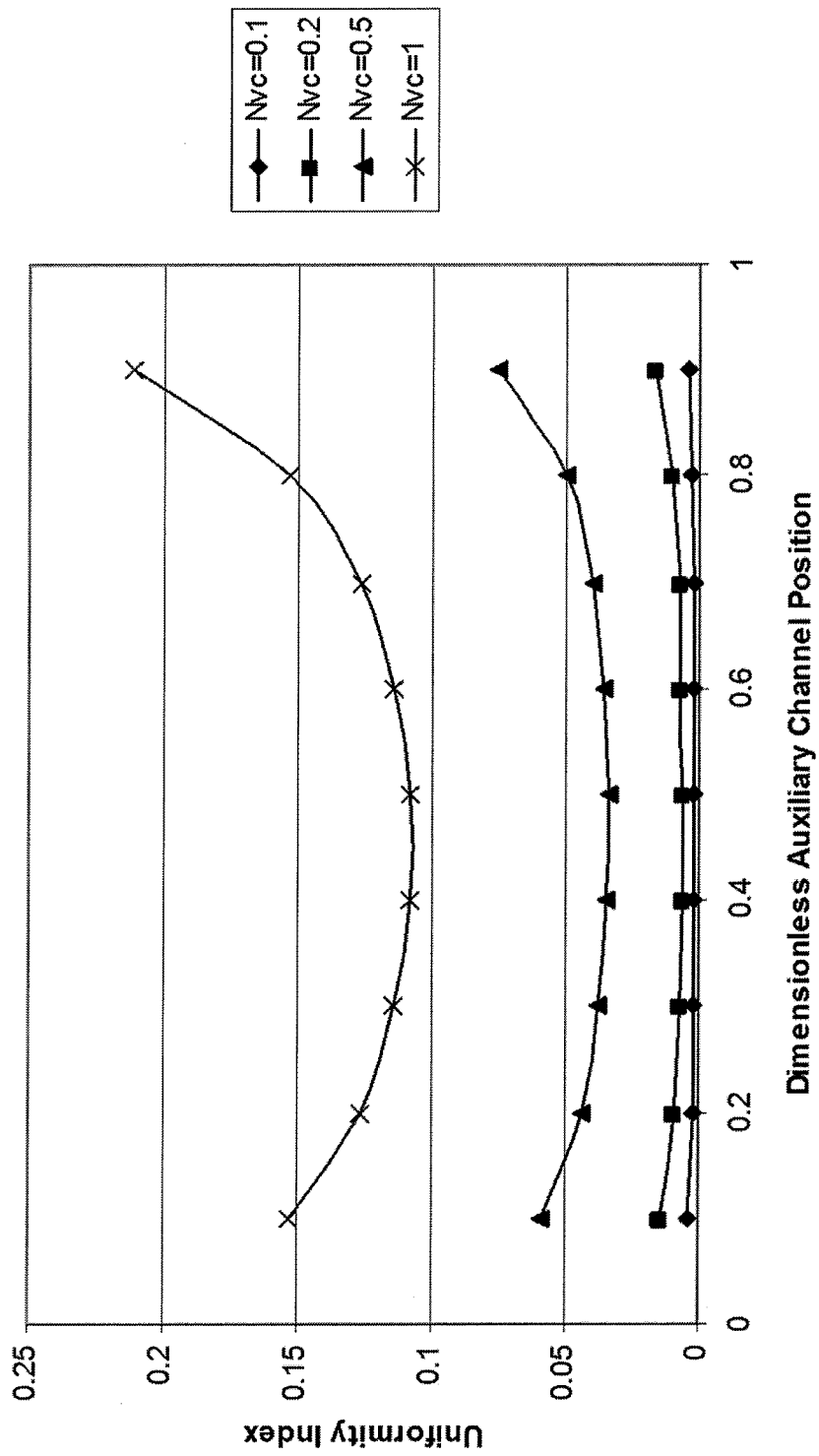
FIG. 61 is a graph of the uniformity index for a device of the invention as a function of an auxiliary channel position and the channel dimensionless viscous number when the viscous number is Nvs=1.

A plurality of actuators that are independently operable may be used to produce local changes in flow restrictions into bores across the width of the die. The actuators can be located in the cavity or external to it. The overall apparatus may be operated automatically to control the flow distribution. A sensor would be used to measure the flow distribution profile across the width die and send this information to a controller. The controller compares the measured profile to a known target profile. Corrective adjustment signals may be produced by the controller and sent to the actuators spaced down the length of the die. The actuators manipulate the flow restrictions to change the profile. Simple on-off control of the flow is preferred.

a. Optimizing the Cross Channel Location with No Clogging:

FIGS. 58 and 61 are graphs of the uniformity index for a device of the invention using one auxiliary cross channel. Uniformity index is plotted versus the position of the channel along the bore. Curves are plotted for various values of the auxiliary cross channel dimensionless number Nvcm. They illustrate that the optimum positional placement of a single auxiliary channel is at the halfway point along the length of the bores when there is no bore clogging.

b. Optimizing the Cross Channel Location with Clogging:

When there is clogging at the junction of a bore and the cavity, improved performance is obtained when the auxiliary channel is placed at less than the halfway point along the bores. This is illustrated by FIGS. 59 and 60. In these everything is comparable to FIGS. 58 and 61 except that the last two bores at the end of the die have total blockages. This is at the end of the die furthest from the cavity flow entrance position.

In the case of these blockages without a cross channel, no fluid flows from the affected bores and the flow distribution is grossly non-uniform. With a die having at least one channel, fluid flows from all the bores, and the flow distribution is adequately uniform when the die parameters for the die design are well chosen. When a single channel is used, it is preferred that the cross channel be placed at a dimensionless position between 0 and 0.4 along the bores.

The die of FIG. 49a illustrates a die with two channels and bores with a constant hydraulic diameter extending from the cavity to the orifices. Extensive flow modeling studies were performed on this geometry. These show improved distribution may be obtained when two or more channels are employed. Also, the optimum position for the first channel is at a distance of between the 0.1 to 0.3 times the length of the bores. The optimum position for the second channel is at a dimensionless position between 0.4 to 0.5. Positions are measured from the bore entrance at the cavity.

When more than one cross channel is employed to distribute flow or filter and distribute flow, we refer to the sequential order of the channels from the cavity to the orifices. The first channel is the first channel which fluid encounters flowing from the cavity. Investigation of the flow in and from the cavity, bores and channels of our improved multi-orifice flow distributing system shows that improved performance is obtained by optimizing the position of the channel. It is preferred that the channels of a multi-channeled system be positioned so that the $n^{th}$ channel is between the $(n-1)^{th}$ channel and the halfway position along the otherwise uninterrupted bore length between the cavity and the $(n-1)^{th}$ channel.

c. Improvements Using Intersecting Bores:

Known multi-orifice coating dies like those described by McIntyre, use a simple set of parallel drilled hole bores to communicate between the cavity and the discharge orifices. The presence of auxiliary channel has been shown above to be useful. Their utility arises because they allow fluid exchange between the bores. Other methods and geometries that promote fluid exchange between bores are also useful and are a teaching of this invention. Investigation has shown that performance enhancement is obtained by using intersecting bores, and by adding auxiliary cross channels to the intersecting bore geometries.

FIGS. 50a, 50b and 50c illustrate types of intersecting bore geometries that improve the distribution of flow from the orifices. These also improve the tolerance to clogging, and the ability to simultaneously filter and distribute fluid.

FIG. 50a illustrates an improved design for the flow passageways of a fluid distribution device. The heavy lines 701 and 702 represent two sets of bores. If the device is a metal die, the bores may be produced by repeated drilling at two angles other than ninety degrees to the cavity 700. It is preferred that the acute angle that bores 701 make with the cavity equals the negative of the acute angle that bores 702 make with the cavity. The bores 701 and 702 in FIG. 50a connect the discharge orifices 703 on face 704 to the distribution cavity 700. Fluid discharges from the face 704 from the bores through the orifices 703. Bores 701 and 702 intersect at least one other bore. For a uniform flow distribution from the bores along face 704, it is preferred that each individual bore intercept at least one other bore and preferably more than one. By this means, at least one flow path exists that allows fluid to flow from one bore to another bore as it flows from the cavity to the die face.

As the auxiliary cross channel modeling illustrates, the ability to exchange fluid between bores after leaving the cavity and before exiting the discharge orifices is beneficial and is a teaching of this invention. More than one exchange means are preferred.

Figure 62:
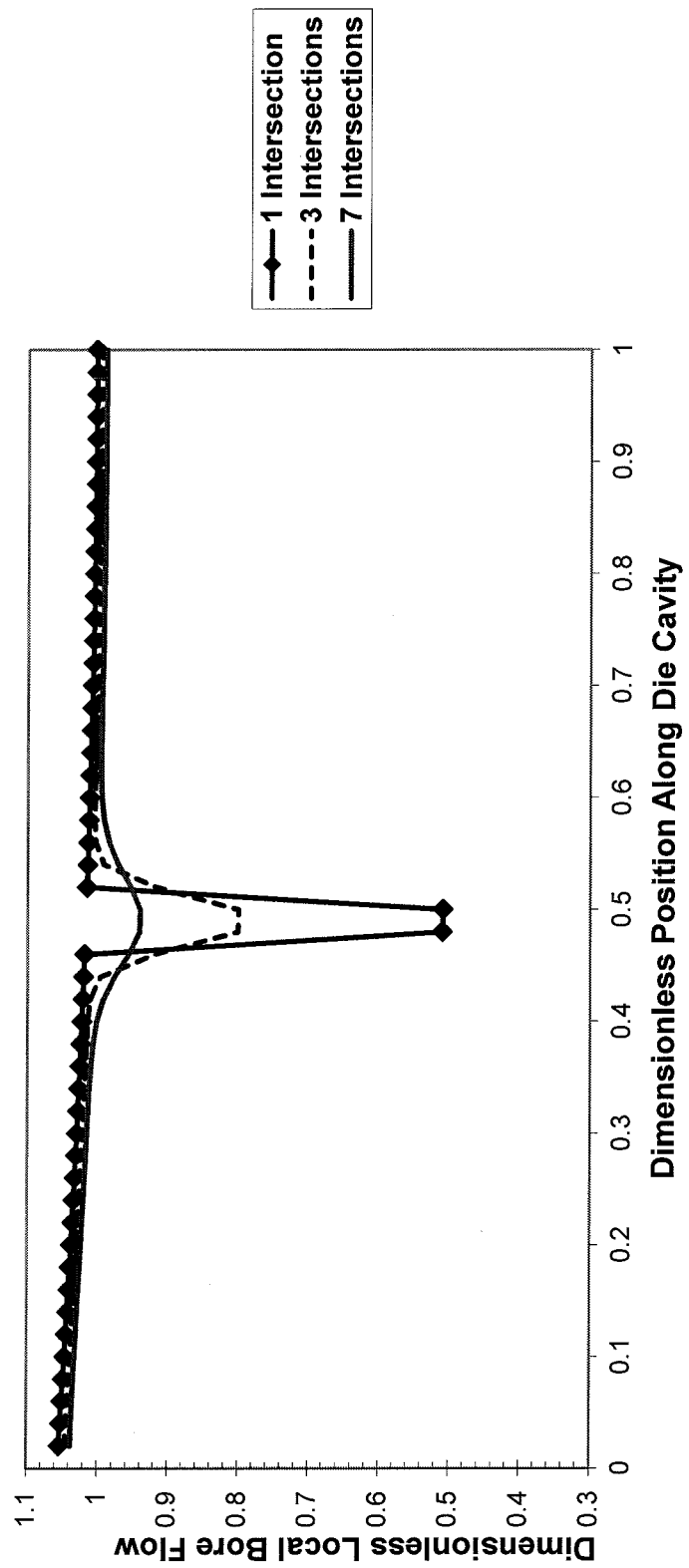
FIG. 62 is a graph of the local flow from the bore orifices when the intersecting bore geometry of FIG. 50a is employed and there is blockage of two bores.
Figure 63:
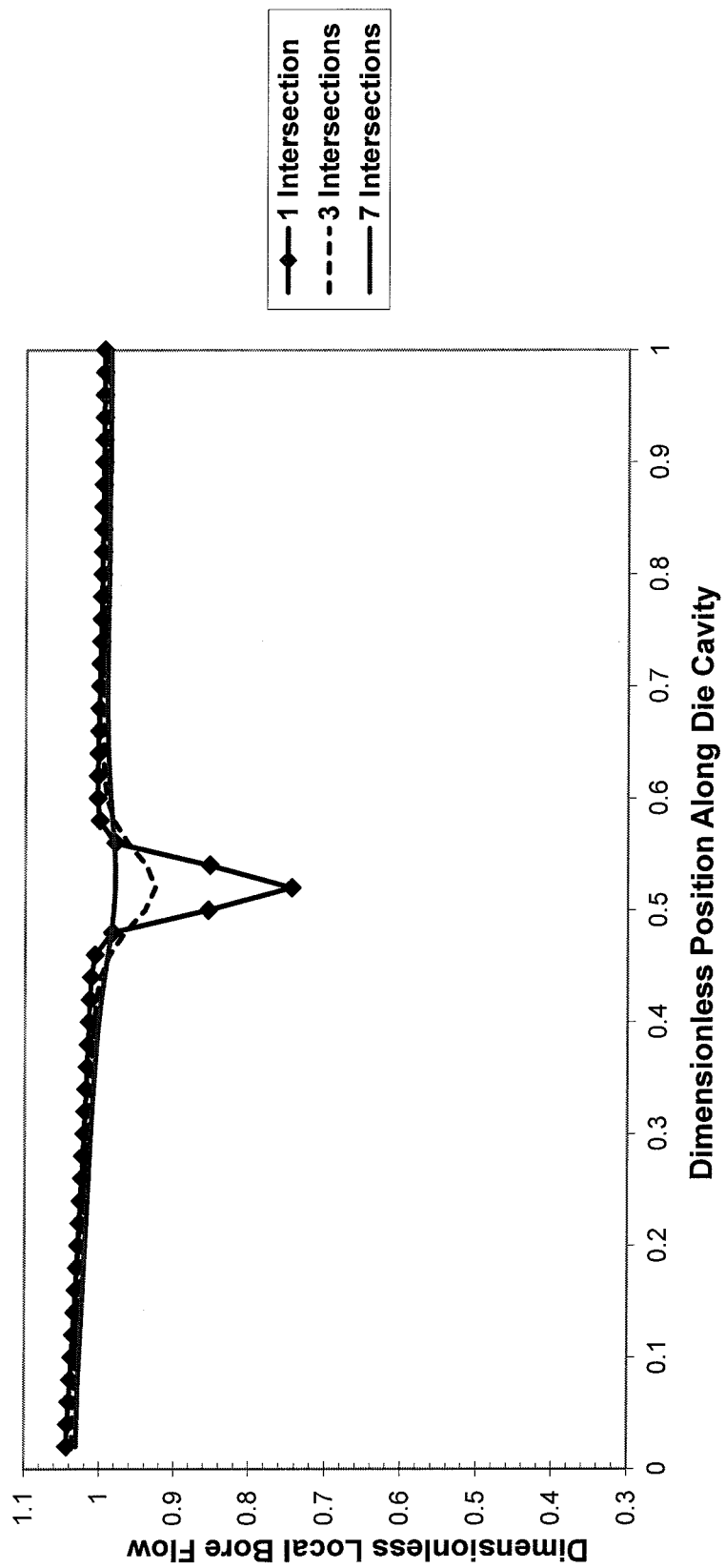
FIG. 63 is a graph of the local flow from the bore orifices when the intersecting bore geometry of FIG. 50b is employed and there is blockage of two bores. The influence of number of bore intersections is shown.

FIG. 62 illustrates the utility of the intersecting bore design of FIG. 50a. Here two side by side bores near the center of the die have been blocked at their junction with the cavity. With a prior art die this would result in total disruption of the discharge distribution with no fluid flowing from the die face orifices of the blocked bores. With the bore geometry of FIG. 50a the disruption is healed. The plot of local bore flow for the case where a bore intersects just on other bore between the cavity and the die face is designated "1 intersection". Flow at the exit of the blocked bores is found to have a dimensionless flow of 0.5. For the case of three intersections the flow is 0.8, and for seven intersections the flow is 0.94. All are improvements over the prior art.

d. Intersecting Bores and Cross Channels:

FIG. 63 illustrates the utility of the intersecting bore and channel design of FIG. 50b. Here two bores have been blocked near the center of the die. With a prior art die this would result in total disruption of the outflow distribution with no fluid flowing from the blocked bores. With the bore geometry of FIG. 50b the disruption is healed. All curves show improvements over the prior art.

Further improvements to the apparatus of FIG. 50b may be achieved by adding additional bores to the geometry. An example is illustrated in FIG. 50c. Here a set of additional bores 713 are placed at a third angle of intercept with the cavity. These bores have a shorter path from the cavity to their exit orifice. Generally, the flow resistance of these bores will be lower than the others to achieve uniform flow along the die face 715.

8. Stripe Coatings

Figure 50D:
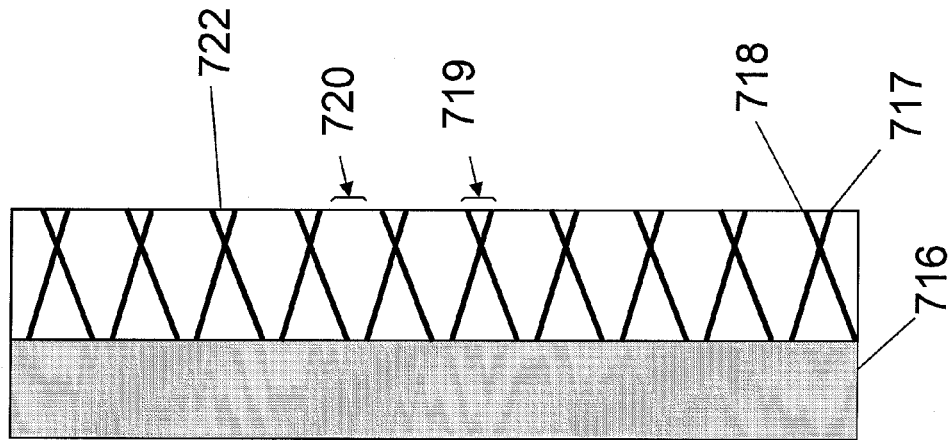
FIGS. 50a, b, c and d are schematics of die cavity and drilled hole layouts.

Multi-orifice coating dies are known for their utility in coating stripes on webs. Bores are present in areas where coating is desired and absent where no fluid is desired. FIG. 50d illustrates a device where adjacent bores 717 and 718 intersect. The bores are not equally spaced. They are arranged to provide lengths 719 and 720 along the device face 722 where the discharge of fluid is respectively present and not present. When used in coating, the device produces down web stripes. Again, the bore intersections provide for more uniform flow distributions and a tolerance to clogging.

9. Further Examples Using Layers of Bores

Figure 67A:
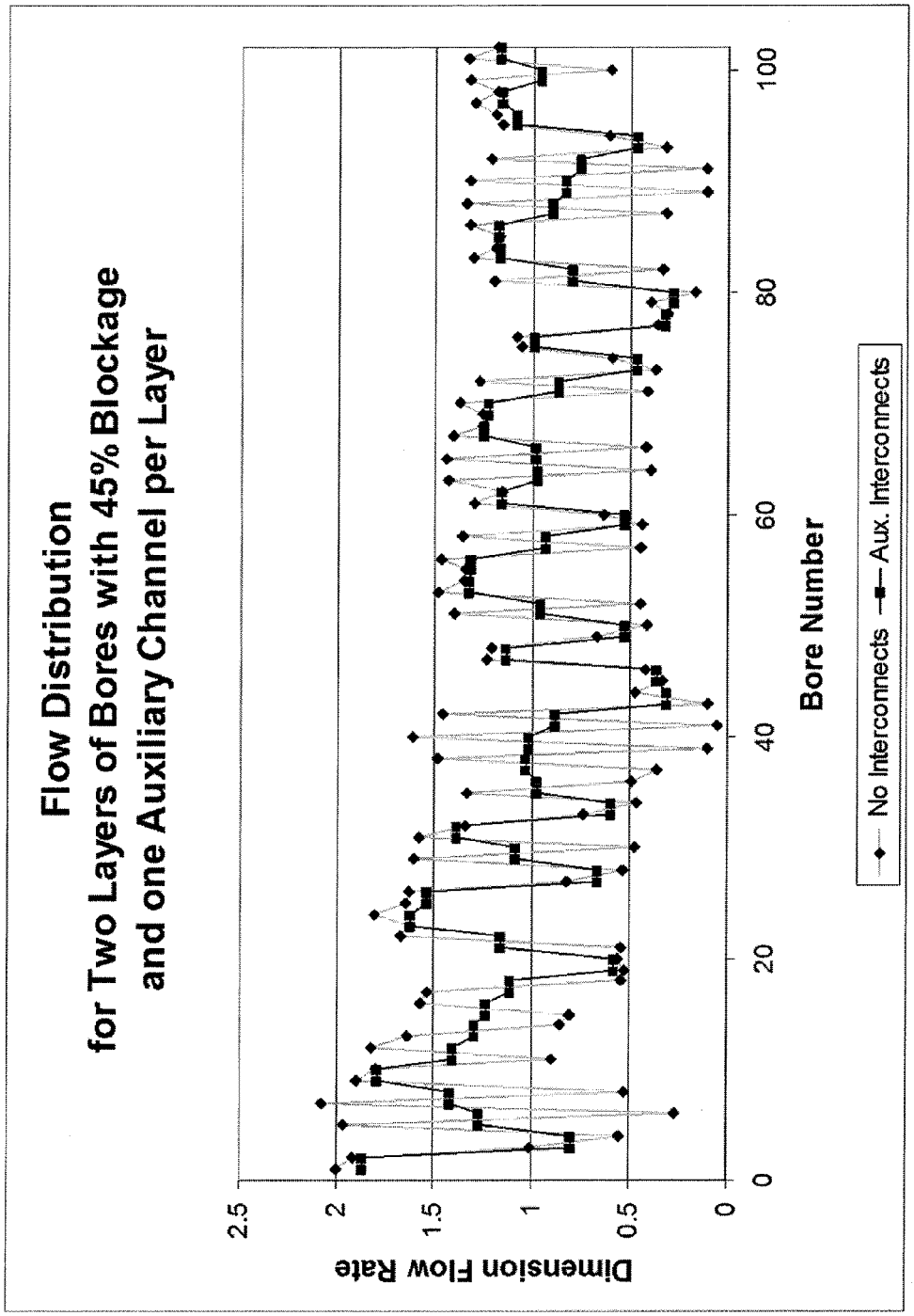
FIG. 67a is a chart illustrating the flow distribution from an improved, two layer, multi-orifice die each with one auxiliary cross channel per layer and with 45 percent of the bores blocked.
Figure 67B:
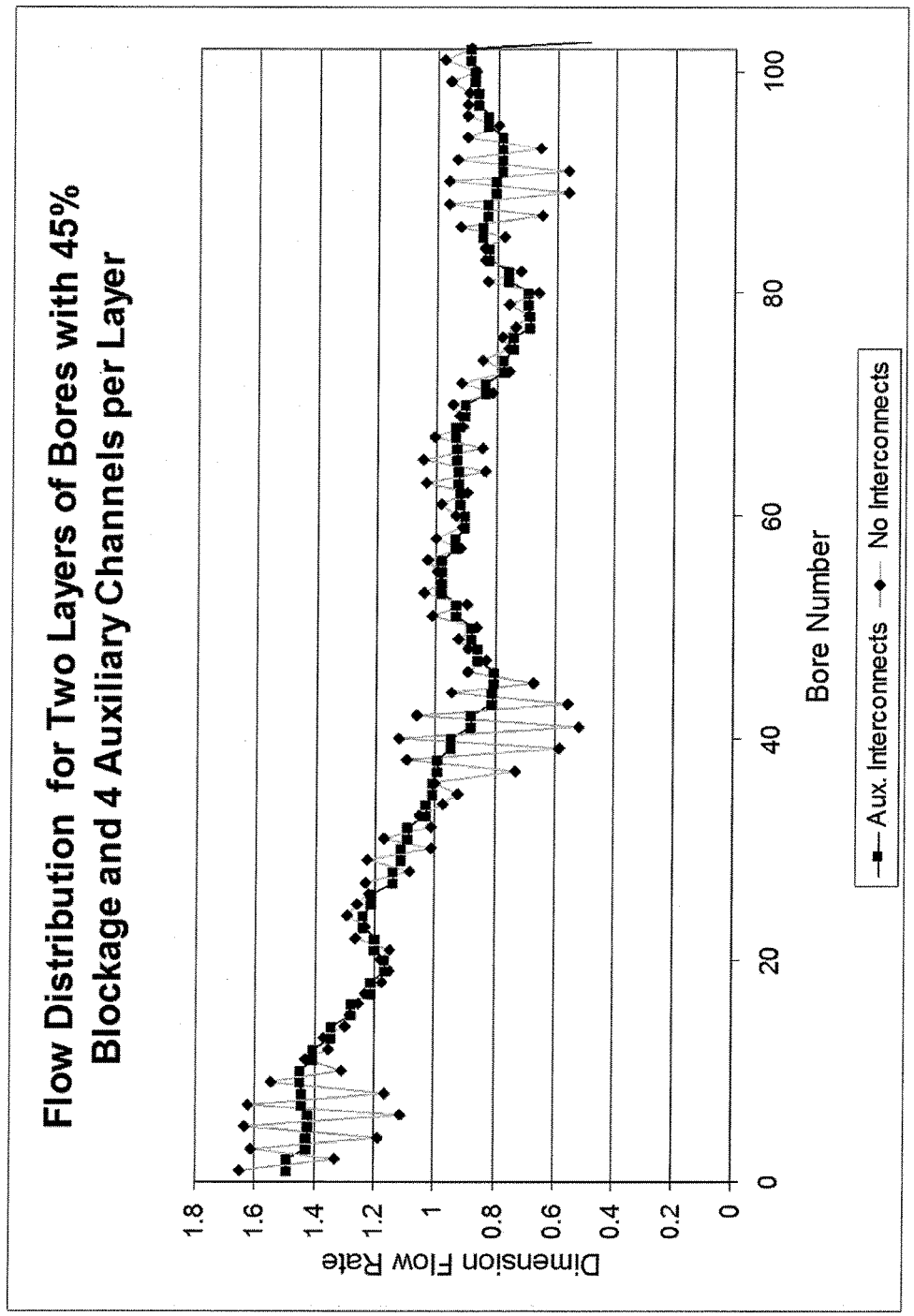
FIG. 67b is a chart illustrating the flow distribution from an improved multi-orifice die with four auxiliary cross channels per layer and with 45 percent of the bores blocked.

When lines of bores are stacked on top of each other, improvements may be obtained. FIGS. 49b, 49c and 49d illustrate examples of possible multilayered bore geometries with auxiliary intra-layer and/or inter-layer channels. FIGS. 67a and 67b illustrate improvements may be obtained with auxiliary channels, with multiple layers of bores, and with inter-layer auxiliary channels. A die of 102 bores distributes flow between two rows, one above the other has been studied. The bores are numbered from the inlet end of the cavity sequentially by alternating between the top and bottom layers. That is the number one bore is at the first position of the bottom layer, and the number two bore is at the first position of the top layer. interlayer auxiliary channels are present connecting the intersections of the bores and cross auxiliary channels in one layer to those of the adjacent bore layer. Thus in the case with 51 bores per layer, 2 layers, and 1 cross auxiliary channel per layer, there are 51 interlayer auxiliary channels.

Twenty-three bores are blocked at their cavity end in the bottom row, and twenty-three are blocked in the top row. The blocked bores have been randomly chosen. The grids of bores and auxiliary channels are present. The dominant auxiliary channels are cross channels that run perpendicular to the bores and intersect all bores in a layer. These auxiliary channels are uniformly spaced between the supply manifold and the die exit orifice face.

The bore parameters are chosen so that the ratio of the incremental flow resistance in the manifold from bore to bore to that of a bore increment length equals 0.002. Here the bore increment length is the distance between the cavity and the first auxiliary channel. The ratio of an auxiliary cross channel flow resistance per increment to the flow resistance per increment in the manifold equals 2.0 with the incremental flow resistance in the auxiliary being also from bore to bore. One auxiliary cross channel is used for the results plotted in FIG. 67a. Four auxiliary cross channels are employed for the results plotted in FIG. 67b.

FIG. 67a plots the dimensionless bore flow rate as a function of bore number with and without interlayer auxiliary bores present for the case of one auxiliary cross channel. There are 46 blocked bores that are the result of filtering and trapping contamination at the manifold bore entrances. Without the auxiliary cross channels the bore flow rates would oscillate in values between 0 and approximately 2.0. This is totally unacceptable for most coating operations. With one auxiliary cross channel in each bore layer the flow distribution is improved. The flow per bore is always greater than zero.

When interlayer auxiliary bores are present the flow distribution is further improved. In the plot the data for the presence of interlayer auxiliary channels is indicated by the plotted squares. With interlayer auxiliary channels present the data is indicated by diamonds. When only one cross channel is used, the standard deviations of the bore flows at the orifice exits are 0.54 and 0.37 respectively. The interlayer auxiliary channels improve the flow distribution.

FIG. 67b plots the dimensionless bore flow rate as a function of bore number with and without interlayer auxiliary channels present for the case of four auxiliary cross channels. The flow resistances of all auxiliary cross channels in the example of these two figures are equal. Additionally, the same 46 bores that were blocked for FIG. 67a are blocked here. With auxiliary cross channels in each bore layer the flow distribution is significantly improved over the results in FIG. 67a.

When interlayer auxiliary bores are present the flow distribution is further improved countering the negative effects of the blockage of 45 percent of the bore entrances. In the plot the data for the presence of interlayer auxiliary channels is again indicated by the squares. With no interlayer auxiliary channels present, the data is indicated by diamonds. The interlayer auxiliary channels improve the flow distribution. The standard deviation of the bore flow rates at the orifice exits when there is no inter-layer flow equals 0.24. When there is interlayer flow, the deviation is reduced to 0.22.

When filtering a fluid in a die where all bores have equal flow resistance, it is observed that most of the trapped particles are located at the intersection of the bores with the cavity. With time more and more of the bores will be blocked, and if the flow rate to the die is constant, the pressure in the cavity will increase. In the case when operation is limited to a doubling of the supply pressure, production will be stopped when fifty percent of the bores are blocked at the cavity with a prior art die.

With prior art drilled dies, clogging of a bore causes drastic flow uniformity defects at the exit from the die. Some post coating improvement methods are known to hide this problem. These all include methods of redistributing the fluid after it has left the die. However, when the filtering of particles clogs bores to the point of reaching pressure limits, production must stop. Because of the flow maldistribution prior art dies have not been successfully used to both filter and distribute flow.

The following additional examples of modeling investigations further illustrate the utility of using multi-orifice devices with auxiliary channels.

Example 1 (Auxiliary Inter-Layer and Intra-Layer Channels and Distributed Filtration)

A coating die is used to distribute fluid to a die face. It consists of a cavity feeding three layers of bores stacked upon top of each other. The cavity is four units long and has a flow resistance per unit of 0.002. From the cavity the bores direct fluid to the die face. In each bore layer four bores connect to the discharge orifices on the die face. The bores are interconnected by auxiliary intra-layer cross and interlayer cross channels with a geometry as illustrated in FIG. 49d. The four rows of cross channels are used, and the dimensionless parameters for the passageway layout are $Nvm=0.024$, $Nvim=1.2E+08$ and $Nvcn=0.006$.

A fixed volume of fluid is processed through the die at a constant rate. This fluid although carefully prepared contains eleven contaminant particles that are larger than some of the bore sizes. The probability of capturing the eleven unwanted particles of a fixed diameter from a set volume of fluid is adjusted for each segment of each bore. Additionally, the die is set so all eleven particles are captured within the die with a probability of 1. That is the probability of a particle escaping from the die is 0.

After flowing the test volume of fluid through the die, four particles are trapped at cavity to bore intersections. Their distribution is one at the first layer of bores, two at the second layer, and one at the third. With the bore location with respect to distance along the cavity numbered as 1 through 4, the particle locations are at positions 1, positions 1 and 3, and position 3 for the three layers respectively.

Four particles are trapped at the first auxiliary cross flow channel and bore intersections. Their distribution is two at the first layer of bores, one at the second layer, and one at the third. The particle locations are at positions 3 and 4, position 1, and position 2 for the three layers respectively.

Three particles are trapped at the second auxiliary cross flow channel and bore intersections. Their distribution is one at the first layer of bores, one at the second layer, and one at the third. The particle locations are at position 1, position 2, and position 3 for the three layers respectively.

Just after the last particle is trapped the dimensionless pressure drop through the die is 0.37. The flow from the first layer of bores is 0.000, 0.480, 0.450 and 0.417 respectively for bore locations 1 through 4. From the second layer of bores the flow is 0.445, 0.000, 0.450 and 0.417 respectively. From the third layer of bore orifices the flow is 0.445, 0.479, 0.000 and 0.417 respectively.

The dimensionless sum of the flows from all three layers at each of the four bore locations along the cavity is 0.890, 0.959, 0.900 and 1.25 respectively. The standard deviation of this population is 0.15.

Example 2

A coating die is used to distribute fluid to a die face. It consists of a cavity feeding three layers of bores stacked upon top of each other. The cavity is four units long and has a flow resistance per unit of 0.002. From the cavity the bores direct fluid to the die face. In each bore layer, four bores connect to the discharge orifices on the die face. The bores are interconnected by auxiliary intra-layer cross and interlayer channels with a geometry as illustrated in FIG. 49d. The rows of cross channels is four, and the dimensionless parameters for the passageway layout are $Nvm=0.024$, $Nvim=1.2E+08$ and $Nvcm=0.006$. The same volume of fluid used in example 1 is used here and it also contains 11 unwanted particles of a fixed diameter. However in this example, the bore diameters are fixed a value smaller than that of the particles. In this case, the bore cavity intersections act as absolute filters for the particles with a zero probability that any will flow into the bores. After flowing the test volume of fluid through the die, the eleven particles are trapped at cavity to bore intersections and block eleven of the twelve bore entrances.

Just after the last particle is trapped, the dimensionless pressure drop through the die is 1.31. The flow from the first layer of bores is 0.360, 0.513, 0.287 and 0.173 respectively for bore locations 1 through 4. From the second layer of bores the flow is 0.360, 0.513, 0.287 and 0.173 respectively. From the third layer of bore orifices the flow is 0.360, 0.513, 0.287 and 0.173 respectively.

The dimensionless sum of the flows from all three layers at each of the four bore locations along the cavity is 1.08, 1.53, 0.86 and 0.52 respectively. The standard deviation of this population is 0.37.

Example 3 (Potential Prior Art)

A coating die is used to distribute fluid to a die face. It consists of a cavity feeding one line of twelve bores. The cavity is twelve units long and has a flow resistance per unit of 0.002. From the cavity the bores direct fluid to the discharge orifices on the die face. No auxiliary channels are present.

A fixed volume of fluid is processed through the die at a constant rate. This fluid contains eleven contaminant particles that are larger than the bore sizes. The probability of not capturing within the die the eleven unwanted particles from the set volume of fluid is zero.

After flowing the test volume of fluid through the die, the eleven particles are trapped at cavity to bore intersections. This leaves only the last bore open. All others are clogged. The dimensionless flow from the last bore orifice is 12, and just after the last particle is trapped the dimensionless pressure drop through the die is 3.00. The standard deviation of flow from this row of bores is 3.31.

Example 4 (Auxiliary Intra-Layer Channels and Distributed Filtration)

Using identical conditions to Example 1 except where no interlayer flow was allowed, the test was run. Here then the parameter Nvim=0 was used for the filtration modeling experiment. As with Example 1, the particles were trapped at the intersections of channels and bores, and the cavity and the bores. They were trapped in the same locations found in Example 1.

In this case just after the last particle is trapped the dimensionless pressure drop through the die is 0.502. The flow from the first layer of bores is 0.000, 0.637, 0.174 and 0.058 respectively. From the second layer of bores the flow is 0.293, 0.000, 0.551 and 0.599 respectively. From the third layer of bore orifices the flow is 0.626, 0.367, 0.000 and 0.692 respectively.

The dimensionless sum of the flows from all three layers at each of the four bore locations along the cavity is 0.92, 1.00, 0.73 and 1.34 respectively. The standard deviation of this population is 0.22.

From the examples it is found that when the filtration, the trapping of particles, is distributed within the system of bores and auxiliary channels rather than concentrated at the cavity to bore junctions, the pressure drop is lower. Also the standard deviation of the flow at the die face is lower. This is an improvement. Another finding is that multiple layers perform better than a single layer of bores. It is preferred that multiple layers of bores are employed with auxiliary inter-layer channels. More preferred are devices including multiple layers of bores with both inter-layer and intra-layer auxiliary channels.

It is a teaching that for any line of bores intersecting a cavity or an auxiliary channel, the probability of trapping a contaminant at the intersections may be adjusted by design. It is often beneficial to use a population of bores with non-uniform capture probabilities. A simple method of adjusting the probability for a bore is to manipulate the dimensions of the bore. This may be accomplished while simultaneously maintaining the flow resistance at a desired level. Additionally, it has been found that flow resistance variations may be made unimportant with the use of auxiliary channels, and acceptably uniform flows at the die face may be achieved to meet a desired precision.

When extremely high value products are coated, the presence of even one particle may make a large surface area defective. An example is a large format liquid crystal video display screen. One defective pixel makes the whole screen defective. A single particle in one of the multiple layers comprising the screen may create this defect. It is preferred when coating such a high value product to first double filter the fluid before entrance to a coating die. Additionally, the die should act as an absolute final filter as well as a flow distribution device.

F. Improved Slots for Fluid Distribution
1. Slot and Cavity Systems

Although slots have significant negative features, they are widely used for fluid distribution. This invention identifies desirable improvements. Existing slots have a gap that extends in two dimensions. The gap generally is constant or slow varies along an axis.

Figure 89:
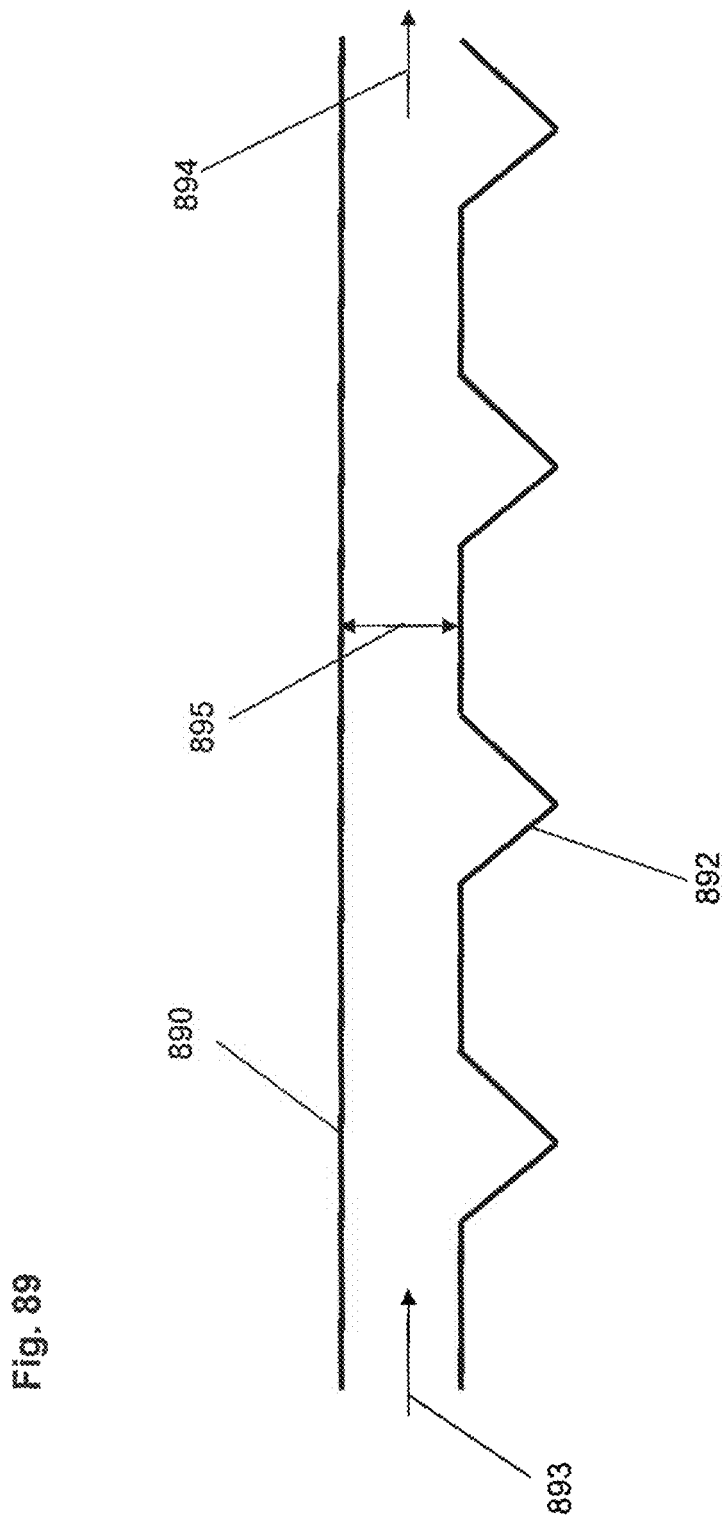
FIG. 89 is a schematic edge view of an improved slot with bidirectional flow conductance.

It has been found that having the flow resistance vary in two directions may be used to distribution. FIG. 89 illustrates a cross-section of such a slot. Slot 890 conducts fluid from a cavity where the fluid enters as indicated by arrow 893. Fluid exits the slot at a slot orifice as indicated by arrow 894. The slot is modified by grooves 892 that extend across the dominant flow path from the cavity to the orifice. These small grooves provide dramatically reduced flow resistance to fluid movement in a direction parallel to the orifice and cavity centerlines extending down their lengths.

As shown the grooves are placed uniformly at a high frequency along the flow path from cavity to orifice. Preferred spacing is on the order of a fraction of the nominal slot gap 895 or the average slot gap to upwards to ten times the gap. It is preferred that they are uniform in the direction perpendicular to the dominant flow direction.

A key feature of the improve slot geometry is that its flow resistance in the dominant flow direction is larger than that in the direction of the grooves. This is characterized by the ratio of the resistance in the orifice centerline direction to the resistance in the depth or nominal flow direction from the cavity to the orifice. This ratio is symbolized by Rw/Rd or the equivalent conductance ratio Cd/Cw.

FIG. 93 illustrates the dramatic improvement in the uniformity of flow from the slot orifice of a cavity fed slot. It is plotted for Newtonian fluids. Here the uniformity index, UI, is plotted versus the parameter Nsp for various values of the ratio of the viscous flow resistance down the cavity to the flow resistance thru the slot, Nvs. A small UI is desirable. It is improved if the ratio Cd/Cw is less than one when all other variables are constant. Reducing the parameter Nsp by reducing the ratio produces desirable orders of magnitude reductions of the UI.

Modifying grooves may be placed in both walls of the slot. Grooves are generally produced by subtractive, material removal techniques.

Figure 91:
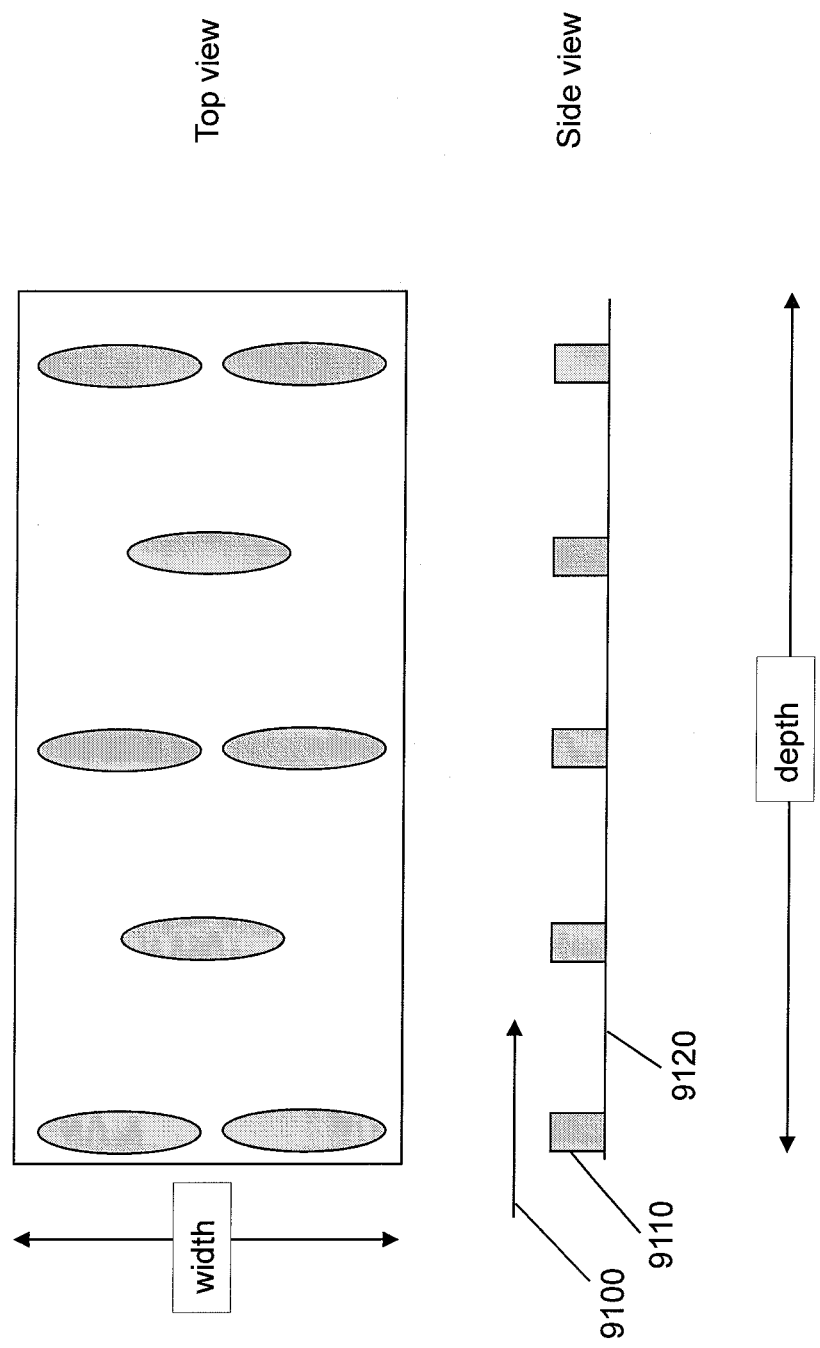
FIG. 91 is a schematic top view of an improved slot with bidirectional flow conductance.

Material additive techniques may be used to produce two dimensional flow properties for the slot. FIG. 91 illustrates one of many such modifications with top and side views. A section of one slot wall surface 9120 is shown having a width in a direction parallel the centerline of the orifice exit of the slot and a depth in the dominant flew direction from the cavity to the orifice. Arrow 9100 indicates the direction of flow. From the wall surface 9120 projections 9110 extend into the flow. These projections have lengths that extend across the dominant flow direction, and much smaller dimensions in the dominant flow direction. They are designed to obstruct flow more in the depth direction than in the width direction. By this means the ratio Rd/Rw is reduced below one.

Any technique that reduces the ratio Rd/Rw for the slot is useful. Any wall or internal modification that reduces the ratio Rd/Rw is useful. The slot wall modifications may be produced by machining, knurling, electric discharge machining, etching, plating processes, diamond turning, micromachining, photometric replication processes, microreplication process, and other techniques. Additive or subtractive techniques may be used. Slots may be modified by placing material within them.

In dies and coating devices where a slot is fed by a constant area cavity, it is taught that improved outflow uniformity is achieved when the dimensionless number, Nvs, is kept below 1, preferably below 0.1, and most preferably below 0.04; and additionally the profiled slot has a dimensionless parameter value Nsp of less than 1.

Both types of modifications also improve the particle trapping ability of the slot. Surprisingly, both also, in terms of orifice out flow uniformity, improve the tolerance to clogging of the slot by contaminants. This allows these improved slots to be used for final filtration of the fluid just prior to discharge from the slot orifice.

2. Point Fed Slots Systems

Slots terminating with a slot orifice on the face of a distribution device are useful. In the preceding section the feeding of fluid to the slot from a cavity through an inlet slot edge is described. A system of improved simplicity uses a slot which terminates at a slot orifice and which is fed fluid at a single point at an inlet edge. It has been found that modifying the slot flow resistances in the depth and width directions independently is useful for obtaining discharge uniformity. It is preferred to have a ratio Rd/Rw less than one.

Figure 94B:
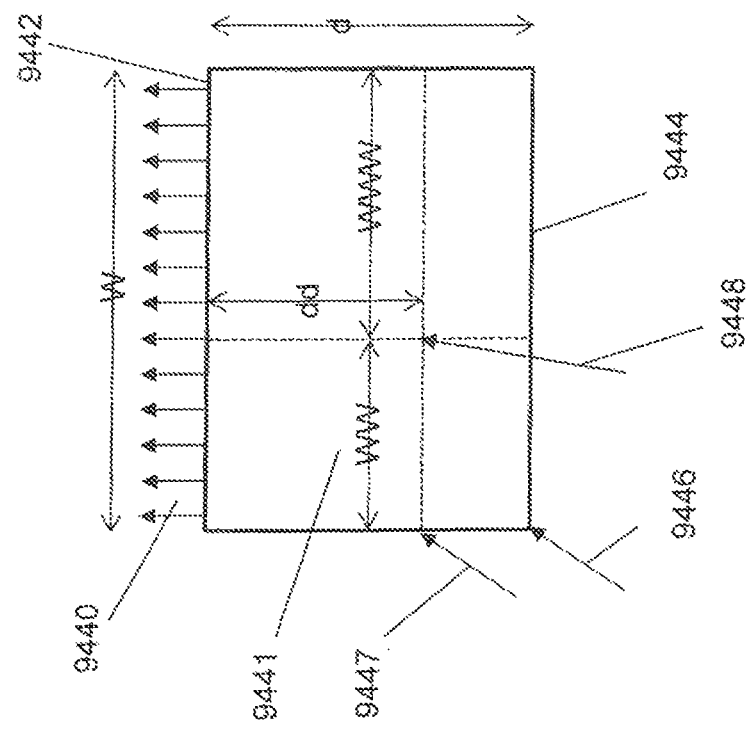
FIG. 94b is a schematic top view of an improved rectangular slot distribution system where fluid is fed at a point within the rectangle.
Figure 94A:
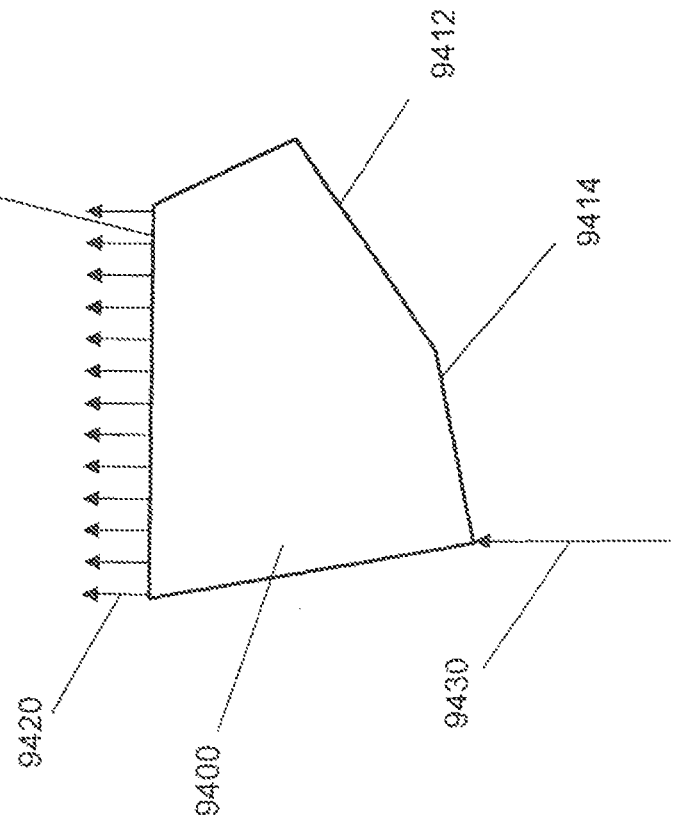
FIG. 94a is a schematic top view of an improved slot distribution system with a polygonal major surface shape.

FIG. 94a illustrates a top view of a slot fluid distribution system. The slot 9400 profile is a straight sided polygon. Fluid is fed into it at an apex as indicated by arrow 9430, and it exits at a slot orifice at an exit edge 9410. The exit flow is indicated by the arrows 9420. Boundary edges 9412 and 9414 do not intersect the outlet edge.

FIG. 94b illustrates a top view of a slot fluid distribution system. The slot 9441 profile is a rectangle with a width, W, and a depth, d, indicated by double ended grey arrows. Fluid is fed into it at an apex on the boundary opposite the outlet edge as indicated by arrow 9446 or it is fed at a point between the opposite boundary and the outlet edge as indicated by arrow 9447. Alternatively, fluid may be fed into the slot at any point in the interior of the rectangle as illustrated by arrow 9448. Fluid exits at a slot orifice at an exit edge 9442. The exit flow is indicated by the arrows 9440.

When feeding is at an interior point the rectangular slot profile may be divided into two rectangular sub-regions both with a depth of d. The left sub-region rectangle has a width WW, and the right has a width WWW indicated by double ended grey arrows.

Simple rectangular slot geometries without feed cavities have utility. A sampling of extensive point fed slot modeling results is graphed in FIG. 90a. Results for a rectangle where the width to depth ratio is 3 to 1 are labeled "rect(3×1)". Results for a rectangle where the width to depth ratio is 1 to 1 are labeled "squ(1×1)". Results for right triangles where the width to depth ratio is 1/1, 1/2, 1/3, and 1/4 are labeled "1/1 tri", "1/2 tri", "1/3tri" and "1/4 tri" respectively.

Here the UI of the flow from the exit edge is plotted. It is found that all rectangular slot systems fed from an inlet edge corner may be described by a single curve of UI versus Nsp where Nsp−W/d (Rw/Rd)^0.5 and contains the ratio Rw/Rd. The same is true for all right triangles where the slot exit is not along the hypotenuse side. For the triangles the feed point is the apex opposite the exit side; the width is the exit length and the depth is the perpendicular distance of the entrance point to the exit edge.

Most slots covering a polygonal area and when fed at an apex have UI results that fall between the triangle and rectangle results. In many cases, the results for polygons may be estimated from combinations of triangle and rectangle results.

In all cases improvement in UI is obtained over conventional slots when the ratio Rd/Rw is less than one. Useful UI's are obtained when the parameter Nsp is less than one. More preferred are values less than 0.5.

When conventional slots where Rd=Rw are employed, useful flow discharge uniformity is achieved using by selecting geometry variables so that the parameter Nsp is less than one. More preferred are Nsp values less than 0.8. This is especially true for corner fed rectangular slots.

Multi-point feed geometries may be used to span a wide width. This design strategy is described in the later description section: "Improved Metering Sheets"

Similar outflow uniformity variation curves are obtained when the slot is fed at an interior point between a boundary edge and the outlet edge. UI may be conservatively estimated using a revised parameter, Nspi, in place of Nsp and the FIG. 90a graph. Here the value of Nspi is calculated from the equation $$Nspi=WWW/dd(Rw/Rd)^0.5$$

where WWW is the larger of the two dimensions, WWW and WW.

When the feed point at a ratio dd/d=0.1, the uniformity is predicted by the graph in FIG. 90b. This graph again illustrates that changing a slot's flow resistance from omnidirectional where Rw/Rd=1 to bidirectional where Rw/Rd is less than 1 improves the outflow uniformity. In addition, it illustrates again that uniformity of outflow may be obtained when the dimensionless parameter, Nspi is less than one.

G. Improved Porous Sheets

1. Conventional Porous Sheets

Useful for investigating porous sheets are fluid dynamic simulations that describe the operational characteristics. We have developed models that describe the flow distribution characteristics of porous media in three dimensions.

Conventional porous sheets are composed of a large collection of pores. They allow for the transport of fluid and the filtering of fluid. They are characterized as having in any individual sheet a wide distribution of resistances to fluid flow from point to point. That is there is great variation in the pore lengths, sizes, and the inter-pore connectivity. FIG. 1a illustrates the typical flow distribution die using a known porous sheet in place of a slot. Fluid is fed into the die cavity 1 by a means not shown. The die has a top plate 5 and bottom plate 6 which are assembled with a slot gap 3 extending from the cavity 1 to the exterior of the die. The gap 3 is filled with porous sheet 2. Fluid flows through the cavity then through the porous sheet and exits the die along a line.

FIG. 1b is a photograph of a cross section of commercially available porous media. The pores have a distribution of sizes and shapes with random connectivities. The black areas 7 are pores. The grey areas 8 are solid material.

Using flow modeling one may investigate the point to point uniformity for flow from the cavity to the discharge face of the die and from one end to the other along the length of the cavity for a die like illustrated in FIG. 1a. FIG. 1c is a grey scale contour graph of the ratio of the local average flow rate at a point to the average flow rate for the whole sheet in the depth direction from a feed cavity to die exit. In this case, a distribution of pore sizes is present where the ratio of the flow resistance down the length of cavity to the total sheet flow resistance is 0.01. This graph points to the failing of common porous media. It has non-uniformities that create large local flow variations.

The failing is even more apparent in FIG. 1d where the point to point flow at the exit edge of the porous sheet is graphed. The ratio of the local flow to average flow is plotted as a function of the distance along the die exit face. The flow is very non-uniform. Variations greater than plus or minus 40 percent are present. In coating this will often create a defective product.

However in some cases, this point to point non-uniformity is not material but average uniformity over length on the order of centimeters or multiples of the sheet thickness is significant.

2. Improved Conventional Porous Sheets a. Porous Sheet and Cavity Systems

Conventional porous sheet material made from sintered metal powder has nominally no directional variation of flow resistance in the plane of the sheet. The flow resistances in any two directions parallel to the major surfaces are on the average not different. It is a teaching of this invention to improve the sheet's ability to distribute flow uniformly by making the resistances different.

Figure 92:
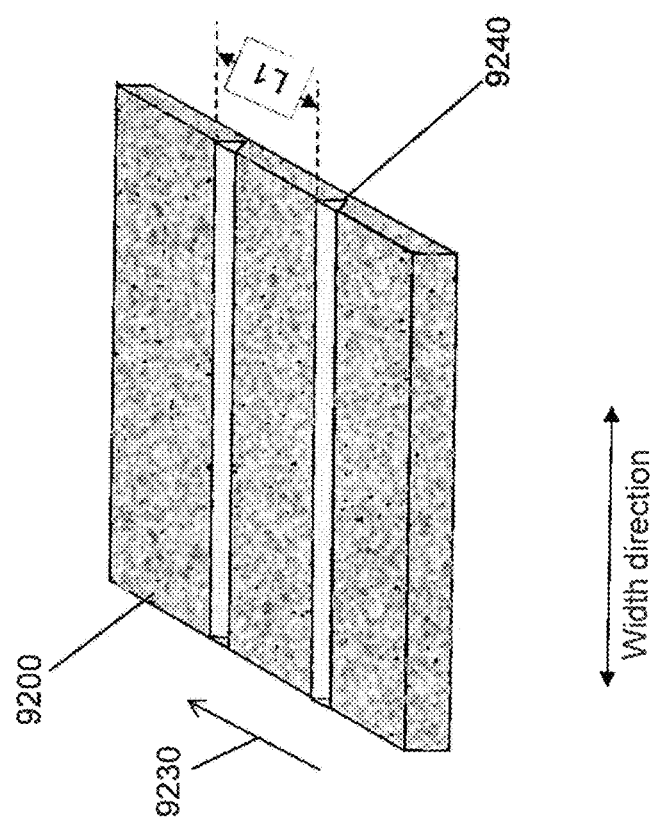
FIG. 92 is a schematic isometric view of an improved conventional porous media with bidirectional flow conductance.

FIG. 92 illustrates an example of an improved sheet. The sheet 9200 is made from granular material and is indicated by the texturing. The partial section has flow across it from front to back in the depth direction as indicated by the arrow 9230. Periodically placed along the top major surface are volume regions 9240 which serve to modify and make different the flow resistances in the depth and width directions. These regions generally extend into the sheet. It is also a teaching that they extend through the sheet. The spacing is indicated by the distance L1. It is preferred that it range from a fraction of the sheet thickness to multiple times the thickness. It is preferred that the width dimension of the region in the depth direction range from a fraction of the sheet thickness to multiple times the thickness.

If the regions 9240 are void of material, the flow resistance ratio Rw/Rd will be less than one. If the regions 9240 contain non-porous material, the flow resistance ratio Rw/Rd will also be less than one. The same effect may be obtained by using less porous or more porous structure of appropriate dimensions.

Figure 86:
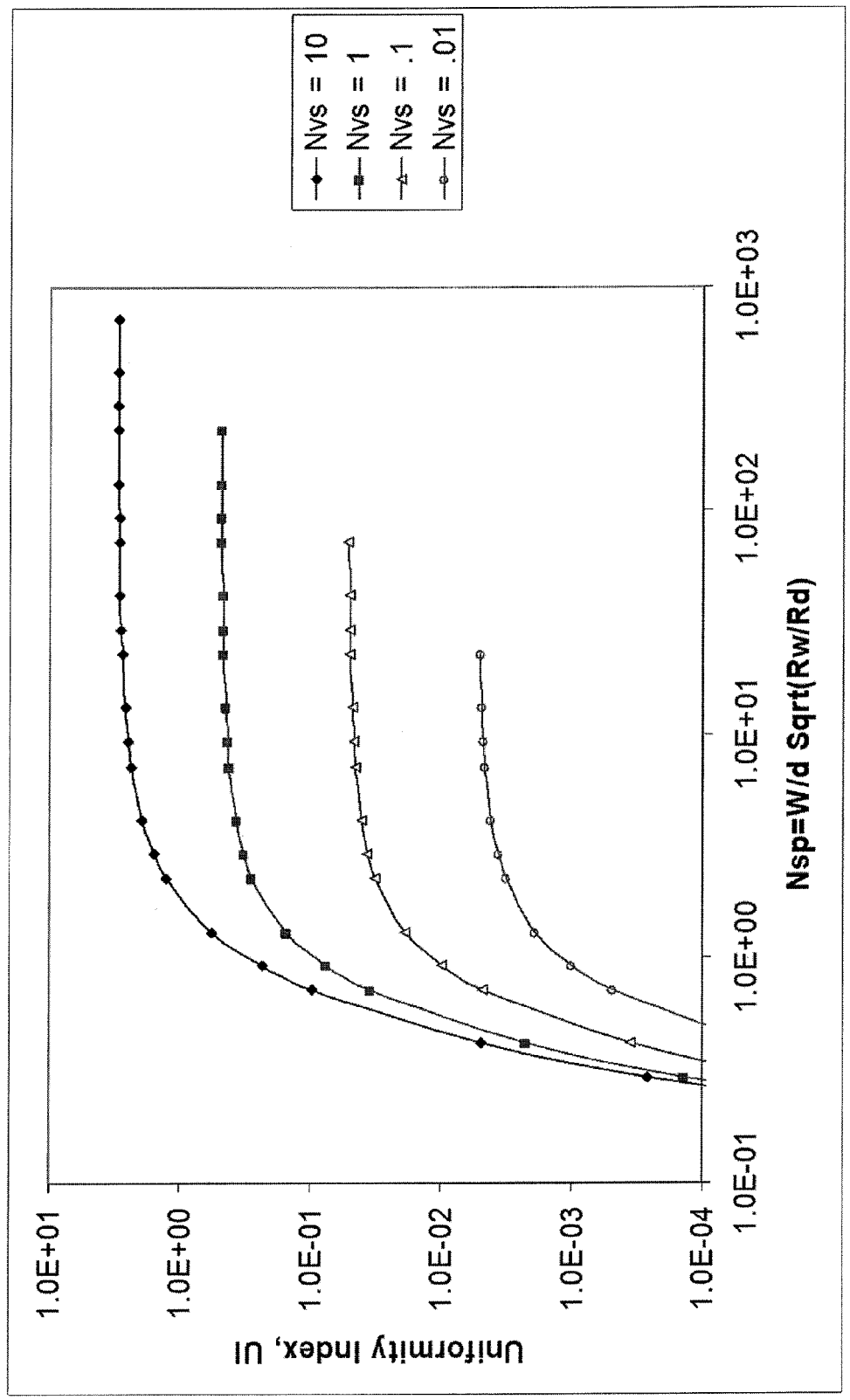
FIG. 86 is a graph of the uniformity for a distribution die using improved porous media.

If the feature spacing distance L1 is many times smaller than the total sheet depth dimension and the flow from the exit distribution edge is averaged over lengths on the order of the sheet thickness, the effect of parameters on out flow uniformity is shown in FIG. 86. This figure illustrates the case of a flow distribution device using a cavity to feed fluid to the inlet edge of a rectangular sheet of the improved conventional porous media.

FIG. 86 illustrates the dramatic improvement in the uniformity of flow from exit of a cavity fed media. It is plotted for Newtonian fluids. Here the uniformity index, UI, is plotted versus the parameter Nsp for various values of the ratio of the viscous flow resistance down the cavity to the flow resistance thru the media, Nvs. A small UI is desirable. It is improved if the ratio Rw/Rd is less than one when all other variables are constant. Reducing the parameter Nsp by reducing the ratio produces desirable orders of magnitude reductions of the UI.

When the porous media is fed by a constant cross-sectional area cavity it is preferred that the parameter Nvs have a value below one.

b. Point Fed Conventional Porous Media Sheet Systems

Slots filled with porous media and terminating with a slot orifice on the face of a distribution device are useful. In the preceding section the feeding of fluid to the media from a cavity through an inlet slot edge is described. A system of improved simplicity uses a media sheet which terminates at an outlet edge and which is fed fluid at a single inlet point. It has been found that a sheet where the flow resistance in the depth and width directions is different is useful for obtaining flow discharge uniformity. It is achieved by having a ratio Rd/Rw less than one.

FIG. 94 illustrates a top view of a slot fluid distribution system. It also may represent a porous sheet fluid distribution system. The sheet 9400 is a straight sided polygon. Fluid is fed into it at an apex as indicated by arrow 9430, and it exits at a slot orifice at an exit edge 9410. The exit flow is indicated by the arrows 9420.

A simple rectangular porous sheet geometry exemplifies the utility and the design of point fed systems. A sampling of extensive modeling of results are graphed in FIG. 90. Here the UI of the flow from the exit edge is plotted. It is found that all rectangular slot systems may be described by a single curve of UI versus Nsp where Nsp contains the ratio Rd/Rw. The same is true for all right triangles where the slot exit is not along the hypotenuse side. For the triangles the feed point is the apex opposite the exit side; the width is the exit length and the depth is the perpendicular distance of the entrance point to the exit edge.

Most sheets, whose top side view is a polygon, have UI's falling between the triangle and rectangle results. In many cases, the results for polygons may be estimated from combinations of triangle and rectangle results.

In all cases improvement in UI is obtained over conventional media sheets when the ratio Rd/Rw is less than one. Useful UI's are obtained when the parameter Nsp is less than one. More preferred are values less than 0.5.

Multi-point feed geometries to span wide widths. This design strategy is described in the later description section: "Improved Metering Sheets".

The flow in and from porous distribution sheets is analogous to flow in slots. The conclusions reached for slot apply to porous media sheets.

H. Improved Metering Sheets

A fluid metering sheet of this invention provides a desired fluid flow distribution out from and along an edge of the sheet. The fluid is forced through the sheet from one edge to another. The fluid flows within the sheet between its top and bottom surfaces. Or in the case when the sheet itself does not confine the flow, flow is confined by top and bottom confining surfaces or capping films or walls. Flow may be within the flow passageways defined by positioning the sheet between confining solid surfaces. The flow from an edge is on average normal to this edge. This sheet may be used as a substitute for fluid passageways such as precision metering slots and drilled holes. The sheets are useful in conjunction with distribution devices and coating dies.

While it is commonly desired that the outflow from a sheet edge be uniform along its length, it is within the scope of this invention to provide non-uniform, prescribed distributions. It is a teaching that the internal passages be designed and located to achieve a desired outlet edge flow distribution. The flow distribution from the edge may be controlled by the internal flow passageway dimensions or any parameter that changes the local effective resistance to flow. Passages may be designed to provide desired flows using various techniques including but not limited to flow simulation, designed experiments, flow tests, trial and error testing, and fluid flow computer studies. Each individual passageway is designed and specified.

The flow discharge edge of the sheet may be along a straight line or a curved line. The edge may also be described by a combination of segments of straight and curved lines.

The fluid metering sheet is bounded by the discharge edge and at least one additional edge. The dominant flow is into an inlet edge and then out a discharge edge. The ratio of the inlet edge length to the outlet edge length may range from greater than one to near zero. Sheets may be designed to distribute a prescribed outflow distribution from the outlet edge even when the inlet is a single point. Commonly in coating devices, the desired outflow distribution is uniform outflow.

A fluid metering sheet of this invention is useful for distributing flow along a width (length) and across a depth of sheet. The width is commonly the nominal width of a distribution device such as a coater. For distribution of fluid along a straight line, the sheet will generally be rectangular. The sheet has edges, and it has two major surfaces. In the case where a sheet is oriented horizontally, the surfaces constitute its top side and its bottom side.

In the following description "uniform flow" from a fluid metering sheet along its discharge edge is understood to mean that the average flow rate per unit length along the discharge edge is uniform within acceptable tolerance limits. The appropriate sampling length is one to several times the largest dimension of a sheet base unit cell which is defined below or the sheet thickness.

"Uniform flow resistance" in a metering sheet is understood to mean that if the pressure gradient is uniform, then the resulting average flow rate of a fluid is uniform within acceptable tolerance limits. The appropriate sampling length is at least as large as the largest dimension of a base unit cell or the sheet thickness.

The term "passageway flow conductance" refers to the reciprocal of the passageway flow resistance. At a given flow rate through the passageway, the resistance equals the flow rate divided by the pressure gradient from one end to the other of the passageway.

In the following description, the terms "metering sheet base unit cell", "base unit cell", "unit cell", and "cell" refer to a small fraction of the total metering sheet volume. It has a thickness that equals the thickness of the sheet, or if the sheet is multilayered it has a thickness equal to the layers. The surface area is a fraction of the sheet surface area, and this area has a shape which M most cases is chosen from a group including but not limited to quadrilaterals, triangles, and hexagons. Its solid material and void space geometries are the basis for constructing portions of the sheet. For a sheet with multiple layers of 2D passageway grids, the base unit cell's three dimensional geometry repeats throughout functional areas of the sheet.

For purposes of clarity the term "sheet width" refers to the length of the fluid inflow or out flow edge for a rectangular sheet. When the sheet is rectangular and used within a coating die, the sheet width will generally be the length of the feed cavity. It nominally equals the width of coating deposited upon the substrate being processed.

The term "sheet depth" refers to the distance from the sheet inflow edge to its outflow edge.

When a sheet is composed by a collection of quadrilateral unit cells, each cell is surrounded by four other similar cells. Each of the four sides of the cell is intersected by at least one void, a flow passageway, which interconnects with flow passageways of the abutting cells. Each flow passageway in a cell interconnects with at least one other void volume flow passageway within the cell. It is preferred that it connects with all other passageways in the cell. It is preferred that each cell edge intersects a passageway of the cell.

In the case where the sheet is constructed from a collection of triangular unit cells, each cell is surrounded by three other similar cells. Other arrays of repeating shapes are also possible.

1. Sheets Using 2-Dimensional Cell Structures

In FIG. 2 an active fluid metering sheet 10 of the invention is illustrated which is made of a layer of polymeric material that has an internal structured void space (not shown). This sheet is rectangular with a width indicated by the arrow 14 that is longer than its depth which is indicated by the arrow 16. The thickness of the sheet is indicated by the arrow 11. When used in a coating die the width 14 of the sheet will approximate the width of the active portion of the coating die. The depth dimension 16 will span from an inlet edge to an outlet edge. In the case of coating dies the depth is generally from the die cavity to the die exit face.

Figure 3:
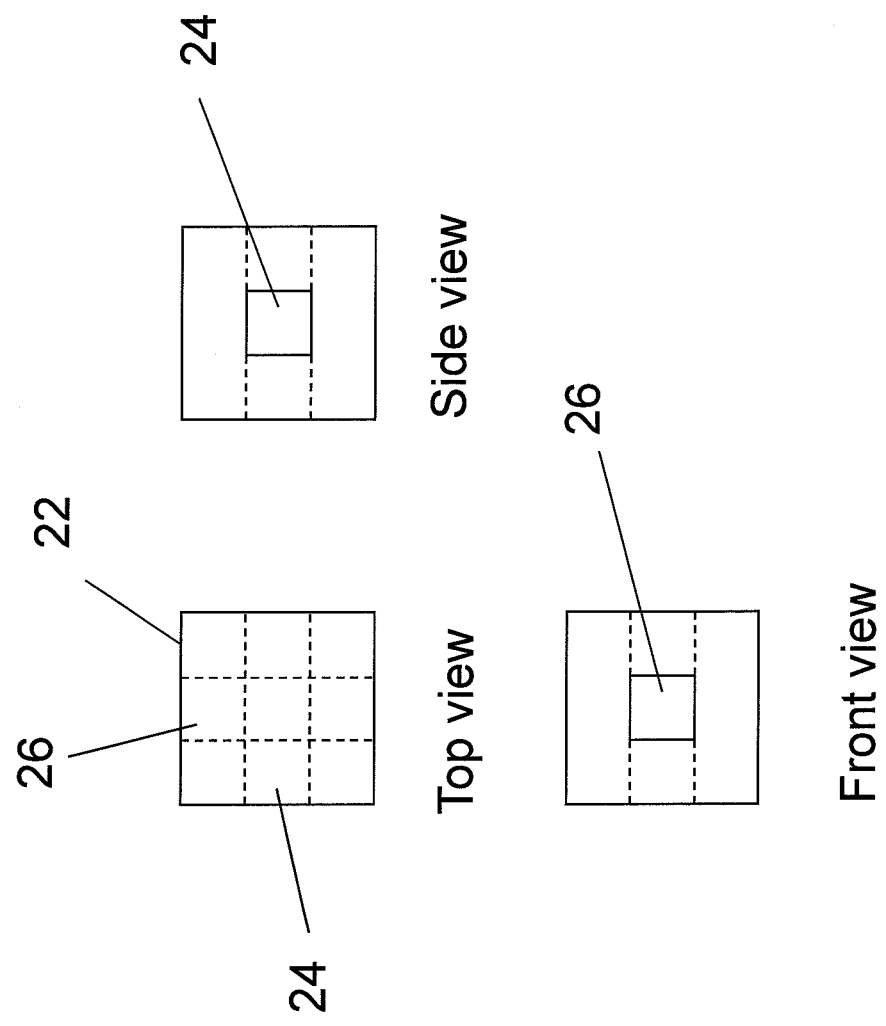
FIG. 3 is a drawing of the top, side and front views of a unit cell illustrating one flow passageway structure of an improved metering sheet.

One embodiment of sheet 10 of this invention will be composed of a continuum of multiple, uniform and identical base unit cells. It is a useful sheet and may be designed to produce uniform outflow. Illustrated in FIG. 3 is an example of a single unit cell 22. Shown are top, front and side views. These cells need not be discrete physical elements, but they are the smallest subdivision of the volume of the sheet that can be used to characterize the flow paths in the sheet. The sheet consists of a repeating internal structure. These cells repeat throughout the width and depth of the sheet 10 of the FIG. 2.

The cell 22 is composed of a block of material through which two intersecting fluid flow passageways 24 and 26 pass. The flow passageways intersect. The block has eight sides which are a top and bottom, left and right, and front and back. It has a top surface and a bottom surface and four edges (left, right, front, and back). The thickness of the cell equals the thickness of the sheet. Throughout the sheet adjacent cells are orientated edge to edge: front to back and left side to right side. In this manner, each of the flow passageways of a cell intersects and connects with the flow passageways of the two adjacent cells orientated along the passageway axis. Each passageway is also connected to the other adjacent cells via an angled intersecting passageway. This results in a sheet where flow cells are fluidically connected to the surrounding adjacent cells. This allows fluid from any unit cell to flow edgewise through the sheet to any other cell. It allows fluid to flow from any flow passageway to any other flow passageway with in the sheet.

Preferred are grids of passageways that confine the flow within the sheet and that do not allow flow through the major sheet surfaces.

An example sheet consisting of the cell structure of FIG. 3 may be characterized by a first set of uniformly spaced flow passageways extending parallel to the width direction and a second set of equally spaced flow passageways extending parallel to the depth direction. The flow passageways of the first set intersect flow passageways of the second set. Flow through the sheet is parallel to the top and bottom of the sheet. In general flow is directed from an input edge to an output edge.

FIG. 4a shows a magnified top view representation of a region of this sheet taken halfway through the sheet's thickness. The sheet is composed of many unit cells 44 of the type shown in FIG. 3. The bold lines 42 and 43 represent intersecting flow passages created by the repeating unit cells. Flow passageways 42 run parallel to the depth edge 38 and intercept the width edge 37 of the sheet. In a like manner, the flow passageways 43 intercept the end of the sheet along a depth edge 38. The flow of fluid is into a first input widthwise edge 37 as indicated by arrow 35. The flow exiting at the discharge edge of the region is indicated by arrow 36. The grid of flow passageways in this figure is also referred to a "square grid" flow passageway layout or square grid.

When a simple metering sheet design is desired for uniform flow distribution along a straight line, the square grid design is preferred. The utility of a metering sheet with a square grid and of the cells illustrated in FIG. 4a is that when fluid is force into it across its width, the sheet facilitates the production of uniform flow from a discharge edge. It will do this even if it filters contaminants from the fluid and traps them at the inflow edge or excludes them from passage through the sheet. Surprisingly, it will accomplish uniform outflow even when a large portion of the passageways are clogged.

Preferred characteristics of a fluid distribution sheet are:

1. The flow may proceed in at least two directions in the plane of the sheet in the cells. Stated in another way the sheet contains void volume flow passageways which allow flow toward each of the four edges of the sheet.

2. Cells in an active flow area have identical flow passageways within the limits of machining precision.

3. Individual flow passageways of a cell interconnect with at least one of an adjacent cell.

4. No flow passageway is dead ended.

5. The conductance of passageways and the grid layout of the passageways are fixed by design and specified.

For the purpose of metering fluid flow uniformly, it is also preferred that the sheet is manufactured precisely with the flow passages in each unit cell having a specific orientation having a uniform resistance to fluid flow. The cell characteristics described produce the desired precision flow metering characteristics for a useful metering sheet. Methods of manufacture are described in a later section.

When the sheet is not uniform in depth but uniform flow from a lengthwise edge is desired, the internal flow passageway flow resistance may be adjusted or prescribed to produce uniform flow from the flow exit edge. Here key preferred characteristics are:

1. The flow may proceed in at least two directions in the plane of the sheet in the cells.

2. Cells have mathematically similar flow passageways.

3. Individual flow passageways of a cell interconnect with at least one of an adjacent cell.

4. No flow passageway is dead ended.

5. The conductance of passageways and the grid layout of the passageways are designed and specified.

All materials are elastic and deform in response to applied forces. External forces applied to the sheet may be used to deform the internal dimensions and change the flow resistance locally in the sheet. Energy may be applied locally to the sheet to change the flow resistance locally in the sheet. Sheets may be fabricated from compressible materials or with compressible structures. Their internal fluid flow resistances may be locally adjusted through the application of forces.

It is a teaching of the invention to adjust the local internal flow resistance by design prior to or during its manufacture. It is a teaching to adjust its local internal flow resistance by applying forces or energy during its use.

When the sheet is for the purpose of providing a prescribed flow variation from a discharge edge, the internal flow passageway conductance may be controlled to produce the desired flow from the flow exit edge. Here key preferred characteristics are:

1. The flow may proceed in at least two directions in the cells in the plane of the sheet.

2. Cells have similar flow passageways.

3. Individual flow passageway of a cell interconnects with one of an adjacent cell.

4. No flow passageway is dead ended.

5. The conductance of passageways and the grid layout of the passageways are designed and specified.

Figure 4B:
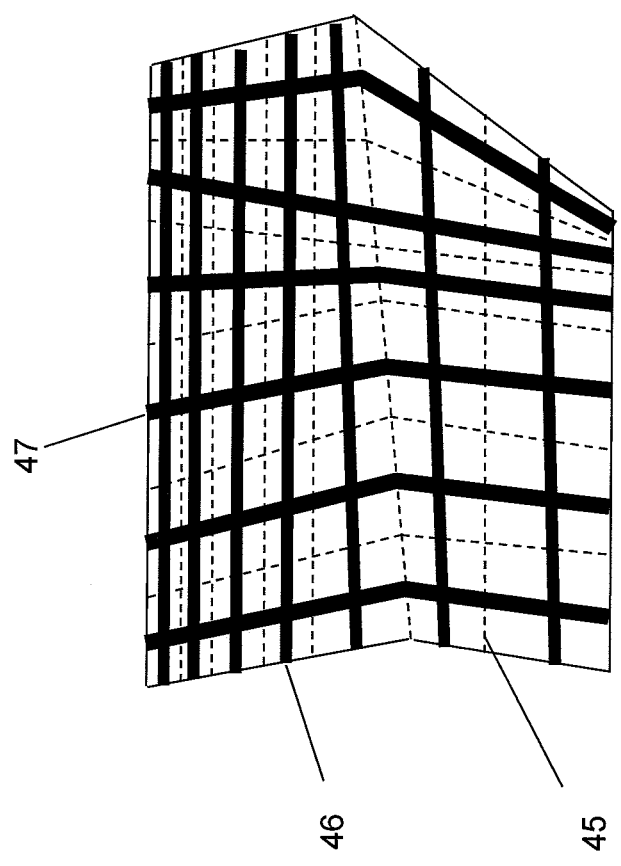
FIGS. 4a, b and c are schematics of improved metering sheets illustrating geometric arrangements and types of the internal flow passageways structures.

FIG. 4b shows a magnified top view representation of a section for a sheet taken halfway through the sheet's thickness and wherein the unit cells are not equal. The sheet is composed of many unit cells of the type similar to those in FIG. 3 and delineated by the dashed lines 45. The bold lines 46 and 47 represent intersecting flow passages created by the multiple base cells. Each cell is a quadrilateral in cross section, but not equal in detail in size or shape. Such a sheet may be useful in distributing flow along a discharge edge or filtering particles from a flow.

Figure 4C:
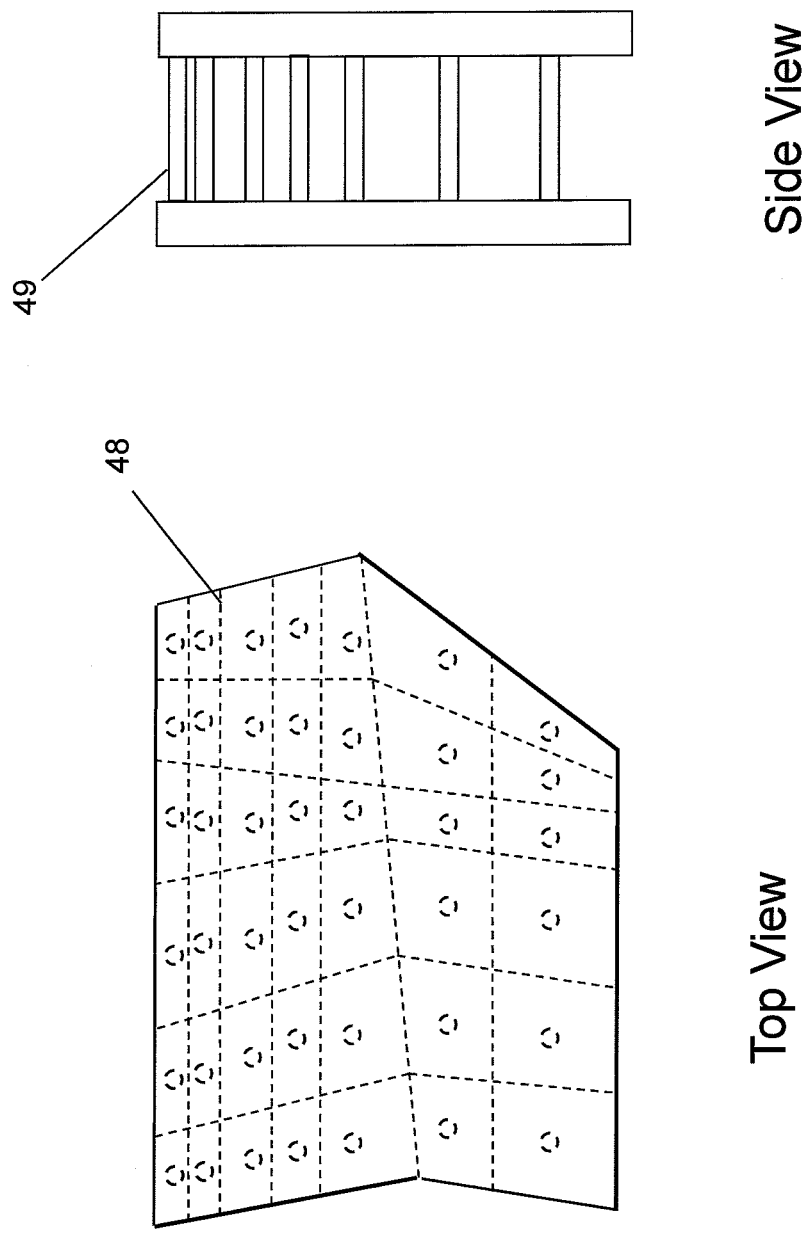

FIG. 4c illustrates another metering sheet structure of this invention with top and side views of the sheet. Here the top and bottom solid surfaces are held in fixed proximity to each other by internal cylindrical columns 49. Again the unit cells are delineated by the dash lines 48.

The sheets of FIGS. 4b and 4c are each designed so that the flow passageways void space is specified and connect so that fluid may flow from one to any other. No dead ended flow passageways exist when fluid flows through the sheet edges. Of course, if any sheet edge is blocked by any exterior placed object, there will be local dead ended flow passageways at that edge. But the whole sheet has local flow conductances that are predetermined by their design, and fluid may move from any local void volume to any other in response to pressure distributions and forces.

Figure 5:
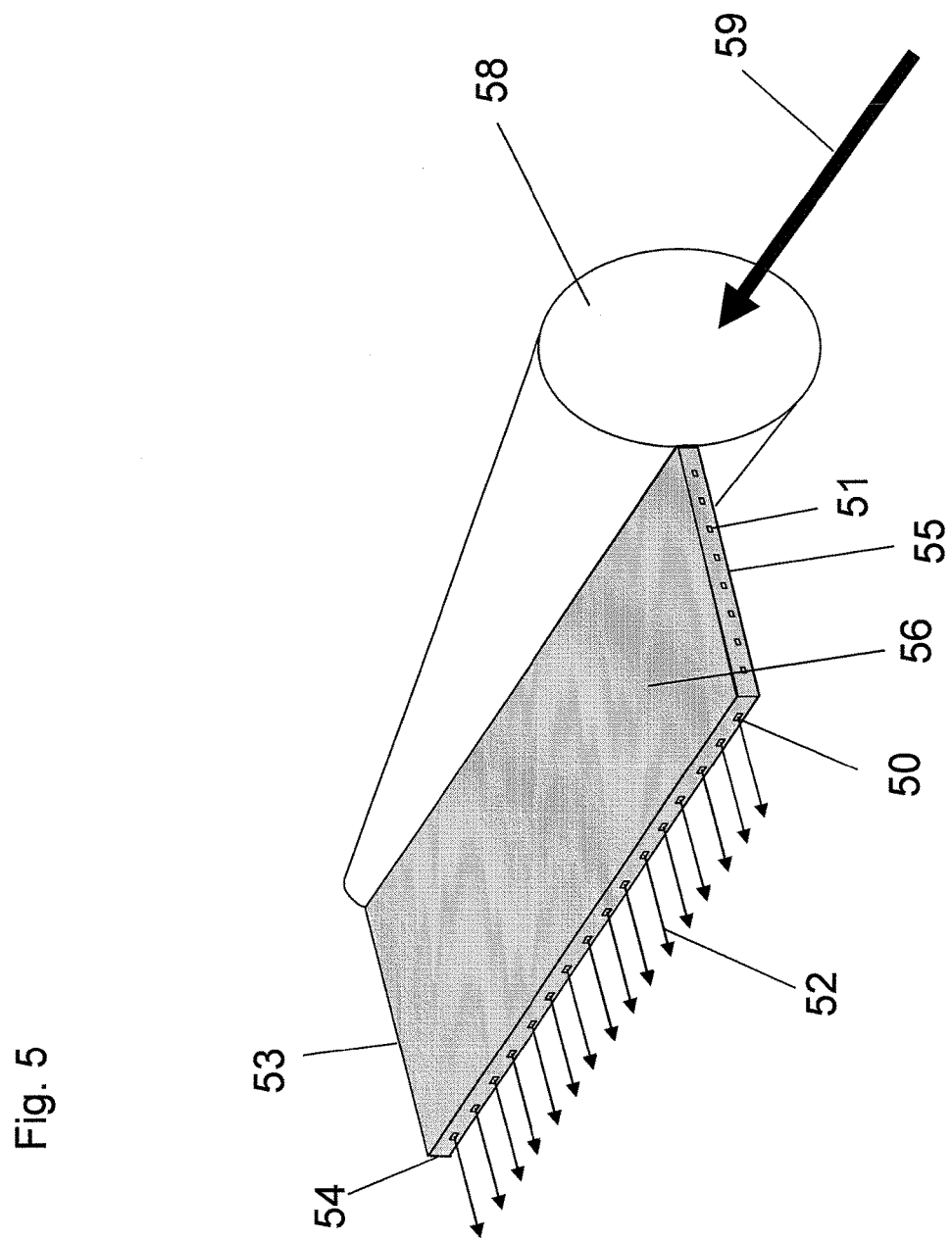
FIG. 5 is an isometric schematic view of the internal feed cavity and metering sheet of a fluid distribution device of this teaching.

FIG. 5 illustrates the internal flow passageways of a die similar to FIG. 1, but here the known porous sheet is replaced by an improved metering sheet 56 using the flow passageway pattern of FIG. 4a and the cell structure of FIG. 3. A line of flow passageways 50 is exposed along the sheet exit edge 54 and along the depthwise edge 55 of the sheet. Fluid enters the end of the cavity 58 as shown by the arrow 59. It then flows down the length of the cavity and simultaneously enters the fluid metering sheet 56 through an inlet edge. It exits through the exit edge 54 from exposed flow passageway ends as indicated by arrows 52. Multiple cross flow passageways intersect the discharge flow passageways extending across the sheet depth. Their ends 51 intersect at the edges 55 and 53 of the sheet. Flow from the ends of the sheet is prevented by solid die structure (not shown) confining the ends of the sheet when it is assembled in the coating die. Sealing of these ends by various means is also a teaching of the invention.

FIGS. 3 and 4a illustrate only one useful cell structure and resulting sheet flow passageway configuration. Many others are possible. Examples are shown in FIGS. 6a and 6b which illustrate a magnified top view representation of a section of the sheet taken halfway through the sheet's thickness. The sheet is composed of many unit cells. The bold lines in FIG. 6a, 61 and 62, represent intersecting flow passages created by the repeating unit cells. A single unit cell is identified by the dotted lines 63. Flow passageways 61 and 62 intersect at acute angles. The bold lines in FIG. 6b, 67 and 68, represent intersecting flow passages created by the repeating unit cells. A single unit cell is identified by the dashed lines 60. Flow passageways 67 and 68 intersect at right angles. Both the patterns of these figures are characterized as having at least two planes of symmetry.

Arrow 64 indicates the direction of flow through the depth of the sheet. Away from depth wise edges the resistance to flow across the sheet from side 66 to 65 in FIG. 6a is uniform. Also away from edges, the resistance to flow across the sheet from side 70 to 69 in FIG. 6b is uniform.

It is preferred that all flow passageways of a metering sheet are interconnected. With this compensation for any obstruction in any flow passageway within the sheet can occur. That is flow can divert around any point of obstruction in a flow passageway of the sheet. Additionally, clogging at an inflow sheet is overcome by the sheets ability to direct fluid around a clogged section. By this means, the sheet can provide filtering while producing an effectively uniform distribution of fluid from its discharge edge.

Figure 7B:
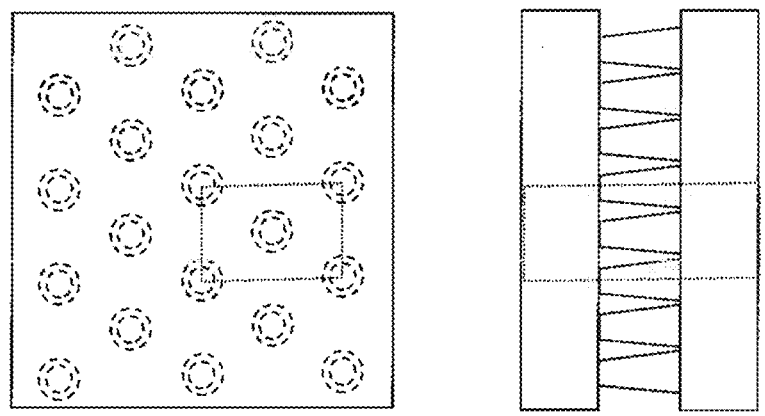
FIGS. 7a and b are schematics with top and side views of improved metering sheets constructed with a regular array of columns.
Figure 7A:
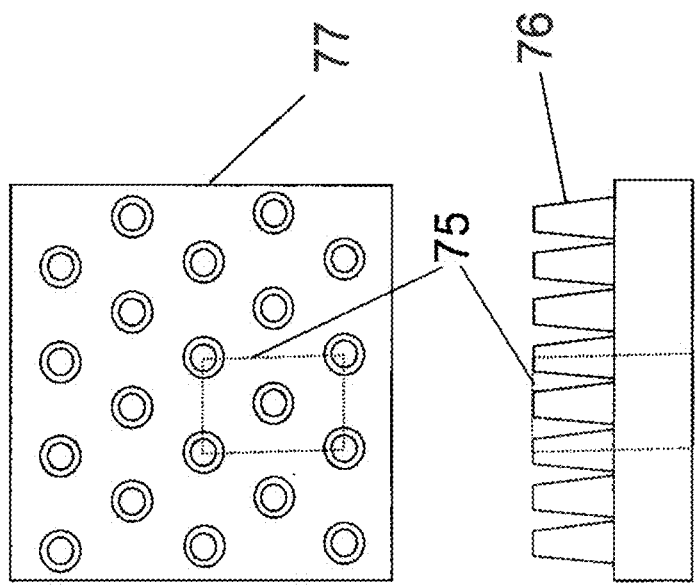

FIGS. 7a and 7b illustrate magnified top and side views of a preferred metering sheet structures created by columnar posts 76 extending from the bottom of the sheet. The sheet 77 is composed of unit cells one of which is delineated by the dotted lines 75. These cells repeat throughout the depth and width of the sheet. The cell has eight sides which are a top and bottom, left and right, and front and back. The thickness of the cell equals the thickness of the sheet. Throughout the sheet, adjacent cells are arranged front to back and left side to right side. In this manner, for each cell the void volume of a cell connects with the voids of all adjacent cells. This results in a sheet where the flow cells are connected, and this allows fluid from any cell to flow to any other cell. It allows fluid to flow from any flow passageway to any other flow passageway. The entire sheet consists of uniformly spaced cells with equal void volumes.

While uniformity in void volume and equal spacing of cells has utility in producing uniform metered flows, non-uniform spacing and volumes are also a teaching of this invention. As in the case of linear grids of flow passageways illustrated in FIG. 4b, the quadrilateral base cell shape and size need not be uniform throughout the sheet.

The sheet in FIG. 7a is one which is intended to be covered (capped) by a solid surface on its top side to contain fluid within its thickness. The sheet of FIG. 7b has an integral top impervious surface so that fluid flow is contained within it. Both types are sheets of this teaching.

Figure 8C:
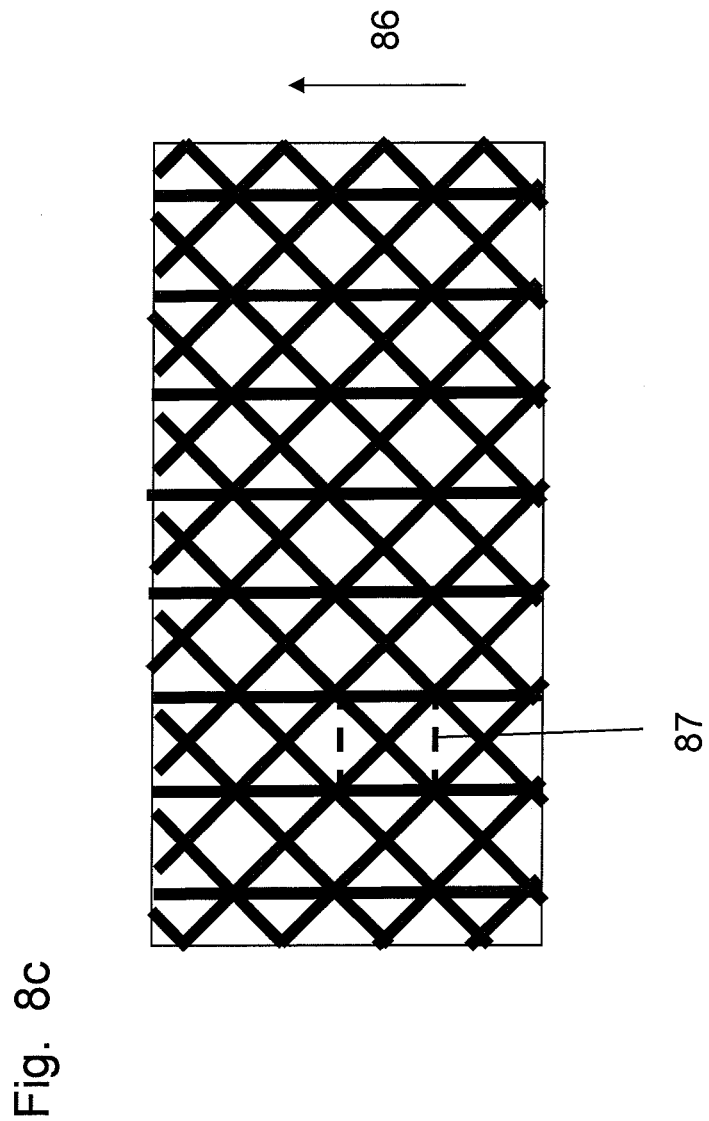
FIGS. 8a, b and c illustrate still other flow passageway layouts for the improved metering sheet.

FIGS. 8a, 8b and 8c illustrate other flow passageway grid configurations for metering sheets. Each is intended for use as a device to distribute flow along a discharge length. The arrows 82, 85 and 86 indicate the intended direction of flow of fluid through the sheets. The basic unit cells are identified by the dashed lines 81, 84 and 87. In each case two or more flow passageways extend across the cell. The void volume of a cell interconnects with the volumes of all adjacent cells.

FIG. 9a illustrates portion of a useful metering sheet 922 where the base structure is described by a more internally complex unit cell indicated by the dashed lines 920. This sheet is designed for metering flow in the direction indicated by arrow 930. Unit cells fill the width and depth of the sheet except near the edges 932 and 934 where incomplete unit cells exist. Again here the flow passageways are indicated by heavy dark lines 940.

Figure 9B:
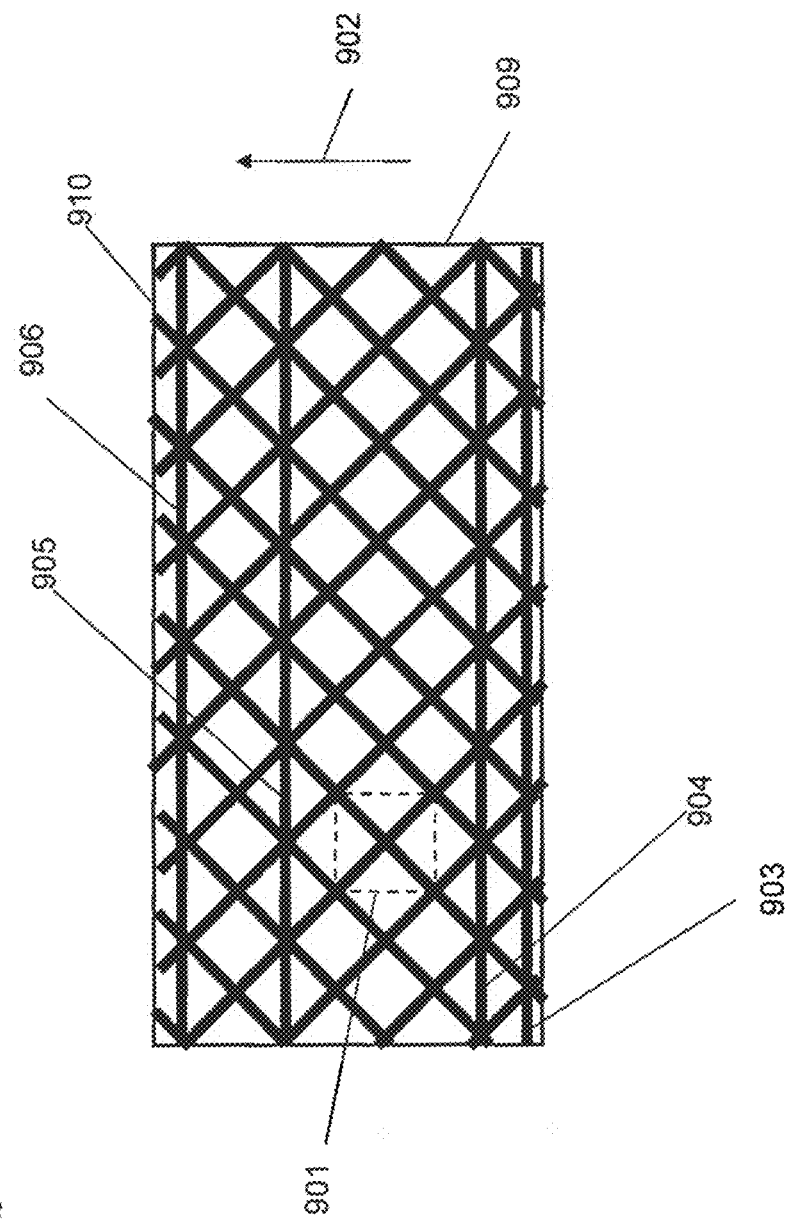
FIG. 9b is a schematic illustration of an internal flow passageway layout further improved with cross channels which are parallel to the cavity orientation.

FIG. 9b illustrates another useful metering sheet grid layout of this invention. The sheet is intended for use as a device to distribute flow along its discharge edge 910 which is perpendicular to the direction of flow indicated by arrow 902. The basic unit cell is identified by the dashed lines 901. In each cell in the sheet at least two flow passageways extend across the cell and interconnect with adjacent cells. Each cell consists of flow passageways which are angled to each other. They allow flow both toward the depthwise and widthwise edges. Any point blockage of a flow passageway in the bulk of the sheet may be overcome by adjacent flow passageways diverting flow around it.

Additional supplemental flow passageways 903, 904, 905, and 906 extend perpendicular to the direction of flow 902. These may be added to the sheet in a systematic or random manner. These do not interfere with the connectivity of the cells of the sheet. They improve the connectivity of the cells' void volume in a direction perpendicular to the direction of flow. Uniform spacing of these supplemental flow passageways is preferred, but not required. Uniform spacing and intersection of these flow passageways with the cells is most preferred. These flow passageways improve the uniformity of flow from outlet edge 910.

Any random supplemental flow passageway not perpendicular to the direction of flow will produce local non-uniform flow from the sheet along its discharge edge. However, when averaged over a significant length it may not be consequential. Any periodic placement of flow passageways not perpendicular to the direction of flow may produce non-uniform flow from the sheet along its length if they are not present in every cell along the length of the sheet.

Figure 9C:
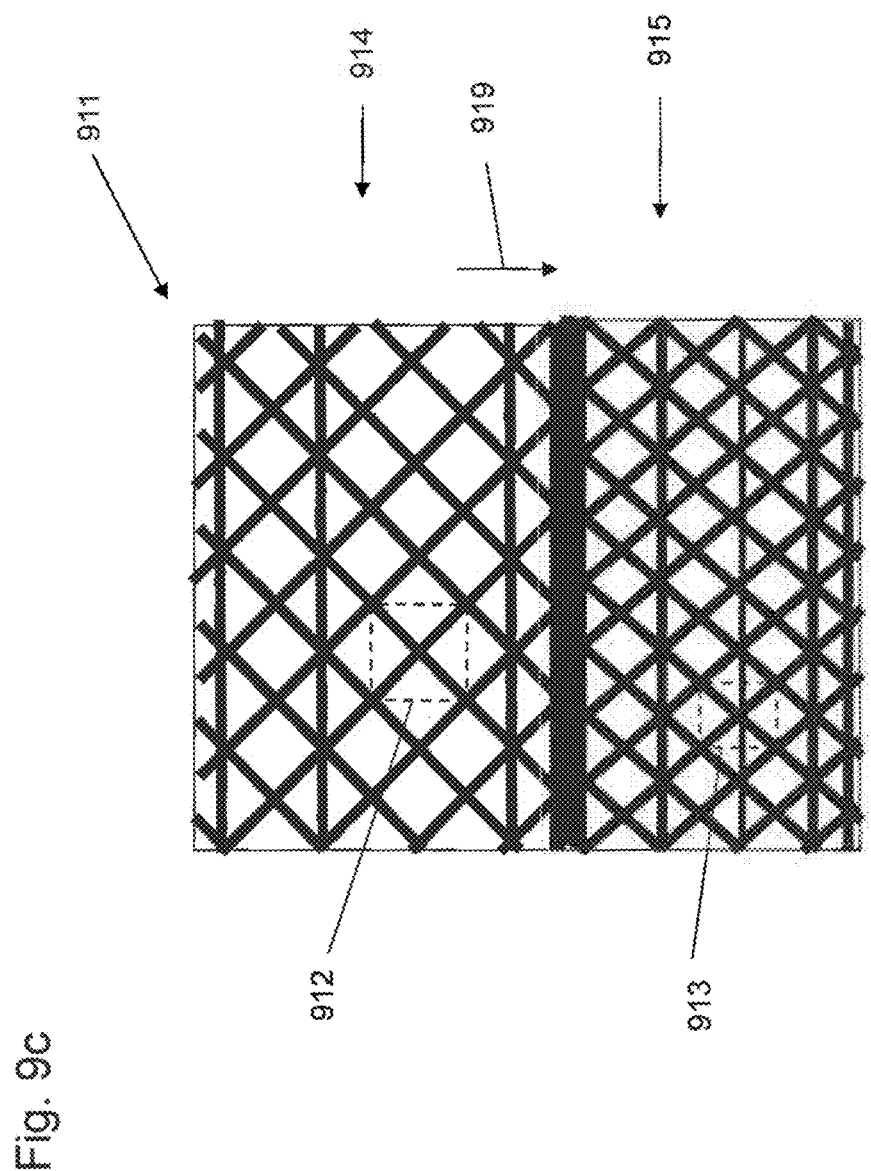
FIG. 9c is a schematic illustration of an internal flow passageway layout further improved with cross channels which are parallel to the cavity orientation and illustrating a sheet structure where two differing base flow passageway cell sizes are employed within a sheet.

It is a teaching of this invention to construct a metering sheet with a base unit cell structure throughout the sheet to which are added one or more supplemental auxiliary flow passageways. These generally enhance or modify flow characteristics of a sheet and may improve average flow uniformity at the discharge edge FIG. 9c illustrates a metering sheet 911 consisting of two distinct flow regions 914 and 915 represented by two different cell geometries delineated by the dashed lines 912 and 913 respectively. The flow direction is indicated by the arrow 919. It is often advantageous to have different flow resistance, flow passageway size, unit cell size, materials of construction, flow passageway orientation, flow passageway spacing, and fluid transport characteristics in the regions near the sheet entrance and sheet flow exit. This has utility in coating and filtering technology.

Figure 9D:
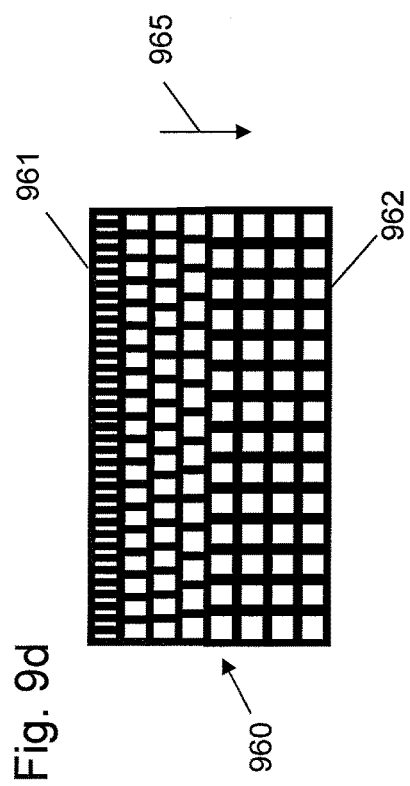
FIGS. 9d, e, and f are schematic illustrations of examples of internal flow passageway layouts employing two or more base cell geometries simultaneously.
Figure 9E:
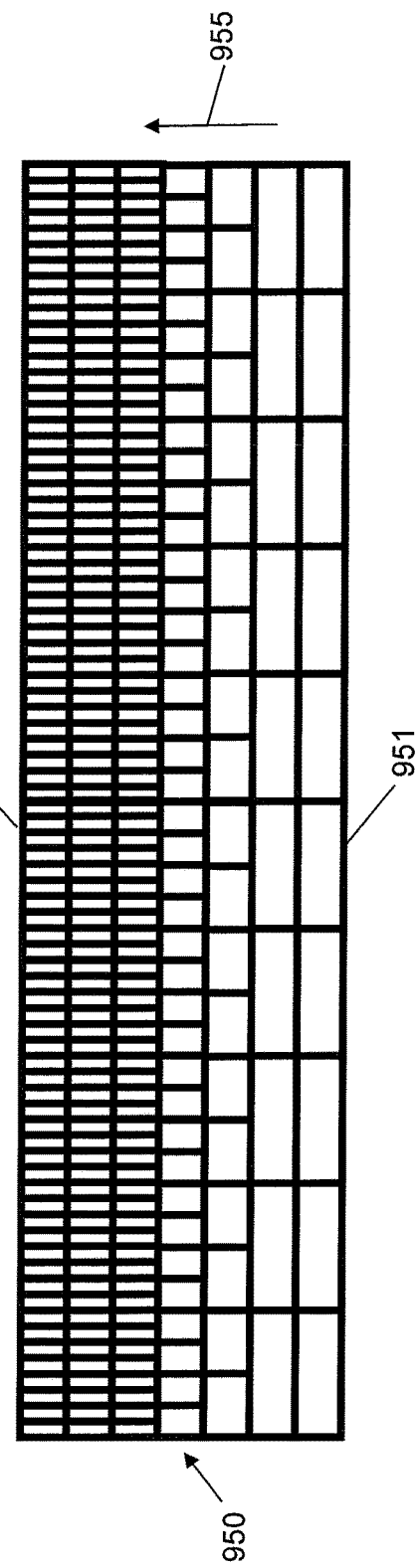
FIG. 9a is a schematic illustration of an internal flow passageway layout geometry designate by the term "rectangular".
FIG. 9g is a schematic illustration of an internal flow passageway layout geometry designate by the term "hexagonal".

FIGS. 9d and 9e illustrate coating flow metering sheets 950 and 960 with flow directions indicated by the arrows 965 and 955. In FIG. 9d the density of flow passageways becomes less from the point where the flow enters the inlet edge 961 of the sheet 960 until roughly halfway across the sheet. From there to the discharge edge 962 the flow passageway density remains constant. The high density of flow passageways at the inlet edge can facilitate filtration of contaminants from the fluid.

In FIG. 9e the density is larger at the discharge edge 952 than at the entrance edge 951. In between there is a transition in the flow passageway density from low to higher. This allows a fluid discharging from the sheet as individual streams to more easily merge together into one continuous ribbon of fluid.

Figure 9F:
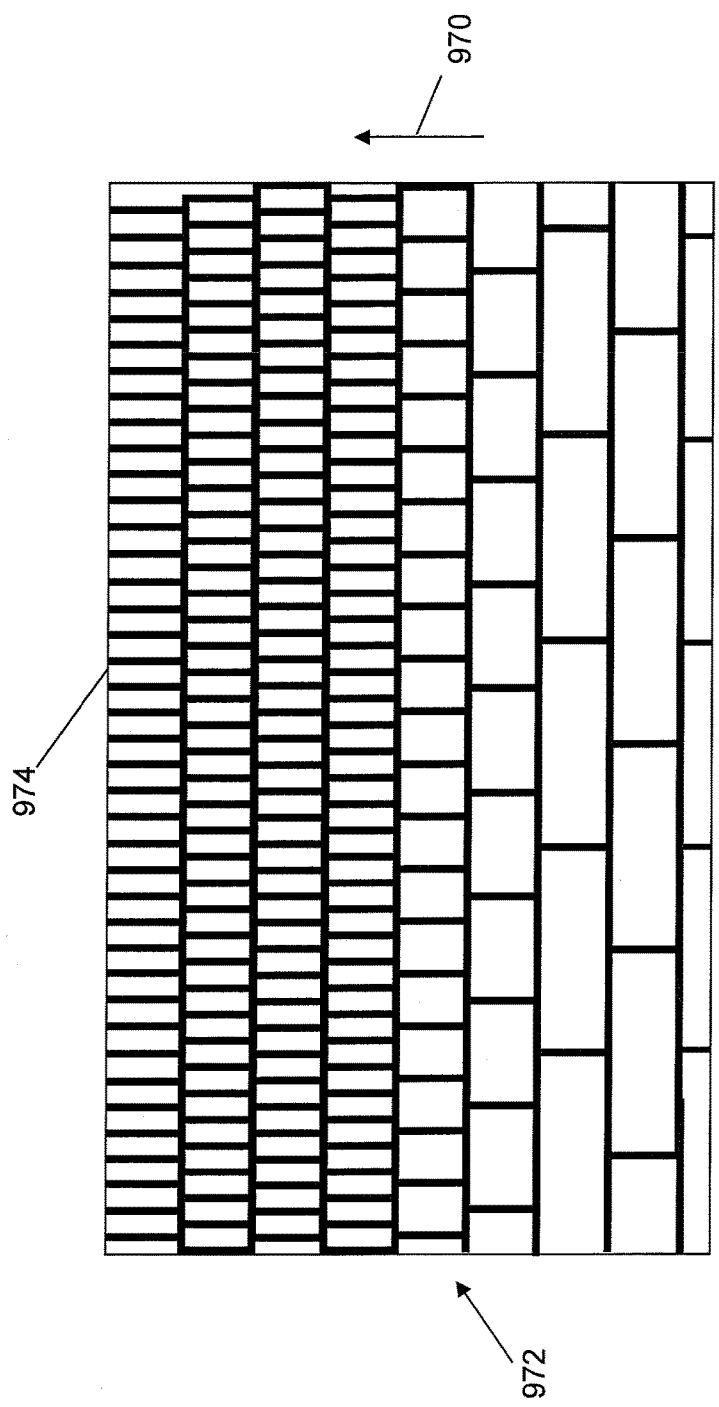

FIG. 9f illustrates still another flow passageway grid in the fluid metering sheet 972 that is useful in promoting uniform flow from a discharge edge 974 where the arrow 970 indicates the flow direction. Again there is not uniformity in the base unit flow cell geometries throughout the sheet in the flow direction. The unit cell is constant with depth position.

Figure 9G:
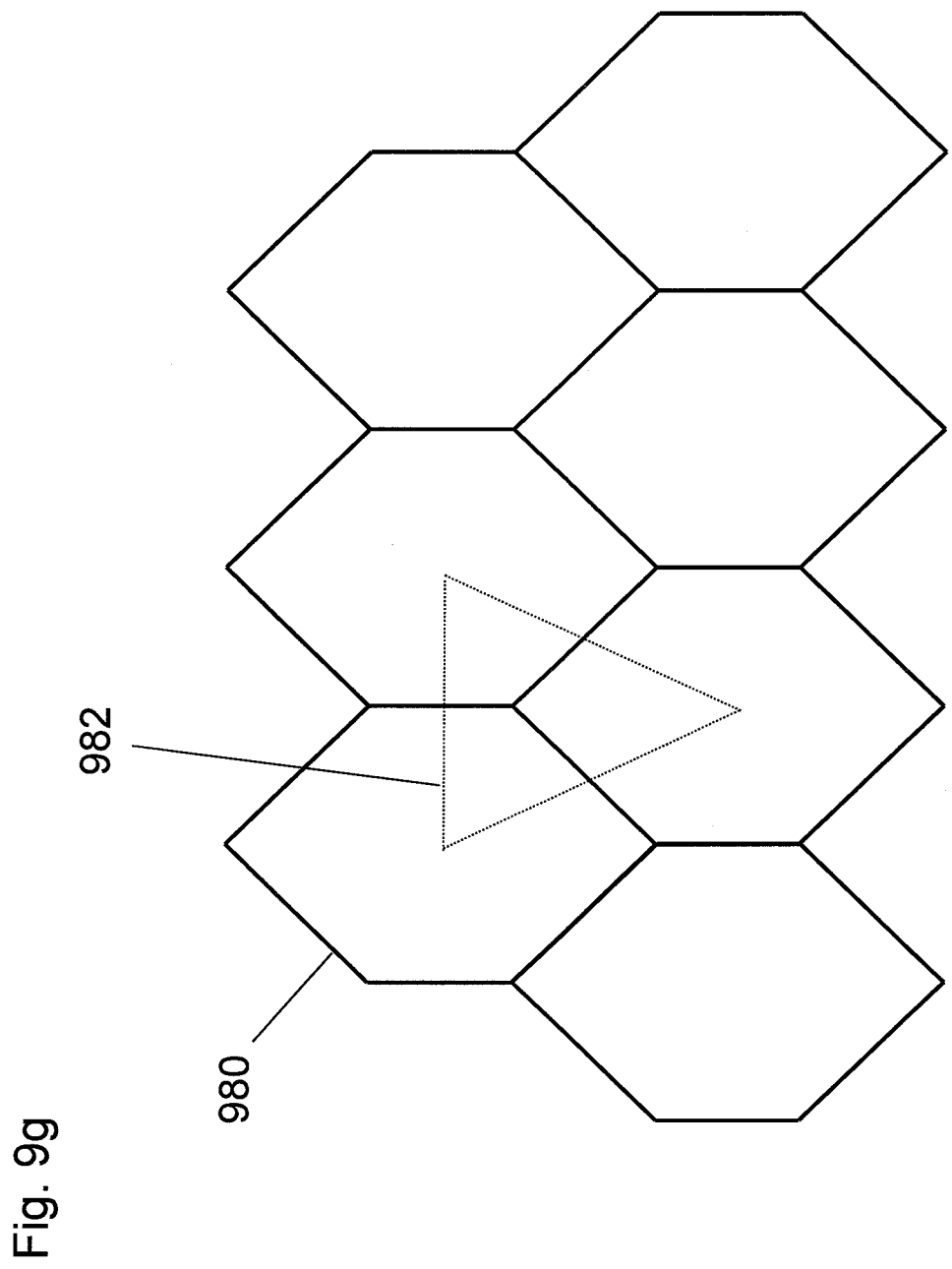

The flow passageway structures of FIGS. 9d, 9e, and 9f illustrate a more general form of improved metering sheets for promoting uniform flow from the sheet outflow edge. In these no flow passageway is dead ended, and the cell structure of the sheet is uniform at a fixed distance from the inflow edge of the sheet FIG. 9g illustrates another useful sheet internal flow passageway grid 980 arrangement wherein the repeating unit cell is triangular. The flow passageway grid geometry is referred to as "hexagonal".

It is a teaching to construct a metering sheet with a base unit cell structure throughout the sheet and to add one or more additional solid structures locally obstructing passageways. It is also a teaching to construct a fluid metering sheet where the base cell structure is interrupted by solid structures, dams, non-flow areas and etc. Additionally, compound sheets containing areas of differing base cell structure are within the scope of the invention.

The unit cells of metering sheets of this invention may be characterized by having a flow passage or passages with a perimeter and a hydraulic diameter. These are scalar quantities defined by a flat plane normal to the sheet and passing through the cell. The hydraulic diameter of the void space passageway of the cell at the plane is defined as four times the open cross sectional area of the void divided by the perimeter of the surface of the void at the plane. For a flow passageway that is cylindrical and normal to the plane the void cross sectional area is pi times the diameter divided by four. The perimeter is pi times the diameter. The hydraulic diameter is then cylinder diameter.

For a slot normal to the plane (a void space contain by only an upper and a lower solid surface at the plane), the area is the height of the slot times the cell width intersected by the plane. The perimeter (the wetted perimeter) is the sum of the length of the slot wall lengths intersected by the plane. The hydraulic diameter equals two times the void height.

FIG. 10a illustrates a fluid metering sheet useful when interfaced with a internal die cavity in metering flow from a coating die used to produce a down web striped coating. The sheet 102 consists of areas 104 which allow flow. These are interspersed with areas 106 which do not allow flow. Arrow 108 indicates the direction of fluid flow from one edge of the sheet to the exit edge. This sheet may be used to communicate fluid dynamically between the internal cavity of a coating die and the external transfer area where fluid is applied to a substrate. Patterned metering sheets of this type are of great utility in the process of stripe coating of adhesives on webs. Many different stripe patterns may be coated with the same die by changing only the metering sheet.

FIG. 10b illustrates a fluid metering sheet flow passageway grid useful in metering flow from a small die cavity and distributing it along a line much larger than the cavity width. This sheet has an inlet edge region along the edges 122a and 122b. It has an outlet region edge 124. Spanning the area in between the inlet and outlet are two different grids of flow passageways that interconnect: grid 126 (indicated by black lines) and grid 128 (indicated by grey lines). The edges 122a and 122b are meant to abut a supply cavity or connect to a fluid source. The grey lines indicate a grid that serves dominantly a distribution function. The black lines 126 illustrate a grid that serves mainly a metering function and if desired a filtration function.

Cross channel 127 is delineated by the heavy grey line. It is where the grids 126 and 128 meet. It is preferred that the passages of this set be designed so that they have a near zero probability of being clogged by the target contaminant. The same is desired for the distribution grid 126.

Flow enters the inlet edge as indicated by the arrows 134, and exits the outlet edge as indicated by arrows 136. Fluid is distributed across the width of the sheet and along the line of the outlet face 124. The grid 128 serves mainly to distribute fluid across the width of the sheet to the upstream side of the metering grid 126. The metering grid serves mainly to meter the flow and filter target contaminants from the fluid. The combination of grids works together. They produce a specified desired flow profile of filtered fluid from the outlet edge 124. This is accomplished by designing and specifying the flow resistance of every passageway in both grids.

By using this type of distribution sheet in a coating die, the internal distribution cavity may be quite small and span only a percentage of the die outflow exit edge width.

For uniform out flow from the sheet, it is preferred that the flow passageways 130 and 132 and those in-between have identical flow resistances and be uniformly spaced. This will produce equal inflow into channel 127 along its length. It is preferred that all the passageways normal to the outlet edge 124 in grid 126 have equal flow resistances.

All passageways of the grid 128 may be made to have a uniform flow resistance by designing their hydraulic diameter variation appropriately.

For Newtonian fluids, the flow resistance through a tube is proportional to its length and inversely proportional to the fourth power of the hydraulic diameter. Therefore, equal resistance in passageways 132 and 130 may be obtained by choosing diameters to compensate for the difference in lengths.

If passage 132 were 81 times longer than passage 130 then a hydraulic diameter ratio of 3.0 between the two would be required for equal flow resistance. If passage 132 were 256 times longer than passage 130 then a diameter ratio of 4.0 between the two would be required for equal flow resistance. Such variations are easily accomplished.

The type of distribution sheet illustrated may be used in coating dies with small cavities to apply fluid to wide substrates. The ratio of the cavity size in the die width direction to die width may be smaller than 0.5, 0.2 or 0.1. This is helpful in designing some styles of simple or inexpensive dies.

Figure 10C:
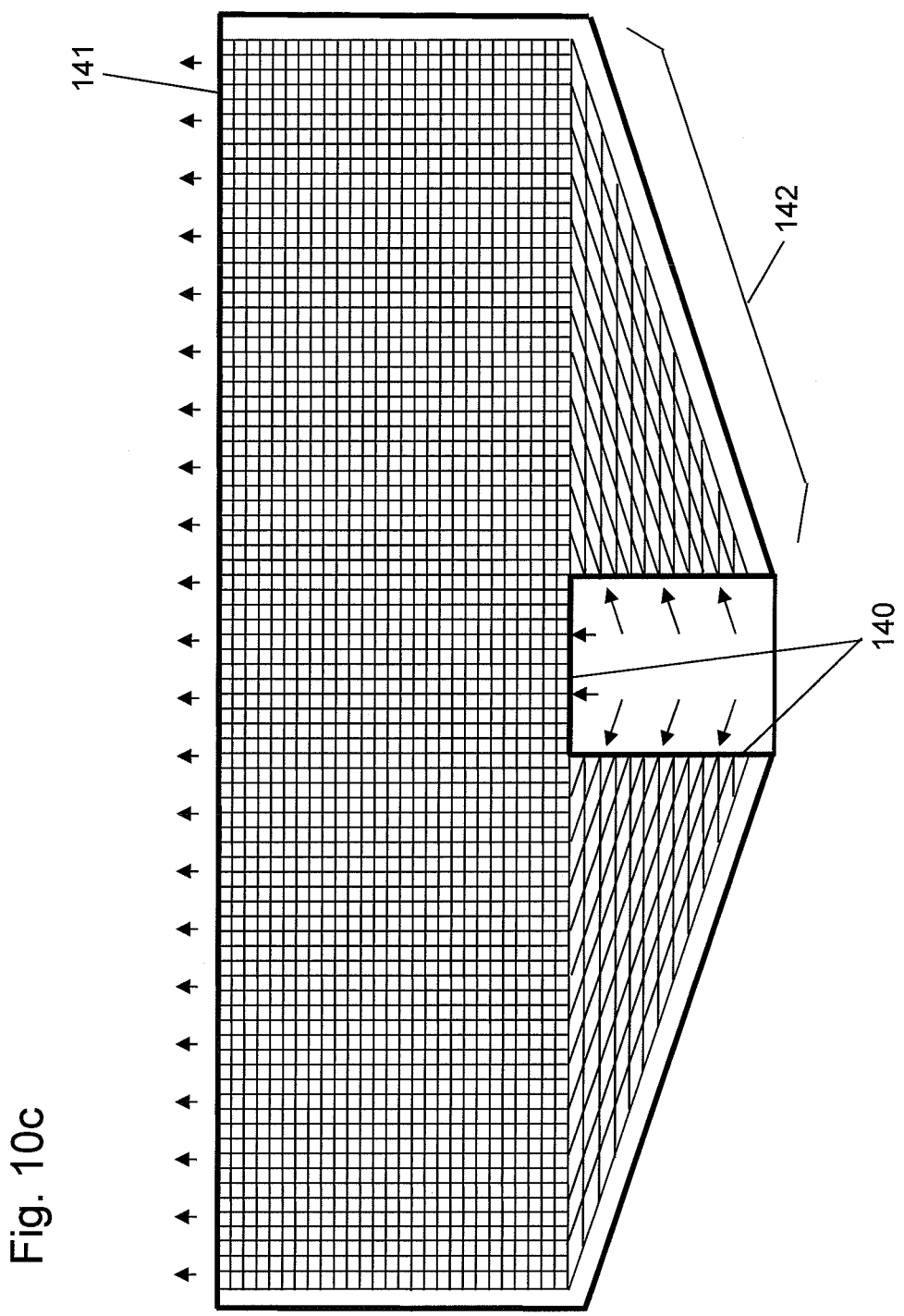

FIG. 10c illustrates another sheet grid design using two different grid designs combined. It is useful for accepting flow through one input flow edge 140, and distributing the flow along a lengthy outlet edge 141. The arrows indicate the flow into and from the sheet. The channels of the grids may be all specified and designed to achieve a large number of distribution purposes including uniform flow from the outlet edge 141. The first grid region 142 may be designed to make it clog tolerant.

An unfulfilled need in the science of coating is the combination of filtration of target contaminants along with the uniform out flow from the outlet edge. Sheets illustrated here may easily achieve this goal with proper grid designs.

Figure 10D:
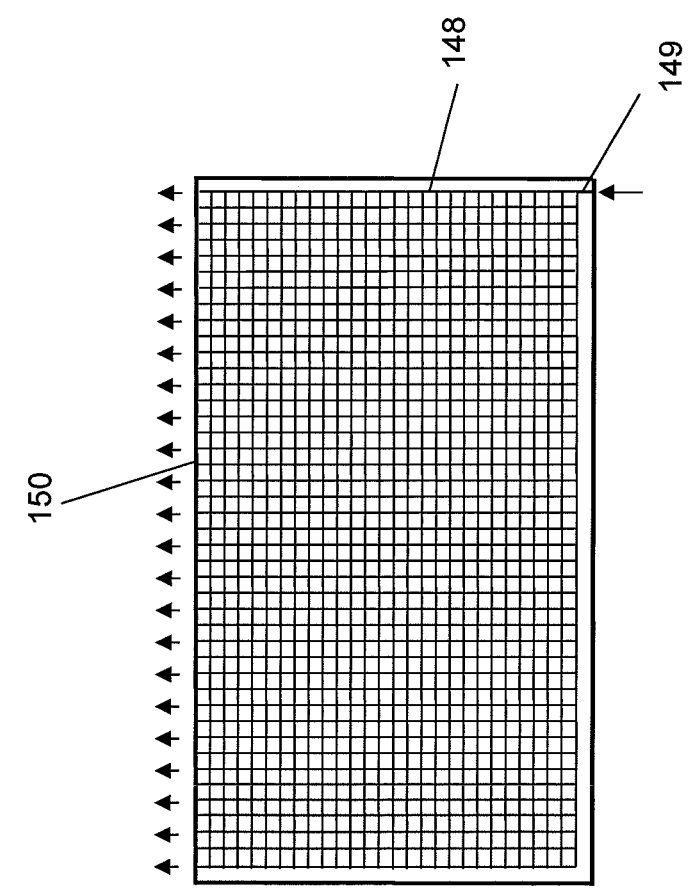

A designed porous distribution sheet may be used to distribute flow from a very small inlet region to a large outlet region. In the extreme we have found that we can design grids to take flow from a single input corner point and distribute it uniformly along a discharge edge. FIG. 10d illustrates such a rectangular sheet useful for distributing a uniform flow indicated by arrows along a linear distribution edge 150. The internal flow grid 148 is designed and engineered to take input flow from passage 149 and distribute it to the output edge.

Multiple sections of grids like in FIG. 10d may be combined to form simple but effective sheets. FIG. 10e illustrates a sheet 143 design where sixteen sections of corner feed sheet grids of the FIG. 10d design have been merged together along a length to form a composite sheet grid region 144b. A single point input grid region 144a interfaces with the region 144b at an interface channel 145 which spans the width of the sheet 143.

Flow enters the sheet through a single passageway 147 in the branching region 144a. The branching passageways of this region serve to distribute flow uniformly through eight passageways into the interface channel 145. Uniformity is achieved by designing this grid with all 29 passageways illustrated with uniform flow resistance. Designs may also achieve uniformity while simultaneously minimizing pressure drop.

Sheet like those illustrated by FIGS. 10a, b, c, d and e may have a complex mix of grid passageway conductance's to obtain a specific outflow distribution, tolerance to clogging, and filtration of target contaminants. The micro-replication techniques referenced above are well suited to the mass production of these sheets. The sheets are well suited for distribution and filtering of low viscosity liquids, and most gasses.

Figure 11B:
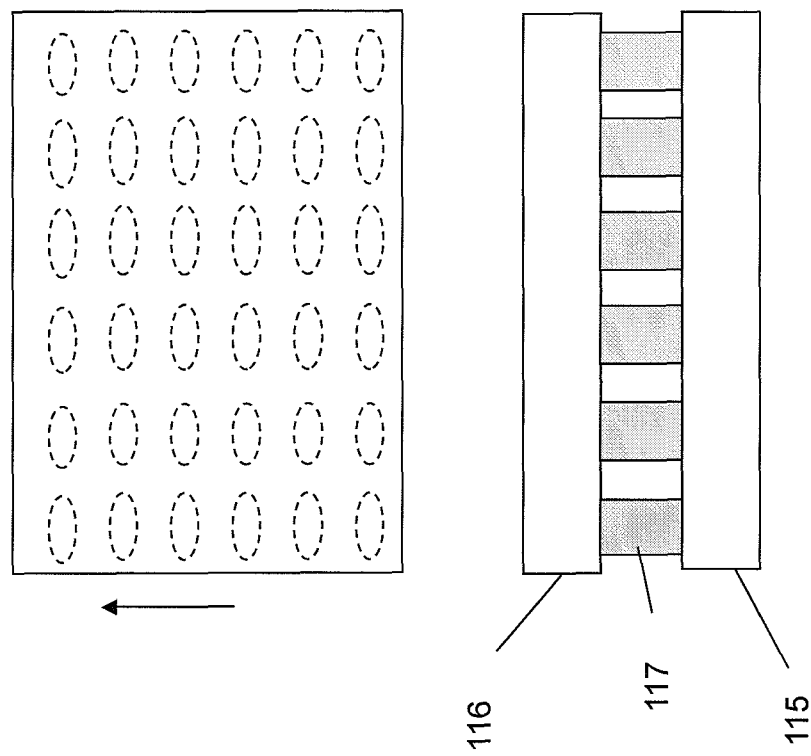
FIGS. 11a and b are schematic illustrations with top and side views of improved metering sheets using a regular structure of cylindrical columns.
FIG. 11c is a schematic with top and side views of an improved metering sheet using a regular array of spherical columns.
FIG. 11d is contains schematic side views illustrations of improved metering sheets using a regular structure of columns of additional profiles.
Figure 11A:
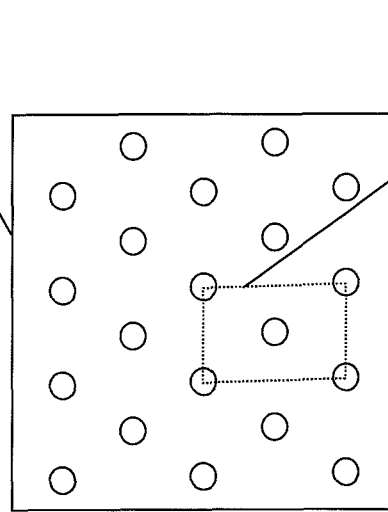

FIGS. 11a, b, and c illustrate useful internal metering sheet structures produced from column structure combinations.

Metering sheets of this invention may consist of regularly spaced columnar structures. These columns may extend from one surface of a sheet base as illustrated in FIG. 11a. Here the sheet 110 is formed with a base 113. From this the column structures 112 extend for a fixed distance. These columns 112 may be cylindrical with constant diameters or other forms. The columns are arranged across the surface of the sheet in a regular, repeating pattern of unit cells one of which is indicated by gray dotted line 111. When this sheet is sandwiched between two confining solid surfaces the void volume becomes the fluid transport means.

As shown in FIG. 11b, the sheet itself may consist of a top and bottom bases 115 and 116 with columns 117 spanning between the two. The elliptical columns here are preferred to circular cross section columns. With the columns 117 as shown, the unit cell passageway in the direction of flow indicated by the arrow will have a higher flow resistance than the perpendicular passageway of the unit cell. It is preferred that the ratio of the cell passageway flow resistances, Rd/Rw, be greater than one. Rd is the passageway resistance in the depth direction and Rw is the resistance in the width direction.

Still another columnar based metering sheet structure of our teaching is shown in FIG. 11c. Here a placement of spheres 118 in a square grid arrangement makeup the inventive sheet. These spheres are interconnected at their mid-sections. When the sheet is confined between two surfaces 119, the enclosed void volume 120 provides precision fluid flow distribution flow passageways. A sheet made using spheres deformed by elongating them all in the rectangular sheet one direction and with spatial locations chosen so that the resistance ratio Rd/Rw is greater than one would be more preferred. This will promote generally more uniform outlet distribution of flow.

Figure 11D:
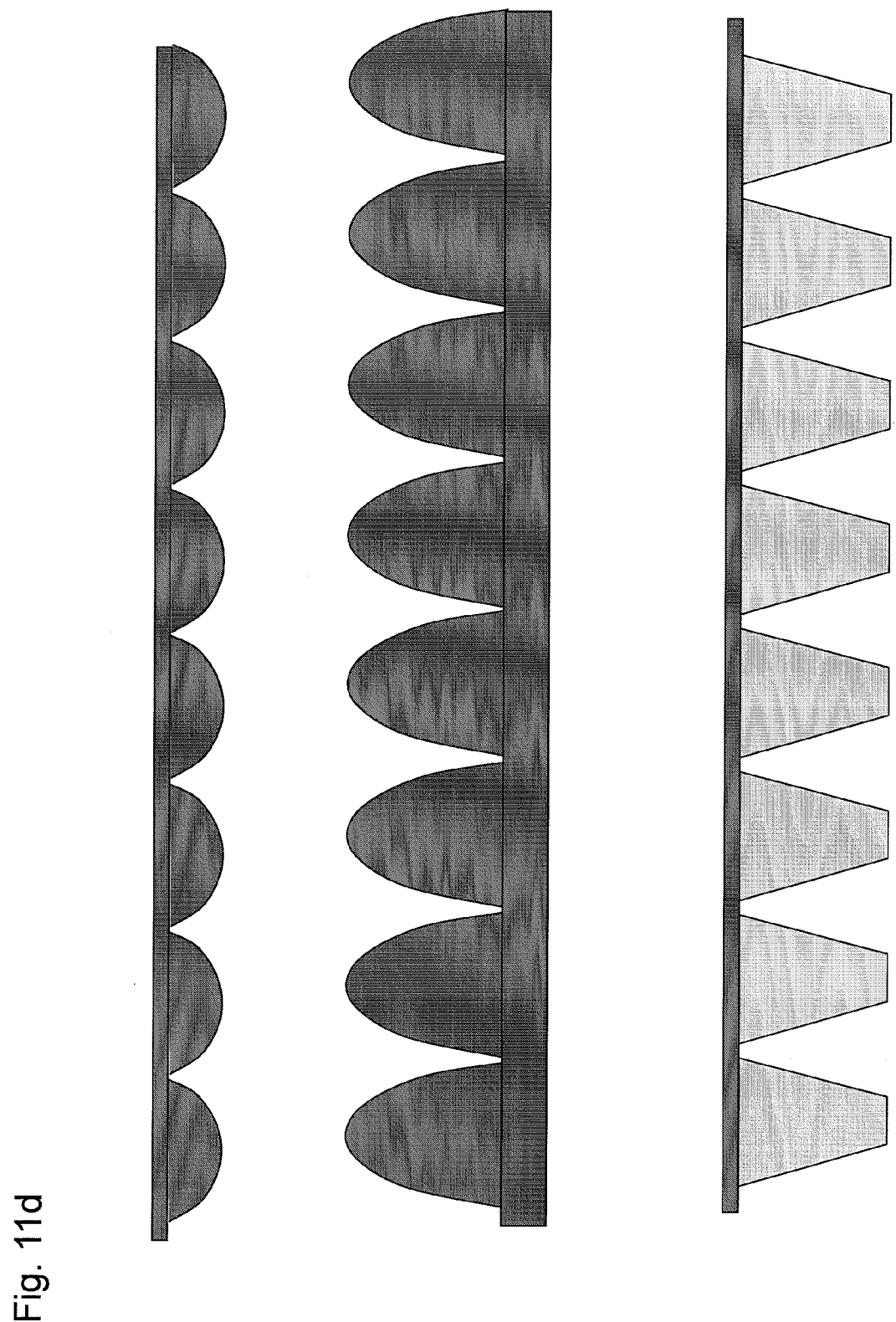

Many other useful spaced column profiles are possible for forming metering sheets. Three additional examples are shown in side view profile in FIG. 11d.

Those knowledgeable in the art will recognize that useful composite metering sheets may be formed by layering two or more metering sheets between two confining die walls. In this manner the total fluid conductance may be increased. It may be doubled by using two sheets of the identical design or tripled by using three sheets.

2. Sheets Using 3-Dimensional Cell Structures

Figure 16:
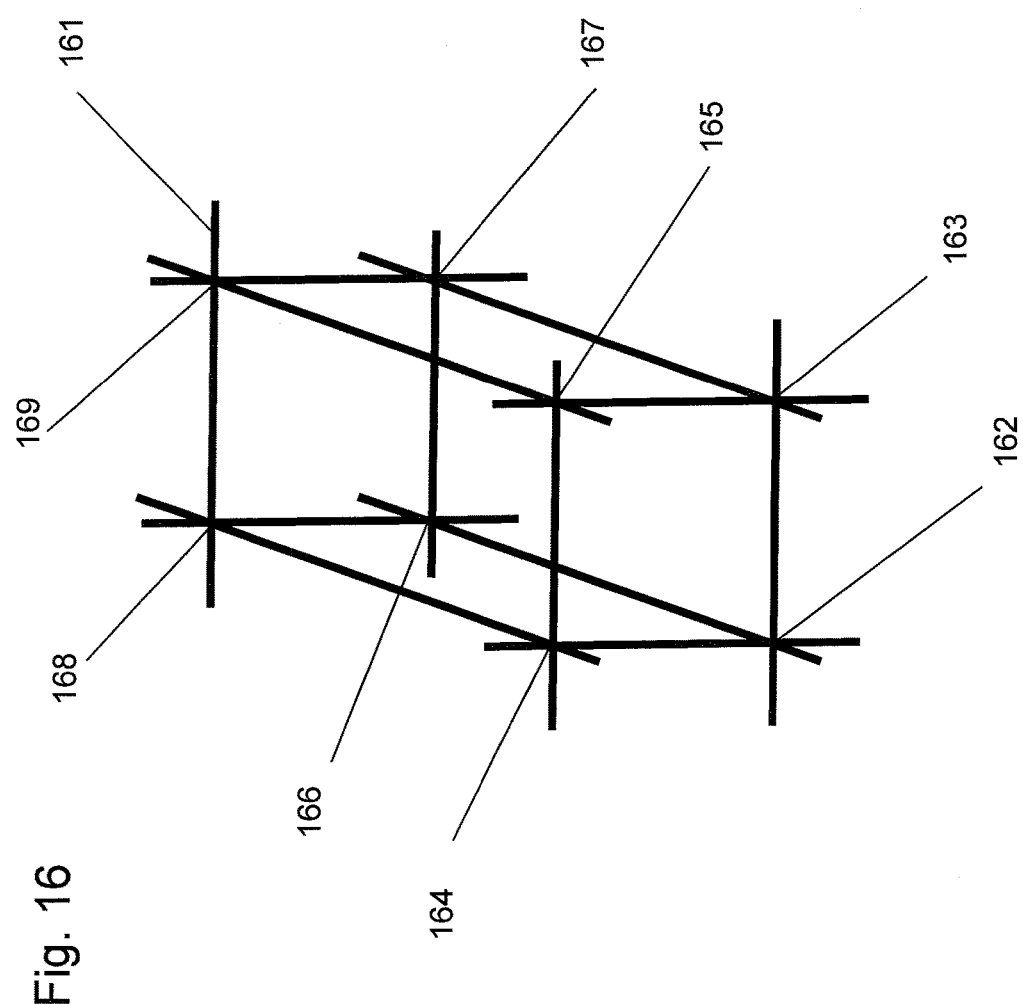
FIG. 16 is a schematic illustration of a 3-dimensional cell structure of an improved metering sheet.

The sheets described above all use planar grids of flow passages. It is also a teaching of this invention to use three dimensional grids of flow passages often referred to as "3D grids". One example is illustrated in FIG. 16. Here a cubic like grid of passageways 161 is used to distribute flow in three dimensions. It may be thought of as two planar arrays of cells stacked on top of each other with additional passages extending through each plane and intersecting the other.

In the cell of FIG. 3, the intersection of the two passages, the nodal point of the cell, has a coordination number of four. Four passageways extend from each node. The passages extend in two dimensions. In the pore structure of FIG. 16, the nodal points have a coordination number of six. The higher coordination number and the three dimensional interconnection of passageways can produce improved fluid flow performance over a single sheet or stacked sheets with only planar flow grid geometries.

For the sheets with the geometry illustrated in FIG. 11c, it should be noted that the grid of passages are three dimensional when top and bottom capping layers are used. When multiple sheets of this geometry are stacked, thick three dimensional arrays of passages may be formed.

It is also a teaching of this invention to create flow distribution and filtering sheets of granular, particulate, open cell foams or other porous materials by using capping films on one or both major surfaces. These confine the available flow paths to within the sheet when in use. Such sheets may not be highly accurate in flow distribution. There is variation of the internal pore sizes. However, fluid distribution from one sheet edge to another without loss through a major surface has utility in many applications.

3. Modeling Metering Sheets

The use of Darcy's Law to describe flow in metering sheets has limited value. It has been found a more detailed analysis of the flow in each individual flow passageway and modeling the actual connectivity of a flow passageway is useful for design of devices employing metering sheets.

Flow models may be used to accurately describe the distribution of flow rates from metering sheet dies. Using known flow modeling principles, a model of flow through multi-passageway media was developed. With this model each passageway of the media is considered as a discrete element and the flows and pressure drops for all are simultaneously calculated. The Reynolds number for each passage is very low, and the effects of gravity and inertia are not generally important. A Stokes flow model is assumed for our work. The models may be used to design the performance of sheet and to design devices constructed using the sheets. Of course with enough computing power, one need not make the Stokes flow assumption, but little is added to the accuracy of the predicted flow from the outlet edge of a sheet.

Many different fluids exist. They may be characterized by their rheology. The standard fluid for all first investigations and modeling fluid devices is a Newtonian fluid. These are characterized as having a constant viscosity that is independent of flow rate. All simulation results in this disclosure are specifically for Newtonian fluids. Newtonian fluids are generally used for defining design principles, illustrating preferred embodiments of the invention, and determining certain features of the elements, apparatus and methods of the invention. Persons with ordinary skills in the art will recognize that the teachings pertain to all fluids in general.

We have modeled sheets that have both uniform and non-uniform internal flow structures. For a distributing die using a cavity to feed a metering sheet and when all flow passageways in the metering sheet have equal conductances, it is found that the flow uniformity is dominated by one variable. Uniformity is primarily a function of the ratio of the viscous flow conductance down the length of the cavity to the total composite viscous flow conductance through the whole sheet from the cavity to the sheet exit edge. This ratio is referred to as the "dimensionless sheet die viscous number" and identified with the symbol Nvs. For any sheet grid geometry, the total grid composite conductance equals the volumetric flow through the sheet divided by pressure drop from inlet to outlet edge of the sheet. This may be calculated or measured experimentally.

In the case where incremental cavity flow resistance changes along its length, it is appropriate to define Nvs in terms of an average cavity flow resistance. An example is the length average. Other definitions of "average" are envisioned and are dependent upon the geometry and fluid properties along the cavity.

We have modeled and studied many sheet grid geometries including those that have uniform structures. Sample results have been obtained for the sheet flow passageway geometries of FIGS. 4a, 6a, 8a, 9a and 9g. These geometries are referred to as the square, diamond, triangle, rectangle, and hexagon grid geometries respectively. These and other grid geometries may be fed from a cavity of constant cross-sectional area and shape along its length.

Three studies defining the utility of metering sheets have been undertaken. The first considers the uniformity of flow from devices where a cavity directs flow into a rectangular distribution sheet. The second investigates the ability of a sheet's design to overcome blockages of internal passageways and still produce uniform outlet flow. The third study investigates the ability to uniformly distribute flow when the sheet inlet edge is not feed by a long cavity but feed at a single point.

Cavity fed rectangular sheets are considered in the following. The cavities are assumed to have constant cross-sectional areas.

a. When all Grid Passages Have Equal Conductance

For fabrication purposes, it is useful but not necessary to create a flow passageway grid structure where all flow passageways have identical viscous flow conductances. For this case, it is found that conservative estimates of the out-flow uniformity index for a cavity and sheet device is given by the equation:

$$UI = 2A\{0.995A - 0.3334A^3 + 0.13334A^5 - 0.05397A^7\}$$

where $A = 0.5\{(Nvs)^{0.500}\}$,
and where Nvs is <1,
and the sheet depth to width ratio is less than 0.5,
and the depth of the sheet is greater than 9 unit cells.

A simpler, somewhat less accurate design expression is given by the equation:

$$UI = 0.46 Nvs.$$

The uniformity index, UI, is defined as the maximum local outflow minus the minimum local outflow rate along the width of the sheet divided by the average rate.

Based on our studies, a fluid distributing die with a cavity and a metering sheet should have a ratio of cavity to sheet viscous conductance less than 1. This will achieve a UI value below 0.5. For shear thinning fluids it will be larger.

It is more preferred that this ratio of conductances be below 0.5. Here the achievable "Flow Uniformity Index" will be below 0.25 giving a more uniform flow distribution. Still more preferred is a ratio of viscous conductance less than 0.1. This will produce a "Flow Uniformity Index" below 0.05.

Most preferred are die designs where the geometry results in a viscous ratio less than 0.04. This achieves a "Flow Uniformity Index" less than 0.02. For shear thinning fluids the uniformity index will be larger so that these values of the conductance ratio, Nvs, provide an upper limit for the conductance ratio which should not be exceeded.

b. Grid Passage Conductance Unequal in Two Directions

The passageways for the grid need not have uniform conductance. In the case of a square grid, it is useful to have passages in the depth and the width directions with different conductance.

When a distribution sheet with a square grid of internal passageways is fed from a cavity, in the general case the passages in the width direction may have a conductance different from those in the depth direction. The performance of the distribution system may be improved with proper choices of conductance.

The sheet composite conductance through the sheet across its width and perpendicular to the depth direction with all the internal grid passageways acting together is Csw. It may be calculated or measured experimentally. The dimensionless sheet viscous number in the width direction Nvsw is the ratio Csw to the conductance of the cavity.

Extensive modeling has shown that the uniformity index is a very strong function of Nvs, and a function of Nvsw. It may be approximated by the equation:

$$UI = 0.466 Nvs^{0.098}(1 - Nvsw)$$

where Nvsw is less than 1, where w/d is greater than 2, and where Nvs is between 0.01 and 1. When sheet output uniformity is desired, and Nvsw is greater than 0.00000001, a value of less than 0.5 is preferred, a value of less than 0.25 is more preferred, and a value of less than 0.1 is most preferred.

For all values of Nvs significant improvements in the sheet out flow uniformity are obtained when dimensionless sheet viscous number in the width direction is greater than 0.1. This is illustrated by tabulated uniformity data in FIG. 88.

i. Overcoming Sheet Passageway Clogging

Besides enabling good flow distribution, metering sheets provide a tolerance to clogging of internal passageways. The presence of grid passageways which allow flow in the direction parallel to the supply cavity provides a means to heal any flow up sets caused by clogging passages within the sheet.

The ability to a redistribute flow around a clogged passage has been extensively investigated. A significant characteristic of the grids in a metering sheet is the flow uniformity downstream from a clog. If the local flow distribution is uniform at a distance downstream from a clogged passage, the local flow uniformity index equals zero. Immediately downstream from the clogged point there is no flow in the direction of flow through the grid toward the outlet edge, and the local index is along a line perpendicular to the direction of flow is equal to 1.0. There is no flow in the clogged passage leading away from the obstructed point. As one moves downstream from this point successive cross flow passages allow flow to be reestablished in the passage directly in line with and leading towards the outlet edge.

After each successive crosswise passage the uniformity of the local flow distribution improves. This may be quantified by the local uniformity index after each successive cross passageway. It is found that the improvement in uniformity, the healing of the flow defect, is a direct function of and dominated by the ratio of the cross flow passage resistance to the depth direction passage resistance, Rw/Rd. The local uniformity improves as the ratio decreases and as the number of cross flow channel increases.

For countering clogging problems, it is preferred that the ratio be less than 100. It is more preferred that the ratio be less than 10. It is most preferred that the ratio be less than 1.0. With a sufficient number of cross channels, it is found that in all cases a usefully uniform flow from the sheet may be achieved.

ii. Feeding Distribution Sheet at a Single Point

Another characteristic of the metering sheets are their ability to take flow inputted at one point at an inlet sheet edge and distribute it with adequate uniformity along an outlet edge. Such a sheet could produce uniform flow at the outlet edge when all but one of the flow pathways into the sheet input edge is clogged. This design could perform well when the fluids are highly contaminated.

Rectangular metering sheets have been extensively studied for this single input case where the inflow is introduced at one edge of the sheet. It is found that the uniformity of the flow from the outlet edge of a sheet is dominantly dependent upon a single dimensionless parameter, Nsp. This parameter equals the sheet width divided by sheet depth and all times the square root of the quantity the resistance of an individual passageway in the width direction divided by the resistance of an individual passageway in the depth direction.

$$Nsp=\{w/d\}\{sqrt(Rw/Rd)\}$$

When the parameter increases the uniformity index decreases.

Figure 88:
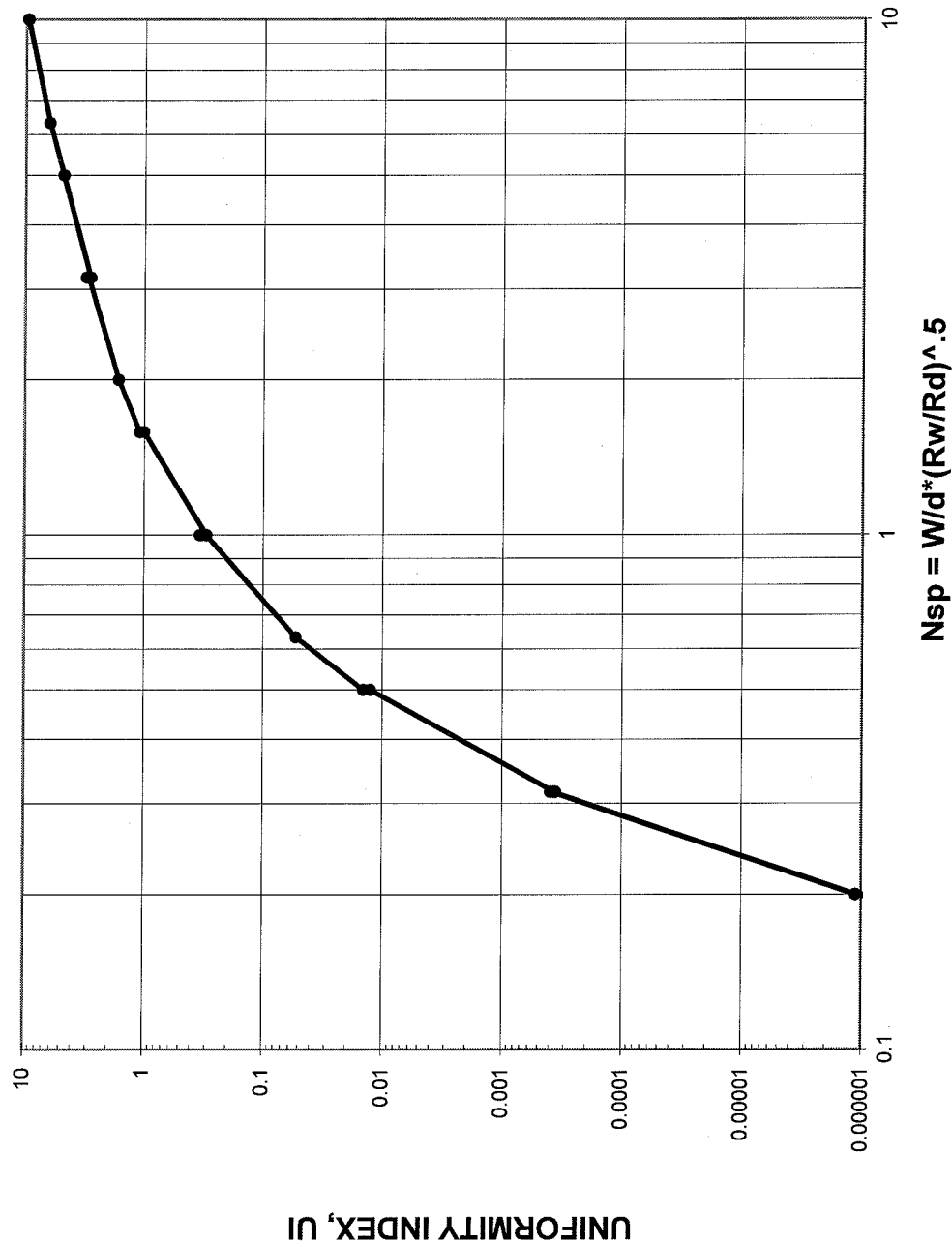
FIG. 88 is a graph of the uniformity index for flow from metering sheets.

FIG. 88 graphs our findings for the variation of the uniformity versus the parameter Nsp. The data is accurately fitted by the equation:

$$UI=e^x$$

where $x=-1.3537Nsp^4+3.4267Nsp^3-3.6685Nsp^2+3.0575Nsp-0.4899$.

It is found that for square grids flow from all passageways exiting the outlet edge of the metering sheet may be obtained if the parameter Nsp is less than 1.5. Better uniformity may be obtained if the parameter Nsp is less than 0.75. And still better uniformity may be obtained if the parameter Nsp is less than 0.6.

If a sheet inlet edge is fed by an inlet cavity that flow from the cavity to the sheet through more than one grid passageway, the flow uniformity is improved over that results obtained by a single feed point as describe in the previous paragraph Surprisingly it is found that just a limited number of single feed points to the metering sheet can reduce the uniformity index from a totally unacceptable value to a desired very low value. For example if the sheet width to depth ratio is 10, and the ratio resistance ratio Rw/Rd is 4.0, then feeding the sheet at a single point at an end of the sheet width will result in an uniformity index of about 2. If the sheet is fed at two points, one at the one-quarter point along the width direction and the other at the three-quarter point, the uniformity index is reduced to a very desirable 0.04 value. If the sheet is fed at four points, at the one-eighth, three-eighths, five-eighths and seven-eighths points along the width direction the uniformity index is reduced to an extremely desirable 0.0004 value.

FIG. 10e illustrates a metering sheet that employs the design principle described in the proceeding paragraphs. It schematics pictures a sheet with a composite grid geometry where eight spaced final distribution grid entrance points are used.

Metering sheets of this invention produce uniform fluid flow from their discharge edge when the design parameters are properly selected. They are also generally insensitive to clogging by particles in the fluid. Solid matter can collect at the inlet edge of the sheet as the fluid flows into it from a feed cavity. When 80 percent of the flow passageway entrances are clogged, one would expect an unacceptable distribution of flow at the sheet exit and throughout the whole sheet. FIG. 12 illustrates that this is true for conventional porous sheets where the pore sizes are distributed about an average.

This figure is a grey scale contour graph the local average flow rate at a point. Each position on the graph represents a location looking down on the sheet. The grey scale plotted at that position indicates the ratio of the local flow rate in the direction toward the exit edge divided by the average flow rate. As indicated by the legend, black color indicates greatly reduced or excessive flows. A white color indicates flow at or near the average.

FIG. 13 graphs the flow distribution for an improved metering sheet for the same 80 percent blockage condition shown in FIG. 12. The disruption from the blockage at the inlet side of the sheet is substantially mitigated by the sheet design. The flow at the exit is shown to be better than the range of plus or minus ten percent of the average. The flow passageways of the sheet are arranged in a square grid.

More detailed results are shown in the graph of FIG. 14 where the actual local flows at the sheet outlet are plotted. Here the variation in the exit flow rate is plotted both for the simulated commercial porous sheet (labeled "Porous Sheet"), and for the improved metering sheet. For the commercial sheet the variation is plus 97 percent and minus 40 percent. For the improve sheet the variation is plus or minus 5 percent. This is a vast improvement. A metering sheet also offers performance improvements over distributing slots when clogging conditions exist.

Of course, additional actions may be employed to improve the uniformity of a coating applied from a coating die. U.S. Pat. No. 5,262,194 to Louks, et. al., discloses applying ultrasonic energy to excite the line of initial contact between the coating fluid and the substrate to provide a coated material of increased crossweb uniformity than would be otherwise present without the ultrasonic energy. However, the method does require additional process equipment and can result in increased complexity to the coating operation. The new concept disclosed in this invention corrects potential coating non-uniformities prior to being coated on the substrate.

4. Filtration Using Improved Metering Sheets

Filtration is the term used to describe the removal of contaminants from flowing fluid. It is an extremely important industrial process with uses ranging from pollution abatement, mineral recovery, polymer processing and a multitude of other material processes in chemical, biological and petroleum industries. When a porous medium acts as a filter and the suspended particles in the fluid being processed are larger than the pore or restrictive flow regions of the pores (pore throats), the process is commonly referred to as screening or straining. It is the filtration process considered here.

Straining large particles is essential for polymer processing, and coating. Large particles obstruct flow and can create point defects, functional anisotropic regions, and a multitude of other problems within products. In optical products the malfunctioning of even one area as small as one pixel can be cause for rejection of the product. Generally these large particles range from ten to thousands of micro-meters in hydraulic diameter.

In an embodiment of our invention, the fluid distribution and metering sheets function both as a final filter to remove contaminants, and to distribute fluid. FIG. 13 illustrates ability of a very simple sheet to both trap targeted particles and distribute fluid. Here the particles challenging the sheet are approximately the size or the passages or larger. In this example all of the passages directing flow from the inlet supply manifold have a probability of stopping the contaminant particles equal to 1. By definition a probability of capture of 1 means that any particle presented to a passage will be trapped, and it will clog the passage. Therefore, all the particles are collected at or in the entrance passageways at the inlet face or edge of the sheet. As such, the filtration ability here is generally proportional to the inlet face area.

Such a sheet design can be adequate for low particle concentrations. But the number of particles that may be filtered is limited. As more and more particles challenge the sheet enough of the passages at the entrance edge may become clogged to destroy the outlet uniformity. As still more particles challenge the sheet, the pressure drop through the sheet may increase beyond limits for a given flow rate, or the flow may be totally stopped. Improved sheet passageway grid designs have been developed to substantially postpone these problems and to allow filtration of many times more particles than in the FIG. 13 example.

A target contaminant particle generally is irregular in shape and has a nominal hydraulic radius dependent upon its orientation in a flow field. Flow passages of porous media may have uniform flow resistances per passage on the average. However, there are variations of their hydraulic radii from point. Because of this, the capture probability of a particle of a particular hydraulic radius passing through a passage of the same radius may be one or less than one. Additionally, a collection of particles of a nominal size will actually have a distribution of sizes about the nominal. This also adds to the statistical nature of the particle screening, trapping process with which we are concerned. Therefore, the capture probability for the transit through a passageway for the target particles is a variable of importance. Generally it is a design parameter that can be fixed for a passageway on the average when a large number of target particles are considered.

5. Further Improvements in Metering Sheet Filtering

Improved filtration using a sheet may be accomplished in a number of inventive ways. These have been found and defined by the use filtration process models.

Consider the case where the concentration of target particles is low. So low that in a specific unit of time only one particle passes into the inlet sheet edge. In this situation, the probability of particle capture in a specific passage is the product of the probability of the particle being in the fluid flowing through the specific passage multiplied by the probability of capture of the particle.

The probability of the particle being in the volume of fluid flowing through a passage equals the ratio of the flow rate through the passage to the total flow rate. The probability of the particle being captured while flowing into or through a passage is a function of multiple variables. When filtering is accomplished by sieving commonly one variable is the ratio of the particle hydraulic diameter to the passage hydraulic diameter. Another is the flow rate through the passage.

Filtration modeling may consider contaminant particles where the sizes are all uniform and the capture probability is known for that size. More complex modeling may consider: populations of contaminants having a distribution of sizes; pore capture probabilities that are dependent upon particle size, pore flow, pore size, and past history; populations of pores having a distribution of sizes; and many other parameters.

Consider a distribution sheet with only one plane containing a two dimensional square grid of passages as illustrated in FIG. 4a. Here eleven rows of passages span the depth of the sheet. The depth is measured from the bottom where the flow enters as indicated by arrow 35 to the edge where the flow exits as indicated by arrow 36. The width of the sheet contains thirty four channels directing flow to the sheet outlet. Further consider the case where the probability of capture of a target particle in each passage is less than 1.0 and even much less than 1.0. Surprisingly, it is found that nearly 100 percent of the particles entering the grid are captured.

A filtration improvement is to modify the grid of passages so that the probability of capture of a target particle in the entrance edge passages, the "entrance composite probability", is less than one. Preferred is to have the entrance composite probability substantially less than 1.0 while simultaneously having the probability of capture by the remaining passages near or at 1.0. More preferred is to have the flow past through successive regions with each have these characteristics.

While much effort in the past has been devoted to modeling flow through porous media using a continuum approach, network models allow investigation of the microscopic details of the filtration and flow processes. They have been used for this teaching.

A network model employs a regular or random array of pores and throats with specified geometry and topology. Statistical variation of these may be used to model known granular porous filter media. A network model can deal with pore scale behavior of fluid flow and particle collection. Such models have also been used in the study of infiltration and two phase flow transport problems in oil and gas extraction and also soil percolation. We have used this technique to develop unique media and devices. The modeling is discussed in greater detail in a later section.

6. Multilevel Distribution Grids

Those with ordinary skills in the art of fluid flow and distribution will recognize that three dimensional flow grids are a natural extension of the two dimension planar grids discussed above. Expanding the grids with channels in the direction of the metering sheet's thickness may improve its ability to distribute flow and to reduce the pressure drop through the sheet. Three dimensional grids are quite helpful for improving filtration.

7. Fluid Distribution Along Non-Straight Lines

The preceding discussion has dealt with fluid distribution along a straight line. Those with ordinary skills in the art will recognize that the invention may be used to distribute fluid along a line that is not straight. The invention may also be used to distribute fluid with a controlled variation along the distribution line. The controlled distribution variation may be achieved by designing the sheet flow passageway structure with controlled variation of the viscous conductance. It may also be achieved using a deformable sheet where deformation adjusts the local conductance of the sheet. Compressible sheets where the flow passageway volume may be manipulated are useful.

Figure 15:
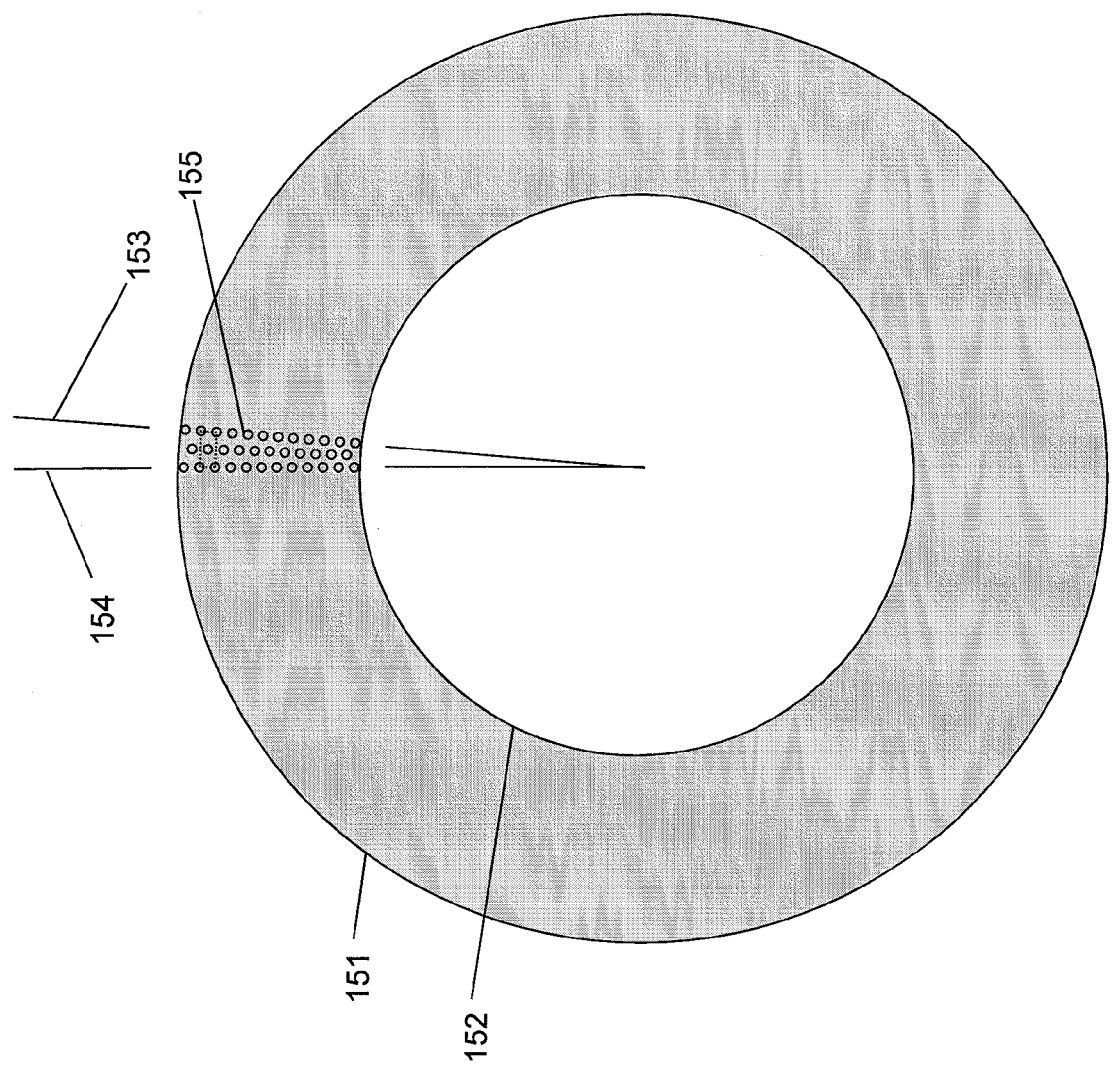
FIG. 15 is a schematic illustration of an improved metering sheet for distribution of flow from a circular sheet face.

It is common in industrial fluid distribution to require fluid to be discharged along a lie that is circular. FIG. 15 illustrates such a sheet with an inner circumference 152 and an outer circumference 151. On this sheet are located protruding columns 155 a portion of which are shown between radial lines 153 and 154. These and the columns not shown are spaced along radial and circumferential lines so as to provide the desired flow distribution along the outer circumference 151.

In each of the above uses of improved metering sheets, it is preferred that the internal flow passageways and flow grids of the sheet are designed so that first there are no dead ended passageways in the bulk of the sheet and away from edges or confining surfaces. Additionally, the flow passageways are interconnected so fluid may flow from any flow passageway to any other flow passageway. The passageway flow conductance of the flow passageways are specified by the sheet design, and the location of the passageways and flow passageway intersections are fixed by the sheet design.

8. Methods of Manufacturing Metering Sheets

Metering sheets may be fabricated from many materials by many different methods. The techniques of making structured surfaces are applicable to making improved metering sheets. The making of structured surfaces on a polymeric layer such as a polymeric film is disclosed in U.S. Pat. Nos. 5,069,403 and 5,133,516, both to Marentic et al. Structured layers may also be continuously replicated using the principles or steps described in U.S. Pat. No. 5,691,846 to Benson, Jr. et al.

Structured polymeric metering sheet media produced in accordance with such techniques can be replicated and micro-replicated. The provision of replicated structured layers and metering media is beneficial. They can be mass produced without substantial variation from piece to piece and without complicated processing techniques. The replicated surfaces and the replicated flow passageway defining surfaces preferably are produced such that the flow passageway features retain individual feature fidelity during manufacture from piece-to-piece.

Metering fluid transport sheets for any of the invention embodiments can be formed from a variety of polymers or copolymers including thermoplastic, thermoset, and curable polymers. As used here, thermoplastic, as differentiated from thermoset, refers to a polymer which softens and melts when exposed to heat and re-solidifies when cooled and can be melted and solidified through many cycles. A thermoset polymer, on the other hand, irreversibly solidifies when heated and cooled. A cured polymer system, in which polymer chains are interconnected or crosslinked, can be formed at room temperature through use of chemical agents or ionizing irradiation.

Polymers useful in forming metering sheets in articles of the invention include, but are not limited to, polyolefins such as polyethylene and polyethylene copolymers, polypropylene, ethylene/vinyl acetate polymers, ethylene/ethyl acrylate polymers. Other useful polymeric materials include vinyl polymers (e.g., polyvinyl chloride, polyvinyl alcohol, vinyl chloride/vinyl alcohol copolymers, polyvinylidene chloride, polyvinylidine diflouride (PVDF)), acrylate polymers (e.g., polymethyl methacrylate), polycarbonate polymers, polyesters (e.g., polyethylene terephthalate), polyamides (e.g., Nylon), polyurethanes, polysaccharides (e.g. cellulose acetate), polystyrenes (e.g., polystyrene/methyl methacrylate copolymer), polysiloxane polymers (e.g., polysiloxane and organopolysiloxane polymers). Metering sheets can be cast from curable resin materials (monomer and prepolymer mixtures) such as acrylates or epoxies and cured through free radical polymerization pathways promoted chemically, by exposure to heat, electromagnetic radiation or electron beam radiation. Plasticizers, fillers or extenders, antioxidants, ultraviolet light stabilizers, surfactants, and the like may be utilized within the polymers for the invention.

The metering sheet could also be made from materials other than polymers if desired. Metals, ceramics, super cooled liquids, organic and inorganic materials may all be used.

Polymeric materials including polymer blends can be modified through melt blending of plasticizing active agents such as surfactants or antimicrobial agents. Surface modification of the structured surfaces can be accomplished through vapor deposition or covalent grafting of functional moieties using ionizing radiation. The polymers may also contain additives that impart various properties into the polymeric structured layer. For example, plasticizers can be added to decrease elastic modulus to improve flexibility.

Distribution and transport of fluids, including gasses, liquids, super critical fluids, and combinations is central to many unit operations. These operations can include, for example, heat transfer, mass transfer, ion exchange, reactive chemistry, and coating. Additionally, the present invention provides an apparatus and methods of distribution of fluids for active thin film reaction in applications such as chemical or radiant reactors.

Preferred embodiments of the invention may use thin flexible sheets that have metering sheet cell topographies on their surface. For purposes of this invention, a "film" is considered to be a thin (less than 5 mm thick) generally flexible sheet of polymeric material. The economic value in using inexpensive films with highly defined metering sheet film surfaces and structures is great. Flexible films can be used in combination with a wide range of capping materials and can be used unsupported or in conjunction with a supporting body where desired. The flow passageways formed from such structured surfaces and caps may be flexible for many applications, but also may be associated with a rigid structural body where applications warrant.

Similarly, the capping material may be a rigid metallic. The capping material may be a confining wall of a mounting fixture. The metering sheet material may be a sheet with complex three dimensional structures on both sides. In this form capping material is required on both sides to confine the fluid flow within the sheet. This capping material may be flexible films or the solid confining walls of a mounting structure. FIG. 11c is an example of a metering sheet that requires capping on two sides. Here capping could be provided by confining the sheet within in a slot of a fluid distribution die.

Another meter of constructing a metering sheet is to align side by side a row of precision tubes on a flat surface. These may be fused or bonded together to form a sheet. This sheet may be bonded to a plane flat sheet of material or between two sheets of material. In this form one has a composite sheet with many bores or passages running parallel with no auxiliary channels running at an angle to the bores. Such channels may be added in many ways.

When the tubes are assembled and bonded to a single plane sheet, many cross channels may be created by removing lines of material at an angle to the bores. Machining, laser ablation, electric discharge machining, grinding and thermoforming are some of the many methods of creating flow channels between the bores. Alternatively many rows of very short length tubes may be assembled side by side and in sequential rows on a plane flat sheet and bonded to that sheet. The spacing between the rows then provides the auxiliary cross channels.

The high volume production of the fluid metering sheets by repeated or continuous replication processes allows the metering sheet to be manufactured at low cost. This then allows the sheets to be disposable. By this means, the expensive precision parts that require cleaning and reuse are eliminated, and manufacturing using the sheets is simpler and less costly.

9. Methods of Assembly of Metering Sheets

The fluid metering sheets can be assembled from layers of multiple sheets using a variety of techniques, including, but not limited to external force clamping devices, bonding using thermal means, bonding using curing layers, using adhesive layers, or bonding using internal mechanical interlocking structures and the like.

Clamping methods can include constraints on the external major surfaces of the sheets that apply a mechanical clamping force, or other external clamping forces such as air pressure, gravitational, electrostatic or magnetic forces.

Thermal bonding methods can include heat transfer devices, sonic, ultrasonic or electromagnetic radiation, such as focused infrared or radio or microwave radiation.

Pressure sensitive adhesion concepts can also be envisaged.

Mechanically interlocking layers can also be utilized. These may have molded, machined, or formed internal sheet structures.

Additionally, tie layers of one or more materials suitable for use with the sheets can be used. Generally the tie layers can be a meltable, curable, or chemically bondable layer.

Additionally, the layers can be adhered using adhesive forces. These layers can be pre-applied including application just prior to the assembly and bonding step. For example, a lower melting temperature polymer can be applied to non-meltable or higher melting temperature sheets to aid in thermal or mechanical bonding means. A nonwoven film can also be used as a tie layer.

A curable tie layer may be utilized. The curing step may be accomplished by thermal means such as ultrasonic, infrasonic, or electromagnetic radiation such as focused infrared or radiation. Component layers that initiate curing on contact may be used. The curable layer can contain a component that absorbs the applied energy at a greater rate than the sheet material, thereby only melting the tie layer.

These bonding means can be used to only bond at sheet internal intersecting surfaces (interstices) where the energy is focused.

10. Three Dimensional Sheets

Figure 17:
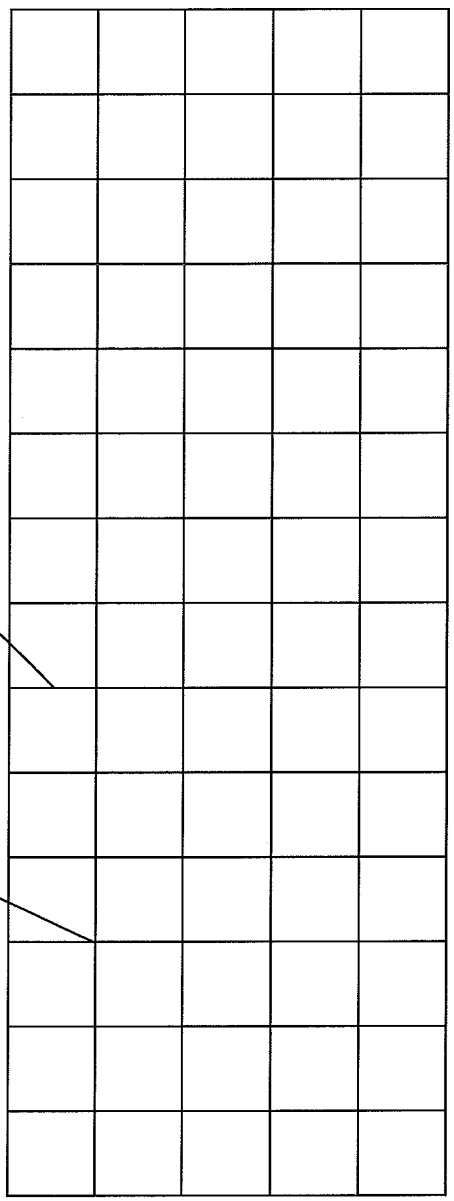
FIG. 17 is a schematic illustration of an improved metering sheet with a 2-D grid of square passageways.

Consider a 2-dimensional grid lattice laid out in a square pattern as shown in FIG. 17 where the nodes 171, the intersections of the lattice lines 170, are connected by the lattice. The lines of this lattice represent flow passages. The nodes are the intersection points of the passageways. These passageways may be simple flow channels. They may also be irregular shaped pores. The collection of interconnecting passages may also be referred to as a grid of passages, pores, or simply a grid.

Figure 18:
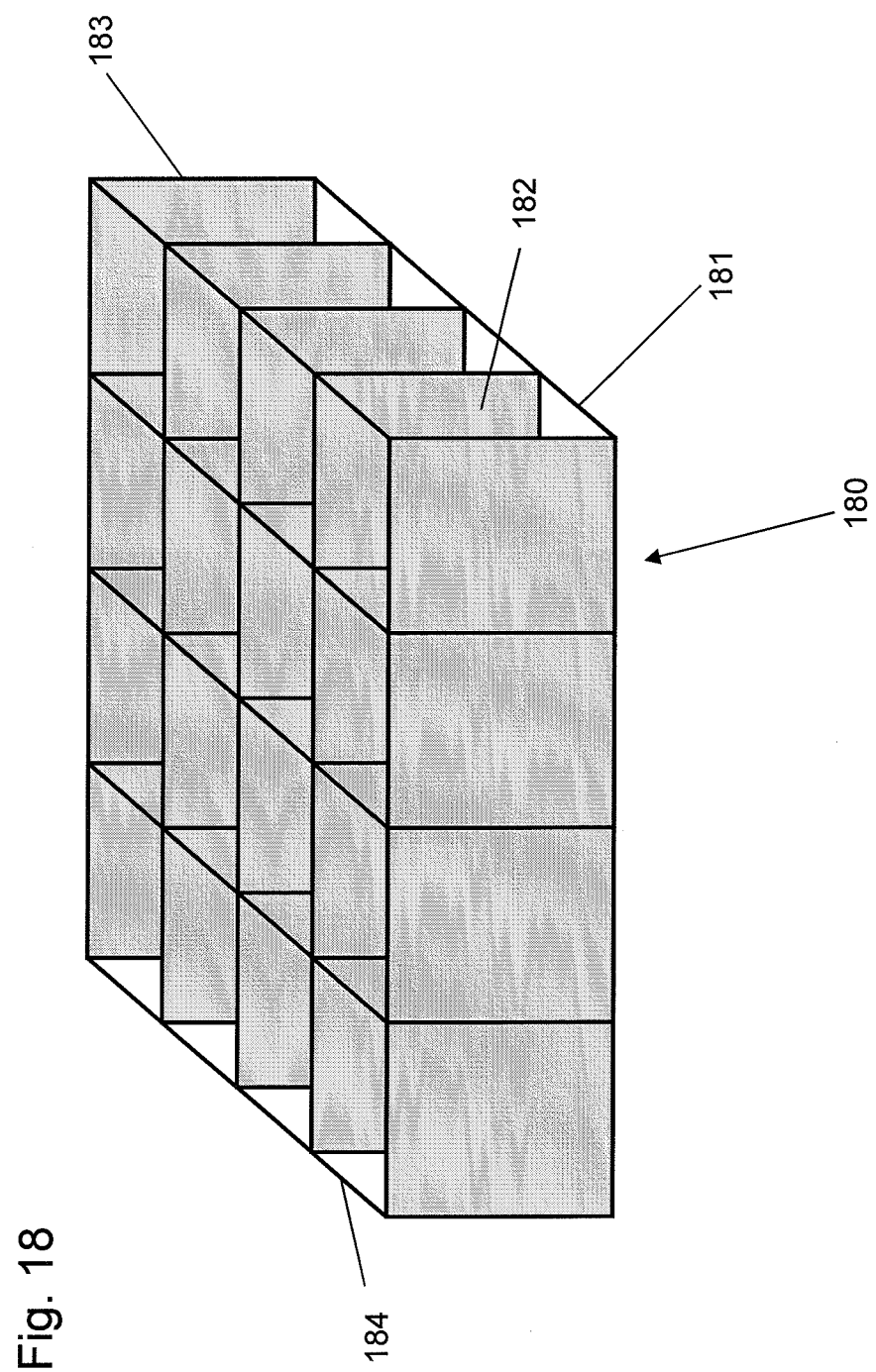
FIG. 18 is a schematic illustration of an improved metering sheet with a 3-D grid of passageways.

A two 2-dimensional grid is a layer, and multiple layers may be stacked together. When the two layers are interconnected by channels spanning between nodes in the bottom and top layers, a cubic lattice or 3-dimensional grid of passages may be created. An example is shown in FIG. 18. A cubic lattice of channels 180 is shown. Here the bottom grid of channels 181 is connected to the top layer of channels 184 by interconnection channels 183. The shaded vertical planes 182 are added solely to illustrate and emphasize the three dimensional character of the lattice of pore flow passageways.

Figure 19:
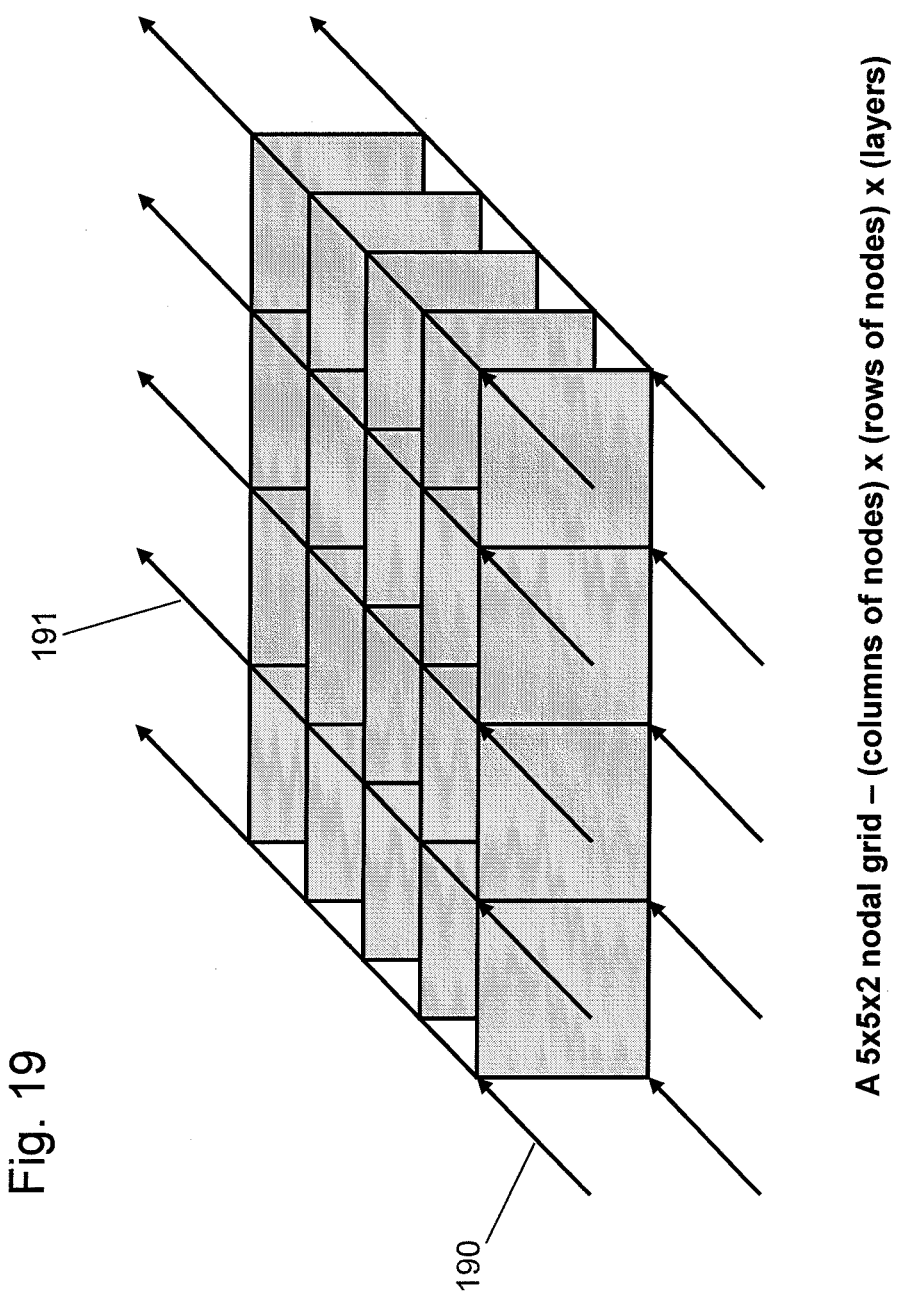
FIG. 19 is an isometric illustration of an improved metering sheet with a 3-D grid of passageways.

The grid of pores in FIG. 18 is embedded within solid material such as metal, plastic, or ceramic. This material may be a sheet of material with an inlet edge and an outlet edge. These have exposed passageways where flow may enter and exit. FIG. 19 schematically illustrates such a sheet. Flow enters the front edge as indicated by the arrows 190, flows through the depth of the sheet, and exits the back edge as indicated by arrows 191. The shading of the vertical planes is added only to emphasize the 3-D nature of the media. This is a basic sheet type for a fluid distribution or metering device. It may also function as a fluid filtering sheet device.

FIG. 16 illustrates the cube like grid composed of eight nodes 162, 163, 164, 165, 166, 167, 168, and 169. The node points are the intersections of channels 161 that extend in width, depth and sheet thickness directions from each node.

I. Improved Filtration Media

1. Modeling Filtration

Modeling the flow of fluid in the passages and the capture of particles within a flow grid is extremely valuable in understanding the filtration ability of such grids. The modeling has been used to identify significant parameters and to develop improved filtration methods and devices.

When the flow resistance of each channel in the filter media is known, one may calculate the flow rate and flow direction in each grid passageway. With an applied pressure gradient from the front to back side across the depth of a sheet or block of media, the total flow rate through the media and the individual channel flows may be calculated. If individual channels are clogged by trapped particles, the redistribution of flow around the obstructed passages may be determined. This is the basis for various approaches to modeling the filtration of a dilute concentration of contaminant particles from a flow of fluid.

In a grid of nodes, the connectivity of all the channels to nodes is known. When the flows and flow directions are calculated, the directional connectivity is determined. Knowing the contaminant capture probability for each channel, and knowing the probability for a contaminant to take a specific flow path at each node juncture, allows us to perform statistical experiments following the paths and to determining the point of capture of large numbers of particles.

2. Filtration: Following a Particle a. Particle Paths

In one variation of the modeling the filtration performance of a fluid distribution sheet, a volume of fluid that contains a particle of a known size is allowed to pass completely through the sheet. The model determines if the particle is trapped within the sheet and its location. This is appropriate for low concentrations of contaminants where only one particle is present in the flow grid at a time. In a great many industrial processes there is a very sparse population of particles in the fluid at certain steps. However, the demand for quality requires that they must be removed. Details of this approach are described below.

At higher particle concentrations two or more particles may be passing through the grid simultaneously. In this case the general approach to simulation is the same. In the simplest case, the probability of a particle entering the grid at each increment in time is calculated from the concentration, the flow rate, and volume of the pores. The simulation marches forward in time with the particle paths being individually calculated as time proceeds.

Figure 20:
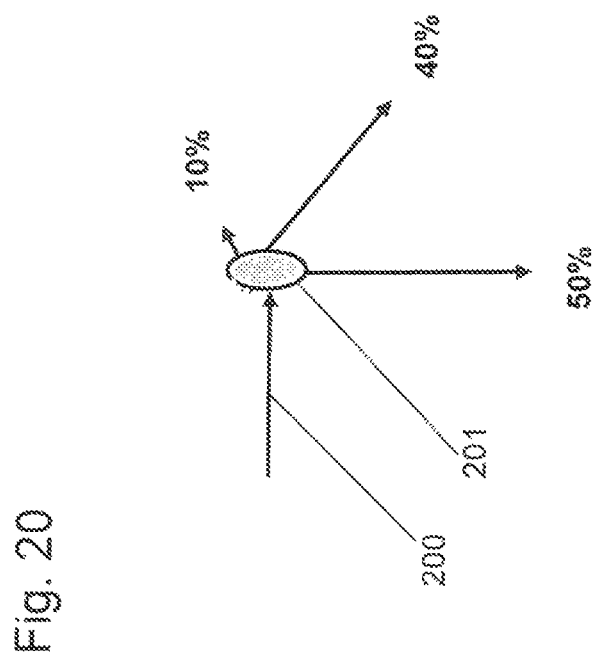
FIG. 20 is a schematic illustration of a node point within porous media.

In FIG. 20 a node point is illustrated. The arrows 200 indicate flows into and out of the node 201. When a particle is carried by the flow into the node, it is assumed to exit in the flow from the node. The channel by which the particle leaves is determined by chance. The probability that particle is in the flow in a particular channel equals the ratio to the flow in a channel divided by the total flow rate leaving the node. The probabilities for all flow leaving channels are thus known, and the sum is equal to one.

Given these probabilities one may "roll the dice" and determine by chance which channel carries the particle leaving the node. The flow model for the grid gives the directional connectivity. Therefore, at any node it is known which channels contain entering flows and which contain exiting flows. Once a particle is in a channel, the node to be encountered is known. At the next node the dice are rolled again to determine its exiting route. The stochastic processes of the movement of many particles through the filter grid may be followed one by one.

b. Particle Capture

The process of capture of a particle as it flows through or into a channel can be complex. Extensive modeling of the specialized process of straining has been done. In straining if a particle is captured in a channel, it is assumed the channel is plugged and thereafter allows no flow. This is accomplished by immediately setting the particular channel's flow conductance to zero in the flow model. If the particle is captured, the flow distribution through all the channels is recalculated with the newly clogged channel taken into account. For a fixed fluid supply pressure, the total flow in the sheet will be reduced. At some point when many particles have been captured, the total flow will be reduced to zero, and the sheet is totally clogged. In reality filters are often replaced when the pressure drop across them exceeds a limit, or the flow is reduced to a limit value when the upstream pressure is maintained constant.

In this modeling, it is assumed that the capture probability for each channel and each particle is known. This probability may be controlled by many factors. Significant ones include cross sectional shape, hydraulic diameter, length and size variations. These may be set for the filter media, the sheet, by design.

The particles entering the filter media may have a distribution of properties like size. It is assumed that the capture probability for every particle with respect to every pore is known or may be calculated from known parameters. In the following discussion on filtering simulation, results represent the cases where capture probability varies only from pore to pore, and not from particle to particle. This approach simplifies the analysis of results but does not diminish the utility of the teachings.

Once a particle enters the flow going into a particular channel, we determine if it is captured by the channel using the capture probability. Knowing the probability we "roll the dice" to determine if capture occurs. If the probability is 0.001, then on the average only one particle in one thousand will be captured by the channel. In the simulation all "roll the dice" decisions are made using a random number generator.

In simulation of filtration multiple numerical experiments are used to determine the average or most expected trends and effects. An estimated of a mean equals the average of a limited number of experiments plus or minus two times the standard deviation of those experiments divided by the square root of the number of experiments. A large number of experiments are required for very accurate estimates of means. However, the estimates are independent of each other so they may all be calculated simultaneously using parallel processing computer hardware and software.

Particles are generally captured sequentially and with each event the flow in the grid redistributes and needs to be recalculated. The recalculation involves the solution of a large set of equations, and this is the most resource and time intensive step of the model algorithms employed. Commonly up to 90 percent of the computer simulation time is consumed by the step. Flows are often calculated for filter media containing pores ranging from hundreds to hundreds of thousands of interconnected pores. When the number is large, the particle paths and capture events for a subset of the total particles processed may be estimated without updating the flow distribution. That is the movement of a subset of particles may be approximated by a simultaneous calculation rather than a sequential one. This allows the use of parallel processing algorithms and results in proportional reductions in computation times. Improvements in the accuracy of the obtained estimates may be obtained by limiting the use of this approach to the cases where the particles traverse pores in the media that are significantly removed from each other.

3. Characteristics of the Filtration Sheets a. Filtering Flow Distribution Grids An example geometry where the sheet grid of nodes is designated as 5×26×2 is used in the following example. This designation means the test sheet consists of 2 layers. In a layer there are 5 columns of nodes extending from an entrance edge (inlet) to an outlet or exit edge, and there are 26 rows of nodes between the inlet and outlet. The rows of nodes extend parallel to the inlet face, and the columns extend perpendicular to the inlet and outlet faces. Filtering flow grids have channel geometries or unit cells that repeat throughout the sheet or media. In filtering geometries, channels direct flow in a number of primary directions. For cubic channel grids there are three: parallel to the depth direction, parallel to the width direction, and parallel to the direction from layer to layer. When only a single layer of with a rectangular layout of channels is used there are just two primary directional orientations of the channels.

In filtering grids the flow resistances in channels in each primary direction of the grid are generally held constant in the following simulations. However, the channel flow resistances may differ between the primary directions, but in general the filtration results depend upon the capture probability for the channels that have a directional component orientated from inlet to outlet edge.

In commercial porous metal the flow passages are randomly distributed in space and are organized with a multitude of mostly random orientations and flow resistances.

Figure 21:
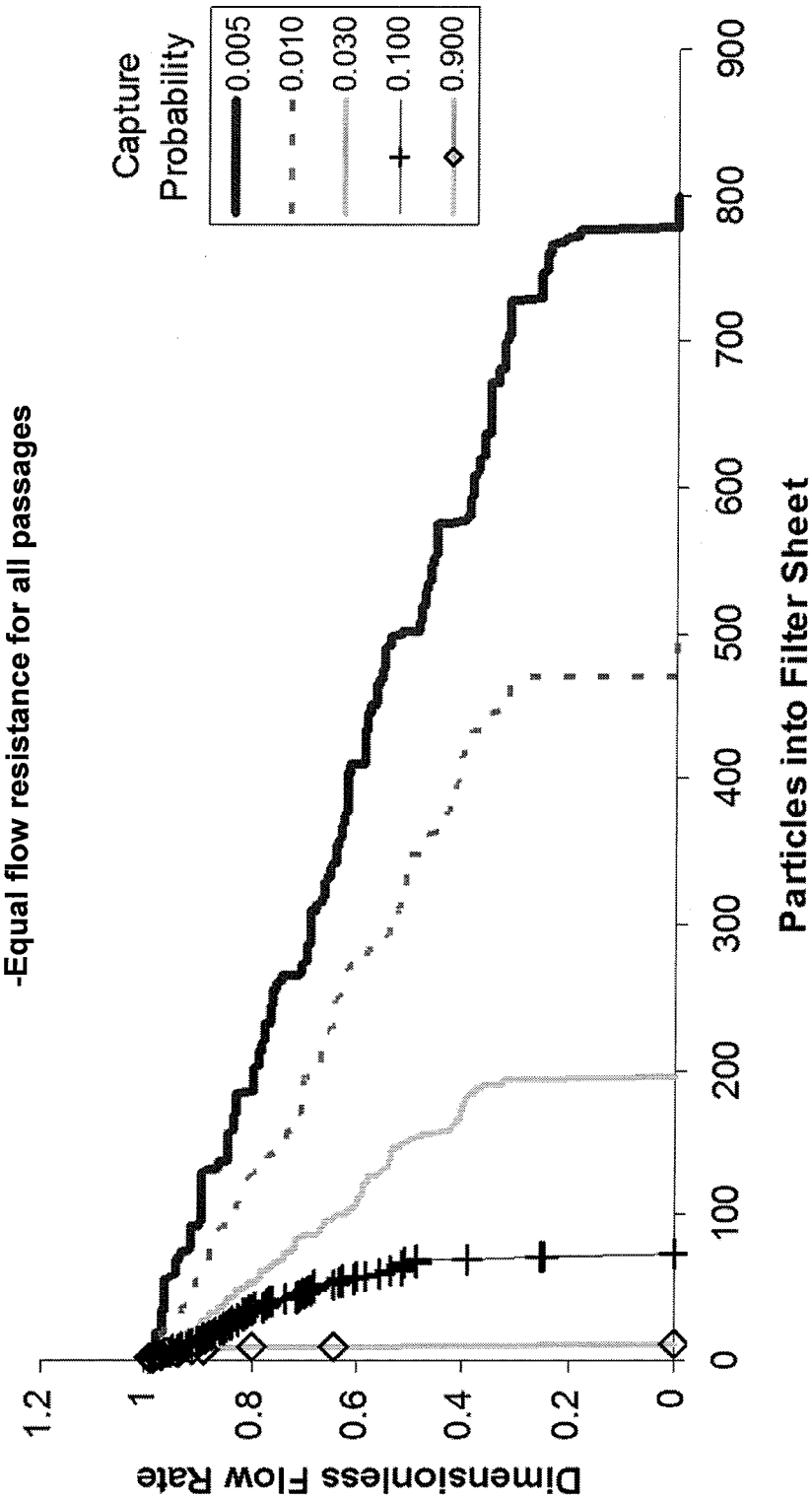
FIG. 21 is a graph of filter experiments illustrating the change in flow as addition particles are captured by the filter.

FIG. 21 graphs representative examples of the filtration process for various channel capture probabilities. Each curve shown plots the dimensionless total flow rate through the cubic 5×26×2 grid of channels as a function of the number of particles that have entered the sheet. The capture probabilities of the channels differ for each curve. All channels in the grid have the same designated probability for the experimental trial. Each line of graphed results represents a single experimental trial. In each case the process continues until the sheet is clogged and the flow rate abruptly drops to zero. These results illustrate that capture probabilities less than 0.9 are preferred increasing the number of contaminants contained. It is found that generally channels that have a direction component orientated from inlet to outlet are most significant in influencing the nature of the results.

The curves of FIG. 21 represent single simulation experiments. Repeat experiments at the same conditions would illustrate the same trends but vary in the exact numeric results. Because the particle path and particle capture are a stochastic processes, duplicate trials would result in a different curves, but on the average the endpoint results would be the same.

When the probability is high, only a few particles are processed before all flow is blocked. The graphs are plotted versus the independent variable which is the number of particles passing into the sheet. Some of the particles are captured and some pass through the sheet and exit from it. The graph does not show the number of particles that escape from the sheet. FIG. 21 illustrates that the filtration of many more particles may be accomplished if the capture probability is significantly less than one. It also indicates that the improved filtering will be achieved if the entrance composite capture probability for the sheet is not one.

Figure 22:
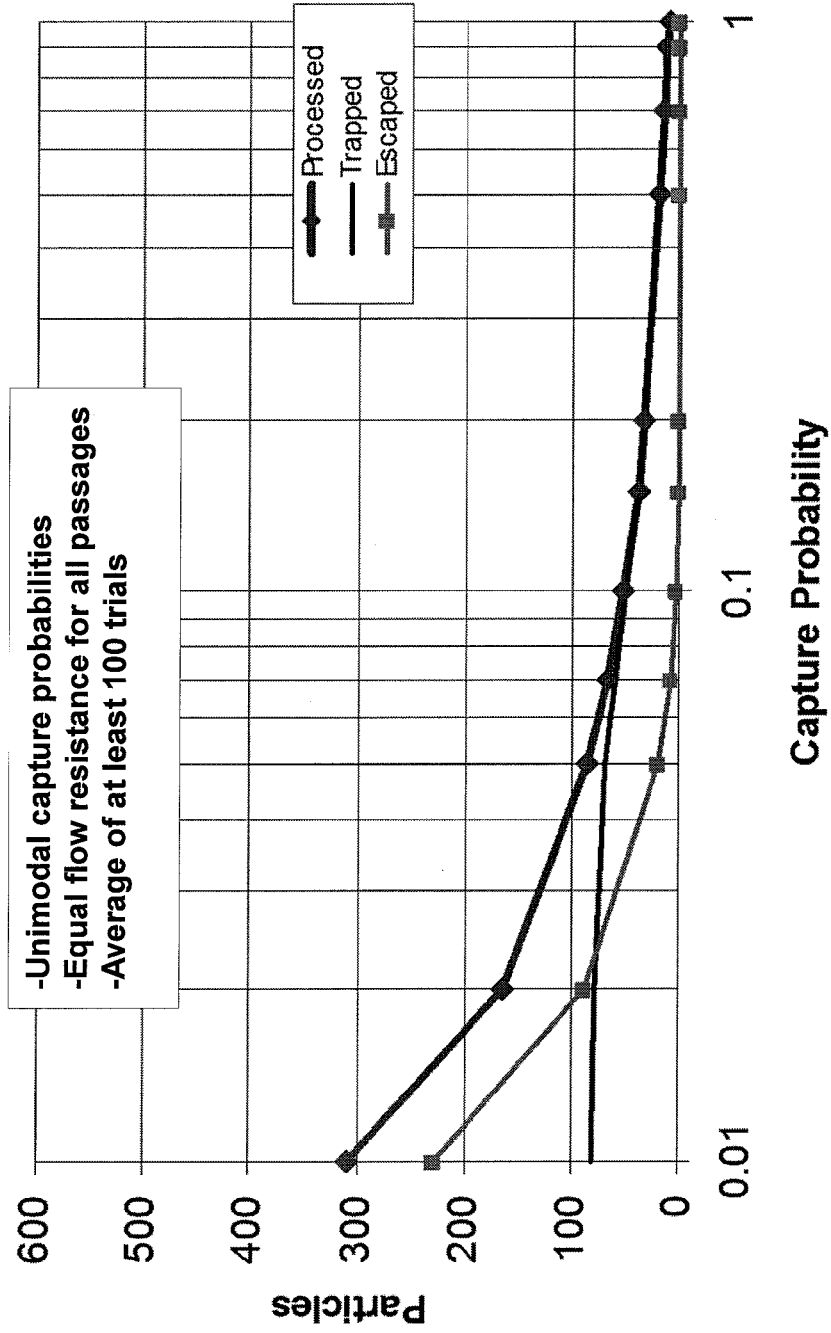
FIG. 22 is a graph of filter experiment results plotting the particles trapped or escaped as a function of the pore capture probability.

The average results of many trials for a two layer stack of a 5×26×1 grid are summarized in FIG. 22. All data points represent the average of at least one hundred trial simulations and thousands of particles passing into the media. This is done because of the statistical nature of the capture process. In this series of experiments only filtering passages were used. Additionally, the capture probabilities for channels in any direction were equal. The base grid was by our designation a 5×26×1 grid, and two layers were used. We designate this combination grid as 2×(5×26×1). This is equivalent to a 5×26×2 grid where the layer interconnect channels have an infinite flow resistance.

Three curves are plotted: one curve for the total particles processed before all flow stops, one curve for the particles trapped before all flow stops, and one curve for the particles escaped from the filtering sheet before all flow stops. The curves are plotted as a function of the capture probability. As the probability increases the number of particles processed is decreased before all flow through the sheet stops. At the same time, the number of particles that escape from the sheet also decreases. It tends to zero as the probability approaches 0.2, and becomes zero at a probability of 1. As it happens for this double layer 2×(5×26×1) grid, approximately 0.2 percent of the particles escape when the capture probability is 0.2, but there is no simple correlation between these variables.

The results for the two layered grid 2×(5×26×1) of FIG. 22, and the results for a 5×26×2 grid are approximately equal when the capture probability is greater than 0.02.

Figure 23:
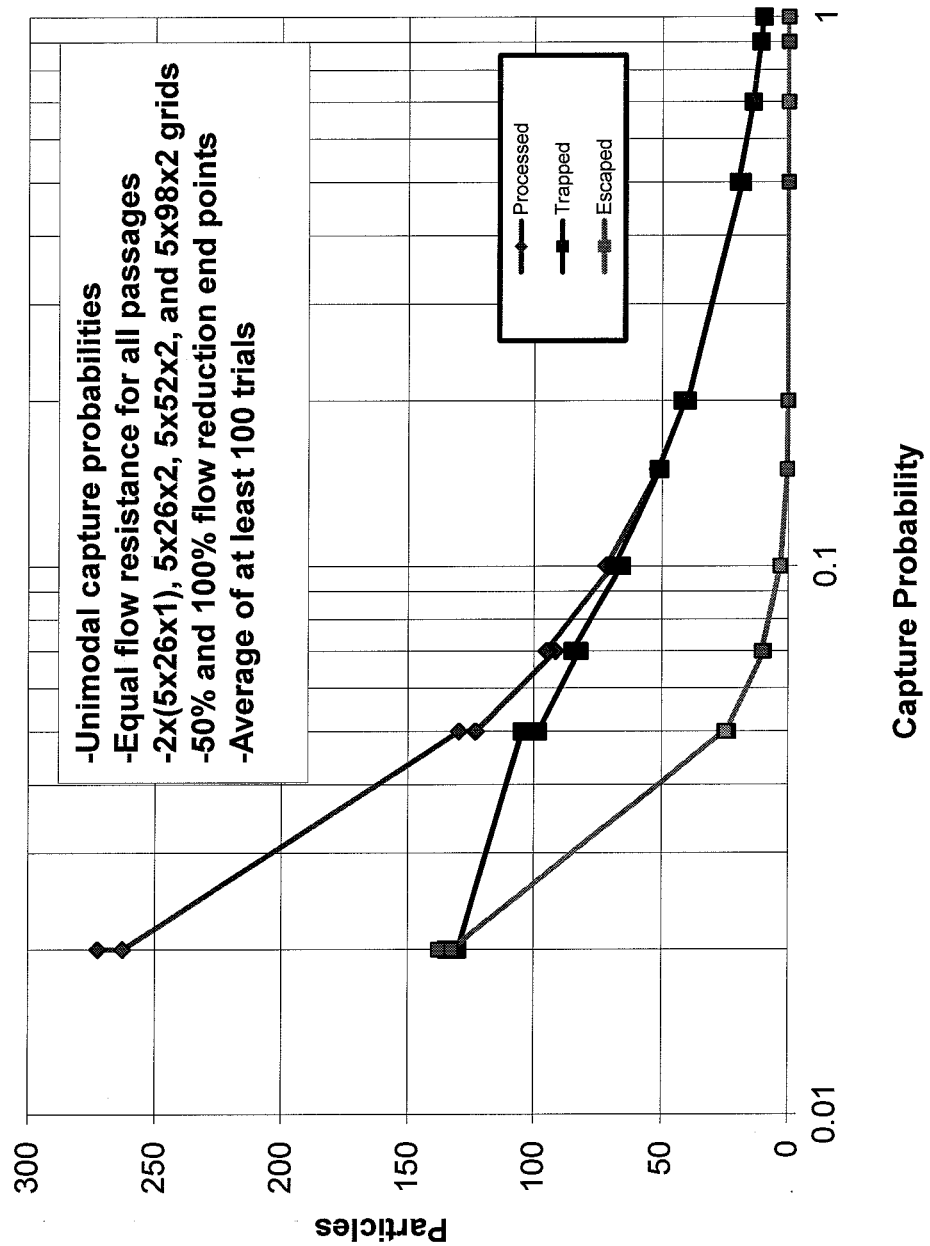
FIG. 23 is a graph of filter experiment results plotting the particles trapped or escaped as a function of the pore capture probability.

Increases in the numbers of particles processed may be achieved by expanding filter media volume by increasing the width dimension of the sheet or the numbers of layers in the sheet. Surprisingly, increasing the depth dimension does not improve filtration. We have documented the effect of increasing the depth dimension from 26 rows of nodes to 52 and 98 rows. The findings are illustrated in FIG. 23. Here all the results for the grids 5×26×2, 5×52×2 and 5×98×2 plot closely together and are approximated by one curve for the particles processed versus probability, trapped particles versus probability and escaped particles processed versus probability. Also plotted are the results for the 2×(5×26×1) grid.

It is found that there is no substantial variation in filtration and no substantial improvement in filtration by increasing the filtration media size in the depth dimension. However, the pressure drop through the sheet is increased when this is done, and the mechanical strength is increased.

Also investigated was the effect of different filtration end points. It is found that there is no substantial difference in the plotted curves for the number of particles processed, trapped, or escaped when the end point for filtration is a 50 or a 100 percent reduction in flow through the filter. In FIG. 23 we have aggregated this data together. These results are only for probabilities of 0.02 and higher. When the grid depth is reduced below 26, at some point the results begin to become depth dependent.

The finding of a parameter region of depth independence and end-point independence is counterintuitive and not expected. But, it is significant and useful. These results indicate that for a given set requirements an optimum filter media depth exists. Beyond this depth, increasing the depth increases cost without benefit of improved filtration. In general, it appears that on the average it may only take a very limited number of particles to reduce the flow from a value of 50% of the initial start-up value to a no flow condition when uniform grids of constant capture probability are used.

In general, we find that regularly spaced designed grids in a flow device may serve as useful particle filters. Preferred are cubic grids where node points are laid out in rows, columns, and layers. The columns are through the depth direction where the depth direction corresponds to the direction of flow through the filtration sheet or media. The grids extend in planes. The rows in a plane are generally normal to the direction of flow through the filtration media. Layers generally consist of one plane of rows and columns of node points. Flow passageways connect adjacent and near nodal points and form a lattice of interconnected passageways. It is preferred the filtering flow passageways have similar characteristics to the flow distribution passageways described prior to this section.

In its simplest form a useful filtering sheet or block of media flow device may be a two dimensional grid of passageways or layers of 2D grids similar to a simple improved fluid distribution sheet described earlier. Microchannel grids of flow paths on the surface of a thin sheet of material may be manufactured by known micro-replication techniques and stacked together to form filtration media.

Devices for filtration or filter media elements may be assembled of multiple sheets stacked together. Filtration media may consist of material containing multiple layers or planes of two dimensional grids. Filter media may also be three dimensional grids of flow passageways, or assemblages of two and three dimensional grids of passageways. Preferred are passageway assemblages which repeat within the volume of the filter media. Preferred are passageway assemblages which repeat within the area of a plane of a filter media sheet.

Our findings, some of which are exemplified by graphed results in FIG. 23, indicate that improved filtration may be obtained with grids of more than 5 rows of nodes when the capture probability is below 1, preferably below 0.5, more preferably below 0.2, and most preferably between 0.02 and 0.2. Additionally, we have found that the pressure drop through the filter may be minimized without significantly sacrificing particle capture. This is accomplished by using grids with more than 5 rows and less than 52 and preferably less than 27 rows of node points.

b. Prefect Filtration—No Particle Escapes Using Filtering Grids

Often manufacturing processes require totally particle free fluid flow from a filter. This may be accomplished by designing a filter with an overall capture probability of 1.0 for the target particle. That is a filter element where the combination of flow passages acting together as a whole create a particle capture probability of 1.0. A filter sheet with only one or several rows of nodes, and where all individual passageways have a capture probability of 1.0, may be used. However, the number of particles that can be filtered from the inlet flow before flow is stopped or significantly reduced is relatively small. It is generally limited to the number of node columns times the number of layers in the case of a design fabricated in a grid of 3D cubic forms. It is generally limited to the number of passageways directly exposed at the media entrance edge. Therefore, the volume of fluid that may be processed is low. In the prior art this limitation is dealt with by expanding the filter inlet area by various means. We have found that this is not necessary and that improvements may be obtained by using filter sheets with designed variations (predetermined) in the internal structure and functioning of the sheet. This is also found with filter media in general and not just sheets. One key element is to design the row by row capture probabilities of arrays of internal channels so that they have a value less than 1.0 for the majority of the rows.

Commercial porous media is often constructed using an assemblage of spherical particles. One type of assemblage may be constructed using close packed spheres of equal sizes. This media may be modeled by a modified 3D cubic grid of flow passages with flow resistances and particle capture probabilities.

Irregular media particles of a known size classification are often used to construct a filter media. Cubic grids are useful to model the flow and particle capture for this media. In general, the filter may be presented with a filter challenge consisting of target particles of a uniform size or of a known distribution. The pores may have a known distribution of flow resistances and particle capture probabilities.

i. Bimodal Distributions—"Bimodal Total Capture Distributions"

Figure 24:
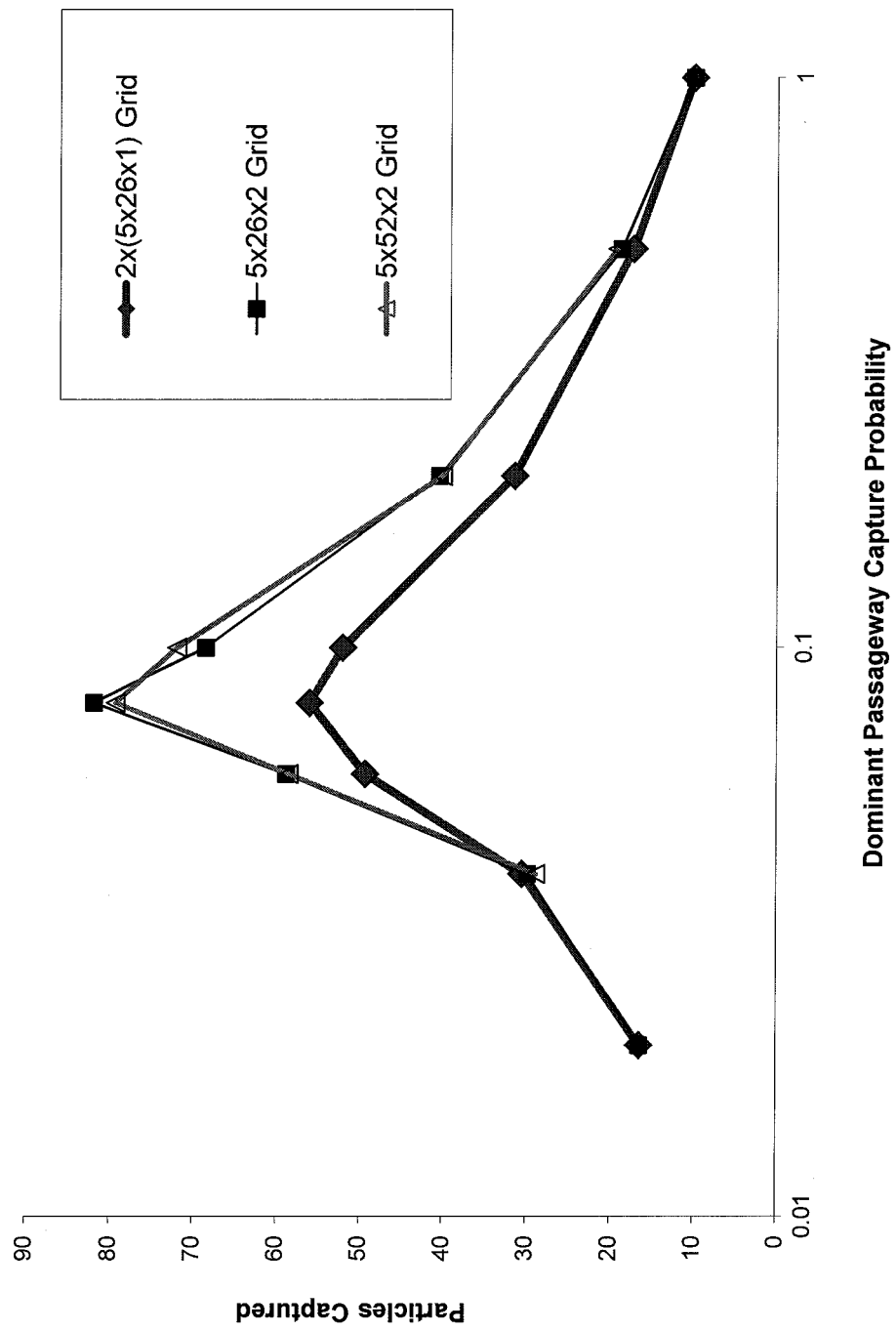
FIG. 24 is a graph of filter experiment results plotting the particles captured as a function of the capture probability.

In the following examples, target particles of uniform properties are used for purposes of illustrating new principles of filter design. A uniform capture probability for all channels throughout the bulk of the media are used except for passageways near media exit. Designing the sheet with a probability of one for just the exit channels prevents particles from escaping. We refer to these distributions as bimodal total capture distributions. Here the passageway capture probabilities in the bulk of the filter are at a constant value less than 1.0, but the exit or near exit channels have a value equal to 1.0. One method of obtaining a capture probability of 1 is generally to set the flow passageway hydraulic diameter to a value less than 80 percent of the target particle hydraulic diameter. Simulation results for these distributions are shown in FIG. 24. It indicates there is an optimum capture probability for the channels leading up to the exit node row. For the sheet grid example presented the optimum probability is 0.08. The upper two curves indicate on the average a volume of fluid containing 80 particles may be processed by the grid geometries 5×26×2 and 5×52×2, and the curves for all practical purposes are identical. These results represent the average hundreds of experiments.

If the probability for all sheet channels were 1 for this example, only the fluid volume containing 10 particles could be processed. The two level gradients in probability, this bimodal distribution, can provide an 8 fold improvement. The exit edge interface channels are preferred for the location of the capture probability of 1.0. If the channels at the inlet sheet edge for the 5×24×2 and 5×50×2 grids have a probability of 1, only the volume containing 10 particles may be processed before total clogging occurs and flow from the filter stops.

Unexpectedly, the bimodal total capture distributions do not provide ever improving filtration when more depth is added to the sheet. As FIG. 24 shows, 52 rows of nodes will not capture significantly more particles than a sheet with only 26 rows. Additionally, if the near exit channels with a capture probability of 1.0 for the 5×52×2 grid were to include the all the channels from the $27^{th}$ to the $52^{nd}$ rows, the filtration results are about equal to the upper curves of FIG. 24.

The inclusion of these rows in the filter design do not improved the filtration when the rows 27 to 52 have a capture probability ranging between the two values of the bimodal distribution. They only provide a redundancy factor in case there is some defect in the preceding channels. This finding on the influence of filter media depth is similar to that for filter media where the capture probability is single valued. This is also true when the filter is challenged with distributions of particle sizes, and it is true when the individual pore capture probabilities vary randomly about a mean value equal to the nominal average of the bulk of the media and final exit pores have a probability of one.

FIG. 24 also plots a curve for a filter sheet consisting of two 2D grids 2×(5×24×1). The reduced total number of filtering channels reduces the particles captured. The results illustrate that 3D grids are preferred over 2D grids if only the number of captures is considered.

When designing filter media with bimodal channel particle capture probabilities, it is preferred that one probability be at or near 1.0 and the other be between 0.05 and 0.2. It is more preferred that the average probability be between 0.06 and 0.1. It is also preferred that the high probability be at or near the exit edge. For bimodal probability filter sheets, after the depth exceeds about a dimension so that a particle flows through about 15 pores sequentially, the benefit of adding additional passageways for extending the sequence is very limited while the pressure drop for forcing flow through the media increases proportional to the number of passageways. Preferred are micro-replicated sheets with 5 to 50 rows of nodes. Most preferred are sheets with 20 to 40 rows of nodes.

The results in FIG. 24 are for a simple grid of filter passages similar that are illustrated in FIG. 4*a*. Similar trends and results are obtained with other grid layouts and types. Examples include those illustrated in FIGS. 6, 7, 8, 9, and 11. We find the general results and conclusions also apply to other more complex grids, and to like grids when they comprise subunits of a collection that acts together to form a filter or filter element. While we have discussed the simple filter grid results in FIGS. 21, 22, 23, and 24, and they have been discussed in terms of them as representing filter media, a filter may be composed of multiple units of filtering grids. These may be arranged and interconnected in series and parallel and in complex patterns. These units may be directly connected to an inlet and outlet face or edge or remotely fluidically connected to other inlets and outlets.

ii. Multimodal Distributions

Figure 25:
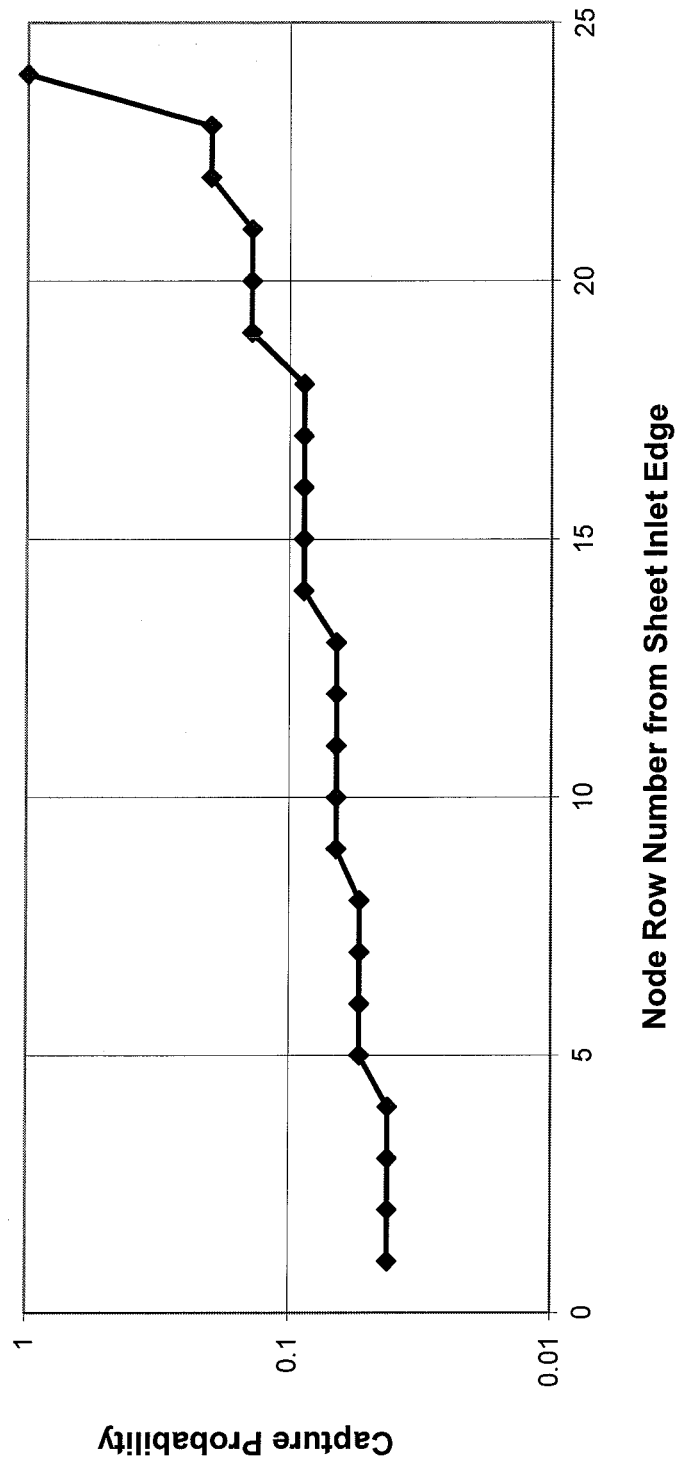
FIG. 25 is a graph plotting a preferred pore capture probability distribution.

Further studies have shown that gradient, multimodal capture distributions improve results over the bimodal and single value capture distributions. Improvements in filtration may be obtained using linear, parabolic, exponential and other multimodal gradients where the passageway capture probability increases from the inlet to the outlet edge of the sheet. FIG. 25 shows a useful gradient for a 5×26×2 grid which allows the fluid volume containing approximately 125 particles to be processed. This is a fifty percent improvement over the best the results for the bimodal distributions in FIG. 24.

In all the grids used in the experiments illustrated by FIG. 24, and with the capture probability distribution shown in FIG. 25, the designs allow no particles to escape the filter.

Using a sheet design where the capture probability advances from a low value to high value in the depth direction, from inlet to outlet, improves filtration performance. When for any row of nodes in a micro-replicated sheet has a capture probability of one for the channels conveying flow away from the row, no particles will escape from the sheet. As before, if this row of nodes is placed towards the outlet edge the filter media, filtration may be improved. Most preferred is to have this row of nodes at the outlet edge. In a like manner for porous media, it is preferred that the capture probability advance from the low to high in the flow direction through the filter depth.

Improved filtration generally results when multimodal total capture distributions with gradients in probability from inlet to outlet are employed. Furthermore, improvements that are proportional to the increased number of rows in the depth direction may be obtained. If we double the depth of the sheet we can double the number of particles trapped by the sheet in these cases. It is preferred that three or more probabilities are used for sequential passageway regions in the depth flow direction. Most preferred are five or more, or a continuous variation with depth direction.

Figure 26:
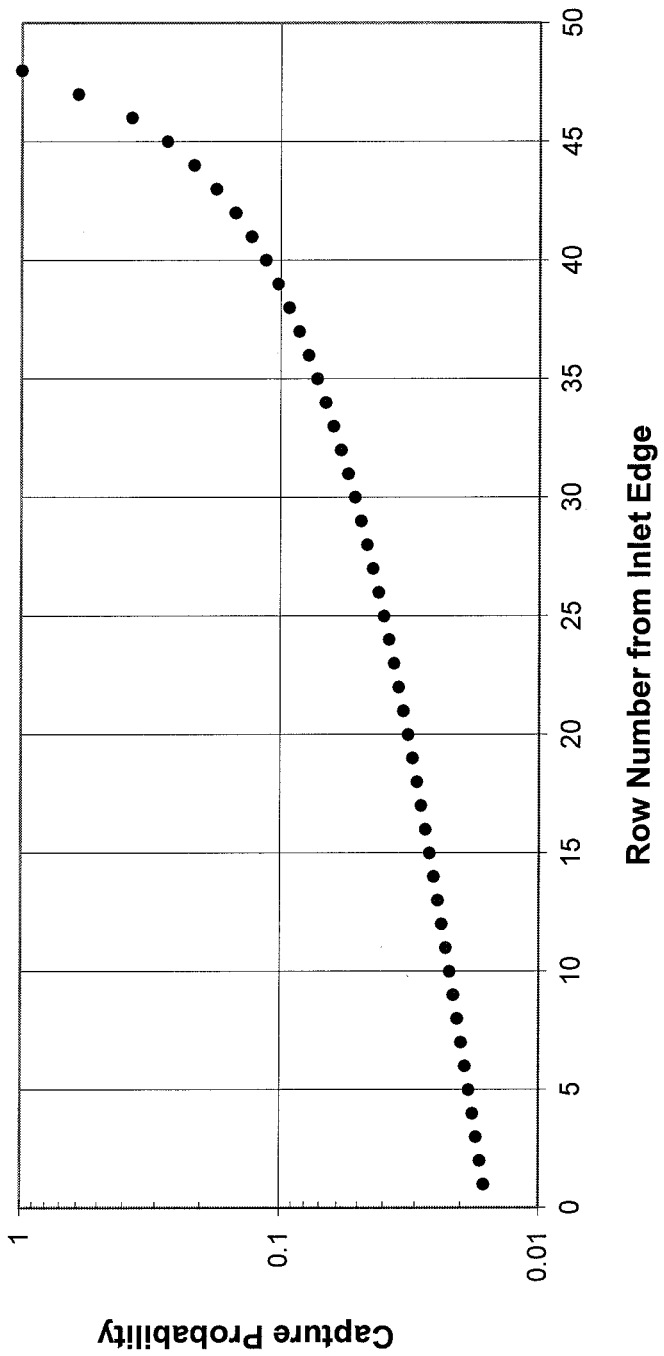
FIG. 26 is a graph plotting a preferred pore capture probability distribution.

FIG. 26 shows another useful multimodal total capture distribution for a sheet with a depth of 48 rows. While the 26 node row sheet with probabilities illustrated in FIG. 25 captures on the average approximately 125 particles, the 48 row sheet defined by FIG. 25 captures approximately 250 particles. This illustrates that gradients in probabilities allow the volume of the media to be used more efficiently and particle capture rates to be proportional to the volume of the media and not the inlet area.

We have investigated regular two and three dimensional grids of filter channels. Multimodal capture probability distributions where all flow at some point passes through channels with a capture probability of 1.0 are preferred. This results in the capture of all particles and prevents the passage of particles beyond the filter.

Many grids are possible for constructing micro-replicated filter media. The examples illustrate results for two layer cubic grids and single layers in sheets. Other experiments have been performed for multiple layers, various sheet dimensions, and various supply channel arrays. The simple layouts of channel grids described above are square or rectangular lattices of channels in layers or planes. Other single and multilayer grids of channels are useful. Single and multilayer grids of pores of distributed sizes are useful. Our findings and conclusions hold in general for all of these.

When porous media is assembled of particulate material, a construction which increases the average particle capture probability locally in the direction of flow is preferred. This increases the total number of particles that may be captured.

The conclusions and findings are valid for filter media in general and not just sheets or media with regular repeating geometric grid assemblies. The conclusions are valid for filter media with random pores, a distribution of pore sizes, or the filtering of particles with a distribution of sizes. When porous media is assembled of particulate material, a construction which increases the local average particle capture probability in the direction of flow is preferred. This increases the total number of particles that may be captured.

c. Improved Filtration Using Auxiliary Channels

We have shown that it is preferred to have multimodal capture probability distributions for the filtering flow grids. It has been also found that even more efficient filtering may be achieved by more complex types of grids. Unexpectedly, we have found that allowing particles to pass more freely toward the outlet edge of the sheet or media may improve filtration. It has also been found that allowing fluid to pass more freely from within the media to the outlet face or edge may improve filtration. In the past, it has been thought that "short circuiting" the filter media is detrimental. One embodiment of the invention is to employ auxiliary channels and auxiliary micro-channels within the media to allow fluid containing particles to pass easily from the inlet edge to regions within the depth of the sheet. Auxiliary micro-channels are positioned within the body of filtration media, and preferably throughout the bulk of the media. While enhancing particle movement toward the outlet of a filtration sheet might be expected to degrade the filtering performance, experiments show dramatic improvements actually result.

Auxiliary channels enhance flow in the width, depth and layer thickness directions within the porous media. Just a few channels dramatically and unexpectedly reduce pressure drops and improve particle filtration.

A "non-filtering auxiliary flow grid" is a special grid defined as a grid of passages having particle capture probabilities much lower than the filtering channels present. Preferably, these are at or near zero for the particles or particle size distribution being targeted. Their properties may be chosen so that they generally never become clogged. Complex types of compound flow grids employing the use of non-filtering auxiliary flow grids are beneficial. These serve to distribute flow to multiple points and regions within the filter media. Auxiliary channels of this teaching are channels with hydraulic diameters generally ranging from microns to a few millimeters. Micro-channels are preferred for the auxiliary channels.

It is useful that auxiliary channels be substitute for some of the primary filter grid flow pores, or be superimposed upon a single layer filtering micro-replicated grid. It is preferred that the auxiliary channels have different flow resistances and particle capture probabilities from the filtering grid. It is preferred that their capture probabilities be much less than the base filtering grid. More preferred are probabilities near zero. Examples of 2D micro-replicated combination grids including a base filtering grid and non-filtering auxiliary channels are shown in FIGS. 27, 28a, 28b, 28c, 30, 31, 32, 33, 35a, 35b and 34c. Only representative sectional areas are shown.

Figure 27:
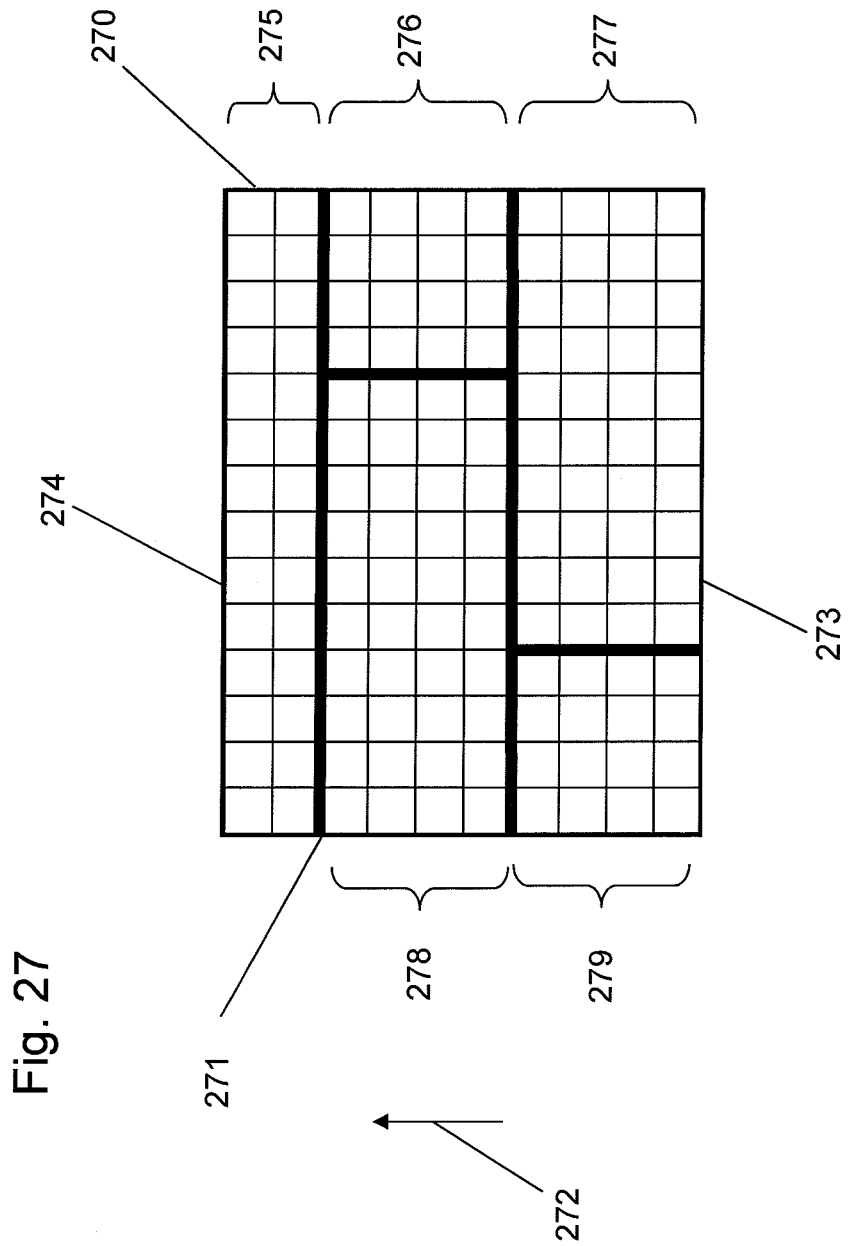
FIG. 27 is a schematic illustration of a section of filtering grid which includes auxiliary channels.

FIG. 27 illustrates schematically a section of a micro-sheet with a basic filtering square 2D grid 270 in one plane with one flow grid layer. The thinner lines represent a filtering grid, and the bold lines represent a non-filtering auxiliary grid 271. Arrow 272 indicates the direction of flow through the sheet. It is from an inlet edge represented by the bold grey line 273 to an outlet edge represented by the bold grey line 274. Replacing a few of the filtering grid channels are the channels of a non-filtering auxiliary grid. Here the auxiliary channels 271 of the non-filtering auxiliary grid type provide alternative flow paths into the depth of the filter sheet. With proper choices of the particle capture probabilities of the channels of the filtering grid, and of the relative flow resistances of the two types of grids, improved filtration may be obtained relative to the filtering grid alone without auxiliary channels.

In FIG. 27 the filter media is subdivided into sub regions 276, 277, 278, and 279 by the placement of auxiliary channels among the filtering channels. These sub regions contain filter channel grids that are in the plane parallel of the layer surface and are surrounded by auxiliary channels or the edge or the sheet. FIGS. 27, 28a, 28b, 28c and 32 illustrate the use of auxiliary channels to form sub regions. It is preferred that the filter performance of these be improved by varying the channel capture probabilities within them. Generally, it is preferred that the probabilities within a sub unit increase in the flow direction indicated by the arrow 272. Bimodal capture probability distributions for the filtering grid are preferred. Multimodal capture probability distributions for the grids are most preferred for these sub units. When 3D grids of filter passageways and 2D and 3D grids of auxiliary channels are present, the same types of probability variations are preferred.

In general, when auxiliary channels are present, the flow from the inlet face to the outlet face may take place through numerous paths or sequences of filter. Each path will have a cumulative capture probability dependent upon the many individual channels in the path. It is preferred, but not required, that the sequence of capture probabilities have increasing values along the flow path.

Figure 28A:
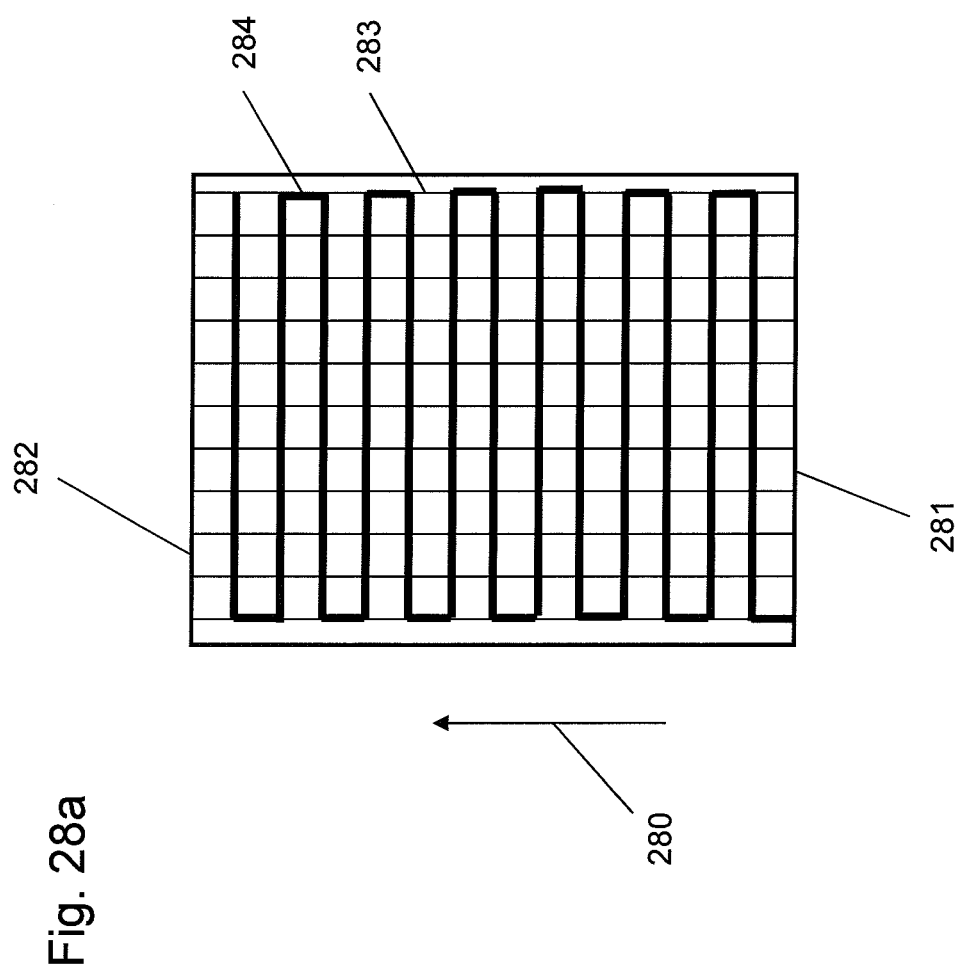
FIGS. 28a, 28b and 28c are schematic illustrations of filtering grids which include auxiliary channels.
Figure 28B:
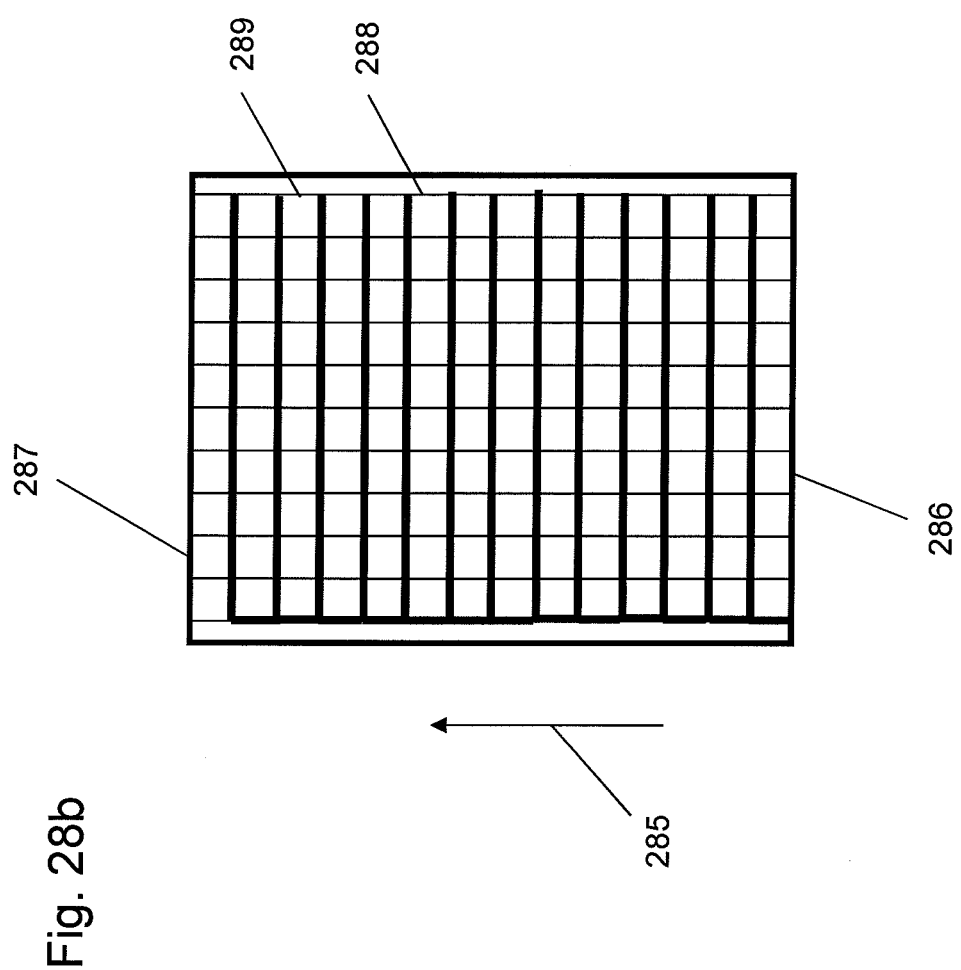
Figure 28C:
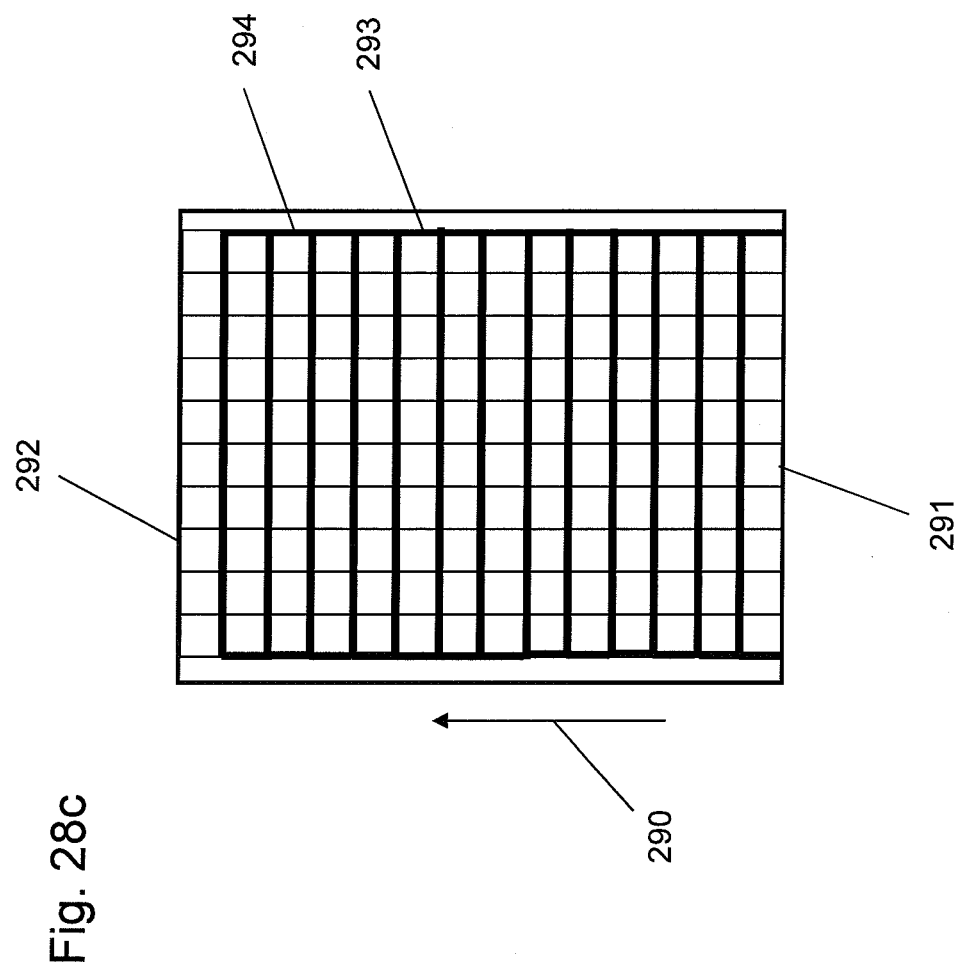

FIG. 28a illustrates another sheet section with a basic filtering square 2D grid 283 in one plane with one flow layer. This filtering grid would be designated as an 11×15×1 grid indicating it has 11 columns of nodes across the width, 15 rows of nodes through its depth, and only nodes in one plane or layer. Arrow 280 indicates the direction of flow through the sheet from an inlet edge 281 to an outlet edge 282. Replacing some of the filtering grid passageways are the channels of a non-filtering auxiliary grid shown as bold lines. Here the auxiliary channels 284 of the non-filtering auxiliary grid provide alternative flow paths into the depth of the filter sheet. With proper choices of the particle capture probabilities of the auxiliary channels, of the filtering grid, and of the relative flow resistances of the two grids, improved filtration may be obtained relative to an unenhanced filtering grid. Here a single valued capture probability equal to or near 1.0 for the filtering grid is useful.

Figure 29:
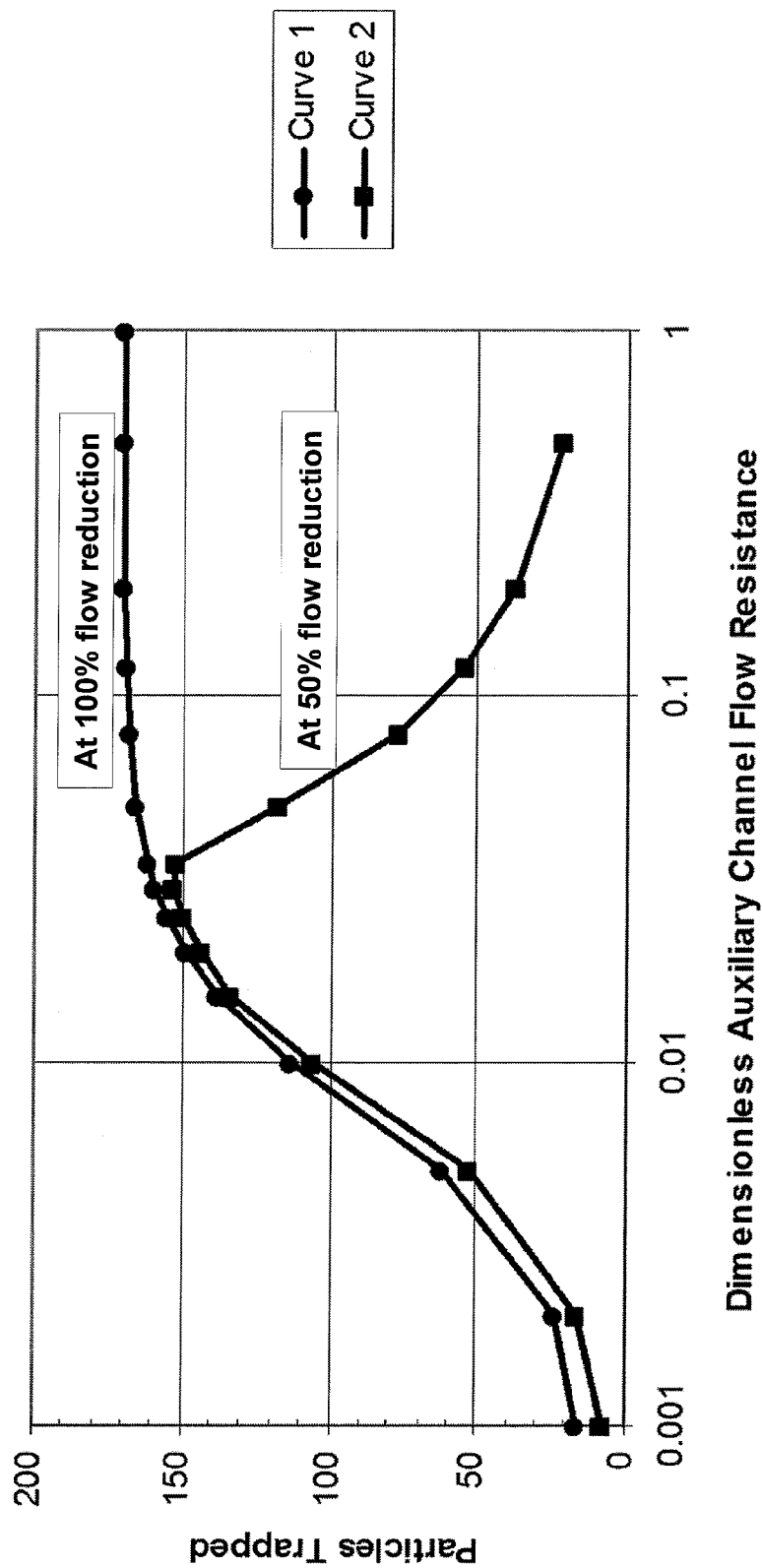
FIG. 29 is a graph of filter experiment results plotting particles trapped versus auxiliary channel resistance.

FIG. 29 graphs filtration experiment average results for a filter sheet of the style illustrated in FIG. 28a with the filtering grid having a 5×22×2 geometry. That is it has 5 columns, 22 rows and 2 layers of nodes. All the filtering cross width channels and all interlayer filtering channels have been replaced with non-filtering auxiliary grid channels. Additional non-filtering auxiliary channels have also been added to complete the serpentine path from the inlet sheet edge to near the outlet edge. Our simulations assumed that all the filtering grid channels have a particle capture probability of 1.0. The ratio of the flow resistance per unit length of each channel increment the non-filtering auxiliary grid, to that of the filtering grid was varied from 0.001 to 1.0. This ratio is the dimensionless auxiliary channel flow resistance. Curve 1 plots the average particles trapped by the filter sheet before all flow is stopped by clogging of the filter. Curve 2 plots average particles trapped by the filter sheet before the flow through the filter drops below 50 percent of the initial flow rate. The pressure drop from the inlet to outlet side is maintained constant to generate curve 2.

The sheet grid geometry for the FIG. 29 results has 170 active filtering channels in the filtering grid with the non-filtering auxiliary channels in place. By selectively choosing the dimensionless auxiliary channel flow resistance ratio to be greater than 0.03, the number particles that may be captured before the flow stops approaches the number of active filtering channels. This results because the filter geometry tends to fill and clog sequentially from the inlet to outlet edge for parameters chosen.

In many filtration tasks one needs to stop the process when the flow through the filter drops below 50 percent of the initial flow rate. Curve 2 illustrates results for this end point. Curve 2 data shows that for the filter design corresponding to the FIG. 29, when the dimensionless auxiliary channel resistance is 0.03, the filter design still allows on the average an amazing 152 particles to be captured. Stating this another way, the filter design allows 93 percent of all active filter channels to be used to trap particles while only reducing the flow rate by only 50 percent. This results because of the presence of the auxiliary channels.

For all results in FIG. 29 no particles escaped from the filter because of the high capture probability chosen for the filtering grid.

The FIG. 29 results illustrate in general there will be a range of preferred values for the dimensionless auxiliary channel flow resistance. A ratio of 0.002 to 0.2 is preferred. A ratio of 0.01 to 0.1 is more preferred. A ratio of 0.02 to 0.06 is most preferred.

For porous media where the pores have a size distribution and a grid of non-filtering auxiliary is employed, it is preferred that the ratio of the flow resistance of the auxiliary non-filtering channels to the average pore flow resistance per unit length be in the range of 0.001 to 0.1

In FIGS. 27, 28a, 28b, 28c, 30, 31, 32, 35a, 35b, and 35c the thin grid lines represent the filtering channels. The bold black lines represent the auxiliary non-filtering channels. The bold grey lines represent inlet and outlet edges. While these illustrations are all for variations of square and rectangular grids in a single plane, flow device designers with ordinary skills will recognize that the same principles may be extended to other grid layouts including those formed from hexagons, triangles, diamonds, quadrilaterals and other geometries and tessellations. The principles may be extended to filter media where there are a large number of layers of grids in planes parallel to the general flow direction. Generally, the layout of the auxiliary channels will be in a repeating pattern for purposes of uniformity of action and ease of fabrication. This however is not necessary for them to function to improve filtration.

FIGS. 27, 28a, 28b, 28c, 30, 31, 32, 35a, 35b, and 35c illustrate types of filter grids and auxiliary channel geometries. They are meant to represent design concepts. As such single thin lines may also be considered to represent a multiplicity of passages. Also the areas enclosed by the filter passageway lines or auxiliary channel lines may be considered to contain additional filter passages and grids of filter passages that are not shown.

It is also a teaching that flow passages which are referred to by the terms filtering channels, flow distribution channels, auxiliary channels, filtering pores, flow distribution pores, and auxiliary pores in filtering media do not need to be uniformly and regularly spaced or be in regular repeating geometric patterns. The spacing and patterns may be irregular and be randomly variable. The grid or lattice of passageways in two dimensional planes may be composed of a multiplicity of differing polygons and curve sided and straight sided geometries. The grids may be Voronoi tessellations in 2 and 3 dimensions. The grids may be formed by random processes or a tessellation process or any tiling process.

Figure 30:
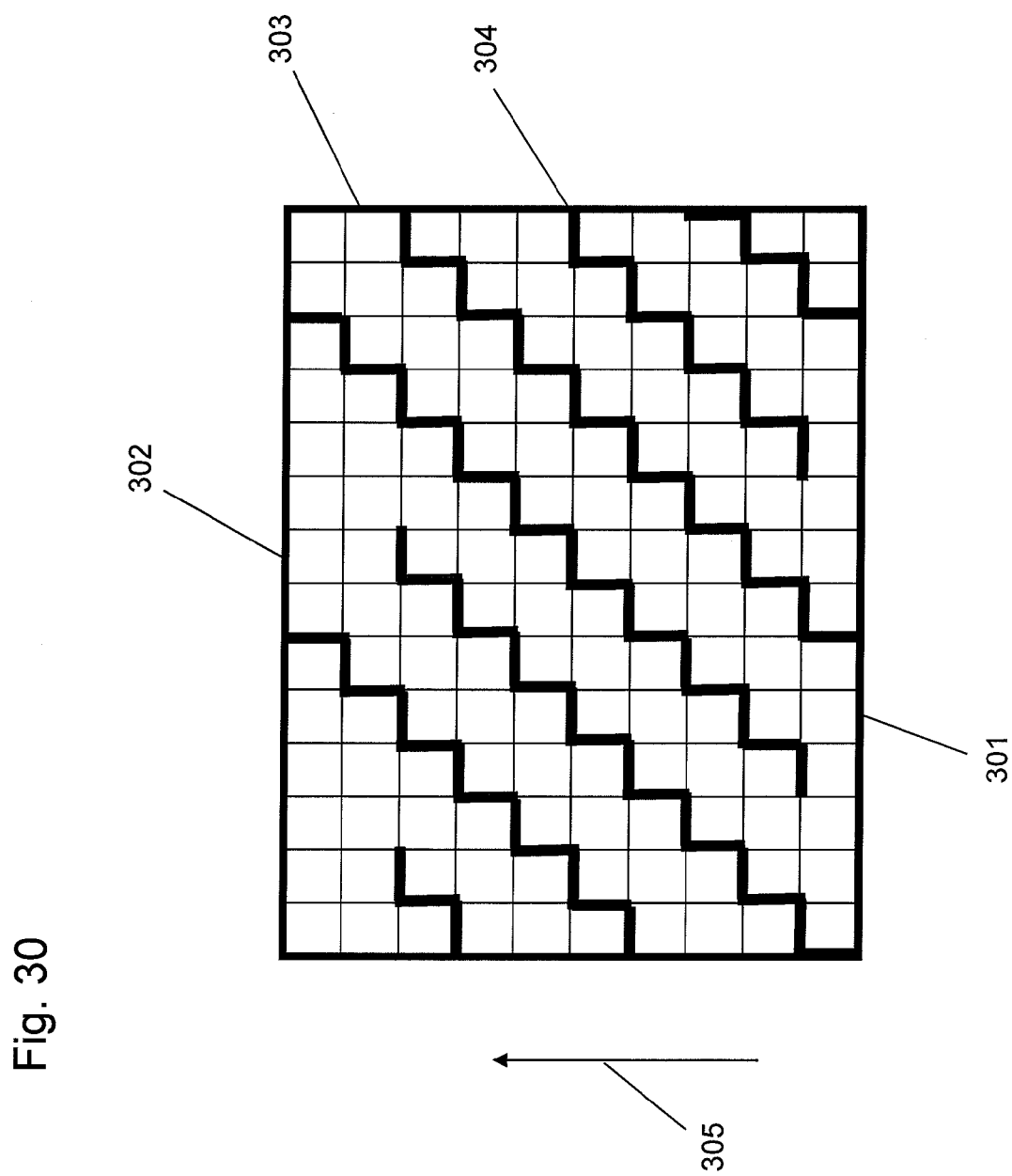
FIGS. 30, 31 and 32 are schematic illustrations of filtering grids which include auxiliary channels.

FIG. 30 illustrates a section of another sheet with a basic filtering, square 2D grid 303 in one plane in one flow grid layer. Arrow 305 indicates the direction of flow through the sheet from an inlet edge 301 to an outlet edge 302. Replacing some of the filtering grid channels are the channels of a non-filtering auxiliary grid. Here the auxiliary channels 304 of the non-filtering auxiliary grid provide alternative flow paths into the depth of the filter sheet. These are distinguished as bold lines. In this style of non-filtering auxiliary grid implementation, the auxiliary channels extend both from the inlet edge and the outlet edge. With proper choices of the particle capture probabilities of the channels of the filtering grid and the dimensionless auxiliary channel flow resistance, improved filtration may be obtained relative to the filtering grid alone.

Figure 31:
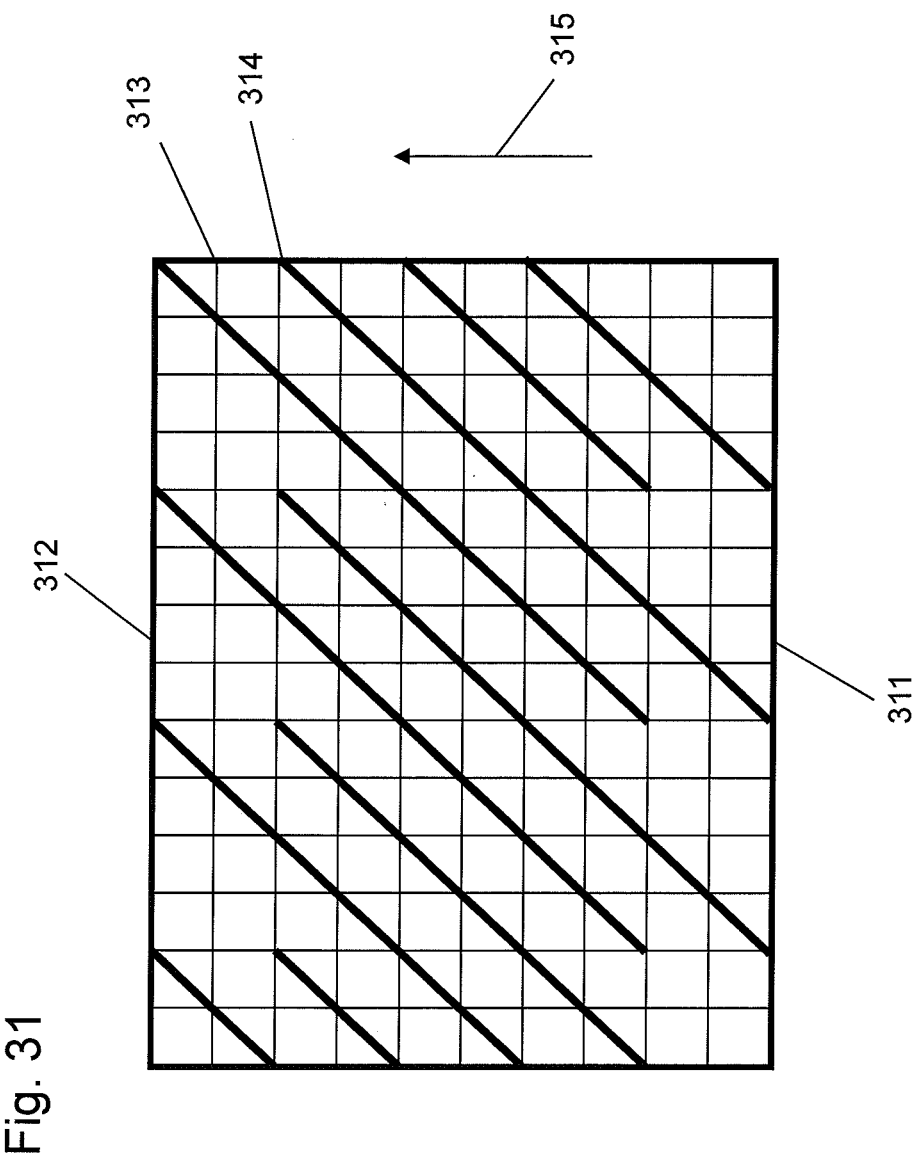

FIG. 31 illustrates a section of a micro-channeled sheet with a basic filtering, square 2D grid 313 in one plane in a sheet. Arrow 315 indicates the direction of flow through the sheet from an inlet edge 311 to an outlet edge 312. Here the auxiliary channels illustrated as bold lines 314 provide alternative flow paths into the depth of the filter sheet. In this style of auxiliary channel grid implementation, the auxiliary channels extend both from the inlet edge and the outlet edge, and do not replace any of the filtering grid passageways. With proper choices of the particle capture probabilities of the filtering grid channels and the dimensionless auxiliary channel flow resistance, improved filtration may be obtained relative to the filtering grid with no auxiliaries.

Figure 32:
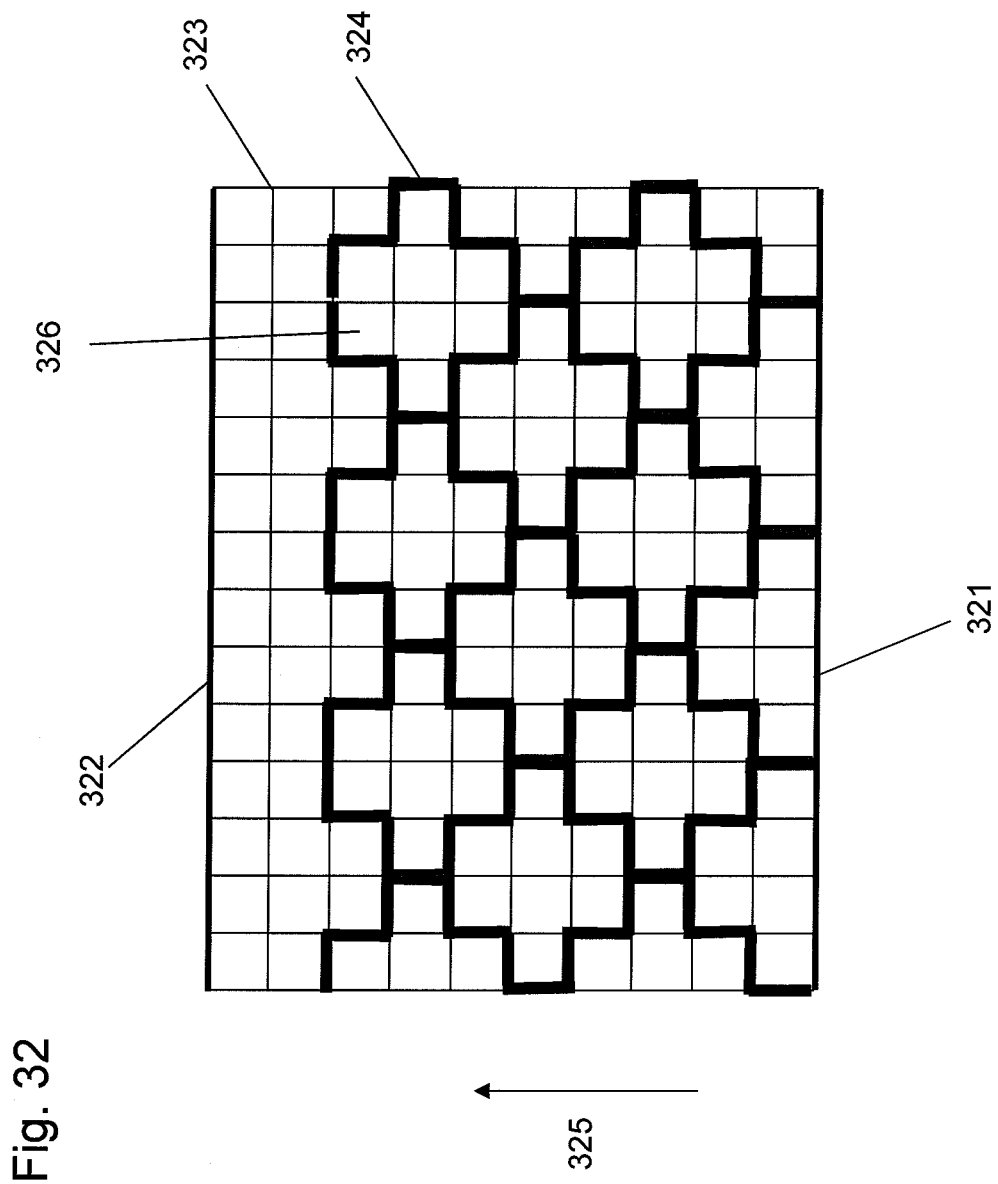

FIG. 32 illustrates a section of another sheet with a basic filtering, square 2D grid 323 in one plane with one flow grid layer. Arrow 325 indicates the direction of flow through the sheet from an inlet edge 321 to an outlet edge 322. Replacing some of the filtering grid channels are the channels of a non-filtering auxiliary grid. The auxiliary channels 324 of the non-filtering auxiliary grid provide alternative flow paths into the depth of the filter sheet. In this style of non-filtering auxiliary grid implementation the auxiliary channels enclose regions 326 containing only filtering channels. With proper choices of the particle capture probabilities, and the dimensionless auxiliary channel flow resistance, improved filtration may be obtained relative to a simple filtering grid. Preferred capture probability distributions in the enclosed regions are bimodal and multimodal. Preferred are distributions where the probability increases in the general flow direction.

4. Improvement of Known Prior Art Porous Media with Auxiliary Channels

Figure 33:
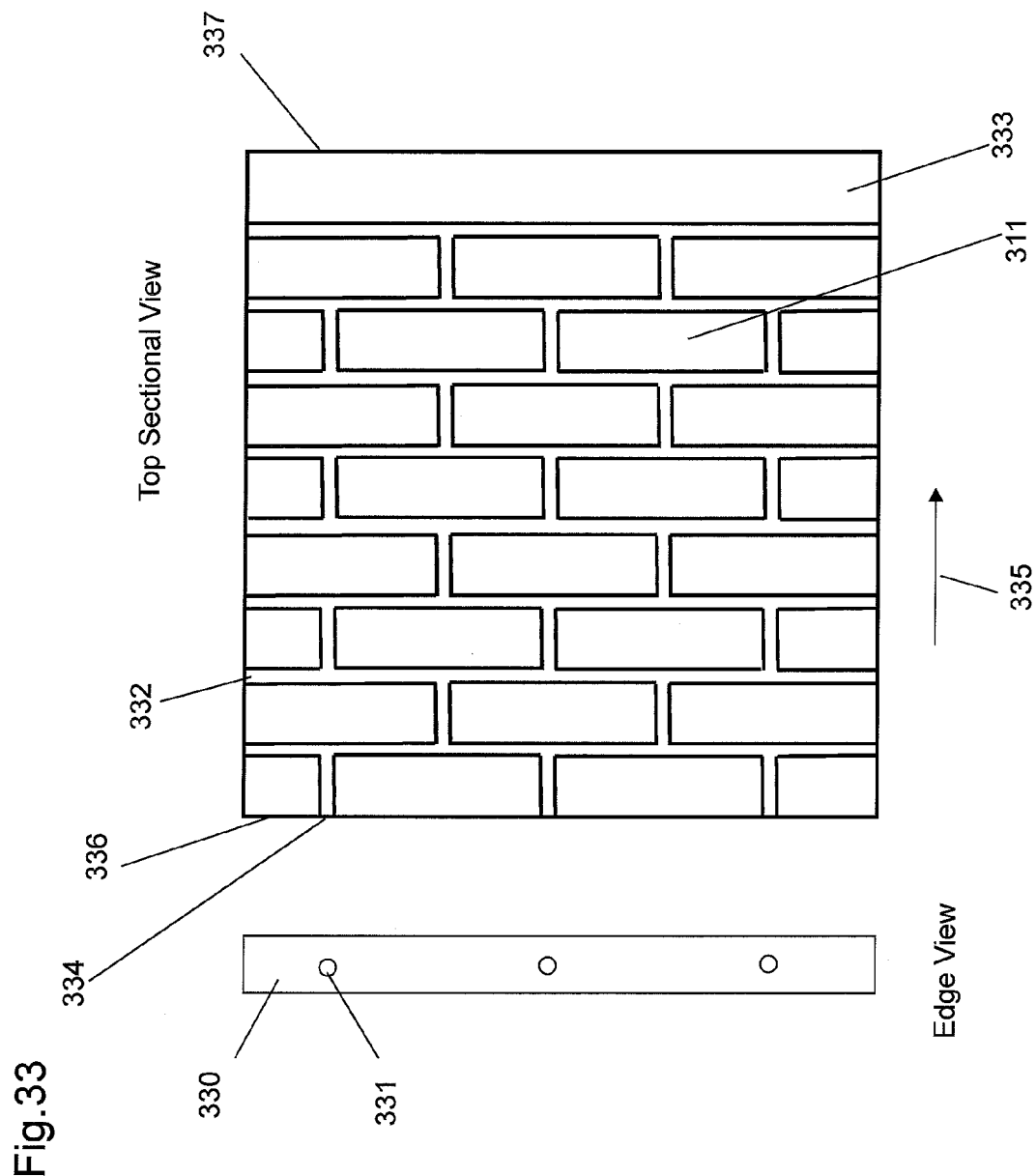
FIG. 33 is a schematic illustration of a section of a conventional porous, sintered, metal sheet modified with auxiliary micro-channels.

FIG. 33 illustrates a section of a porous sintered metal sheet modified with auxiliary micro-channels 332 according to the teaching of this invention. An edge view is shown along with a mid-plane, sectional top view. The porous metal material 330 comprises the bulk of the sheet. The individual pores are not illustrated. Auxiliary micro-channels 331, 332 and 334 comprising part of a non-filtering auxiliary grid present within the sheet are shown. Micro-channel 334 extends from the inlet face 336 of the sheet. Arrow 335 indicates the general direction of flow from the face edge to the outlet face of the sheet. Some auxiliary micro-channels 334 extend in the depth direction. Others 332 extend in the width direction. The rectangular grid defines regions of influence. They are delineated and outlined by the micro-channel closed loops in the plane. An example is region 311. Region 333 adjacent to the outlet edge of the sheet contains no auxiliary micro-channels.

The non-filtering auxiliary grids geometries of useful in filtration sheets and illustrated in FIGS. 27, 28a, 28b, 28c, 30, 31, 32, 35a, 35b, and 35c all may be used to improve the flow through the internal structure of conventional granular porous media including, but not limited to granular, particulate, fibrous and various combinations. This improved media may be in the form of a sheet, layered sheets and three dimension blocks.

While this illustration of the invention is of a sheet of granular porous media, and includes only a one layer 2D grid of auxiliary channels, porous media containing regular 3D grids of auxiliary channels are also part of the teaching of this invention. Random placement and orientations of the passageways of one or more auxiliary grids are also a teaching.

Figure 34:
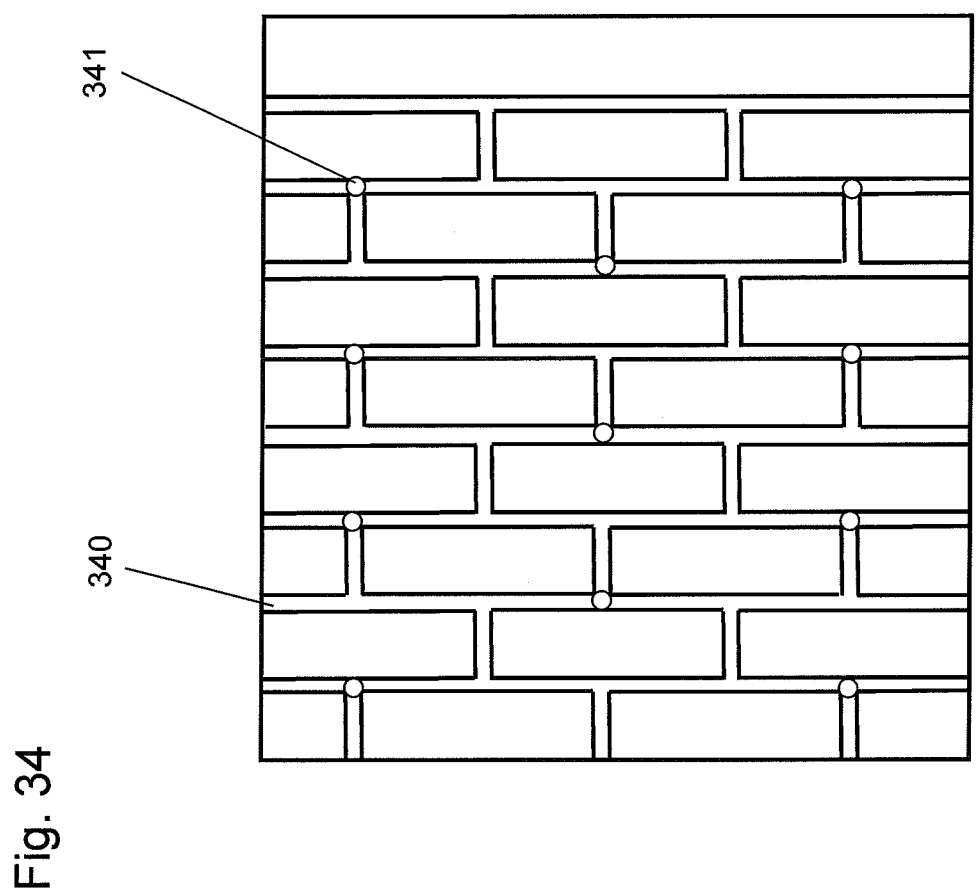
FIG. 34 is a schematic illustration of a section of a conventional porous, sintered, metal sheet modified with auxiliary micro-channels spanning 3-dimensions.
Figure 35A:
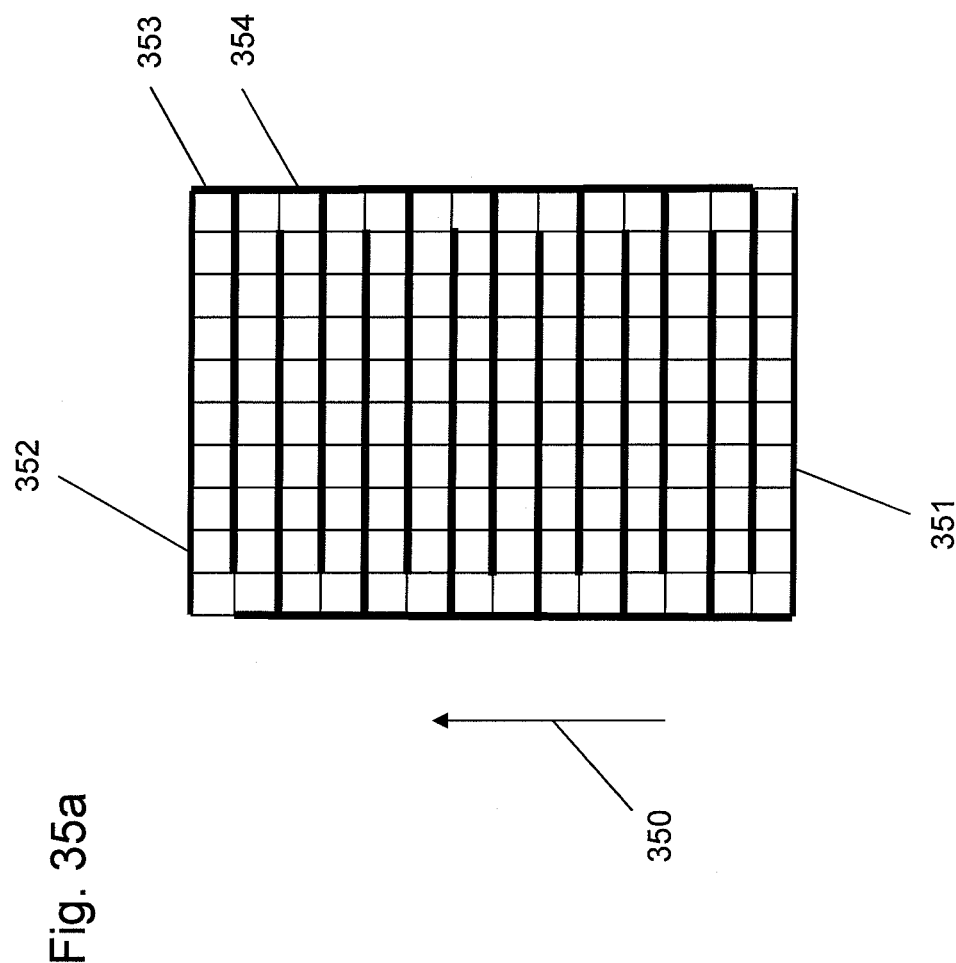

FIG. 33 illustrates a sectional view looking down on a portion of a sheet containing micro-channels in a single plane. FIG. 34 is a sectional view of conventional sinter metal porous sheet containing multiple planes or layers of auxiliary micro-channels through its thickness. It contains in one plane channels 340. It also contains inter-plane channels 341 that allow flow to pass between the grids of channels on different levels.

Careful studies of conventional porous media simulations have been performed. In conventional porous media the filtering pores may consist of the void volumes in beds of the media formed from assemblages of particles. The pores may be regular or irregular shapes. The pores may have various size distributions. The particles may be of uniform size. They may be obtained from conventional screening processes or maybe produced by other methods.

It is also a teaching that non-filtering auxiliary channel grids may be used to improve porous media when incorporated into the internal matrix of the porous media. The media includes assemblages of micro-channel sheets and granular porous materials. Conventional media, as exemplified by sintered porous metal, has an array of particles with a distribution of sizes. Other conventional media materials also have randomness. We have found that filter media may be improved by the placement of auxiliary micro-channels within the media. Commonly, making a block of conventional porous media more porous improves its ability to flow fluid through it while decreasing its ability to filter out contaminating particles. This invention allows improved flow and simultaneously improves filtering by the media. Using micro-channel auxiliary grids to modify the filtering porous internal structure and connectivity of conventional media improves filtration and is a teaching.

Micro-channel and auxiliary channel modification of the internal structure of known porous media allows more effective use of the internal pore structure and reduces flow resistance. It has been found the inclusion of auxiliary channels within the porous media substantially improves filtration. Preferred channels include internal repeating geometries of flow grids. Improve filtration may also be achieved with the random grids or non-regular grids of auxiliary channels. The filtration improvements are obtained without substantial reduction in the strength of a filter element and its ability to resist shear, compressive, tensile and bending forces.

Consider the case of a replaceable filter element which fits into the volume space which is a cube. Further consider the case where the flow through this element is from the front to the back face and where the other faces are not permeable to flow. If the filter media is a fused granular matrix, the strength of the element depends only on the strength of the matrix. The maximum element strength is obtained when the media totally fills the cube of volume. The same is true if the filter media is a layered structure containing grids of channels where the layers are fused together. Any removal of portions of media to create a structure of greater inlet or outlet surface area on the media within the cube volume produces an element of lower strength. It also lowers the mass of filter media per unit volume.

We have found placing grids of auxiliary channels, or a plurality of micro-channels within the filter element base media material makes it more porous and improves the filtering action. This allows the mass of filter media to totally fill the volume for maximum strength. These channels simultaneously promote the use of all internal volume of the media for capturing particles while lowering the pressure drop through the media.

These very small auxiliary channels do not significantly reduce the strength of the element. These very small auxiliary channels do not significantly reduce the active volume or mass of filter media within the limited space of the volume of the element.

Without the auxiliary channels the performance of the filter element is dependent upon the exposed inlet edge face area. With auxiliary channels the performance of the filter element may be made dependent upon the volume of the media in addition to the area of an inlet face or faces. Conventional filter media tends to concentrate the entrapment of particles at the faces of the filter element. Auxiliary channels promote the use of the entire volume and improve filtration. The auxiliary channels are fluid transport paths designed so as to avoid contaminant capture within them. They are paths designed and located to enhance fluid transport and contaminant flow into the media. And again in general, the addition of auxiliary channels does not significantly change the mechanical strength of the media.

Any known porous media may be used for the bulk of the new inventive media with auxiliary channels and auxiliary transport pores. The bulk media described as conventional porous media may be comprised of granular materials, fibrous materials, and combinations. The chemical compositions may be singular or mixtures of compounds or elements. The individual grains or fibers may be bonded together to form a matrix. They may be simply packed together or loosely associated in a confined volume.

The conclusions and findings are valid for filter media in general and not just sheets or media with regular, simple, repeating geometric grid assemblies. The conclusions are valid for filter media with random pores, or a distribution of sizes, or the filtering of contaminates with a distribution of sizes.

The following examples and simulation results illustrate the improved filter media that may be obtained using the teachings of this invention.

In the prior art one method of improving filter performance is to increase the inlet edge area through which the fluid flows. One illustration of this teaching is U.S. Pat. No. 7,125,490. Here a folded sheet structure is used. This is schematically illustrated in FIG. 36. Shown is a cross section of a segment 360 of the structure. The media is shown as the grey area. Fluid flows to an inlet side indicated by arrows 362 and from an exit side indicated by arrows 364. The folding of the media creates increased area within the volume using the large inlet side indents 361 and outlet side indents 363. The view is a cross sectional view where the pleated filter geometry extends in the direction normal to the section. The total volume enclosing the filter media in cross section is outlined in this view by dashed line box 365. The volume is roughly twice the actual volume of the media. Half the total volume of the filter element is used to enable fluid to access the extended surface area of the folds.

A teaching of this invention is to fill the total volume indicated by line 365 with filter media modified by auxiliary flow channels where these facilitate penetration of particles into the total volume. The auxiliary flow channels have hydraulic diameters slightly larger to larger than the nominal or average pore size of the media. It is preferred that the auxiliaries are distributed within the media with a repeating, predetermined geometry. It is preferred that a multiplicity of the auxiliaries provide auxiliary flow paths from the inlet edge of the media and into the internal volume of the media. It is preferred that the auxiliary channels have a low probability of capturing the particles being filtered. It is most preferred that their probability of capturing the particles being filtered is near zero. It is preferred that the auxiliary channels be micro-channels.

Tests have shown that using media of this invention with the auxiliary channels allows the filter to remove three to more than six times more particles than the conventional folded structure of FIG. 36. The media of this invention will have more than twice compressive strength of the folded structure, more than 7 times the resistance to shear, and more than 120 times the resistance to bending.

FIG. 37 illustrates the device of Kelly et al. in U.S. Pat. No. 7,361,300. The cylindrical element 370 filters fluid flowing from top to bottom. The entering flow indicated by arrows 372 enters the top inlet face and into the large holes 371 extending into the volume of the element. The holes increase the filter inlet face area. Holes also extend from the bottom outlet face into the element. These are not shown. Fluid flows out the bottom of the element as indicated by arrow 373. The illustration figures of the Kelly et al. patent illustrate hole placements that remove approximately half the media volume and mass of the element. Although the sintered metal media described is strong, the elimination of half the mass reduces the compressive strength by roughly one-half. Our modeling studies indicated the volume of the element is inefficiently used.

Modeling of the use of micro-auxiliary channels indicates a two to eight times improvement in filtration may be achieved by filling the entire volume taken up by the element with media and using a multiplicity of the auxiliary channels internally. Investigation of the detailed reasons for the improvement indicates that the improvement is first a result of having more mass of media present in the element and secondly that the auxiliaries allow a greater percentage of the internal pores to trap particles.

Figure 38:
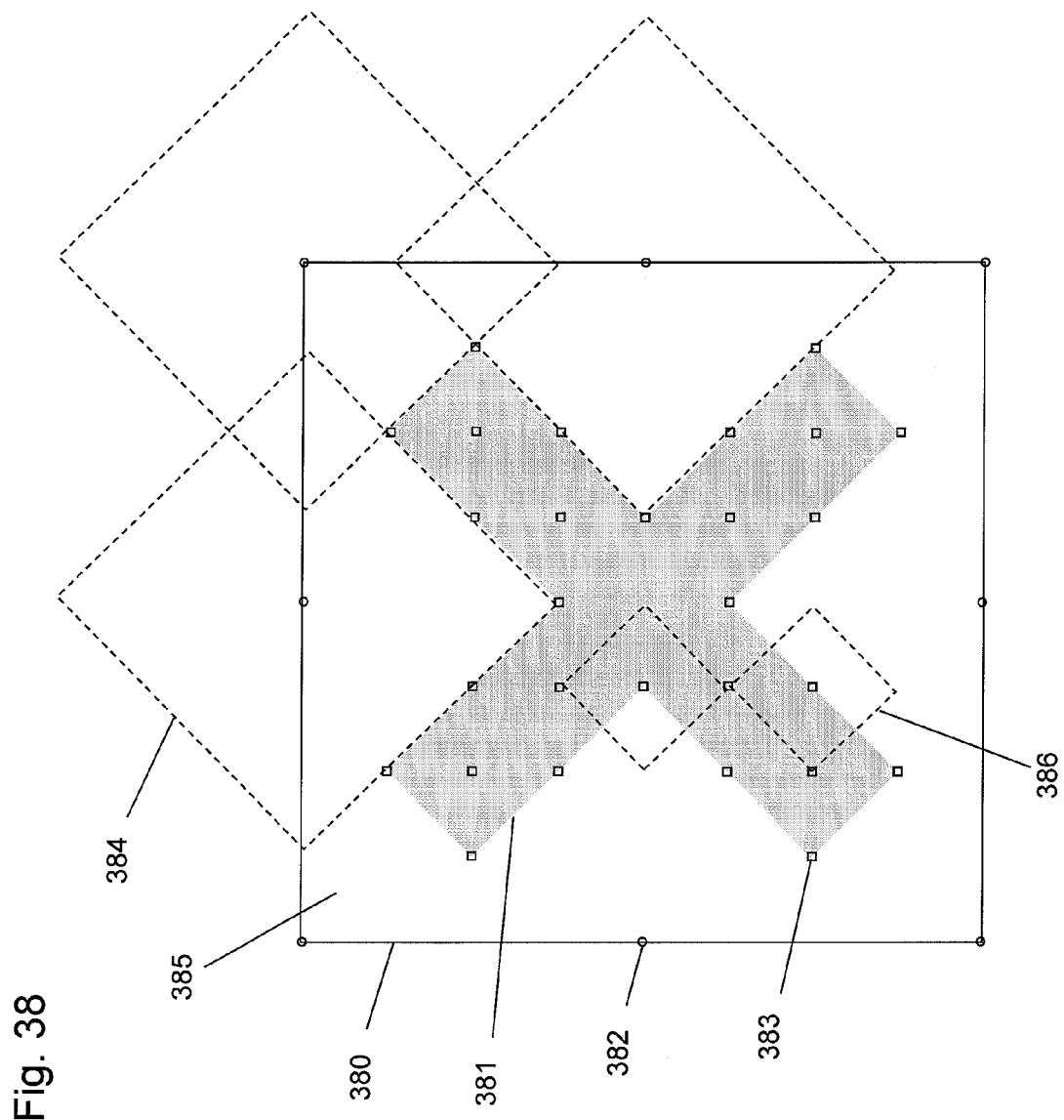
FIG. 38 is a schematic cross-sectional illustration of a block of filter media containing a preferred array of inlet and outlet auxiliary channels.

A simple useful auxiliary channel 3D grid geometry is illustrated in cross section in FIG. 38. It illustrates the placement of micro-channels in a cross-section of a small cube subsection of filter media at a plane between the inlet and outlet sides of the filter element. Auxiliary channels penetrate the media volume from the inlet and outlet faces. The flow is from an inlet face to a parallel outlet face. FIG. 38 illustrates a small sub-cross-section 385 of a cross section of the filter media taken parallel to the inlet face. This subsection is bounded by the line 380 that defines the cross sectional area of the subsection. This is a region which abuts edge to edge with like regions that fill the total cross section of media. Running perpendicular to the cross-section are inlet auxiliary passageways that intersect the inlet face. These are indicated by the small squares 383. Small circles 382 indicate outlet auxiliary passageways that parallel the inlet auxiliary passageways. The outlet passageways intersect the outlet face of the element, but not the inlet face. Likewise the inlet auxiliary passages do not intersect the outlet face. The size of the circles and squares are not necessarily proportional to their actual size. They only serve to locate the relative positions.

The volume of the media is filled with a regular cubic grid of filtering passages that run parallel to the three major axii of the element. They intersect each other and totally fill the volume. These are the pores that filter the fluid passing through the media. These individual pores are not shown in this schematic.

Each outlet auxiliary channel is surrounded by a performance region of influence indicated by the large dashed square areas 384. If an inlet auxiliary channel lies within the region, the probability of a particle escaping from the filtering grid and passing into the outlet flow in an outlet auxiliary channel is greater than a target level. The target level depends upon the design specifications of the filter. For example it might be 1 percent of the particles processed, 0.1 percent or some other value. A preferred grid of auxiliaries is shown in FIG. 38. It consists of eight outlet auxiliaries located on the perimeter of the subregion illustrated. Further, all the inlet auxiliaries are confined to an area in the form of a cross indicated by the grey area 381 within the subregion 385.

One useful space placement of auxiliaries is shown. It has been found that each inlet auxiliary is surrounded by a small square zone of influence indicated by the small dashed lined squares 386. Only two are shown, but all inlet auxiliaries are surrounded by these zones of influence. It is found that when two inlet auxiliaries exist within a zone of influence, they restrict the filtration performance.

When a first inlet auxiliary exists in the center of its zone of influence, it is found that on the average a given number of particles will flow from the auxiliary into the filtering pores and be trapped. The number will depend at least on the average capture probability of the pores, the flow in the auxiliary, the relative resistances to flow in the pores and the auxiliaries, and the desired filtration end point. When another inlet auxiliary is placed within the influence zone of the first, the particles filter will not double. The two auxiliaries will interact to restrict the filtration performance expected by two single isolated auxiliaries.

For a given set of filtration and media parameters, there will tend to be an optimum number and an optimum distribution of the auxiliaries.

The filter pores need not be arranged in cubic grids. Grids of pores created in the sintering granular materials are more random. The filtration performance of granular metal and plastic media may also be greatly improved by the placement of auxiliary channels and micro channels within the media. Generally, this does not significantly change the number of pores available for filtering. Conventional filter element designs limit capture of contaminants to pores near the inlet face. The auxiliary channels of this teaching allow the pores within the whole element volume to function to capture particles.

Figure 39:
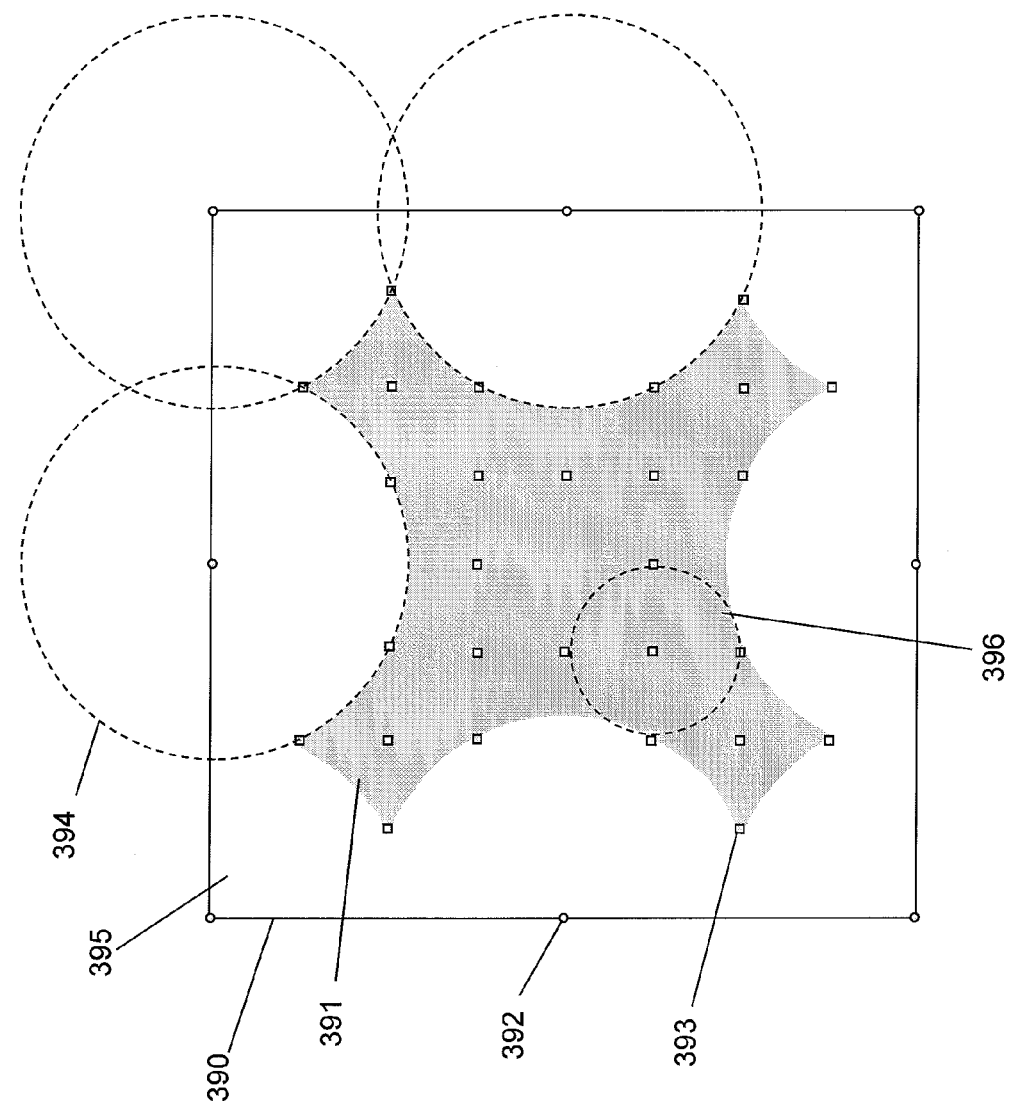
FIG. 39 is a schematic cross-sectional illustration of a block of filter media with randomly distributed filtering pores and containing a preferred array of inlet and outlet auxiliary channels.

If the volume of an element is filled with sintered granular media, a simple useful 3D grid of auxiliary channels consists of two sets of passageways that penetrate the inlet and outlet faces. Flow is from an inlet edge or face to an outlet face. FIG. 39 illustrates a small sub-cross-section 395 of a cross section of the filter media taken parallel to the inlet face. This subsection is bounded by the line 390 that defines the area of the subsection. This is a region which abuts edge to edge with like regions that fill the total cross section of media. Running perpendicular to the cross-section are inlet auxiliary passageways that intersect the inlet face. These are indicated by the small squares 393. Small circles 392 indicate outlet auxiliary passageways that parallel the inlet auxiliary passageways. The outlet passageways intersect the outlet face of the element, but not the inlet face. Likewise, the inlet auxiliary passages do not intersect the outlet face. The size of the circles and squares are not necessarily proportional to their actual size. They only serve to locate the relative positions.

By nature granular and other known media, their volume is filled with a random grid of interconnected passages. Passages intersect each other throughout the volume. These pores filter the fluid passing through the media. These individual pores are not shown in this schematic.

Each outlet auxiliary channel is surrounded by a performance region of influence indicated by the area delineated by the large dashed circle 394. If an inlet auxiliary channel lies within the region, the probability of a particle escaping from the filtering grid and passing into the outlet flow in an outlet auxiliary channel is greater than a desired level. The target level depends upon the design specifications of the filter. Therefore, the size of this circle depends upon the characteristics of those chosen for the filter and the media. For example the desired level of particle escapes might be 1 percent of the particles processed, 0.1 percent or some other value. A preferred grid of auxiliaries is shown in FIG. 39. It consists of eight outlet auxiliaries located on the perimeter of the subregion illustrated. Further, all the inlet auxiliaries are confined in an area in the form of a cross indicated the grey area 391 within the subregion 395.

One useful spatial placement of inlet auxiliaries is shown. It has been found that each inlet auxiliary is surrounded by a circular zone of influence indicated by the small dashed circles 396. Only one is shown, but all inlet auxiliaries are surrounded by these zones of influence. It is found that when two inlet auxiliaries exist within a zone of influence, they restrict the filtration performance.

When a first inlet auxiliary exists in the center of its zone of influence, it is found that on the average a given number of particles will flow from the auxiliary into the filtering pore and be trapped. The number will depend at least on the average capture probability of the pores, the flow in the auxiliary, the relative resistances to flow in the pores and the auxiliary, and the desired filtration end point. When another inlet auxiliary is placed within the influence zone of the first, the particles filter will not double. The two auxiliaries will interact to restrict the filtration performance expected by two single isolated inlet auxiliaries For a given set of filtration and media parameters there will tend to be an optimum number and a distribution of optimum placements.

Figure 40:
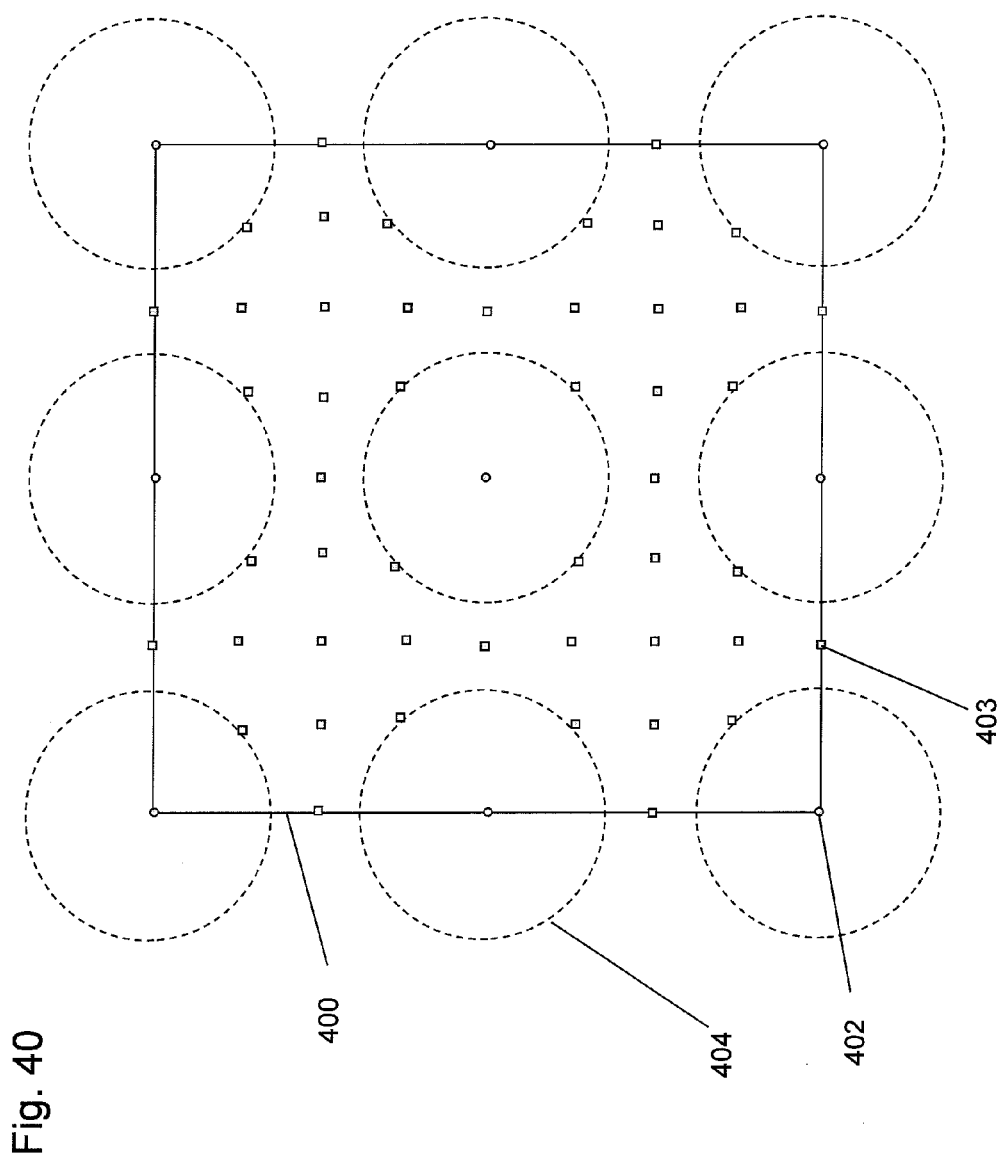
FIGS. 40 and 41 are schematic illustrations of a block of filter media containing a preferred arrays of inlet and outlet auxiliary channels.
Figure 41:
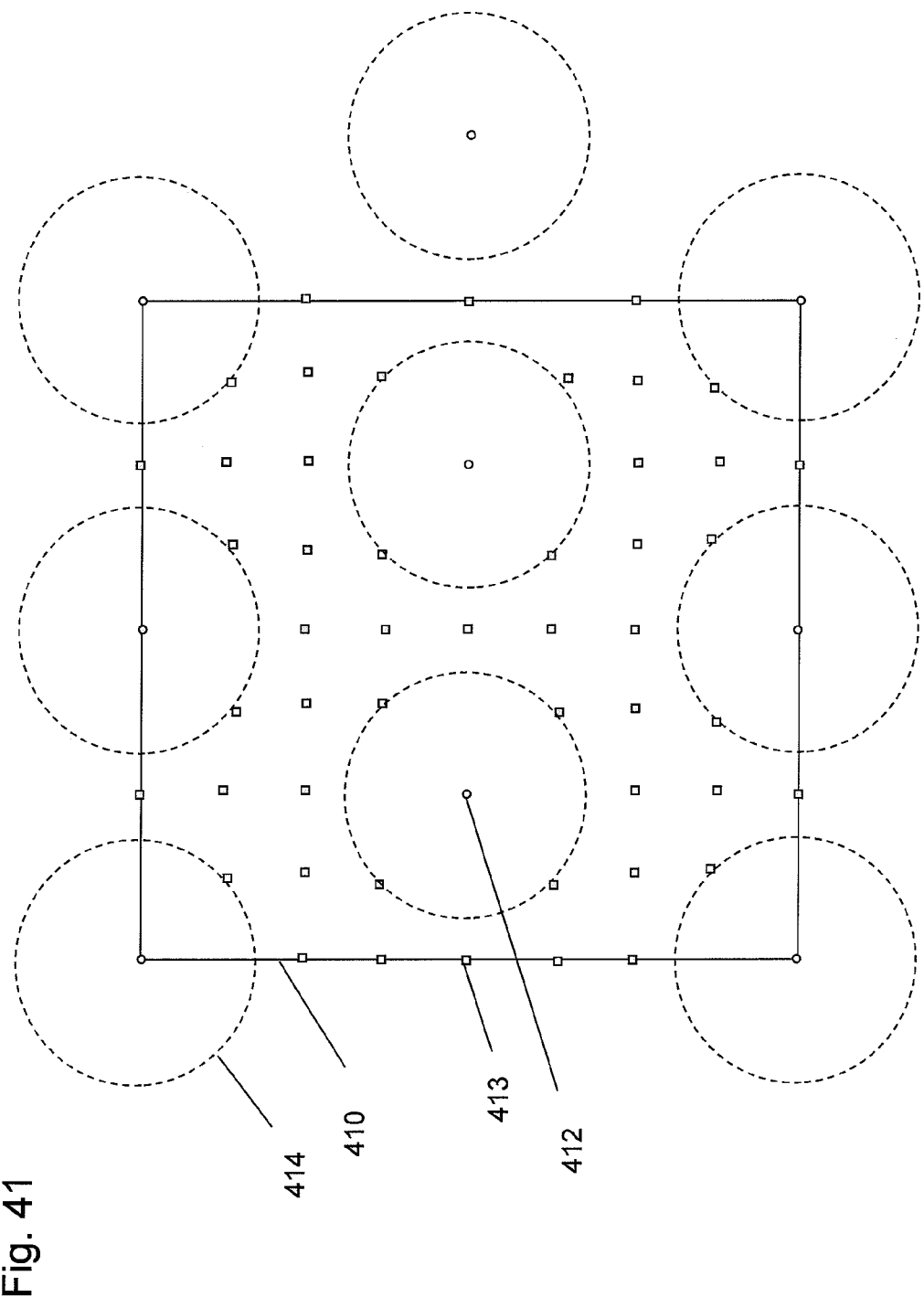

FIGS. 40 and 41 illustrate small subsections of cross sections of the filter media closely related to that illustrated in FIG. 39. These subsections are bounded respectively by the lines 400 and 410 that define the area of the subsections. These are regions which abut edge to edge with like regions that fill the total cross section of media. Running perpendicular the cross-section are inlet auxiliary passageways that intersect the inlet face. These are indicated by the small squares 403 and 413. Small circles 402 and 412 indicate outlet auxiliary passageways that parallel the inlet auxiliary passageways. The outlet passageways intersect the outlet face of the element but not the inlet face. Likewise the inlet auxiliary passages do not intersect the outlet face. The size of the circles and squares are not necessarily proportional to their actual size. They only serve to locate the relative positions.

Again the volume of the element is filled with a random grid of pores. Some of them are interconnect. These pores filter the fluid passing through the media. The individual pores are not shown in this schematic.

Each outlet auxiliary channel 402 and 412 is surrounded by a performance region of influence indicated by the area delineated by the dashed circles 404 or 414. Here to, if an inlet auxiliary channel lies within the region, the probability of a particle escaping from the filtering grid and passing into the out flow passages is greater than a desired target level. The target level depends upon the design parameters for the filter. Therefore, the size of this circle depends upon the characteristics chosen for the filter and the media. Preferred arrangements of auxiliary channels are shown in FIGS. 40 and 41.

In FIG. 40 the closest outflow auxiliaries are arranged in a square pattern. In FIG. 41 they are arranged in a triangular pattern. They are located on the perimeter and internal of the subregion illustrated. Further, all the inlet auxiliary channels are confined to an area outside the performance areas delineated by the dashed circles 404 and 414.

Our studies show it is quite beneficial for the number of inlet auxiliary channels to outnumber the outlet channels by a factor of more than 1.2 to 1. It is preferred that the ratio of the number of inlet to outlet auxiliary channels be greater than 2. More preferred is a ratio greater than 3.

a. Further Filtration Examples

The performance of a conventional pleated filter media like illustrated in FIG. 36 has been modeled. The depth thickness was sufficient to achieve a capture efficiencies greater than 98.2 percent for a particle capture probability of 0.3, greater than 99.9 percent for a pore capture probability of 0.5, and greater than 99.99 percent for a probability of 0.7 for the target particles. In the simulations using a fixed pressure across the filter, the number of particles captured was followed up until the flow was reduced to 50 percent of the initial value. The ratio of the pleated media thickness before folding, to the thickness of the Z-fold element in the depth direction as indicated by arrow 366 was approximately 0.14. The results for these conditions and geometry are labeled Z-fold in the tables of results in FIGS. 44 and 45.

Contrasted with the Z-fold results are results for elements using solid blocks of improved filter media employing micro-auxiliary channels. The solid blocks all had the same depth dimension as the Z-fold element.

The improved filter media with an auxiliary inlet and outlet micro-channels in the pattern of FIG. 38 was tested. Its results are labeled Micro-auxiliary1 in the following tables.

Figure 42:
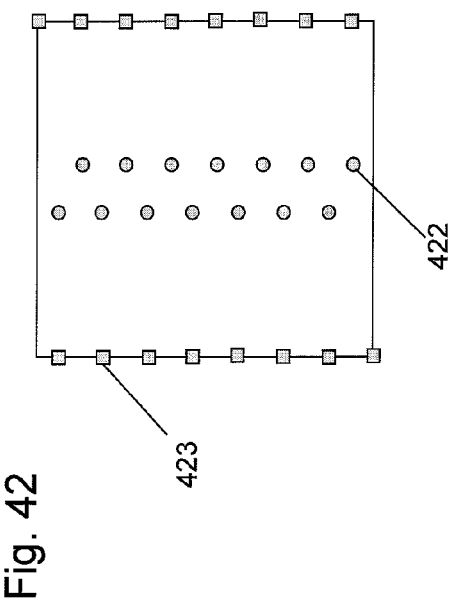
FIGS. 42 and 43 are schematic cross-sectional illustrations of example arrays of inlet and outlet auxiliary channels within filter media.
Figure 43:
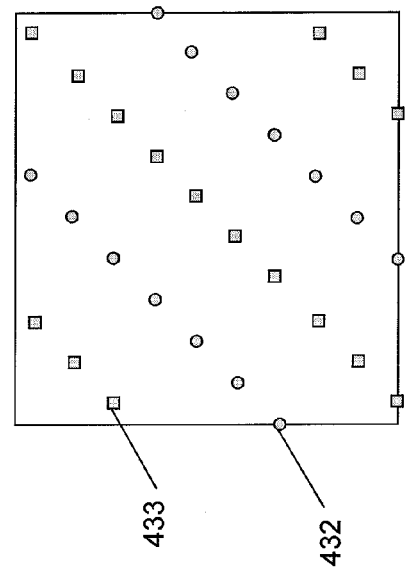

Improved filter media with auxiliary inlet and outlet micro-channels positioned as illustrated in FIGS. 42 and 43 were also tested. In FIGS. 42 and 43 the micro-channel locations at a plane between the inlet and outlet faces of the filter media are represented by the small squares 423 and 433 for the inlet micro-channels and small circles 422 and 432 for the outlet micro-channels. The results for these geometries are labeled Micro-auxiliary2 and Micro-auxiliary3 respectively. The filtering pores of the media were identical for all four geometries.

A representative sample of the Z-fold filter element occupies a volume which has a rectangular cross section indicated by dashed rectangle 365 in FIG. 36. In one case, the Z-fold filter is compared with blocks of the improved Micro-channel media where the blocks fill the same total volume as the Z-fold element sample. In a second case, the performance of improved media is compared to Z-fold elements on an equal mass basis.

In FIG. 44, Table 1 compares the total number of particles captured by the filter elements by the time the filtration process end point is reached. Z-fold media is compared to the improved media Micro-auxiliary1 for three pore capture probability levels. The results are compared for both the equal total mass case and for the equal total volume case. In every situation the improved media containing micro-auxiliary channels is vastly superior. It is superior on an equal volume basis, and on an equal mass basis. Additionally, the Z-fold performance varies by more than 100 percent as the particle capture probability varies. The micro-channel media of this invention shows improved operational flexibility indicated by only a less than 25 percent variation in performance.

In FIG. 45, Table 2 compares the ratio of particle captures of the improved media to the Z-Fold element. The improved auxiliary channel containing media is compared on both an equal volume and equal mass basis. In all cases a significant improvement is found when using the media of this invention. Because the improvement is observed on both a mass and volume comparison, the inventive media will generally allow replacement of conventional media elements to improve the contaminant capture performance, or the pressure profile characteristics during filtration, or both simultaneously.

b. Methods of Producing Auxiliary Channels

In still another aspect of the invention, a method for manufacturing the filter element and media is taught. The method generally comprises a step of charging a porous filter media precursor composition into a mold. Commonly, the precursor is a pourable granular material. The grain size and distribution is chosen as to create on the average the pore sizes and distribution desired after bonding the material into a rigid element. The mold is configured to provide an element having a desired size and shape.

Fugitive auxiliary micro-channel masters are placed within the mold. These are constructed of materials that may be removed leaving behind passageways within the bed of granular material. For example, a self-supporting wire frame master structure may be placed within the mold. The wires of the frame may be of wax like material. Granular precursor is poured into the mold filling. It surrounds the wire frame. The precursor is then bonded together without disturbing the wire frame structure. Afterwards the wire frame may be dissolved, liquefied or converted to gas and removed from the bonded granular material. Upon removal of the wire frame master material, auxiliary channels will be left behind within the pore structure of the media. A solid structure is formed with interconnecting pores being the void spaces between the granular material and with an internal grid of auxiliary channels.

The wire frame may be a single piece or multiple pieces. It may be formed by various techniques including but not limited to molding, injection molding, net spinning and 3-dimensional printing. The material of the frame may be polymeric, organic, inorganic, a meltable salt, ice, a meltable material, absorbable material, absorbable material, or vaporizable material. The removal of the auxiliary micro-channel masters is accomplished by a means appropriate for its composition and the media's composition. The auxiliary channels will be interconnected with the pores adjacent to their positions leaving functional auxiliary channels within the porous media.

Removal of the wires leaves behind void spaces that provide the auxiliary flow passageways within the media. After forming the auxiliary channels or during their formation, the precursor can be sintered or bonded together with known techniques.

J. New Coating Methods Using Fluid Distribution Metering Sheets

Coating dies perform two functions. First they distribute and meter fluid across the width of substrate to be coated. And secondly, they apply fluid onto the substrate after the distribution and metering step.

The use of fluid distribution metering sheets is beneficial in coating devices because it allows precise fluid distribution without resorting to precision steel die slots. Secondly, the enclosed edgewise fluid transport through the sheet allows the functional parts of a coating device to be physically separated and replaced with less complex, easier to maintain and often disposable subcomponents. The utility of metering sheets is further illustrated in the following discussion.

1. Physical Separation of the Metering and Application Coating Device Functions a. Improved Blade Coating Die coating methods in general use the slot and cavities of the die to premeter the needed film of liquid required for producing a coating upon a substrate. The die technology creates the film of liquid at the slot exit. The geometry of the die lip and its position next to the substrate is responsible for the uniform transfer of a continuous liquid film onto the substrate translating past the die. With most die coating methods the die operating position is required to be very close to the substrate. This close positioning is needed for uniform coating transfer without air entrainment. Generally, the slot exit is required to be positioned at a distance away from the substrate that is no larger than 1 to 5 times the wet coating caliper on the substrate. This presents operational complexity, difficult positioning requirements, and it creates an elevated probability of scrap generation.

In the process of blade coating, excess liquid is applied to the substrate and the excess is removed by a flexible blade or a stiff blade bearing against the prewet surface. Here the amount of coating left on the substrate is controlled by the forces exerted on the blade and the response of the fluid under the blade.

Coating blades vary widely in shape, sizes, and material. Some are easily bent plastic strips. Others are stiff metal ones. Steel blades range from 0.1 to 1 millimeters in thickness and 10 to 200 millimeters in width equal to the substrate width. Loading of the blade against the liquid wet substrate may be accomplished in several ways. It may be pivoted about a blade clamp to a working angle that differs from the installation angle. It may be deformed by an air bladder bearing against a portion of its length. Various mechanical devices can be used to transmit force normal to the blade surface. The force may be generated by hydraulic, pneumatic, electrical or mechanical means.

Figure 69A:
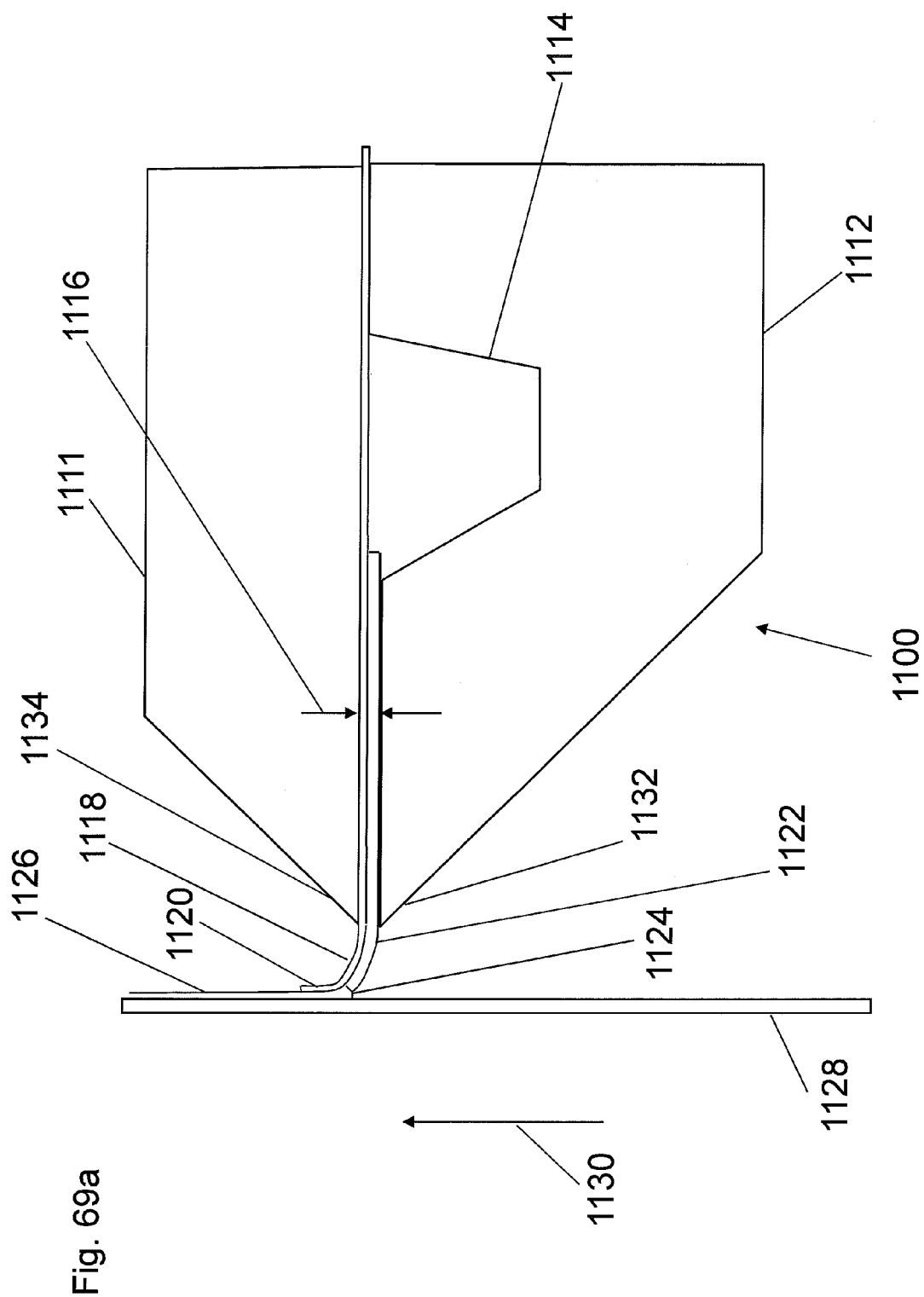

Known blade coating methods are difficult to employ in that they do not allow a premetered fluid to be ducted directly to the blade tip, and applied to the substrate without using excess fluid. FIG. 69a illustrates a novel blade coating device using a fluid distribution sheet device of this invention that overcomes prior art deficiencies. This device allows a coating liquid to be applied onto the substrate when the die body containing the distribution cavity is physically set back from the substrate surface. The metering sheet meters and transfers liquid from the die cavity to the blade tip proximity, and the blade facilitates the transfer onto the substrate.

Shown as a cross sectional illustration, the die consists of a top plate 1111 and a bottom plate 1112. A flexible blade 1118 extends through the die and is sandwiched between the die plates. Additionally, a distribution sheet extends from the internal die cavity 1114. A die slot indicated by the arrows 1116 is present between the two die plates 1111 and 1112. The blade and the distribution sheet pass through and extend from the die slot.

Web 1128 translates past the die in the direction indicated by arrow 1130. The substrate may be a free span of web, or it may be supported by a means (not shown) such as a roll.

Liquid exits from the exit edge 1124 of the distribution sheet 1122. The sheet transports the liquid from the cavity 1114 to the web 1128. The blade forces or promotes transfer of liquid from the sheet end onto the web. A liquid coating 1126 is applied to the web by the blade. The combination of the metering sheet and the blade allow the die slot exit 1118 and the adjacent die lips 1132 and 1134 to be positioned at a distance from the web surface that is more than 20 times greater than the wet coating 1126 caliper.

The distribution sheet 1122 may extend into the cavity 1114 as shown, or it may extend only a limited distance into the die slot 1116. Extension into the cavity is preferred. Doing so tends to enhance the cross web uniformity of flow from the die.

When the coating blade is flexible or the web is unsupported (free span), or the web is supported by a deformable support means, the mechanics of the web, web support, and blade deformation allow uniform coatings to be applied. The blade-distribution sheet combination facilitates coating with the die lips positioned at large distances from the substrate.

The setback die lip position of this coating method allows web splices to pass by the die without retracting the die. The blade force on the liquid and the web allows premetered coating to be applied without air entrainment.

The blade and the distribution sheet of this invention are shown as two separate items. This may sometimes be convenient. The blade and distribution sheet may also be fabricated as a single compound element. In addition they may be laminated together by various means to form a compound element. The two may be combined so they flex or bend together or separately. The position of the blade end 1120, and the sheet fluid exit edge 1124, with respect to the web and each other is determined by coating trials. The positions are dependent upon the coating speed, coating caliper, the web surface and fluid flow properties.

Figure 69B:
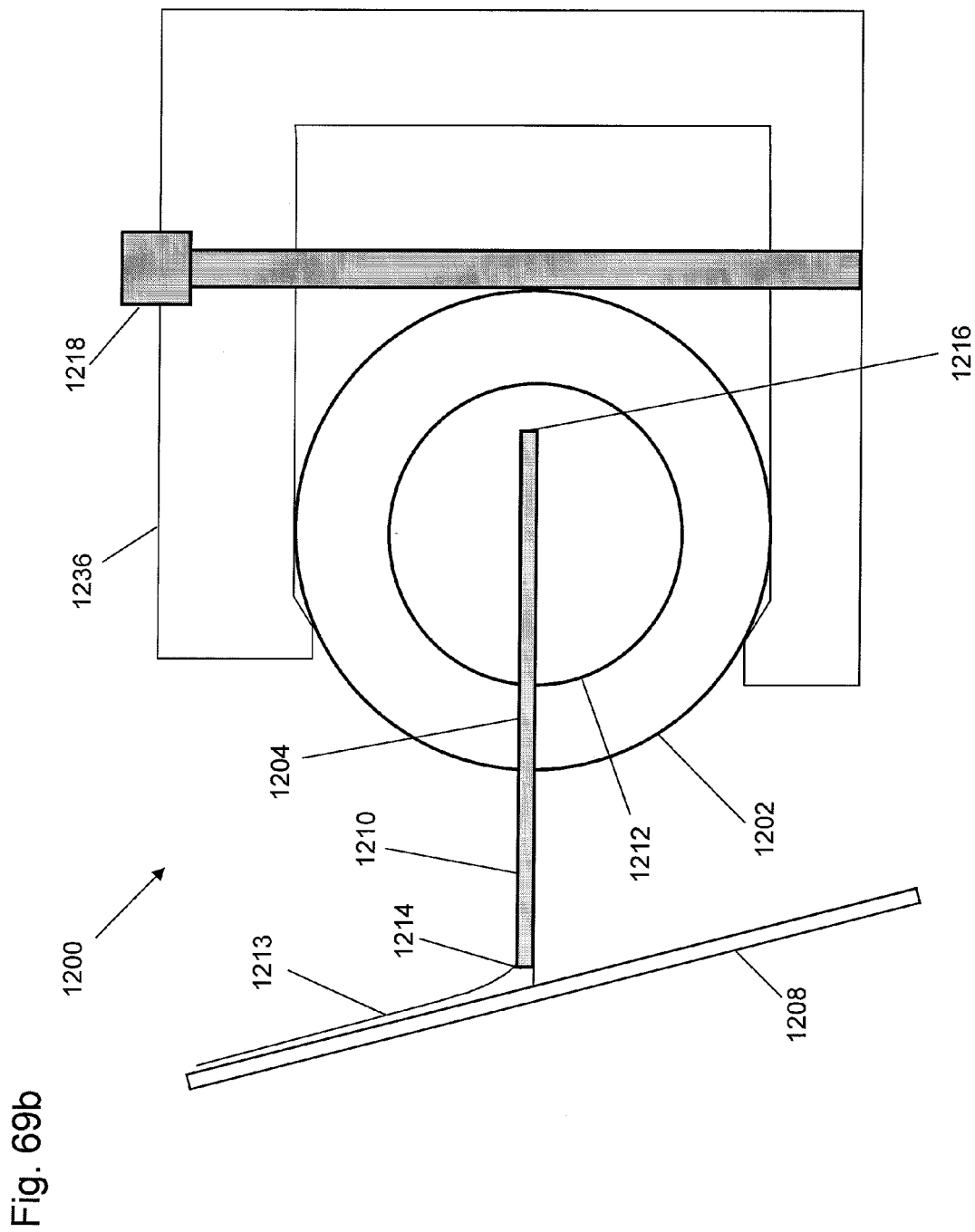

FIG. 69b illustrates and economical construction of the blade type applicator of this invention. It illustrates a simplified coating die assemble 1200 using a fluid distribution metering sheet 1210 and a tubular element 1202. This element is pierced by a slot aperture 1204 which terminates at a die face 1206. Coating fluid is supplied by a metering and pressurizing means not shown. Fluid is transferred to a substrate 1208 which translates past it. The slot 1204 contains the fluid distribution metering sheet 1210. This type of sheet is described in the preceding sections.

The tubular element 1202 is constructed as a cylindrical body which is open at both ends and has a cylindrical bore 1212. The slot 1204 is formed, molded or machined in the tube. There is thus as defined by the bore 1212, a confined space connected to a discharge slot 1204. Also provided are end caps (not shown) which operate to close off the slot 1204 at opposite ends of the tubular element as well as the ends of the cylindrical bore 1212. The die 1200 is mounted in clamp 1236 which includes a plurality of clamping bolts 1218.

The distribution sheet 1210 is cantilevered from the tube 1202. It ducts flow from the cavity 1212 by way of its inlet edge 1216 to its discharge edge 1214. The die is mounted so as to bring the distribution sheet against the web 1208 translating by it. Fluid 1213 issues from the sheet discharge edge 1214 and is applied to the web. The web speed, the flow rate of fluid, and fluid properties determine the structure and stiffness of the sheet needed for coating. An extruded tubular die element forming the bulk of a die body combined with a fluid distributing metering sheet make up a low cost coating device requiring little or no precision machining to fabricate. The die may be constructed from polymeric materials and may be disposed of by incineration.

The distribution sheet may be a compound sheet composed of a sheet layer which ducts flow from an inlet to an outlet edge along with a structure support layer to modify the composite mechanical properties.

FIG. 70a illustrates another novel blade coating device variation of this invention. This device allows the coating die to be used to deliver liquid onto the substrate when the die slot exit is retracted from the substrate surface. A metering sheet transfers liquid 1318 from the die to the blade tip 1320 proximity, and the blade 1319 forces it onto the substrate.

Shown as a cross sectional illustration, the die consists of a top plate 1311 and a bottom plate 1312. A flexible blade 1319 extends through the die. It is sandwiched between the die plates 1311 and 1313. Additionally a metering fluid distribution sheet 1318 extends from the internal die cavity 1314. A die slot indicated by the arrows 1316 is present between the two die plated 1311 and 1312. The blade and the metering sheet extend from the die slot exit area.

Web 1328 translates past the die in the direction indicated by arrow 1330. The substrate may be a free span of web, or it may be supported by a means (not shown) such as a roll.

Liquid exits from the exit edge 1324 of the metering sheet. The sheet transports the liquid from the cavity 1314 to the web 1328 and the blade tip region. The blade forces or promotes transfer of liquid from the sheet end onto the web. A liquid coating 1326 is applied to the web by the blade. The combination of the metering sheet and the blade allows the die slot exit and the adjacent die lips 1332 and 1334 to be positioned at a distance from the web surface that is more than 20 times greater than the wet coating 1326 caliper.

Again, the setback die lip positions of this coating method allow web splices to pass by the die without retracting the die. The blade transfers coating liquid from the discharge edge of the metering sheet to the web.

FIG. 70*b* illustrates still another novel blade coating device variation of this invention. It exemplifies the principle that the fluid metering sheet allows separation of the functions of a coating die into separate component devices. The device 1400 contains the fluid distribution cavity 1402, and the device 1406 performs the function of transfer of the fluid coating 1410 to the substrate 1412.

Coating fluid is supplied by a means not shown to a die body device 1400 and into cavity 1402. Here the fluid is distributed across the width of the substrate 1412 and flows into the inlet edge of the distribution sheet 1404. Fluid proceeds internally inside the sheet and exits at the outlet edge 1414 near the end of the application blade 1408. The blade is held and positioned by the separate means 1406. The blade tip transfers liquid onto the substrate producing a coating 1410.

The advantages of separating the functions of the coating applicator into separate devices are that individual components are less complex, that the distribution cavity may be position remote from the substrate, that individual components may be smaller and lighter, that single components may be replaced without disturbing the other components, and that there is more flexibility in the mounting, design and adjustment of components.

c. Improved Slot Coating

One widely use coating method is "slot coating" as described in chapter 11a of the *Liquid Film Coating* book. In this technique a die with a distribution chamber (cavity), a metering slot, and die lips is brought into very close proximity of a substrate translating past it. The lips transfer the coating onto the substrate.

Such lips are also known as knives. They are commonly spaced at a precise distance away from the surface of the translating surface of the substrate. It is also common to have the substrate assume a hydrodynamically created distance away from the knife surface. In this case, it is common for the substrate speed, the fluid rheology, and the pressure distributions acting upon the fluid between the substrate and knife to determine the required distance between the knife and substrate.

Figure 70C:
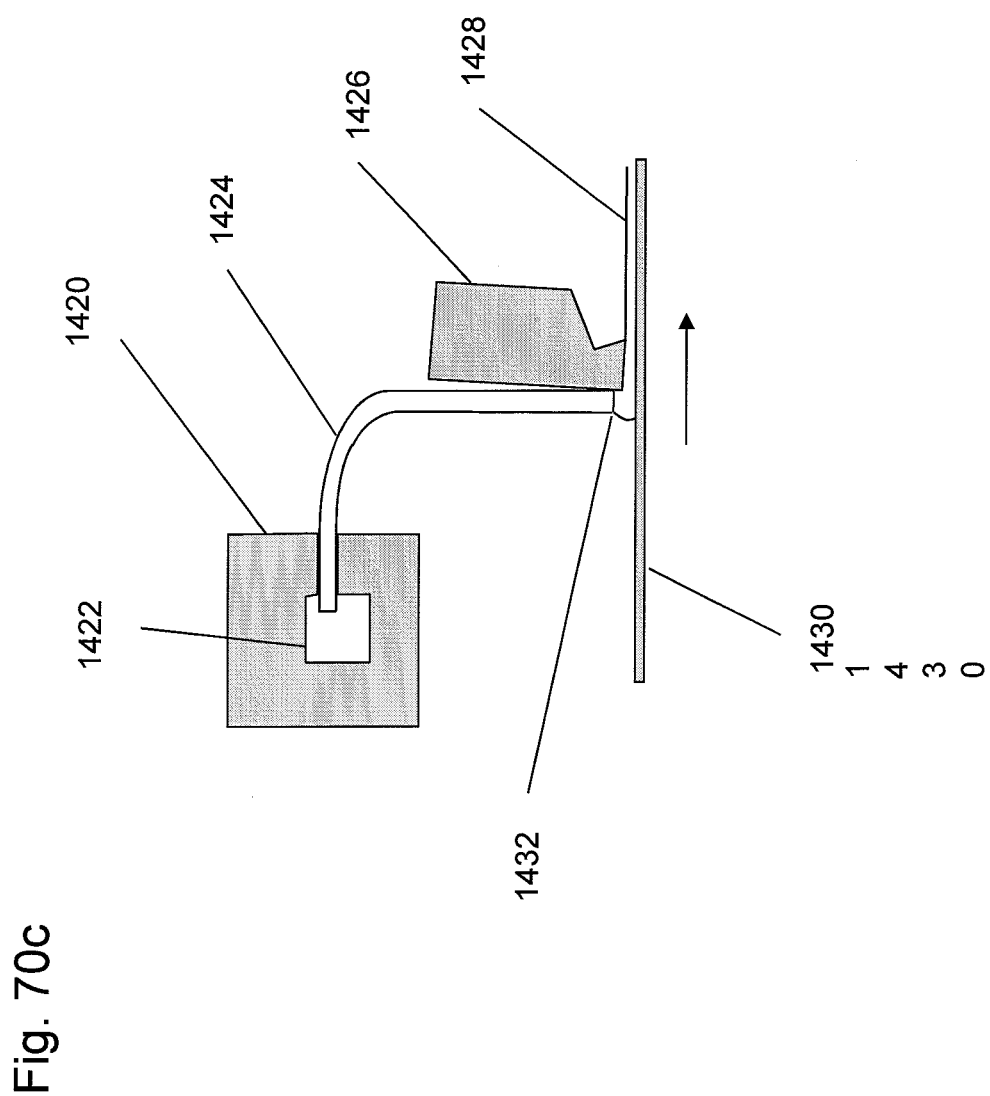

Improvements are illustrated in FIG. 70*c*. Coating fluid is supplied by a means not shown to a die body device 1420 and into cavity 1422. Here the fluid is distributed across the width of the substrate 1430 and flows into the inlet edge of the distribution sheet 1424. Flow proceeds internally inside the sheet and exits from the outlet edge 1432 near the end of the knife blade 1426. This blade is positioned close to the substrate 1430 to effect a coating 1428.

As shown only one knife blade 1426 is in use on the out running side of the application point. It is also a teaching to confine the outlet end of the distribution sheet between an in-running and an out-running knife blade.

Further improvements of slot dies are disclosed and discussed in the improved casting die specifications.

d. Improved Slide Coating

Another useful coating device is the slide coater as described in chapter 11b of the *Liquid Film Coating* book. In this technique a die with a distribution chamber (cavity), a metering slot presents liquid onto an inclined slide. The fluid flows by gravity down the side and transfers to the substrate at a lip at the end of the slide.

Figure 70D:
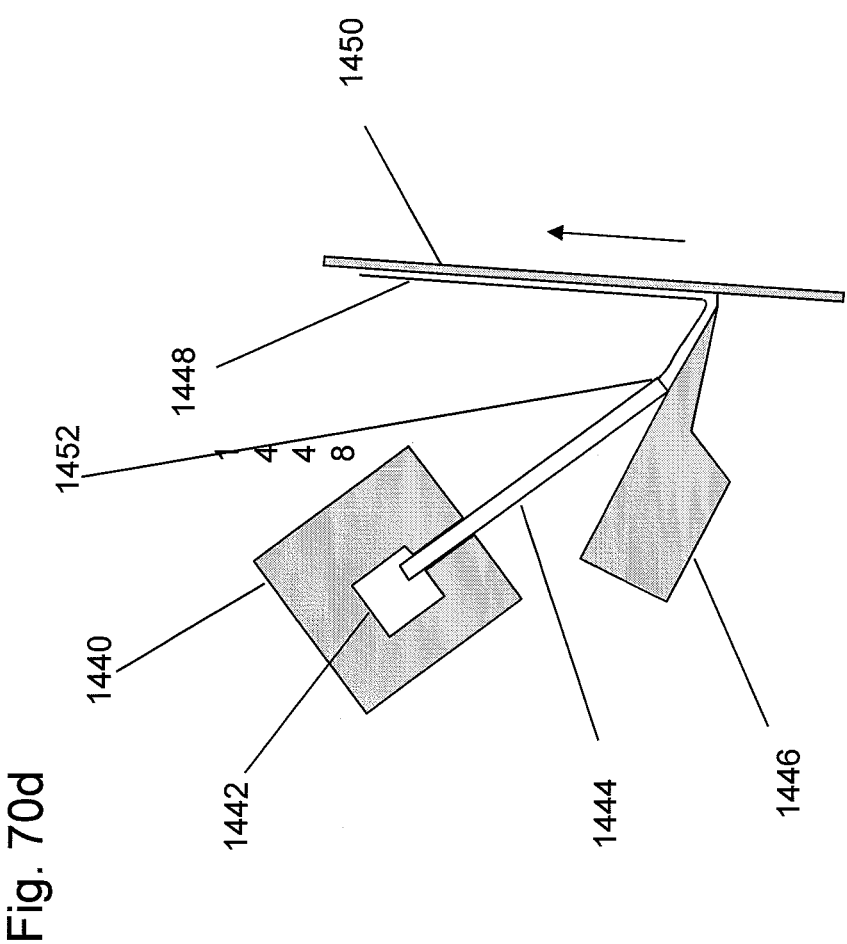

An improved slide coater is illustrated in FIG. 70*d*. Coating fluid is supplied by a means not shown to a die body device 1440 and into cavity 1442. Here the fluid is distributed across the width of the substrate 1450 and flows into the inlet edge of the distribution sheet 1444. Flow proceeds internally inside the sheet and exits at the outlet edge 1452 onto the inclined slide surface of slide device 1446. This slide is positioned close to the substrate 1450 to accomplish a coating 1448.

e. Improved Curtain Coating

Still another useful coating technique is curtain coating. It is widely used for high speed coating of water based materials. It is also described in chapter 11c of the *Liquid Film Coating* book. In this coating method, a die containing a cavity and a metering slot is used to produce a flowing liquid film on an exterior surface of the die body. From this surface or a lip the liquid then free falls under the influence of gravity and impacts the substrate and coats the substrate translating past the die. The free fall distance is generally large on the order of multiple inches.

Figure 70E:
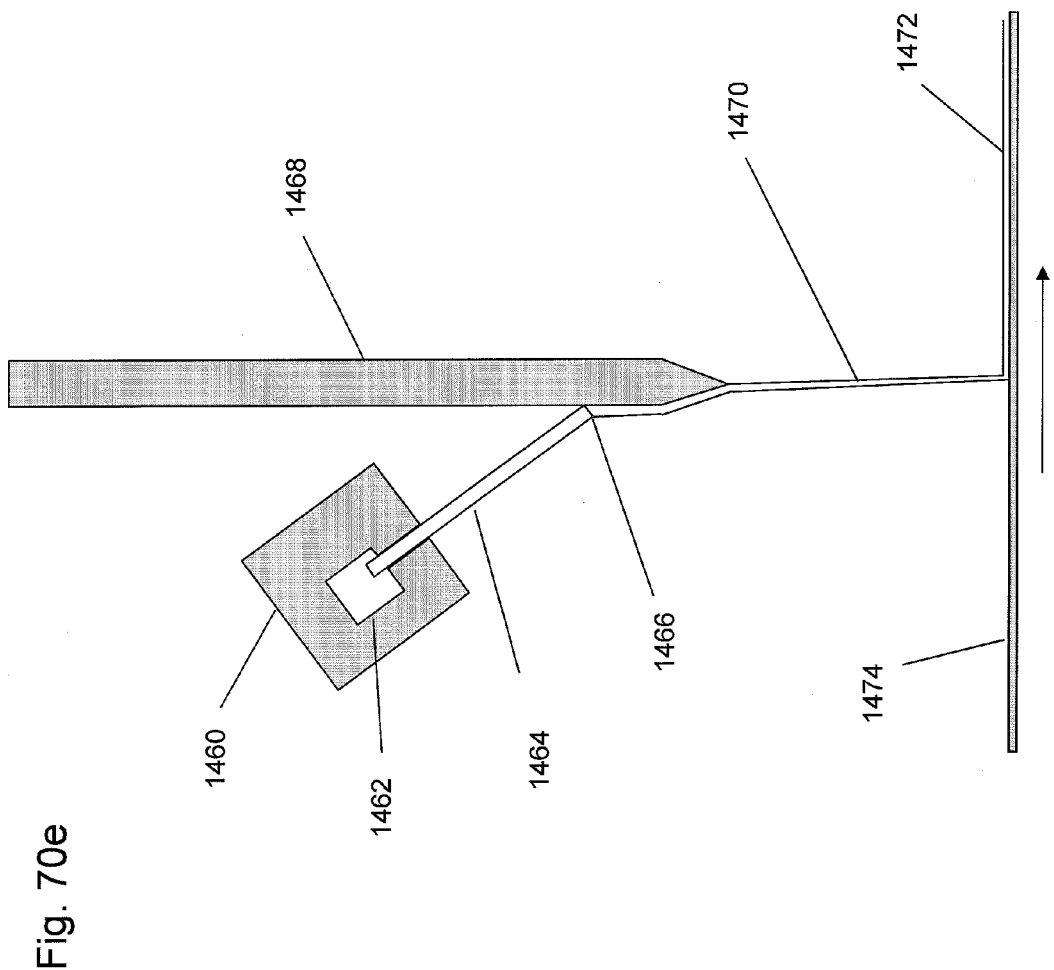

An improved curtain coater is schematically illustrated in FIG. 70*e*. Coating fluid is supplied by a means not shown to a die body device 1460 and into cavity 1462. Here the fluid is distributed across the width of the substrate 1474 and flows into the inlet edge of the distribution sheet 1464. Flow proceeds internally inside the sheet and exits at the outlet edge 1466 onto the surface of the curtain support device 1468.

The fluid flows by gravity to the distal end of the curtain support 1468 then free falls forming a fluid curtain 1470. The curtain impacts upon the translating substrate 1474, displacing the air and forming a layer coating 1472.

The curtain extends across the substrate from one edge to the other. In order to maintain the curtain edges in fixed positions mechanical edge guides bridge from curtain support device 1468 to the substrate. These are not shown.

Many useful variations of the metering sheet improved curtain coater are possible. Multiple die body devices 1460 with a metering sheet 1464 may be positioned on each side of the curtain support 1468 to produce multilayer coating.

Also multiple die body devices may be easily positioned adjacent to the curtain support 1468 because of the positional flexibility afforded by the use of metering sheets. The coating operator may use one until it becomes clogged or until a formulation change is desired. At that time the flow may be stopped from the current die body and instantaneously started from a second die body without interrupting production.

Additionally, it is a teaching that the metering sheet alone may be used as the curtain support.

2. Cast Coating Methods and Apparatus Using Organic Die Lips

Die coating methods in general use the slot and cavities of the die to pre-meter the needed film of liquid required for producing a coating upon a substrate. The die technology creates the film of liquid at the slot exit. The geometry of the die lip and its position next to the substrate is responsible for the uniform transfer of a continuous liquid film onto the substrate translating past the die. With most die coating methods the die operating position is required to be very close to the substrate. This close positioning is needed for the coating uniformity and transfer without air entrainment. Generally, the slot exit is required to be positioned at a distance away from the substrate that is no larger than 1 to 5 times the wet coating caliper on the substrate. This presents operational complexity, difficult positioning requirements, and it creates an elevated probability of scrap generation.

a. Cast Coating Improvement Needs

The production of embossed sheeting and the casting of free pressure sensitive adhesive (PSA) films prior to lamination to a backing have common problems. It is the damage to critical surfaces of critical elements (examples: roll, drum, belt, mold, web or plate) when using a slot die liquid applicator. Generalizing, the improvements in coating of a liquid onto casting surface exemplified by rolls, drums, belts, molds, webs, or plates using a close proximity slot die are a need of industry.

Lippert in U.S. Pat. No. 5,067,432 describes an improved slot die useful for casting a coating onto a web or mold surface. The improvement comprises a means of removably attaching the lips to the coating die. While this allows easy replacement of die lips damaged by clashing with rolls, drums, belts, webs or plates, it does not prevent the damage to those casting rolls, drums, belts, webs or plates. Improvements are in the casting coating process needed.

b. Disposable Lip Casting Die

FIGS. 71, 72 and 73 illustrate three existing methods of using slot orifice coating dies. A coating station for producing embossed sheeting is shown in FIG. 71. This station illustrates the process for casting an embossed web such as a substrate with a micro-replicated surface texture. A roll 1801 is provided with a patterned surface 1812. The pattern surface 1812 contains the negative image of the embossed pattern desired on the resulting web 1814.

A coating die comprised of a top metal plate 1802 and a bottom metal plate 1804 contains an internal manifold 1806 and slot 1808. These direct fluid to the end of the die slot between lips 1810 and 1811. The slot terminates in a slot orifice 1813 where the coating fluid emerges. The trailing lip 1810 forces casting fluid into the pattern on the roll surface.

In combination with the fluid feed system, the applicator must function to coat the entire patterned surface with a preset rate of fluid supply. Generally, the gap between the trailing lip 1810 and the pattern surface 1812 will have to be carefully and precisely adjusted to achieve a smooth and continuous coating. Even slight variations in the gap clearance will produce non-uniformities in the cast sheeting. Precise machining of the metal die and the patterned roll 1801 is required to achieve uniform sheeting.

The applied coating is transformed into solid sheeting 1814 as the fluid progresses around the roll 1801. Various means may be used to accomplish this including chemical reactions and phase changes. Reactions may be facilitated using electromagnetic radiation, heat or other methods. The sheeting is stripped from the roll 1801 and leaves with a negative image of the pattern on the roll.

If the lip 1810 touches the roll surface the embossing pattern on it is damaged. The metal lips 1810 and 1811 also will be damaged.

An existing free span coating of a web or a belt is illustrated in FIG. 72. Here coating is forced onto the surface of the substrate as it wraps around and translates past the metal slot die 1900. The die is comprised of a top metal plate 1922 and a bottom metal plate 1924. It contains an internal manifold or cavity 1926 and a slot 1928. These direct fluid to the end of the die slot between lips 1920 and 1921. Fluid exits from the slot through the slot orifice opening 1923. The trailing lip 1920 forces coating fluid onto the substrate surface. If the metal lip 1920 touches the surface the lip is damaged. If the substrate is a belt with an embossing pattern on its surface the embossing pattern is damaged by contact with the die lip 1920. If the substrate is a smooth belt, contact with the die lip 1920 may damage it.

FIG. 73 illustrates an existing transfer coating station. Here coating is forced onto the surface of the transfer roll 2060 as it translates past the slot die 2067. The die is comprised of a top metal plate 2068 and a bottom metal plate 2066. The die contains an internal manifold 2069 and slot 2070. These direct coating fluid to the end of the die slot between lips 2062 and 2064. The trailing metal lip 2064 forces coating fluid onto the roll surface. Fluid is forced through the die slot orifice into the gap between the lips 2062 and 2064 and the roll 2060 surface. Fluid is coated onto the roll and then is transferred to the web 2074 which is nipped to the roll 2060 by forcing roll 2072. If the lip 2064 touches the surface of roll 2060, the surface they will be damaged.

In combination with the fluid feed system, the die 2067 must function to coat all of the fluid delivered at preset rate supply. Generally, the gap between the trailing lip 2064 and the roll 2060 surface will have to be carefully and precisely adjusted to achieve a smooth and continuous coating. Even slight variations in the gap clearance will produce non-uniformities in the coating. Precise machining of the metal die 2067 and its lips and the roll 2060 is required to achieve uniform coating upon the roll.

If the fluid applied by die 2067 is a hot melt and the roll 2060 is internally cooled, the solidified fluid transfers to the web 2074 at the nip between rolls 2060 and 2072. If the fluid is liquid at this nip only some portion will transfer to the web 2074. In another variation of this coating method the web may be wrapped around roll 2060. In this mode, the fluid will be applied directly to the web in the gap between the roll 2060 and the die lips 2062 and 2064.

With the transfer coating technique in FIG. 73 and the casting process of FIG. 71 a gap must be maintained between the die lip and the roll. This gap must be larger than the combined positional machining, adjustment and environmental tolerances of the coating station to prevent clashing. Additionally, the variability of the gap must be less than the allowable variability in the mass per unit area of the product being produced. A ten percent variation in the gap will produce product variation of about 10 percent. If the absolute accumulative variation of the gap is plus or minus 0.02 millimeters and the layer being cast is 0.2 millimeters in thickness, the produce will have a variation of about plus or minus 10 percent. However, this same gap variation when trying to produce coating of 0.02 millimeters results in product variation of plus or minus 100 percent, and there is the almost certain probability of clashing of the die lips and the roll. This makes thin coatings or thin cast sheets difficult to manufacture.

Replacing the expensive, precisely ground metal lips on coating dies with inexpensive, non-metallic disposable lips allows precision coating at low cost. Additionally, thin coatings may be successfully achieved that are beyond the capabilities of metal lipped dies. Unlike metal lipped dies, organic and polymeric die lips may be operated with the die positioned so that the lip would clash with the coating roll or the substrate.

Figure 74:
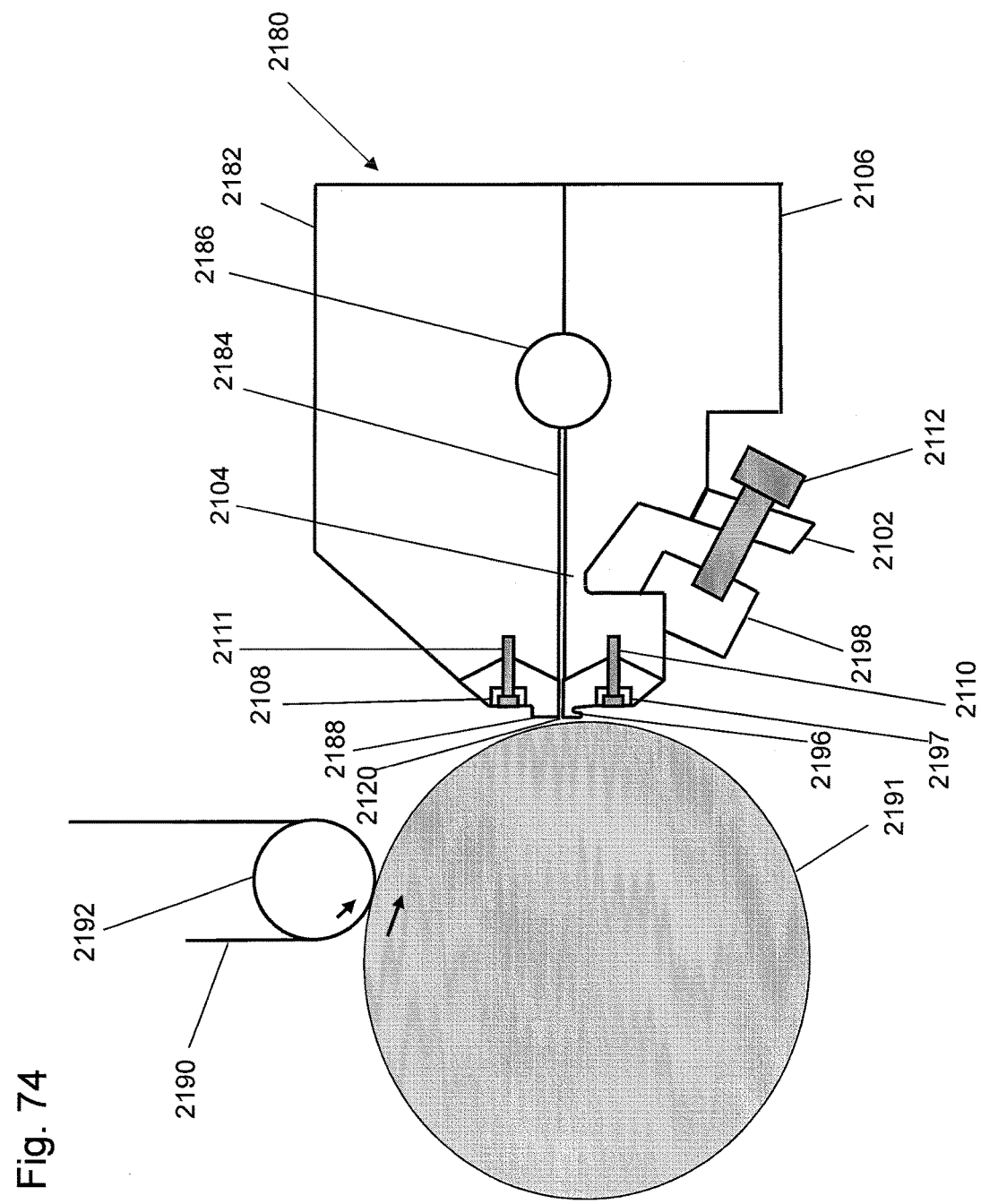
FIG. 74 is a schematic cross-sectional view of an improved transfer coating station.

The coating station in FIG. 74 illustrates the method and apparatus of this invention for coating a hot melted fluid with the disposable lip contact die of this invention. Die 2180 coats fluid across the width of transfer roll 2191. Fluid hot melt is pumped into the die cavity 2186 and exits from slot 2184. The melt is forced onto the surface of roll 2191 by the lip 2196. Roll 2191 is cooled internally by the flow of chilled water. This cooling removes heat from the fluid as it moves with the surface of roll 2191. The rotation brings cooled adhesive to the nip between rolls 2191 and 2192, and web 2190 is transported through the nip on roll 2192. At the nip, solidified fluid is laminated to the web.

The surface of roll 2191 is covered with a thin layer of a release material. Upon cooling of the hot melt as it travels around roll 2191, the adhesive may be totally transferred to the surface of web 2190. When the web is an open highly porous nonwoven material, this allows placement of solidified fluid on its surface and reduces or eliminates strike through to the opposite side.

Die 2180 consists of a bottom plate 2106 and top plate 2182. Disposable trailing lip insert 2196 and a disposable lead-in lip insert are mounted at the discharge end of the bottom plate 2106 and top plate 2182 respectively. These are held in place by small plates 2197 and 2108, and a plurality of bolts 2111 and 2110. It will be appreciated that horizontal surfaces of the lip inserts 2188 and 2196 cooperate to form an extension of the slot 2184 which connects to a slot orifice 2120 between the disposable lip inserts 2188 and 2196.

Mounted on the plate 2106 are a plurality of lip adjusting blocks 2198, which are attached to the discharge end of plate 2106. The lip adjusting blocks 2198 are spaced apart longitudinally along plate 2106 and each threadedly receives therein an adjusting screw 2112, which is also engaged with an adjusting nut 2102 functionally attached to plate 2106. By adjustment of the adjusting screws 2112, the force applied through the adjusting blocks 2198 can be varied, serving to vary the deflection of the distal end of plate 2106 and its attached lip insert 2196. The deflection is about the narrow portion 2104 of plate 2106. This deflection may be either toward or away from the discharge end of plate 2182, thereby adjusting the average thickness of the slot 2184 and slot orifice opening 2120 dimensions.

Die 2180 is mounted by conventional means and brought into coating position by pneumatic cylinders. When in coating position, the disposable lip 2196 will be in contact with the roll 2191 if no adhesive is flowing and the roll is not moving. Because of this, the coating method is referred to as contact die coating. The exact die position is adjusted by wedge blocks. These may be moved to adjust the degree of engagement of the lip with the roll. Many other useable gap setting mechanisms are known to those skilled in the art for positioning the die to the roll.

The disposable die lip 2196 is extruded or molded from polymeric and organic materials. These processes do not have the exacting precision of machining and grinding steel. While steel may be ground to a tolerance of about plus or minus 0.0050 millimeters, polymeric and organic materials may be molded or extruded only with a tolerance of about plus or minus 0.050 millimeters a factor of ten less precise. Surprisingly, it has been found that molded or extruded polymeric and organic materials, as exemplified by polymers, may be used to replace high precision metal die lips. The substitution allows quality coatings.

Polymers and organic materials are generally more resilient than metal. Incidental impact of the lips and their edges that would dent, nick or permanently deform metals are resisted by the polymeric and organic materials. Additionally when polymeric and organic lips clash with substrates and rolls, they are much less prone to damage the substrate or lip. Running an organic lip into a stationary metal belt or roll will generally not damage it or the lip. Both will be damaged if the lip is metal. If embossed or patterned sheeting such as a cube corner reflective sheet is being manufactured, clashing a metal lip to the patterned roll or belt will destroy this most expensive piece of tooling.

Additionally, the polymeric and organic lips may be mass produced inexpensively in great volume. This may be accomplished by injection molding, continuous profile extrusion, or other forming processes. When damaged the polymeric and organic lips are inexpensive to replace.

Casting of embossed webs is shown in FIG. 71. During preparation of the casting station for the manufacture of micro-replicated, surfaced sheeting is usual to precisely align the casting die lips parallel to the casting roll axis of rotation. Also it is desirable that the clearance between the die lips and the roll surface is monitored. The limiting position of clashing contact with the roll should be known. This is the position where steel lip would begin to damage the roll.

A surprising finding is that resilient polymeric and organic lips may be used differently than metal lips. It is found that when polymeric and organic resilient lips are used in place of steel lips, thinner caliper coatings of casting resin may be applied upon the roll to produce thinner sheeting. This is also true when coatings are cast upon a roll then transferred to a substrate as illustrated in FIG. 72. Thin coatings may be achieved with the die positioned closer to the roll than limiting position of clashing contact. Additionally, changes in coating flow rate made to adjust the coating mass deposited often require no adjustment in die position. With rigidly mounted all steel dies any change in coating fluid flow rate requires a change in die to substrate gap.

While the detailed reasons for this phenomenon have not been studied, it is believed that the lips allow a deflection response which prevents lip and substrate damage and enables thinner coatings. That is the hydrodynamic pressure at the lip forces the lip to move away from a damaging position. Stiff steel lips do not allow this to happen.

Figure 75:
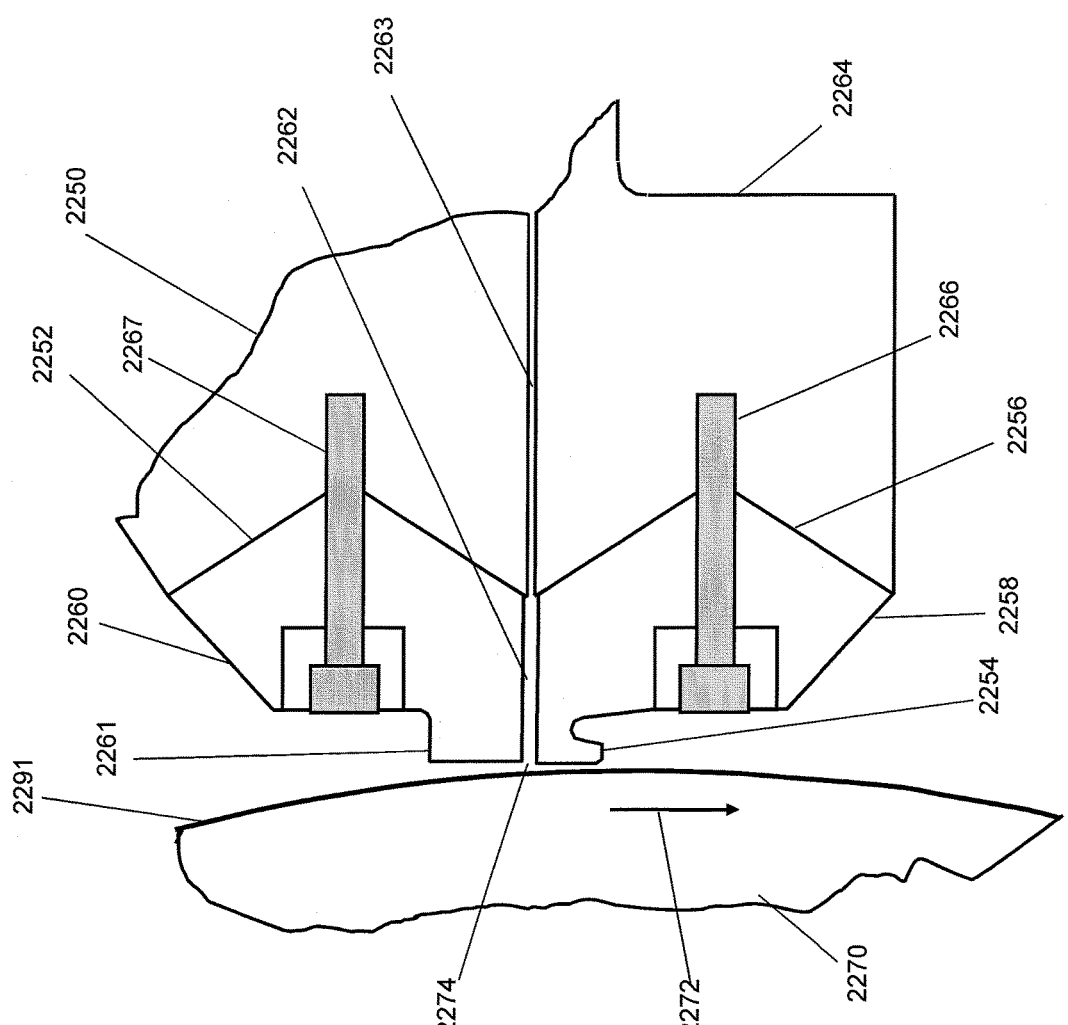
FIG. 75 is a schematic, close-up, cross-sectional view of lips of a die of an improved coating station.

As a further explanation, consider the adhesive coating process in FIG. 73. FIG. 75 shows an enlarge view of the lips of the coater. Here resilient lip insert 2258 terminates with a profiled lip geometry 2254. A segment of the roll 2270 is shown. The roll rotates in a direction indicated by arrow 2272. With a resilient lip, the die may be positioned in a roll clashing contact position. Unlike a steel lip, when the lip 2254 contacts the rotating roll, it is believed that it resiliently deforms by stretching downward in response to the shear and tractive forces exerted by the rotating roll. It is further believed that the deformation lessens the normal force between the lip and the roll surface. Also the flexible, elastic, and resilient character of the lip material reduces the probability of "biting" into the roll surface.

The ability of polymeric and organic materials to undergo deformation in response to applied forces is in general much greater than tool steel. This is another factor. Young's modulus for steel is on the order of 200 giga-pascals while for resilient polymeric and organics the modulus may be as low as 0.01 to 0.1 giga-pascals.

During coating, adhesive is forced between the trailing lip 2254 and the roll surface 2291 by the shear forces created by the roll rotation. When coating fluid is flowing from the slot orifice 2274 the pressures and forces generated by the flow also produces deformation of the lip. It is believed these forces open a passageway between the lip and the roll surface allowing coating to pass even when the die is positioned beyond the clashing contact limiting position. When the lip position is not yet at the clashing contact limiting position, the metered flow from the slot orifice 2274 creates fluid force that deflects the lip to allow the flow to pass between the lip and the roll. A steel lip will not do this. It is not self-adjusting.

It is preferred that the trailing lip design and the positioning of this lip with respect to the roll centerline, a tangent to the roll at the horizontal plain of the slot orifice 2274, and the die slot angle with respect to horizontal, and the gap between the lip 2254 and the roll 2270 surface all be chosen so that the flow of the fluid and the rotation of the roll 2270 both tend to resiliently deform the lip to open the gap between the lip and the roll when the roll 2270 rotates.

It is preferred the that flow exiting from the slot orifice 2274 be confined by the lip inserts 2260 and 2258, and most preferred that the flow be confined between roll 2270 and the trailing profile 2254 or both the lip termination profiles 2254 and 2261.

With stiff metal die lips, a precise gap must be set between the lip and the roll surface. The deformation of the lip in response to forces created by the flowing fluid and moving roll is negligibly small with respect to the gap required to allow the desired coating caliper. With metal lips the coating caliper produced is proportional to the gap. Thin coatings require gaps so small that the limitations on machine tolerances introduce unacceptable coating variations. An additional problem is that the probability of clashing the die lip with the roll becomes high. Clashing metal lips to the roll damages both.

Numerous organic lip widths and profiles are possible for the insets 2258 and 2260.

The choice of a lip is made experimentally as follows. With the web speed and adhesive flow rate set, the lip is brought in towards the roll. At first discontinuous bands of adhesive will be coated onto the roll commonly orientated at an angle to the web edge. These bands are often called "tiger stripes". As the lip is moved closer to the roll, the bands will become wider and wider. At some point, a continuous coating will be achieved.

When continuous coating is established, further forcing the lip against the roll will still result in uniform coatings until an upper limit is reached. At this point, the adhesive may either accumulate behind the lip or be forced beyond the two ends of the die. Just before either of these occurs a measurable increase in coated width on the roll occurs.

The operability range is quantifiable if the die position relative to the roll surface is measured. The difference in position between that for the initial achievement of a continuous coat, and the position where the coating width increases more than a few percent is the operational window. The coating method will be less sensitive to upsets if the organic lip resilience, and die orientation are chosen to give the widest possible operational window. Well-chosen organic lips generally have much larger operational ranges than steel lips.

Coating with an organic lip has limitations. These relate to the modulus of the lip material, its geometry, and the coating weight and the product of the speed times the viscosity. For a given lip, viscosity, and coating weight, there will be a minimum and maximum coating speed. Generally, the operation between these limits is easy to achieve. One sets the flow rate and the web speed, and then one adjusts the gap between the die and the roll to achieve stable coating. Commonly, lip profile and modulus are chosen based on experimental trials. The sensitivity of the quality of the coating to die position and roll gap is much less than that which is achieved with steel lips.

One consideration is that as the product of the speed times the viscosity for the coating process increases, a point is reached where stable flow cannot be established. Coatings of high viscosity at high speeds can be difficult.

Referring to FIG. 74, the cooled roll 2191 is covered with a thin coating of a silicone rubber to provide for the release of the PSA after cooling. The diameter of the roll must be large enough to allow the PSA sufficient dwell time for solidification. For high speed coating the diameter required may be on the order of one meter.

Casting dies offer the ability to coat both stripes and patches of adhesive on a web. For down web stripe coating the die may be fitted with internal deckles. These block flow at the desired cross web positions. In the uncoated web positions the organic lip should be cut back. The lip should only engage the roll where adhesive is applied.

Patch coating requires both deckling and modulation of the adhesive flow rate.

Referring again to FIG. 75, the die slot 2263 is formed between the horizontal flat surfaces of metal plates 2250 and 2264. Their distal ends terminate with seat areas 2252 and 2256 to which the organic lips 2258 and 2260 are attached by a plurality of bolts 2266 and 2267. A die slot extension 2262 is formed between the horizontal flat surfaces of the organic lips 2258 and 2260. It is preferred that this extension have a gap height larger than the slot 2263 height. Surprisingly it is found that although the tolerances achievable for organic lip inserts are larger than steel lip, adequately uniform flow may be achieved from the slot orifice across the width of the substrate being coated or cast. The substitution of resilient polymeric organic lips of lower precision in place of high precision steel lips need not destroy the precision of the coating. It may be that the organic lips resiliently deform to compensate or partly compensate for non-uniformities.

In one mode of operation, a die position is chosen so that the lip 2254 will contact the roll surface 2291 when no fluid is flowing. This is a clashing position. In this position when the fluid is then forced from the die orifice 2254, and when the substrate is translating, good coatings are observed. When the flow and the substrate are stopped, clashing is again observed. Although it is difficult to observe, the flow and motion appear to cause elastic lip deformation opening a flow passage between the lip and the roll surface.

We believe that when a metered flow of adhesive is distributed behind the lip, the lip deforms in response to pressure and shear allowing coating. The lip floats on the flow of coating liquid between it and the roll. With a proper adjustment of the forces holding the lip against the roll, the lip deforms to allow the metered flow to be applied as a uniform and continuous coating to the roll surface 2291. The lip riding position off the roll surface is self-adjusting. The lip deformation self-compensates for the flow rate, and the coating uniformity is insensitive to mechanical precision. Operation in this mode is often desired to achieve very thin coatings, but there is the possibility of damaging the lip 2254 if the flow is interrupted. This is another reason for using inexpensive, disposable organic lips.

Useful polymeric and organic lips have resilience as measured by ASTM™ Shore A hardness ranging between 10 and 90 durometer, or Shore O or Shore OO durometers less than 100. Preferred materials for coating at elevated temperatures include heat resistant materials, fluoropolymers, silicone polymers and fluorosilicone compounds.

A general feature of an improved coating or casting die includes the use of replaceable die lips. It also includes the extension of the flow distributing slot surfaces with a replaceable disposable organic or polymeric inserts where these extend the slot to direct the flow to the die lips.

Figure 76:
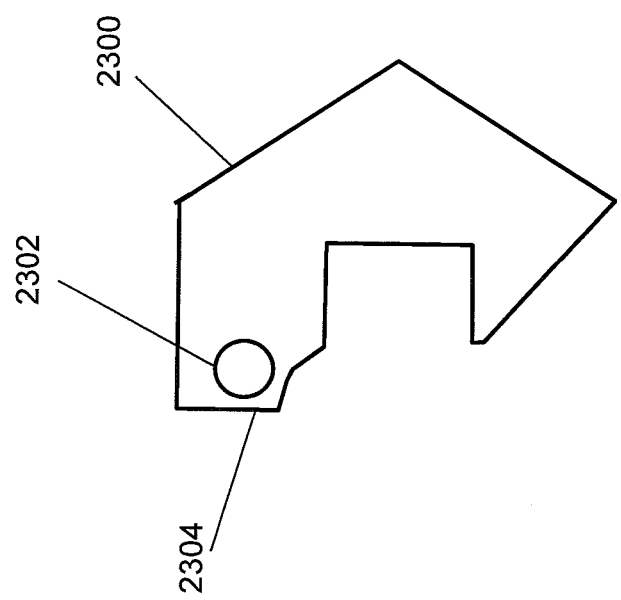
FIGS. 76 and 77 are cross-sectional views of polymeric lips of this invention.

FIG. 76 illustrates a polymer or organic lip 2300 insert which contains a means of adjusting the resilience of the lip termination end 2304. The internal structure may be modified by a region 2302 of a second material with different material properties than the base material of the insert 2300. By this means, the effective resilience of the lip termination end 2304 can be substantially different than the base lip material. The region may be a cylindrical bore containing a pneumatic fluid or a hydraulic fluid. The internal pressure of the fluid may be adjusted and controlled to manipulate the coating performance of the lip.

Figure 77:
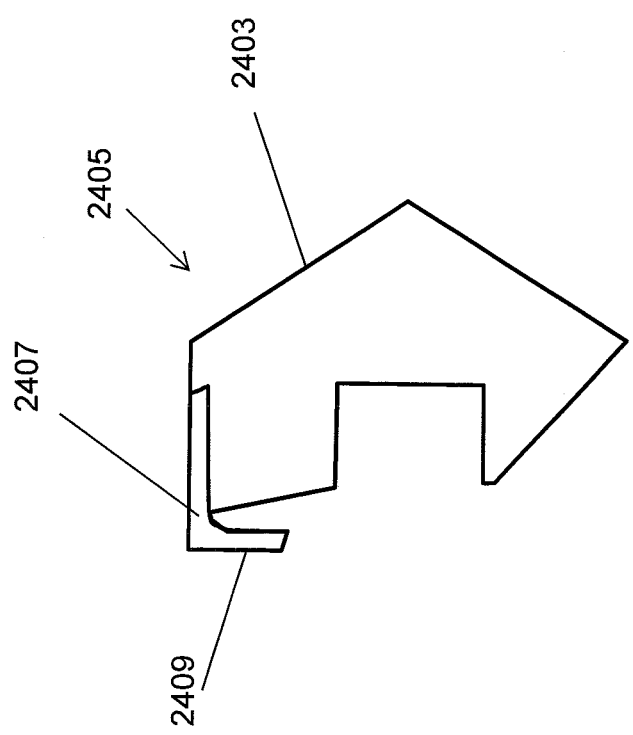

FIG. 77 illustrates a polymer or organic lip insert 2405 which contains a means of modifying the resilience of the lip termination end 2409 and a base subsection 2403. The external structure may be modified by a region 2407 of a second material with different material properties than the base material of the region 2403. Again by this means the effective resilience of the lip termination end 2409 can be substantially different than the base lip material. It is a teaching of this invention that the lip insert or the lip termination portion of the die lip is able to deform or move in response to fluid pressures or forces acting upon it during coating or casting. Multi-component lips are within our teachings.

Figure 78A:
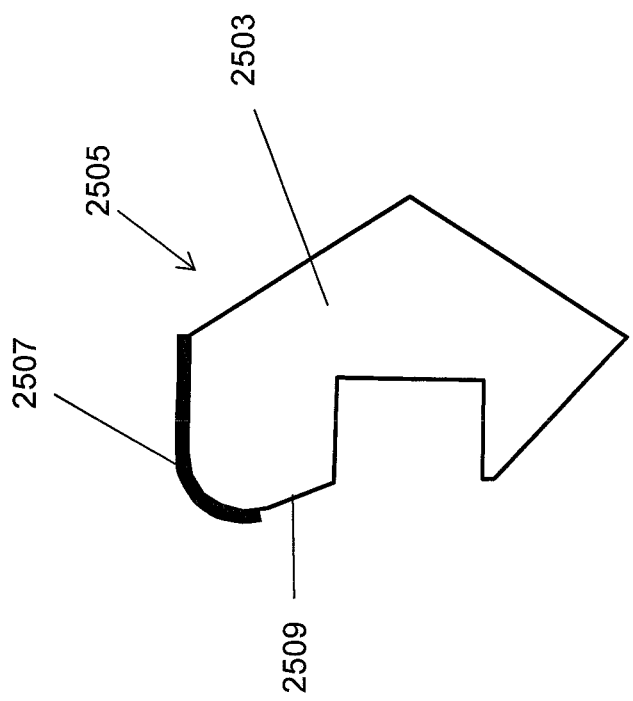
FIGS. 78a and 78b are cross-sectional views of compound polymeric lips of this invention.

FIG. 78a illustrates a polymer or organic lip 2505 insert which contains a means of modifying the resilience of the lip termination end 2509 and a base subsection 2503. The external structure may be modified by a region 2507 of a second material with different material properties than the base material of the region 2503. The region 2507 of differing material may be a ribbon of material attached to the lip insert 2505 by an adhesive or other means. The effective resilience of the lip termination end 2509 can be different than the base lip material and have differing surface properties. It is a teaching of this invention that the lip insert or the lip termination portion of the die lip is able to deform or substantially move in response to fluid pressures or forces acting upon it during coating or casting. Compound lips are within our teachings.

Figure 78B:
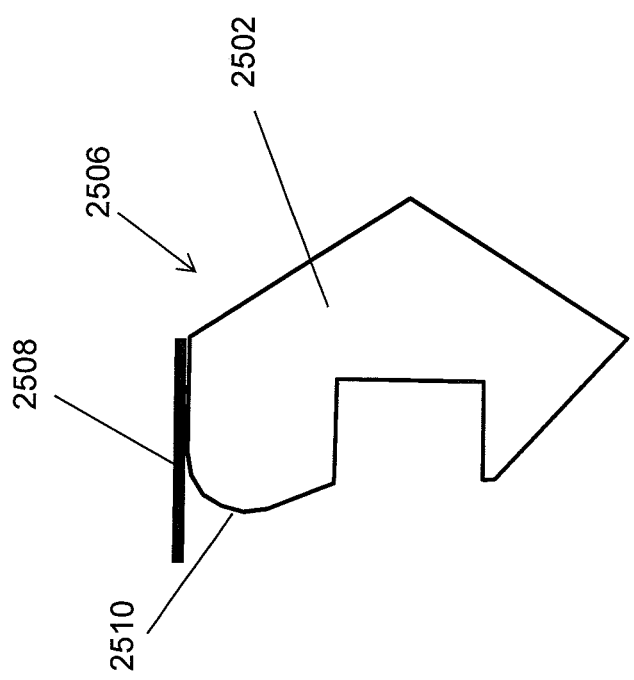

FIG. 78b illustrates a polymer or organic lip 2506 insert nearly identical to that FIG. 78a. However, here modifying material 2508 is only partially attached to the base 2502. When this lip inset is used in a die, and when the lip is spaced from the web in a coating position, the modifying material 2508 will be flexed and deformed to assume a shape more similar to that of material 2507 in FIG. 78a. The material 2508 may be a polymeric sheet or film.

Those skilled in the art of polymer and organic part design will recognize that many different materials may be combined to modify the local stiffness or resilient response of a part. The lip in of FIG. 77 may even be fabricated with external structure 2407 consisting of a material that a high Young's modulus such as a metal. In this case the flexibility, resiliency, and deformability of the lip termination 2409 are provided by the deformable base subsection 2403. Those ordinarily skilled in the art will recognize that many different geometries and combinations of materials will allow resilient response of the die lips or their termination ends. All are within the scope of this invention.

c. Simplified Disposable Dies and Non-metallic Dies

A simplified preferred coating die using the metering sheet of this invention is illustrated in FIG. 79a. Considering in further detail the coating head assembly 1500, there is included in this assembly a tubular element 1502. This element is pierced by a slot aperture 1504. It terminates at a discharge face 1590 at the seats 1514 and 1515 to which the lip inserts 1506 and 1508 are attached. The gap between the lip inserts terminates at an elongated slot orifice 1564. Coating fluid supplied by the metering and pressurizing means exits this orifice. It is transferred to a substrate which translates past it. The slot 1504 and the gap between the lip inserts contain a fluid distribution and filtering, metering sheet 1510. This sheet is described in preceding sections.

The tubular element 1502 is constructed as a cylindrical body which is open at both ends and has a cylindrical bore 1512. The slot 1504 is formed or machined in the tube 1502 along with lip insert seats 1514 and 1515. There is thus, as defined by the bore 1512, a cavity connected to a discharge slot 1504. A plurality of bolts 1520 pass through the wall of tube 1502 and are thread into the opposite wall section locations 1516. By adjusting these screws, the gap of the elongated slot 1504 may be varied.

Also provided are end caps (not shown) which are used close off the slot 1504 and bore 1512 at opposite ends of the tubular element. The slot 1504 in the tubular element 1502 is extended by the opposing horizontal surfaces of the lip inserts 1506 and 1508. These have termination ends 1530 and 1532 which may be of any desired shape. Casting die terminations are shown. Terminations, usable for curtain coating, slide coating, blade coating, slot coating and any method where fluid is supplied through a slot orifice are teachings of this invention. The lip inserts 1506 and 1508 are attached to the tubular body 1502 by a plurality of bolts 1536 and 1534 passing through attachment elements 1538 and 1540.

Fluid is supplied to the bore 1512 of tubular element 1502 by one or more entrance ports (not shown) in its wall. Generally a metered supply rate is used that is equal to that required to achieve a desired coating upon the substrate being coated. A rate in excess of this rate may also be used in some cases. The flow is distributed along the length of the bore 1512 and enters a metering sheet 1510. The metering sheet ducts the flow from the inlet end 1560 to the discharge end 1562. Flow exits the sheet 1510 and is discharged from the slot orifice opening 1564 located between the lip terminations 1530 and 1532. The metering sheet may be bent as shown to accommodate a long length. In the case where clamping bolts 1520 are used, the length may be longer than half the length of any chord of the circular bore 1512. If the bolts are replaced by an external clamping means, the length may be longer than any chord of the bore.

Bending and coiling the sheet within the cavity allows the sheet dimension in the direction of flow to be much longer than the slot 1504. This allows a substantially increased flow path for fluid leaving the cavity. The longer flow path compared to a slot of prior art dies produces a much improved flow distribution at the slot orifice 1564.

The use of the sheet allows useful filtration to be accomplished along with fluid distribution.

The bolts 1520 are used to adjust the slot 1504 width, and thus may be used to hold the metering sheet 1510 in place. Alternatively, the lip inserts may be used to hold the metering sheet in place.

The great advantage of these dies is that major components including the lip inserts, the tubular element, and the metering sheet may individually or all be made from polymeric or organic materials. The individual elements may also be constructed from metals or ceramics. All these possible combinations allow optimization for each particular situation. It is within the scope of this invention to use combinations of two or more materials for the construction of the die assembly. These materials may include but are not limited to organic, inorganic, polymeric, metallic, natural, man-made, and ceramic materials.

The tubular element 1502 and lip inserts 1506 and 1508 may be extruded, cast, molded, or formed from inexpensive polymeric or organic materials. The slot 1504 in the tube 1502 may be formed during the step of making the tube. The slot may be cut or machined in the tube after the tube is formed.

The attachment means for mounting the lip inserts 1506 and 1508 to the tube 1502 need not be by bolts. Other known means of attachment, including adhesives, may be used. Alternatively, the inserts need not be separate elements from the tube 1502. They may be formed as integral parts of the tube during the tube forming process.

The metering sheet facilitates the uniform distribution of fluid to the die slot orifice but may not always be necessary. It is a teaching of this invention to coat with the die 1500 with and without the metering sheet 1510. Coating without the sheet but with the disposable and resilient lip elements is a teaching.

FIG. 79b illustrates a metallic die where lip inserts 1600 and 1602 are organic. The tubular element 1606 is metallic. The metering sheet 1604 is also metallic. A slot is placed to connect the bore of the tubular element 1606 with the exterior. Its walls 1610 and 1612 extend from the interior to the exterior of the tube 1606. In this construction the metering slot is fabricated with a slot height that is less than the thickness of the metering sheet 1604. To assemble the die, forces are exerted to open the slot gap prior to inserting the metering sheet. After insertion the forces are released and the walls 1610 and 1612 of the slot clamp onto the metering sheet 1608. By this means the metering sheet is clamped within the slot without using clamping bolts.

Those skilled in the art of coating will recognize that the coating die illustrated may be used at room temperature or at elevated or depressed temperatures. The temperature of the dies may be controlled by external or internal heating or cooling elements.

FIG. 79a illustrates a coating die construction that, with the possible exception of the clamping bolts 1520, may be constructed from polymeric, organic or other inexpensive materials. When the elements are manufactured by mass production methods such as extrusion, molding, casting and etc., the cost may be drastically reduce compared to precision machined individual metal parts. This enables the coating device to be economically disposable. As a whole, the die may be discarded after a period of use to avoid the expense of cleaning or the expense of refurbishing damaged pieces. Also individual elements of the coating die may be discarded after a period of use to avoid the expense of cleaning or the expense of refurbishing damaged surfaces.

The coating die or individual pieces of the die are "economically disposable" if their cost of is insignificant, or lower than using and maintaining the alternative conventional coating die or die elements.

Figure 79C:
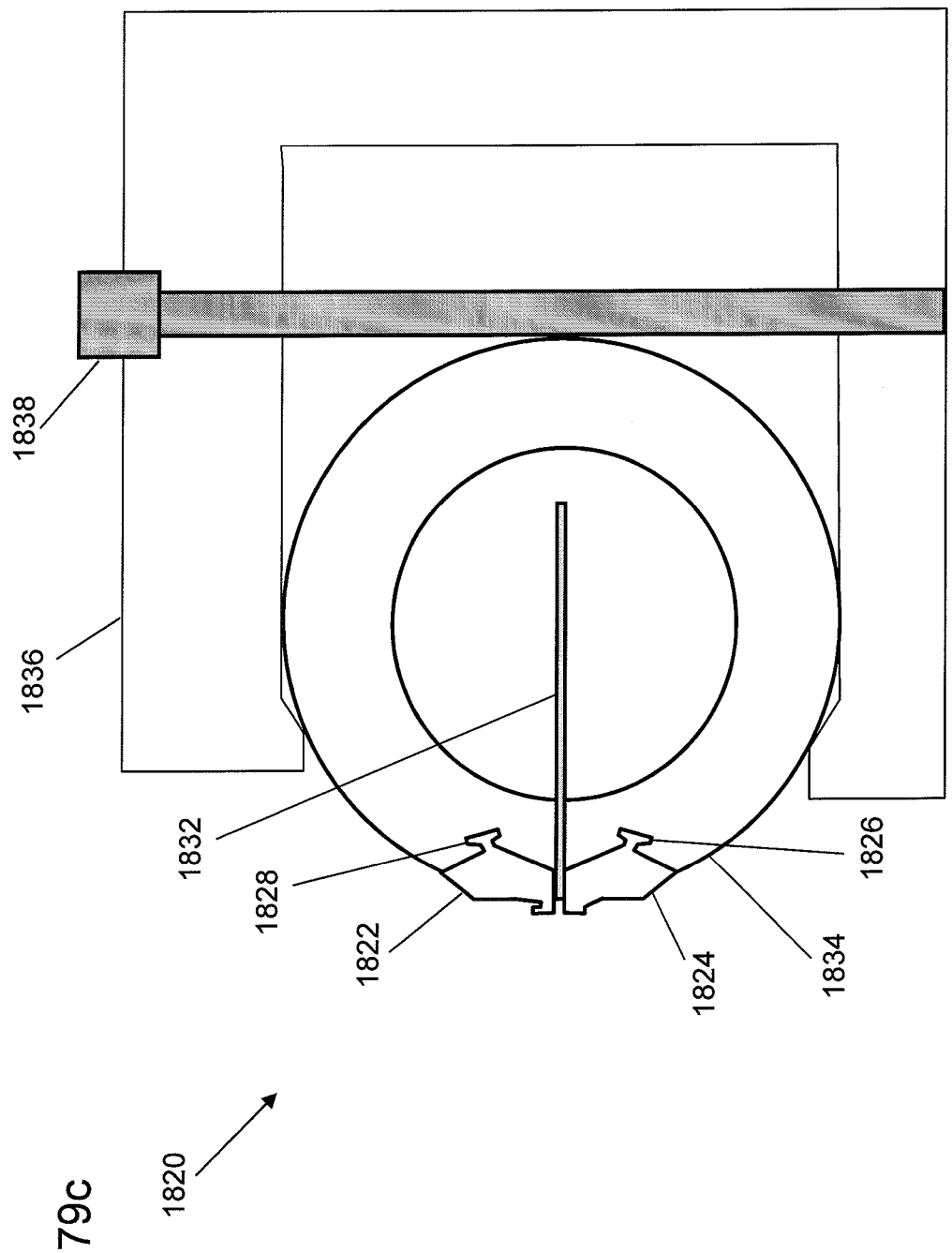
FIGS. 79c, 80 and 81 are cross-sectional views of a coating dies and mounting attachments illustrating embodiments of this invention.

FIG. 79c illustrates a coating die 1820 that is constructed with lip inserts 1824 and 1822, a tubular element 1834 and a metering sheet 1832. All or a portion of these may be made from polymer or organic or other economically disposable materials. It is preferred that the fluid contacting items be made from low cost materials. It is preferred that these items be fabricated using efficient low cost methods. Preferred are lip inserts and metering sheets of polymeric or organic materials. Most preferred are lip inserts, metering sheets and tubular elements of polymeric or organic materials. Preferred methods for producing these items are fabrication methods such as casting, molding, injection molding, extrusion, and micro-replication.

The die 1820 is mounted in clamp 1836 which includes a plurality of clamping bolts 1818. The lip inserts are attached to the tube element 1834 by means of a mechanical interlocking design. The interlocking is accomplished by the foot protrusions 1826 and 1828 which are inserted into matching cavities in the wall of the tube 1834. The matching the protrusions, and the cavities into which they fit, both run the length of the inserts and tube. They are easily produced during a forming step (extrusion, molding, etc.) for the inserts and tube. This construction reduces the number of parts making up the coating die. An extruded tubular die element forming the bulk of a die body, combined with extruded organic or polymeric lip inserts, and further combined with a fluid distributing metering sheet, may be assembled to construct a low cost coating device. Additionally, assembly by use of mechanical interlocking techniques further lowers the cost.

Figure 80:
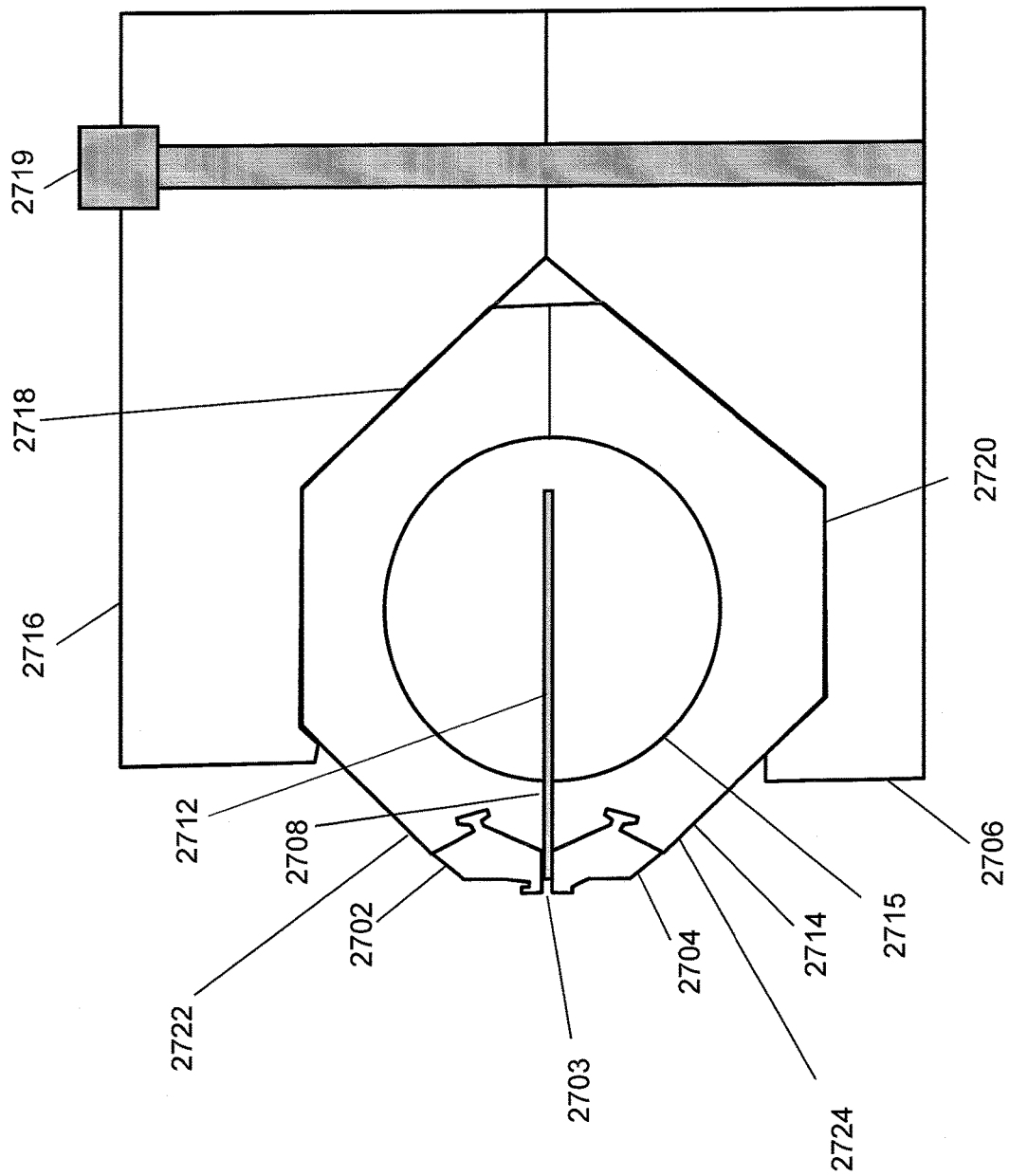

FIG. 80 illustrates an improved tubular casting die consisting of a tube element 2714 which contains a slot 2708 connecting the internal bore 2715 to the lip region. Lips 2702 and 2704 terminate the flow passage from the tube. The termination is at the slot orifice 2703. A metering sheet 2712 is contained within the slot 2708, the tube bore 2715 and between the lips 2704 and 2702.

The tube 2714 may be made from polymeric, organic non-rigid or nonmetallic materials. It is held precisely and rigidly in position by metal mounting plates 2716 and 2706. These are held together by a plurality of bolts 2719. With this construction all the wetted parts of the die may be made from economically disposable, inexpensively fabricated parts. All the wetted parts may be formed by extrusion or casting processes. All the wetted parts may be formed without precision metal working techniques. Additionally, the die lips and the tube may be formed in one step such as simultaneous co-extrusion. Still further, they may be made from the same material.

Figure 81:
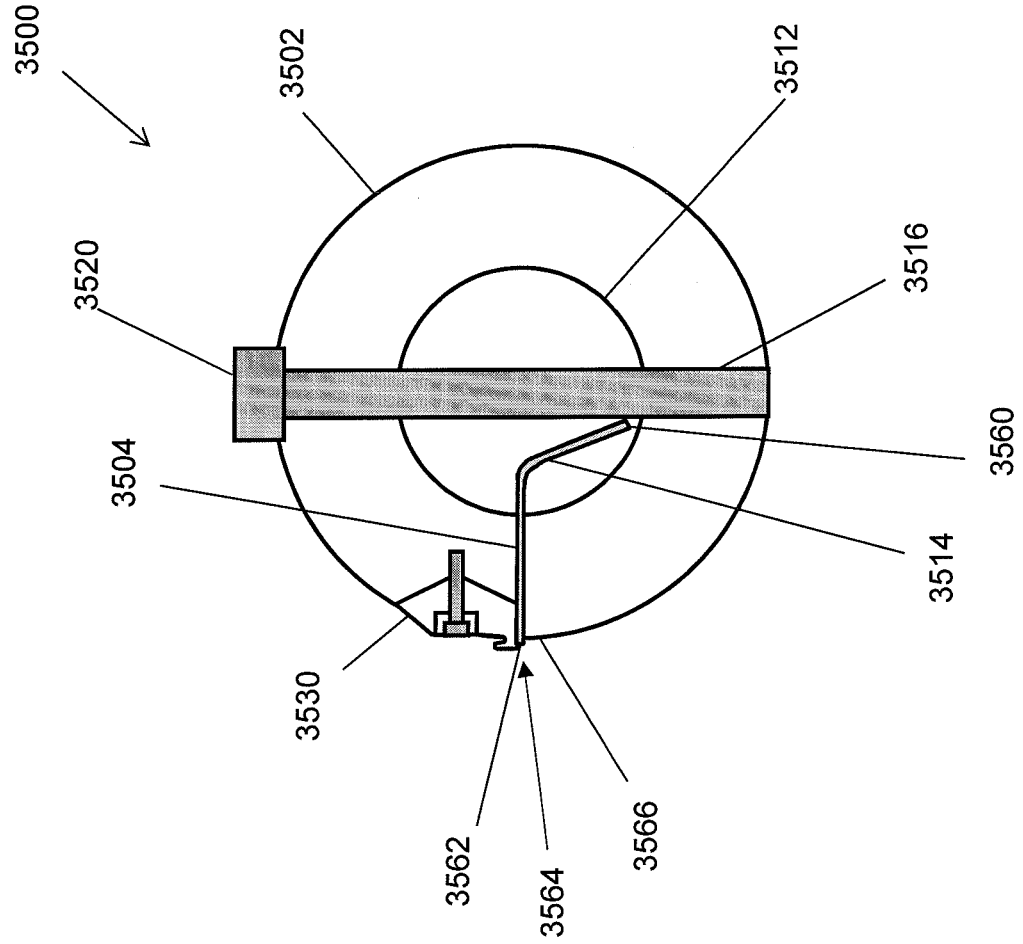

FIG. 81 illustrates an improved tubular casting die 3500 consisting of a tube element 3502 which contains a slot 3504 connecting the internal bore 3512 to the lip region. Lips 3562 and 3566 terminate the flow passage from the tube. The termination is at the slot orifice 3564. A metering sheet 3514 is contained within the slot, the tube bore, and between the lips. In this case only one replaceable lip insert 3530 is present, and the metering sheet extends to the vicinity of the lip 3562.

In summary, it is well known that the cost of fabricating a distribution die is proportional to its size and mass. Lower size and mass means less material is needed for fabrication and generally less time and labor in fabricating critical surfaces. The inventive use of metering sheets allows smaller overall die dimensions. The sheet allows long length of precision metering slots to be replaced by the coiled or curved sheets. By this means the size of the distribution dies may be dramatically reduced. The use of metering sheets avoids precision machining of die slots.

When die parts may be destroyed by incineration, waste disposal is less expensive. The solid mass is reduced in incineration, and energy is recovered in the process. The polymeric die elements of this teaching are ideal for this process. The use of disposable polymeric lips and metering sheets to replace machined metal components improves manufacturing economics.

K. Mist Collection

1. Fundamentals: General Observations on Silicone Fluid Misting

The functional silicone coatings on release liners and pressure sensitive adhesive backings are very thin. Solventless silicone roll coating processes represent a special thin regime of roll coating. Detailed observations of the fluid dynamics at the roll nip have resulted in significant findings.

The separation point in the nip between two counter-rotating rolls is the point at which the respective surfaces make the transition from contacting to non-contacting.

When applied by a 5-roll coater, the liquid wet caliper on the high speed transfer roll (the roll that transfers coating to the substrate) is generally thinner than 10 microns. Often, the thickness is much thinner. In the coating process, a portion of the liquid on the transfer roll is transferred to the substrate as it is carried through the transfer nip on a backing roll. On the in-running side of the nip, liquid on the transfer roll is brought into contact with the substrate. On the out-running side of the nip, the liquid splits between the surfaces. Some liquid stays on the transfer roll and a portion leaves the nip on the substrate.

For this ultra-thin coating range, the liquid film split location occurs very near the separation point of the rolls. The film split is chaotic, 3-dimensional, and random in nature. Liquid surface and air interface perturbations produce filaments, septums, waves, and other disturbances. These are formed as the two wet roll surfaces separate. These generate mist as surface tension acts to form droplets from the unstable perturbations. It is an observation of this teaching that for silicone coating the mist is actually generated in the region normally less than five millimeters from the roll separation point. Of course without confinement, mist rapidly spreads throughout the entire nip region and into the coater room.

Figure 82:
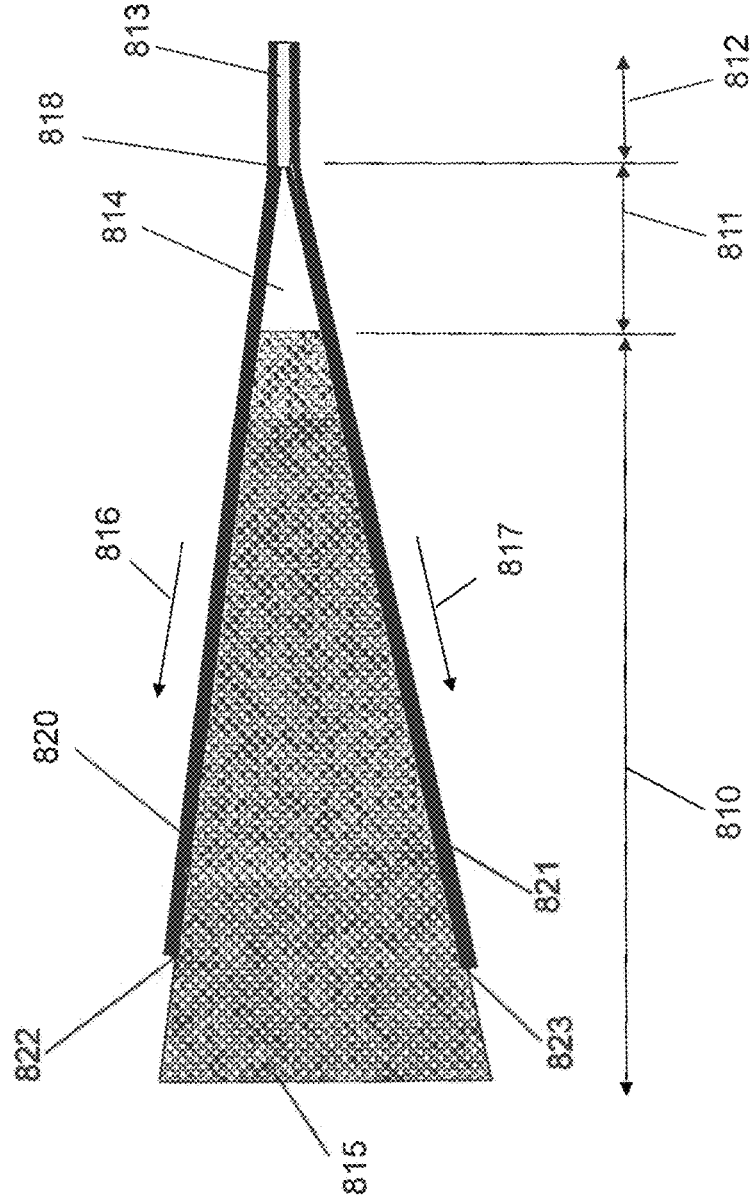
FIG. 82 is a schematic cross-sectional view of the out-running side of a two roll nip region where mist is generated.

The process at the out-running side of the roll nip is shown in magnified detail in FIG. 82.

At the out-running side of the roll nip, there are three regions. The roll contact zone is indicated by arrow 812, and it is filled by fluid 813 (indicated by the solid grey shading). The mist generation region is indicated by arrow 811. The mist 814 is indicated by the fine textured gray shading. The mist dilution zone is indicated by arrow 810, and the diluted mist 815 is indicated by the coarse darker grey shading. While these regions are shown with sharp transitions in the FIG. 82, in reality, they blend into each other. As coating passes through the nip, it reaches the separation point 818. Here the surfaces of the rolls diverge, and the liquid flow diverges with major portions attached to both roll surfaces. Perturbed liquid interfaces are created, and mist is formed.

If the wet caliper of the silicone being coated is "x", then the silicone film thickness in the nip roll contact zone 112 is approximately 2x when roll speeds and surface textures are equal. The length of the mist generation zone is quite small relative to the roll diameter. Compared to the coating caliper, x, is on the order of 100× to 10,000×. The dimension is variable and depends upon coating rheology, speeds, surface textures, coating caliper, etc. The exact dimension is so small it is difficult to measure. In general, the mist generation region will extend less than a fraction of a centimeter from the separation point. Arrows 816 and 817 indicate the direction of motion of the separating roll surfaces 821 and 820. The solid grey thin films of liquid 822 and 823 are carried on the surfaces 820 and 821 and moving with them.

Note that FIG. 82 is not drawn to scale.

The "nip air volume" is the air volume between the roll surfaces 820 and 821. It is defined as the air volume on the outrunning side of the nip between the roll cylindrical surfaces, the two planes containing the roll ends, and a plane simultaneously tangent to both roll cylindrical surfaces at a distance of approximately one roll radius outward from the separation point when the rolls are of equal diameter. The volume of the zone where mist is actually generated will be a very small percentage of the nip air volume.

In the small mist generating zone, stresses generated by the diverging rolls form the mist. Once the liquid on the rolls passes out of this generation zone, little or no additional mist is formed. It is not generated from the roll surfaces outside the critical generation zone. The shear created by rapid movement through air is generally not sufficient to rip droplets from the surface liquid films 822 and 823. The viscosity and the very thin liquid caliper prevent this. Only the divergent liquid flow near the contact point 118 creates mist.

Droplets formed will initially have a velocity outward. The magnitude at first will be on the order of the roll surface speed. This tends to concentrate mist near the midline between the rolls (assuming equal roll speed). However, the mist particles quickly decelerate by transferring momentum to the surrounding air.

The dilution zone 815 features air flow in and out of the "nip air volume". The air mixes with and dilutes the mist. The droplets are entrained by the air currents and carried from the dilution zone to the coating room. The standard method to control mists from process equipment is to enclose the area around the roll coater and to ventilate it. Multiple air replacement volumes for the large enclosures are required for success. Capital investment, operating and maintenance costs are high.

2. An Improved Strategy for Controlling Mists

Consider a control volume which contains the generation zone 814 that is only moderately larger than the generation zone but small compared to the total air nip volume. All the mist formation is contained within this volume. If we continuously remove the mist from this volume and replace it with clean air, the mist is contained and removed. If the volume is properly flushed, mist escaping into the coater room can be drastically reduced. It may be reduced to near zero.

The method and apparatus disclosed here accomplishes the extraction of the mist from the nip. The contaminated air flushed from the control volume is not expelled into the coater room; it is captured and discarded by a vacuum system. Key to successful, economical mist collection is the design of an apparatus that confines the mist to a very small volume, and flushes it from that volume.

3. Mist Extraction Apparatus

A new mist removal die of this invention is described below. One key to its successful and economic operation is that it confines the mist in a very small controlled volume deep within the nip of the rolls. A second feature is a practical die design allowing deep penetration into the roll nip. A third is that the die design uses a replaceable fluid conveying device such as a fluid distribution sheet, or an equivalent thin profile fluid duct. A thin profile for extending far into the nip is preferred.

Figure 83:
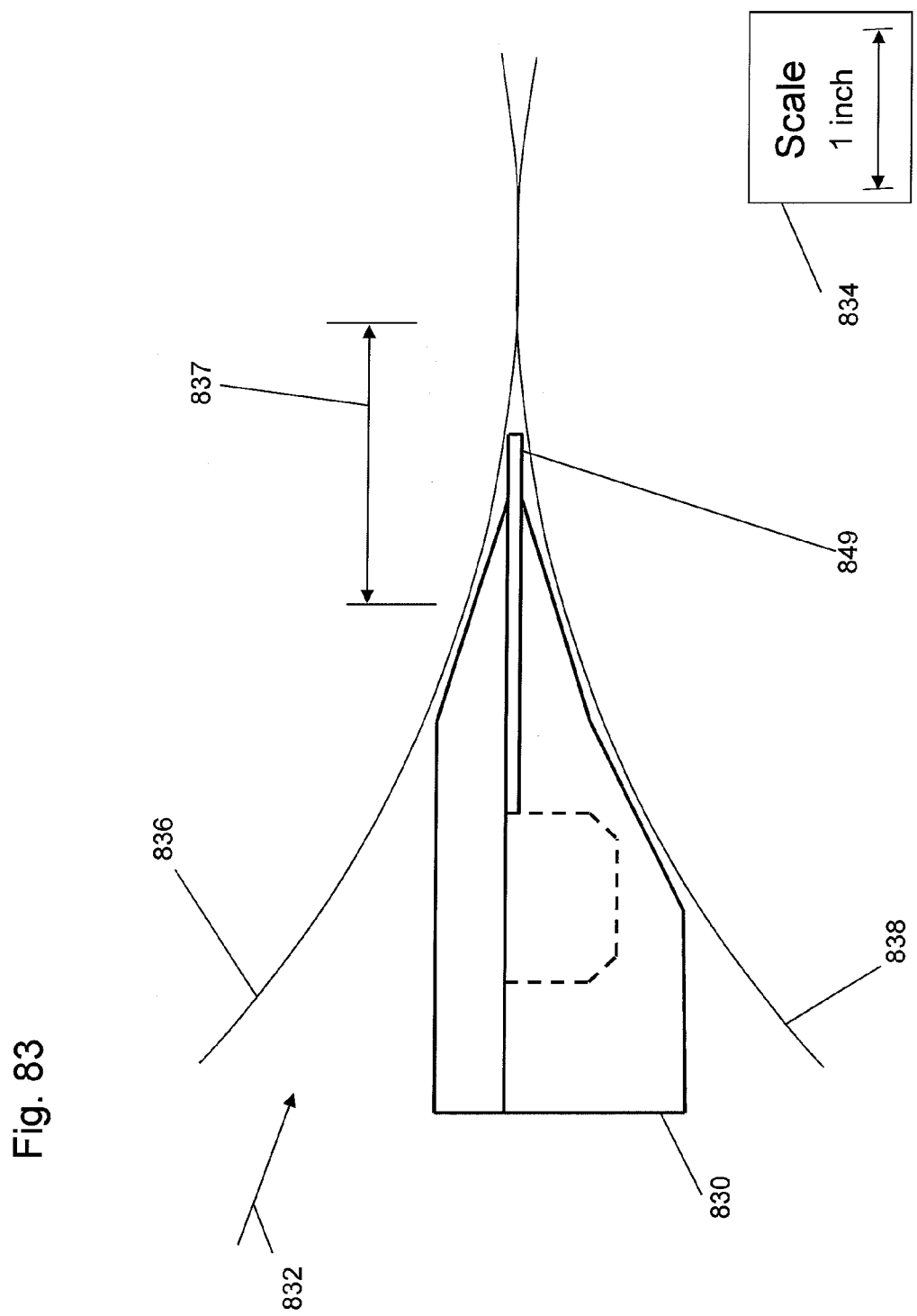
FIG. 83 is a schematic view of the mist collection device of this invention in its operational position in a roll nip.

The operation and utility of the mist removal device may be understood by referring to FIG. 83. Shown here is the mist extraction die 830 which is a fluid flow die. It is constructed and shaped so that it penetrates deeply into the nip region indicated by arrow 832. FIG. 83 is drawn scaled proportionally for roll diameters of approximately 16.5 inches with dimensions indicated by the one inch scale marker 834 in the figure. The large roll surfaces are indicated by the arcs 836 and 838.

The figure illustrates one variation, and the die's ability to penetrate to a position just outside the mist generation zone. The die tip position and the volume of air sucked into the die tip prevent mist escape. The mist confinement zone is indicated by the arrow 840. In this embodiment the close clearance between the die body and the surfaces of the rolls confine the mist. The close approach of the extending die tip element 842 to the roll surfaces also confines the mist. In other preferred apparatus not illustrated, the thin protruding die tip element 842 may extend substantially more than illustrated in FIG. 83. This allows the majority of the die body to have greater clearance with the surfaces of the rolls while the tip element still confines the mist.

Figure 84:
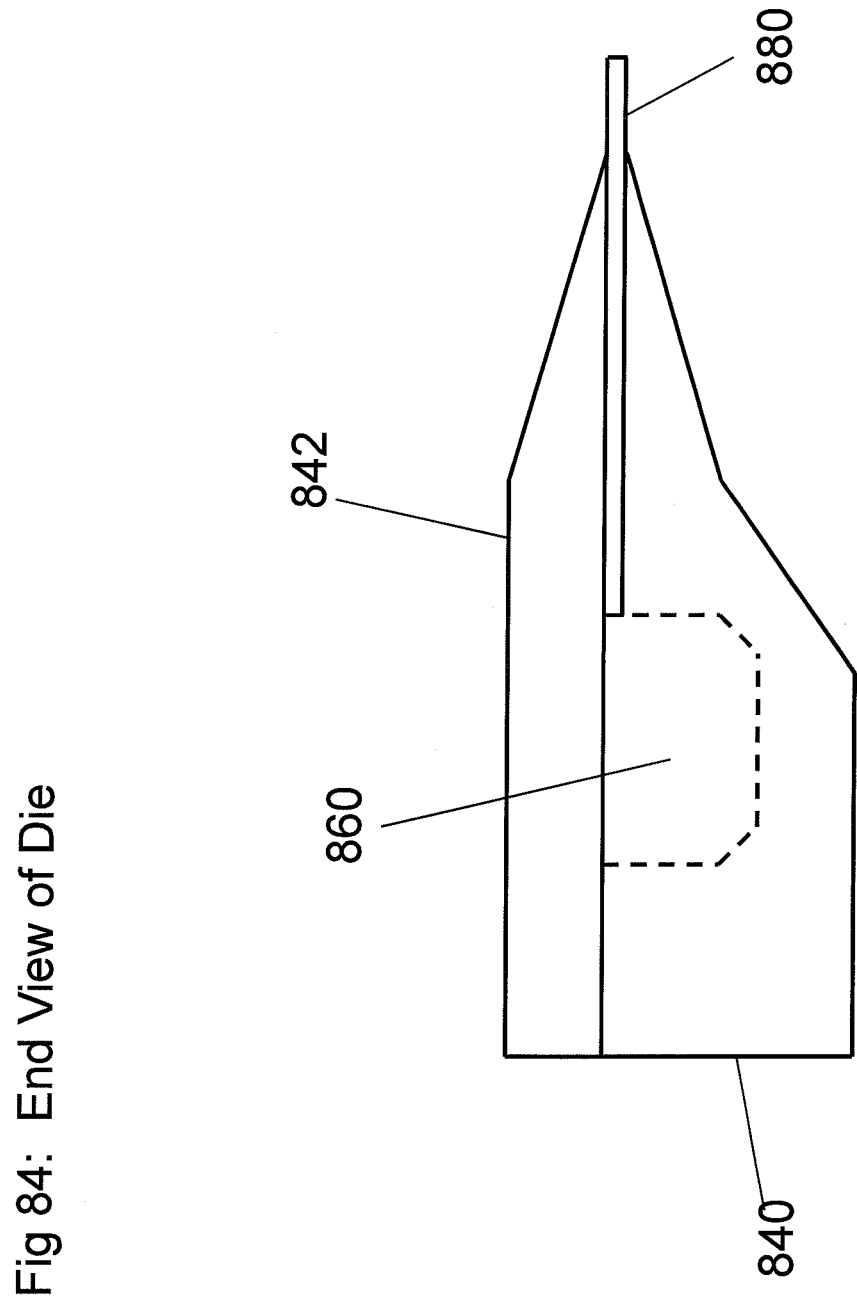
FIG. 84 is a schematic end view of a mist collection die.
Figure 85:
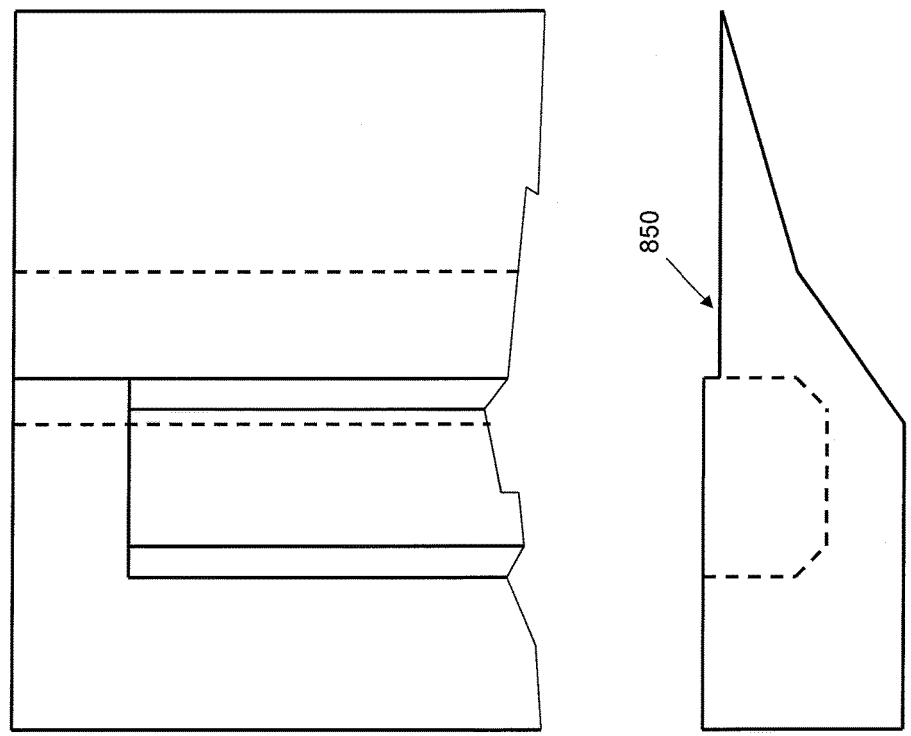
FIG. 85 shows schematic top and end view of a mist collection lower plate of a mist collection die.

The die is shown schematically in FIG. 84, and partial details of the bottom plate 840 and the protruding die tip element sheet 880 are shown in FIGS. 85 and 86 respectively.

Referring to FIG. 84, the die is composed of three pieces. They are the bottom plate 840, the top plate 842, and the sheet 880. A cavity 860 is machined into the bottom plate. Also, there is a recess 850 in the bottom plate down its entire length. This may be more clearly seen in the top and side view schematics of FIG. 85. The protruding die tip sheet 880 fits into the recess 850 and is held in place by the clamping of the top plate. The sheet connects and directs flow between the die exterior and the cavity 860. Attachment mechanisms for holding the three die pieces together are not shown. Additionally, the cavity is connected by process lines and entrance ports to a vacuum system. These also are not shown.

The protruding die tip sheet is a useful design element of the die. It is constructed from rigid materials. Inside this sheet multiple flow passages provide paths to conduct mist laden air from the confinement zone into the cavity 860 of the collection die. The sheet will both transport mist laden air and filter mist from the air. The sheet passageways may be designed to have a probability of capturing mist. Since the sheet will tend to become laden with mist material, low cost disposable sheets are preferred.

Mist capture fluid distribution sheets allow many design and operational advantages. The sheets may be single pieces or multiple pieces placed end to end across the die width. Dies can be designed with quick opening clamp mechanisms for rapid replacement of strips. Strips may be inserted from one die end and simultaneously removed from the other end.

In operation, the passages of the sheet provide precise and uniformly dimensioned flow passages. With a proper die design, this produces uniform air flow into the cavity along the length of the roll nip. The sheet design may be accomplished using the same flow modeling techniques described earlier. Additional inertial effects must be taken into account for the high speed flow of air in the die cavity. Inertia is discussed in the article "Inertia and gravitational effects in extrusion dies for non-Newtonian fluids", W. K. Leonard, Polym. Eng. Sci., 25, 9 (1985), pp. 570-576.

The sheets may be constructed from plastics, metals, ceramics, and other solid materials. They may be sheets containing micro-replicated flow channels, and they may be assembled from multiple single sheets. Plastic materials are preferred to reduce the potential clashing damage to the rolls and to minimize costs. These active flow elements may be laminated to or sandwiched between plates that provide support or rigidity.

The mechanical design and fabrication of the die and associated mountings are not a demanding task compared to manufacture of precision extrusion or coating dies. While coating dies are commonly machined to tolerances of plus or minus 0.0005 or 0.001 inches, tolerances here may be an order of magnitude larger. Those with ordinary skills in the art of precision die design will have no difficulty in fabricating the extractor die, its positioning mechanisms, and its mounting fixtures.

The mounting and positioning of the die requires only standard technology used by coating equipment vendors. The exact details depend upon the design and operation of the multi-roll coater. The movement of the die into the nip during startup, shut down, and emergency stops are preferred to be automatically controlled. The accurate positioning of the die between the rolls may be controlled manually or electronically. A control system may include position sensors, feedback algorithms, adjustable mechanical stops, mist density sensors, etc. Piezoelectric and magnetostrictive actuators are useful for the automatic control of positioning to a roll. These are described in U.S. Pat. No. 5,409,732. All of these features are considered within the scope of this invention.

The metering sheet may be fabricated as a single piece typically by a casting or extrusion process. The sheet may be rigid, or flexible and supported by rigid plates.

It is preferred that if a particle clogs the sheet at a point the flow diverts around the clog and continues through the surrounding channels. The preferred sheet allows flow in both perpendicular and parallel to the length direction of the die.

The compactness of the mist extractor and its operating principles achieve mist collection without the need to process huge volumes of contaminated air. This approach is attractive because it does not depend on the coating formulation, and it lacks the negative features of a HVAC enclosure technology.

L. Expanded Embodiments

The preceding description, drawings, examples and claims represent embodiments of the present invention. However, it will be understood that various additions, substitutions, combinations and modifications may be made without departing from the spirit and scope of the present invention. It will be clear to those with ordinary skills in the art that the present invention may be embodied in other specific forms, arrangements, structures, proportions, combined with other elements and components and be constructed of other materials without departing from the spirit and scope of the present invention. The disclosed embodiments are to be considered as illustrative and not restrictive of the scope of the invention. All of the patents and patent applications cited above are incorporated by reference into this document in total.

The embodiments above are chosen, described and illustrated so that persons skilled in the art will be able to understand the invention and the manner and process of making and using it. The descriptions and the accompanying drawings should be interpreted in the illustrative and not the exhaustive or limited sense. The invention is not intended to be limited to the exact forms disclosed. While the application attempts to disclose all of the embodiments of the invention that are reasonably foreseeable, there may be unforeseeable insubstantial modifications that remain as equivalents. It should be understood by persons skilled in the art that there may be other embodiments than those disclosed which fall within the scope of the invention as defined by the claims. Where a claim, if any, is expressed as a means or step for performing a specified function it is intended that such claim be construed to cover the corresponding structure, material, or acts described in the specification and equivalents thereof, including both structural equivalents and equivalent structures, material-based equivalents and equivalent materials, and act-based equivalents and equivalent acts.

The invention claimed is:

1. A filter media, including a porous material, for filtering target particles from a fluid comprising:
   a plurality of passages fluidically connecting an inlet side of the filter media and to an outlet side of the filter media, each passage having a first flow resistance and a first target particle capture probability,
   a plurality of fluid flow auxiliary micro-channels connected to a portion of the passages, each micro-channel having a second flow resistance and a second target particle capture probability substantially different from the average of the first flow resistances and the average of the first target particle capture probabilities;
   wherein the passages-direct fluid from the filter media inlet side-to the filter media outlet side, and
   wherein target particles in the fluid flowing through the passages and the auxiliary micro-channels are removed by the passages.

2. The filter media of claim 1, wherein the filter media is a sheet comprising:
   a bounding upper surface;
   a bounding lower surface;
   an edge circumscribing the sheet, the edge having
   a fluid distribution region; and
   at least one fluid inlet on the sheet;
   wherein the filter media passages allow flow through the sheet both toward and parallel to the fluid distribution region; and
   wherein the sheet contains a plurality of passages that have a first average flow resistance in the direction toward the fluid distribution region, and a different average first flow resistance in the direction parallel to the fluid distribution edge.

3. The filter media of claim 2 wherein the passages have a hydraulic diameter to a flow length ratio greater than 0.1.

4. The filter media of claim 2 wherein the ratio of the first average flow resistance in the direction parallel to the fluid distribution edge to the first average flow resistance in the direction toward the fluid distribution edge is greater than one.

5. The filter media of claim 1 wherein the passages have a distribution of sizes and an average size, the passages have a distribution of target particle capture probabilities and an average target particle capture probability, and the passages have a distribution of flow resistances and an average flow resistance.

6. The filter media of claim 1 wherein the porous material is an assemblage of solid grains wherein the grains have dimension aspect ratios ranging between one and ten thousand.

7. The filter media of claim 1 wherein the auxiliary micro-channels have substantially lower target particle capture probabilities than the passages average target particle capture probability.

8. The filter media of claim 1 wherein the auxiliary micro-channels have substantially zero target particle capture probabilities.

9. The filter media of claim 1 wherein the auxiliary micro-channels have substantially lower flow resistances than the average of the passages.

10. The filter media of claim 1 wherein the auxiliary micro-channels have hydraulic radii between one micron and one thousand microns.

11. The filter media of claim 1 wherein a plurality of inlet auxiliary micro-channels connect to the inlet side.

12. An apparatus of claim 1 wherein a plurality of outlet auxiliary micro-channels connect to the outlet side.

13. The filter media of claim 1 wherein the auxiliary micro-channels include inlet auxiliary micro-channels connected to the inlet side but not to the outlet side and outlet auxiliary micro-channels connected to the outlet side but not to the inlet side.

14. The filter media of claim 1 wherein the number of inlet micro-channels exceeds the number of outlet micro-channels by a factor of greater than 2.

15. The filter media of claim 1 wherein the ratio of the flow resistance of the auxiliary micro-channels to the average passage flow resistance varies with position within the filter media.

16. The filter media of claim 13: wherein:
   a portion of the inlet and outlet auxiliary micro-channels pass by each other within the filter media,
   wherein the filter media has a specified probability of capturing the average target particle,
   wherein a distance of influence exists such that the average probability of the average target particle traveling through the passages from a point spaced at the distance of influence away from the outlet auxiliary micro-channel and being captured is equal to or greater than the specified probability of capturing the average target particle,
   wherein the inlet auxiliary micro-channels are spaced away from any of the outlet auxiliary micro-channels at a distance greater than the distance of influence, and
   wherein the distance of influence varies with the angular coordinate direction around the centerline of the outlet auxiliary micro-channels.

17. The filter media of claim 1 wherein each passage has a specified probability of capturing the target particle, a specified fluid flow resistance, and a specified spatial location and orientation, and wherein each auxiliary micro-channel has a specified probability of capturing the target particle, a specified fluid flow resistance, and a specified spatial location and orientation.

18. The filter media of claim 1 wherein the density of the porous material with auxiliary micro-channels present is not less than eighty percent of the density of the porous material without auxiliary micro-channels present.

19. An apparatus of claim 1 wherein the auxiliary micro-channels are randomly distributed within the filter media.

20. A method of filtering target particles from a fluid comprising the steps:
   providing a container including at least one container inlet and at least one container outlet, at least one container inlet and at least one container outlet fluidically connected to the inside of the container;
   providing a filter media of a porous material including:
      a plurality of passages fluidically connect to an inlet side of the filter media and to an outlet side of the filter media, and wherein the each passage has a first flow resistance and a first target particle capture probability, and;
      a plurality of fluid flow auxiliary micro-channels connect to a portion of the plurality of passages and have second flow resistances and second target particle capture probabilities substantially different from the average of the first flow resistances and the average of the first target particle capture probabilities;

locating the filter media within the container;
providing a fluid containment means that directs the fluid from the container inlet to the filter media inlet side, through the filter media, to the filter media outlet side, and to the container outlet;
positioning the container in a fluid flow path;
flowing fluid containing target particles through the passages and the auxiliary micro-channels; and
removing target particles from the fluid.

* * * * *